United States Patent [19]
Boles et al.

[11] 3,872,442
[45] Mar. 18, 1975

[54] SYSTEM FOR CONVERSION BETWEEN CODED BYTE AND FLOATING POINT FORMAT

[75] Inventors: John A. Boles, Rosemount; Charles M. Chu, St. Paul; Peter B. Criswell, Bethel; Aron Rolnitzky, Burnsville, all of Minn.

[73] Assignee: Sperry Rand Corporation, New York, N.Y.

[22] Filed: Dec. 14, 1972

[21] Appl. No.: 315,150

[52] U.S. Cl. .......... 340/172.5
[51] Int. Cl. .......... G06f 9/00
[58] Field of Search .......... 340/172.5; 444/812.1; 235/154, 159, 164

[56] References Cited

UNITED STATES PATENTS

| | | | |
|---|---|---|---|
| 3,037,701 | 6/1962 | Sierra | 235/159 |
| 3,389,379 | 6/1968 | Erickson et al. | 340/172.5 |
| 3,460,095 | 8/1969 | Caroussos | 340/172.5 |
| 3,701,893 | 10/1972 | Shimaya et al. | 235/154 |
| 3,742,198 | 6/1973 | Morris | 235/154 |

*Primary Examiner*—Thomas J. Sloyan
*Attorney, Agent, or Firm*—Thomas J. Nikolai; Kenneth T. Grace; Marshall M. Truex

[57] ABSTRACT

Conversion circuitry for converting coded byte strings representative of floating-point numbers to single-precision or double-precision binary floating-point number equivalents, and conversion circuitry for converting single-precision of double-precision binary floating-point numbers to coded byte string equivalent representations are described. The conversion circuits are included in the arithmetic section of an electronic data processor, and operate to perform the conversion under electronics sequence timing control without software intervention during the conversion process. The circuitry to convert from floating to coded byte format includes circuitry for converting a biased binary characteristic to an equivalent exponent representation, and circuitry for converting the binary coded mantissa to an equivalent coded byte string, and includes circuitry for establishing the sign of the exponent portion and the sign of the mantissa portion. The circuitry for converting from coded byte format to floating-point includes circuitry for detecting the mantissa characters and converting to a double-precision floating-point format, and circuitry for detecting the exponent characters and converting to a biased floating-point characteristic, with circuitry for establishing the sign of the characteristic and the sign of the mantissa. For converting from a coded byte to a single-precision floating-point format, there is also circuitry included for compressing the double-precision floating-point result to a single-precision floating-point format.

20 Claims, 118 Drawing Figures

INSTRUCTION STREAM

OPERAND ADDRESS GENERATION

COMMAND ARITHMETIC UNIT FUNCTIONAL BLOCK DIAGRAM

| REGISTER | ADDRESS (OCTAL) | |
|---|---|---|
| | USER | EXECUTIVE |
| J0 | 106 | 126 |
| J1 | 107 | 127 |
| J2 | 110 | 130 |
| J3 | 111 | 131 |

SR1- STAGING REGISTER 1 (GRS $103_8$)

SR2- STAGING REGISTER 2 (GRS $104_8$)

SR3- STAGING REGISTER 3 (GRS $105_8$)

BYTE STRING

LOOK-UP TABLE (LUT)

BRANCH SELECTION LOGIC
(fj = 33,16 or 33,17)

BYTE TO FLOATING-POINT (33,14 & 33,15)

SYSTEM FOR CONVERSION BETWEEN CODED BYTE AND FLOATING POINT FORMAT

BACKGROUND OF THE INVENTION

1. Field Of The Invention addition

This invention relates to computing devices and particularly to conversion circuits for use in computing devices which operate on data both in coded byte string formats and single-precision or double-precision binary floating-point formats, in addition to conventional binary formats. More particularly, this invention relates to conversion circuitry for use in computing devices for converting coded byte strings representative of floating-point numbers to single-precision or double-precision binary floating-point numbers, and for converting single-precision or double-precision binary floating-point numbers to coded byte string equivalent representations. Still more particularly, this invention relates to conversion circuitry of the type described that is operable in the arithmetic section of an electronic computing device wherein the conversions are performed under sequence timing control within the arithmetic section without the need of software intervention during the conversion processes.

2. State Of The Prior Art

Data processing systems available in the prior art are known to include the computational capability of operating on single-precision or double-precision floating-point binary numbers. Similarly, prior art data processing devices are known having the capability of performing arithmetic operations and manipulations of coded byte strings, for example of the Fortran formats. It is also a common practice in the prior art computing devices to provide input data in a coded format, such as a Fortran format, and to cause the conversion of this coded input data into a format more readily handled in calculations within the computing device, such as single-precision or double-precision floating-point binary formats. Having converted the input data, completed the arithmetic operations or data manipulations, it is common to provide a conversion back to the same format as the input data so that it can be provided as output representations in a form that is more readily read and understood by the user. It is common for the input data to be represented in decimal, with a mantissa portion and an exponent portion for numerical quantities. It is also common to have a sign applicable to the mantissa portion and to the exponent portion. In the prior art, single-precision and double-precision floating-point number formats are well known, and arithmetic systems for manipulating single-precision or double-precision floating-point numbers exist in the present day computing art.

In prior art computing systems where it was desired to have the capability of providing input data in a coded decimal format, and to carry on the internal calculations or data manipulations in a floating-point binary format, and to provide the output representations in a coded decimal format, it was necessary to have programs of computer instructions to perform the conversion operations. In stored program computing devices, these conversion programs would characteristically include a set of instructions for evaluating the coded decimal digits of a mantissa portion together with instructions for converting the decimal mantissa to an equivalent floating-point mantissa. Further, a sequence of instructions was required for evaluating the decimal coded digits of the exponent portion and performing the conversion to a binary characteristic for a single-precision or double-precision floating-point representation. It was of course essential that these sequence of stored program instructions include sufficient evaluation of the coded input data to be able to identify algebraic signs, blank conditions, decimal points, and format defining symbols.

In order to provide the conversion process from floating-point to coded byte strings, by use of prior art programming techniques, it was necessary to include program instructions for converting the binary floating-point mantissa to equivalent coded decimal byte string characters, and to convert the floating-point characteristic to an equivalent coded decimal exponent. It was of course also necessary to provide instructions for evaluating the sign of the mantissa and characteristic portions, and for generating the appropriate format of the coded byte string.

For these programmed conversions, it is necessary to have a sequence of computer instructions, and normally these sequences of computer instructions must be stored in a memory section and available during the specified conversion operations. The storage of these sequences of instructions utilizes many addressable memory locations due to the complexity of the conversion operations.

In operation, then, these programmed prior art conversion systems require that one or more conversion subroutines, or sequences of computer instructions, be executed each time that a coded byte to floating-point or floating-point to coded byte conversion is specified. In view of the extensive amount of format evaluation, and conversion steps required, these subroutines characteristically require many instructions, and therefore require many references to storage, together with translation and execution of each of the individual instructions in the sequence. Therefore, the programmed conversion techniques of the prior art are highly inefficient in the use of computational time, due to the extended number of instructions that must be performed, and is inefficient in the use of the computer storage and storage references.

For the programmed conversions, there is often times required the use of instructions such as floating-point multiply or floating-point divide, either single-precision or double-precision, together with instructions for converting binary to decimal and decimal to binary, as well as the usual arithmetic instructions such as add, substract, multiply, and divide. There are also instructions required for the compaction of data, and format conversion instructions. It is of course plain that each of these instructions requires the control sequence for accessing the instruction from a memory system, as mentioned above, together with the set-up time of the instruction. Set-up will include establishing data words in the appropriate registers, initializing the hardware for performing the instruction, and establishing an appropriate timing sequence to accomplish the instruction. There is time lost, then, in the procurement of the arithmetic and data manipulating type instructions, as well as in the set-up of these instructions.

Since the conversion processes are normally input data dependent as to the amount of time required to perform the conversions, it is difficult to get an accurate average timed expenditure for the conversion processes, but it is plain that the programmed conversions are complex and require many memory references for procuring instructions, handling of constants, storing of intermediate results and accessing intermediate results, and storing final results.

It can be seen, then, that the primary problems with the programmed approach to conversion between coded byte and floating-point formats involves the large number of storage registers that must be utilized to store the conversion program instructions, the excessive amount of computational overhead time that is required to procure each instruction in the conversion routine, and the amount of set-up time that is required to initialize and initiate each instruction. Since the basic goal is for an optimum through-put of data in a data processing system, it can be seen that the programmed conversions are inefficient by virtue of the problems described.

SUMMARY

The signal responsive data processing apparatus for use in an electronic arithmetic system for converting data formats between coded byte string formats representative of floating-point numbers and floating-point data formats includes circuitry that is arranged in the arithmetic section of an electronic data processor, and operates to perform the conversions under electronic sequence timing control without software intervention during the conversion process. The conversion circuitry includes receiving circuitry for receiving manifestations indicative of a numerical value expressed as a floating-point number in a first data format having a predetermined numerical capacity to be converted to manifestations indicative of the equivalent of said numerical value expressed as a floating-point number in a second format having a predetermined numerical capacity, these receiving circuits including storage circuits for at least temporarily receiving and storing a first group of manifestations indicating the characteristic of the number and representing the power of the number base of said number in the first format, together with a second group of manifestations indicative of the mantissa for representing the numerical value of the number expressed in said first format, together with manifestations indicative of the arithmetic sign in the first format. The conversion circuitry includes an arithmetic system having input circuits coupled to the receiving circuits for receiving the input manifestations for conversion. The arithmetic system is capable of performing a plurality of data manipulation and data transfer operations required in the conversion processes. The arithmetic system also includes branch control circuits for causing the arithmetic system to perform selected ones of the available data manipulation or transfer operations, the sequence of branch execution being dependent on whether the conversion is from coded decimal format to binary floating-point format or from binary floating-point format to coded decimal format, and upon the actual data manifestations presented for conversion. The branch control and designation circuitry is operative to complete the selected conversion, once initiated, without further instruction or program intervention. Instruction control circuitry is arranged for selecting and activating conversion from one format to another in response to the appropriate programmed instruction. Once the type of conversion is programmably selected, the branch control circuitry selects the predetermined ones of the available branches or data manipulation and transfer sequences in the arithmetic system for converting the first manifestations indicative of the characteristic to different manifestations indicative of the characteristic representing the power of the number base of the number in the second format, and for converting the second manifestations to other manifestations indicative of the mantissa representing the numerical value of the number and as expressed in the second data format. The system also includes circuitry for converting manifestations indicative of sign in a first format to other manifestations indicative of sign in the other format.

The conversion circuitry of this invention includes controlled branch sequences for converting an input data word from floating-point to coded byte format, and includes branch sequences for converting a biased binary characteristic to an equivalent exponent representation, and controlled branch sequences for converting the binary coded mantissa to an equivalent coded byte string, and includes circuitry for establishing the sign of the exponent portion and the sign of the mantissa portion. The branch sequence selection for this conversion process is controlled by the programmed selection instruction, and the actual input data word.

The conversion system of this invention also includes branch sequence selection and control circuitry for controlling the required arithmetic sequences for converting an input data word from a coded byte format to a floating-point format, and includes branch sequences for detecting the mantissa characters and converting to double-precision floating-point format, branch sequences for detecting the exponent characters and converting to a biased floating-poing characteristic, with circuitry for establishing the sign of the characteristic and the sign of the mantissa. Once selected by an appropriate programmed instruction, this conversion process is also dependent upon the input data word for control of the conversion process.

The arithmetic system of this invention utilizes an internal system for generating required constants during the conversion processes, rather than utilizing a memory storage location for each constant as is required in the prior art programmed conversion processes.

In view of the foregoing described deficiencies of prior art conversion systems, it is a primary object of this invention to provide improved conversion circuitry for use in an electronic data processing system for selectively converting data words expressed in a first coded format to equivalent data words expressed in a second coded format. Another object of this invention will be to provide an improved data conversion system having the capability of converting coded byte strings representative of floating-point numbers to single-precision or double-precision binary floating-point number equivalents. Still another object of this invention is to provide an improved data format conversion system having the capability of converting single-precision or double-precision binary floating-point numbers to coded byte string equivalent representations. Another object of this invention is to provide a data format conversion system for converting data words expressed in a first format to equivalent data words expressed in a second format without requiring the need of program intervention once the conversion has been initiated. Still another object of this invention is to provide an improved data format conversion system that minimizes the number of memory access times required during the conversion operation. Yet a further object of this invention is to provide an improved data format conversion system wherein the conversion operation can be selected by a single programmed instruction. Yet a further object of this invention is to provide an improved data format conversion system wherein the format conversion is accomplished in the arithmetic section of a data processing system. Yet a further object of this invention is to provide an improved data format conversion system for use in conjunction with the arithmetic section of a data processing system, whereby the conversion system controls the selection of the arithmetic and data transfer sequences available in the arithmetic section for accomplishing the format conversions. Another object of this invention is to provide an improved data format conversion system in conjunction with the arithmetic section of a data processing system, wherein constants required in the conversion operations are generated within the arithmetic section and do not require memory access. A further object of this invention is to provide an improved data format conversion system capable of selectively converting data words expressed in a first format to a second format, or converting data words expressed in the second format to equivalent data words expressed in the first format. Yet a further object of this invention is to provide an improved data format conversion system for use in controlling the available arithmetic and data transfer operations of an arithmetic unit selectively, in response to a programmed selection of the conversion requested, and in response to the data word being converted. Yet a further object of this invention is to provide an improved data format conversion system having the capability to convert from a floating-point format to coded byte format and including circuitry for converting a biased binary characteristic to an equivalent exponent representation, circuitry for converting the binary coded mantissa to an equivalent coded byte string, and circuitry for establishing the sign of the exponent and the sign of the mantissa. Still another object of this invention is to provide an improved data format conversion system having the capability of converting input words in a coded byte format to equivalent words expressed in floating-point format, including circuitry for detecting the mantissa characters and converting to a floating-point equivalent, circuitry for detecting the exponent characters and converting to a biased floating-point characteristic, and circuitry for establishing the sign of the characteristic and the sign of the mantissa. Still a further object of this invention is to provide an improved branch control system for use in a data format conversion system. Another object of this invention is to provide an improved branch control system for controlling the branches of arithmetic and data transfer operations in an arithmetic system for providing data format conversion in response to a programmed instruction selecting the format conversion required, and in response to the data word being converted. Yet a further object of this invention is to reduce the number of storage registers required for accomplishing data format conversion by eliminating the need for programmed conversion routines and replacing the programmed routines with an instruction actuatable format conversion control. Still a further object of this invention is to provide an improved format conversion system that will minimize the computational overhead time required for converting data words from one format to another by minimizing memory access times by generating required constants internally, and eliminating programmed control once the conversion process has been programmably actuated.

BRIEF DESCRIPTION OF THE DRAWINGS

The foregoing, and other more detailed and specific objectives will be disclosed and become apparent in the course of the following specification and claims, with reference being made to the accompanying drawings, in which:

Figure 17:
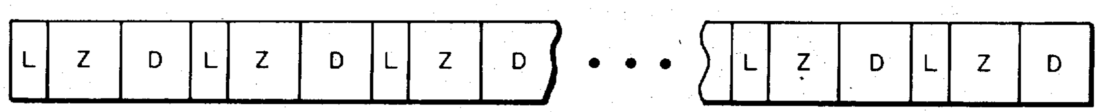
Figures 18, 18D:
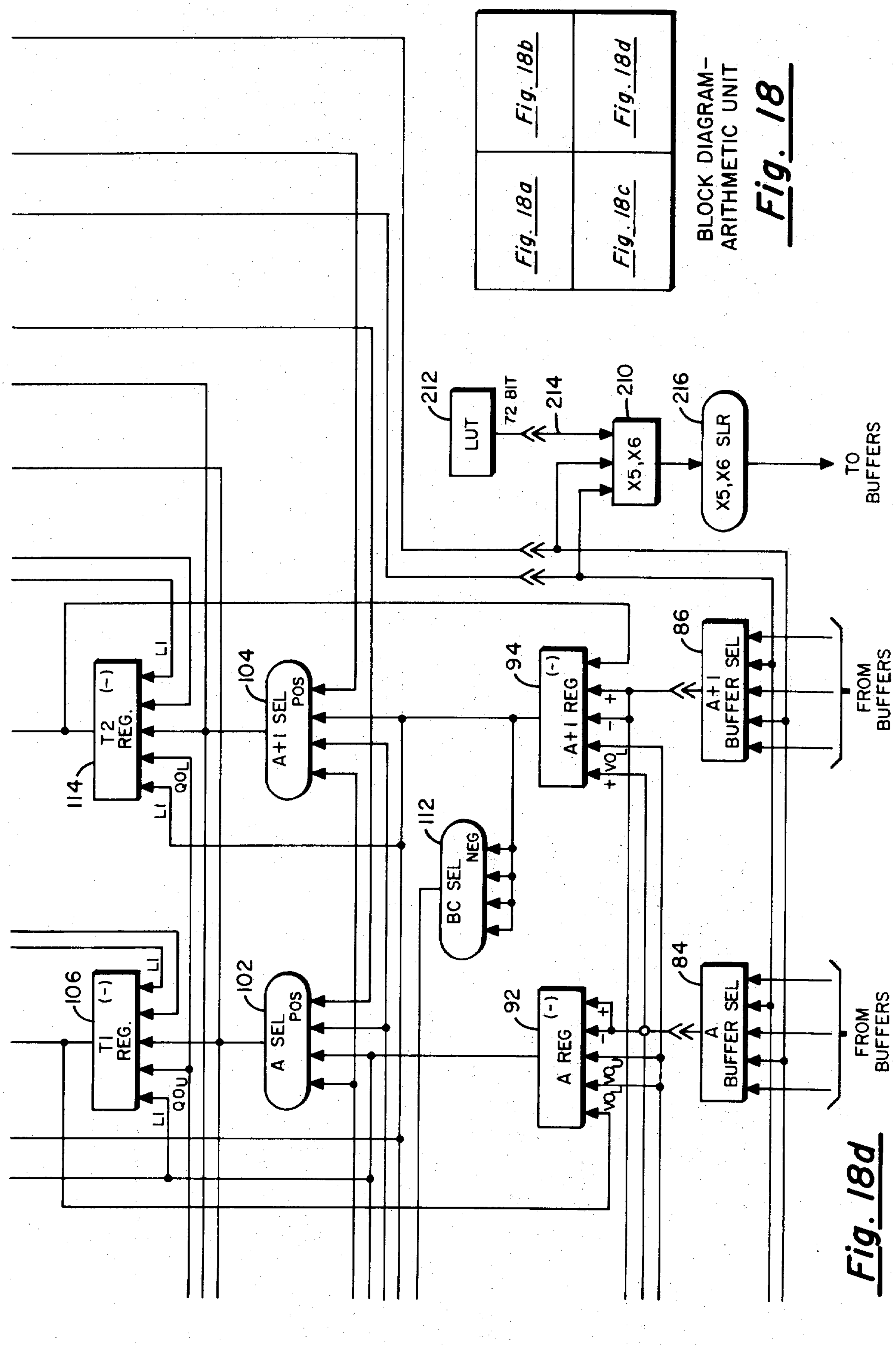
Figure 18A:
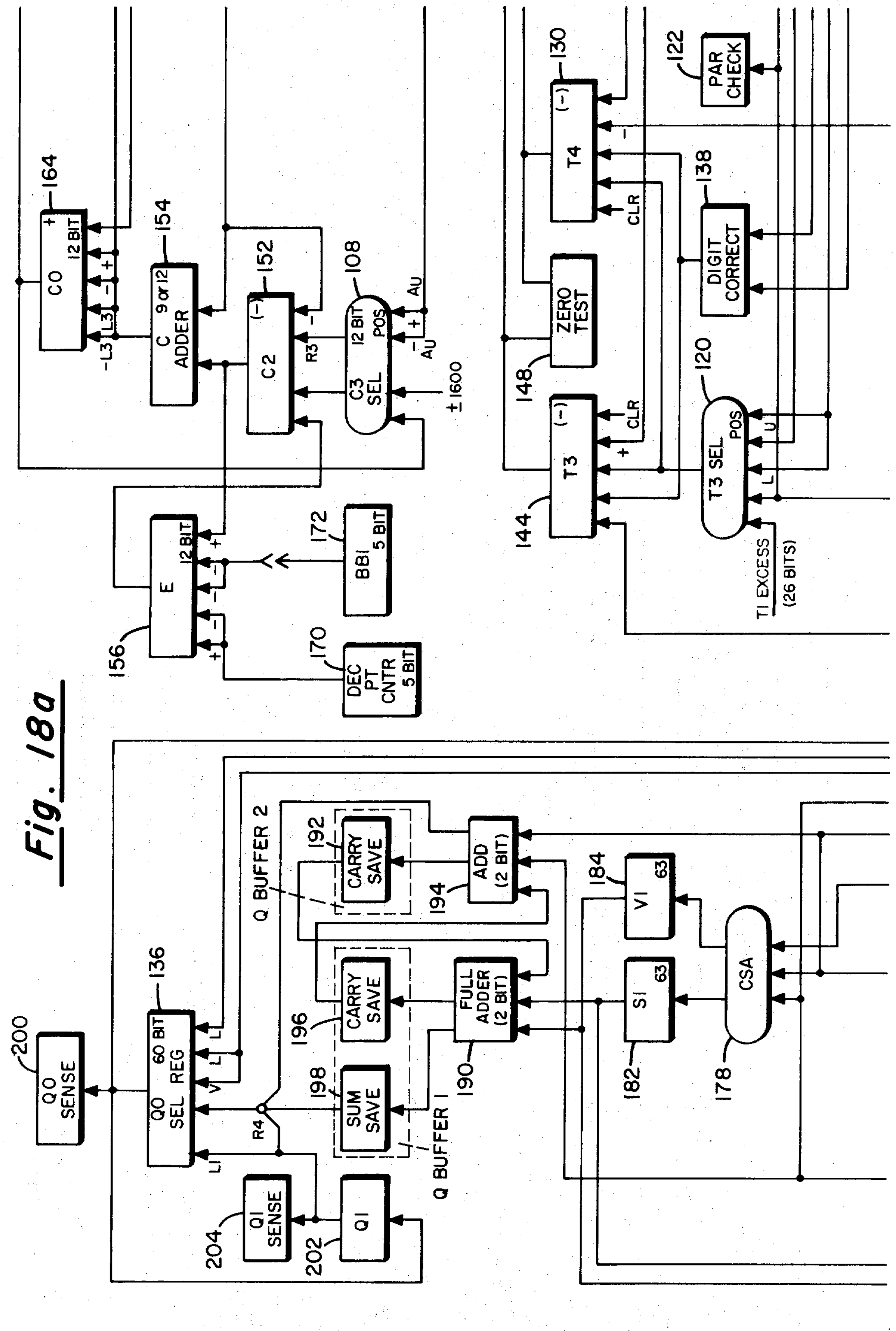
Figure 18B:
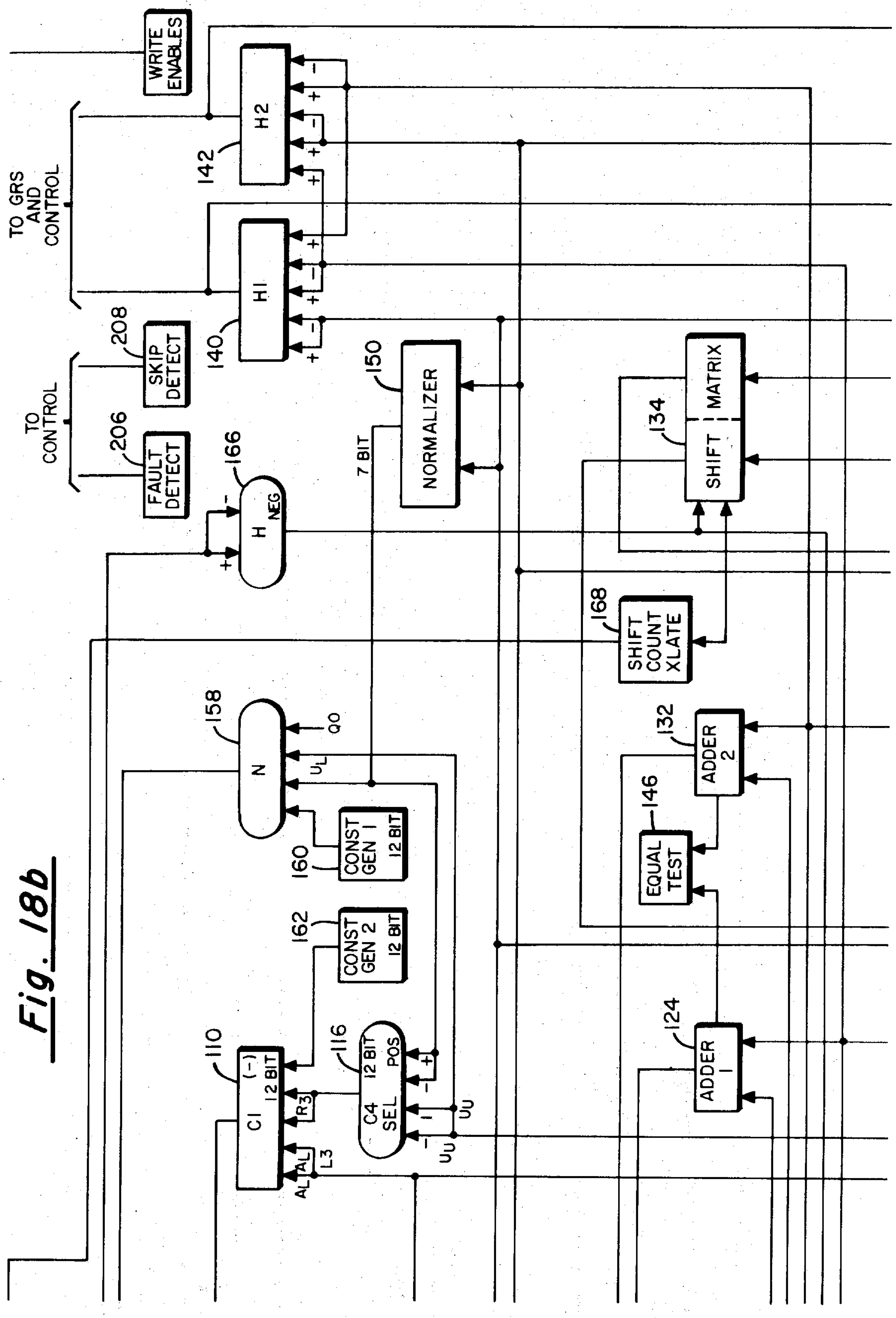
Figure 18C:
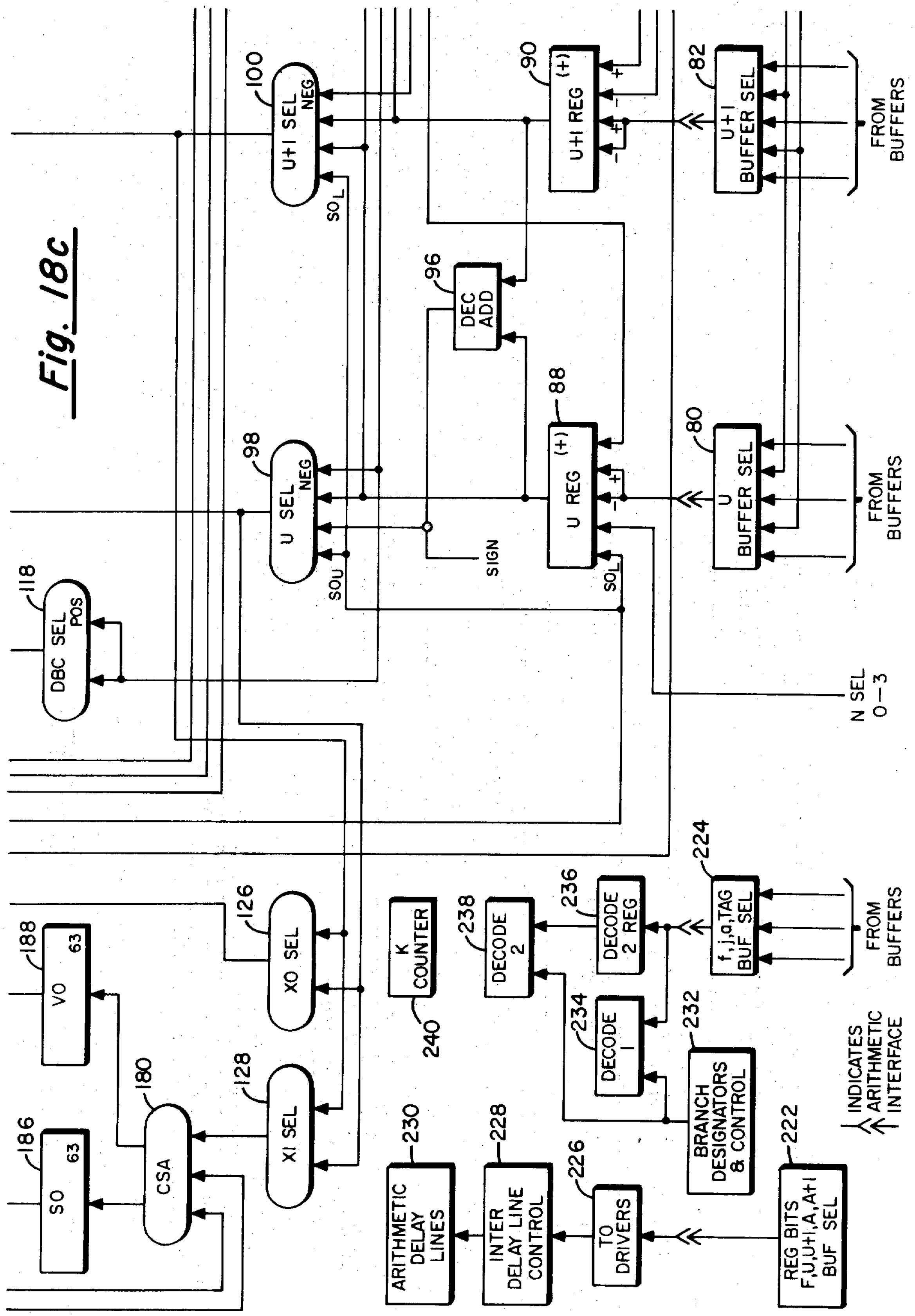
Figure 19A:
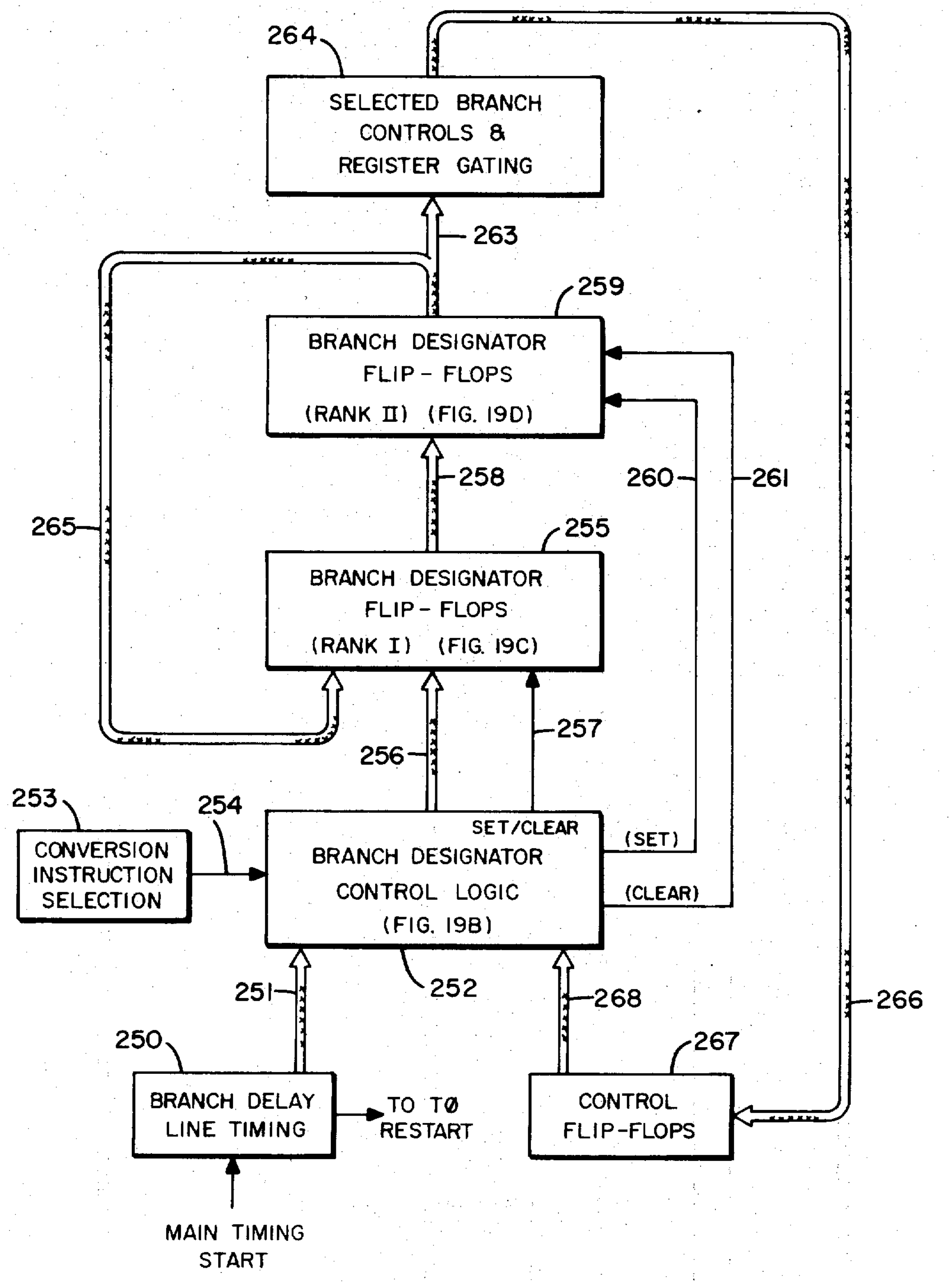
Figure 19B:
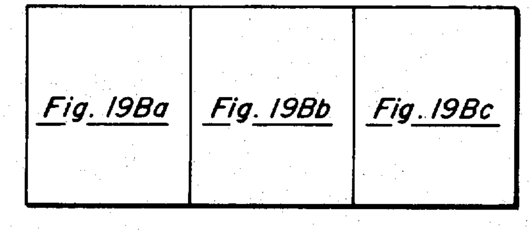
Figure 19B:
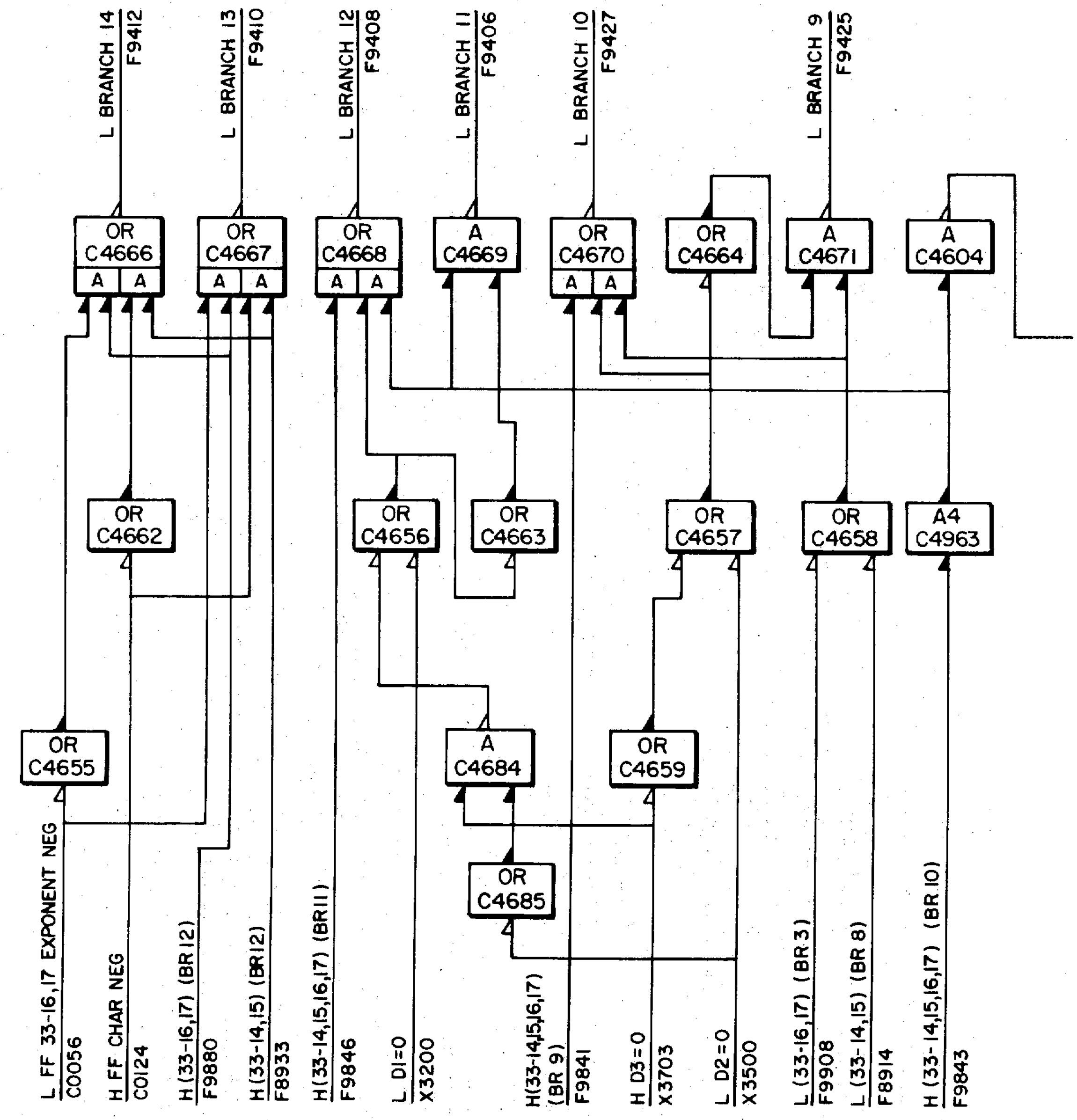
Figure 19B:
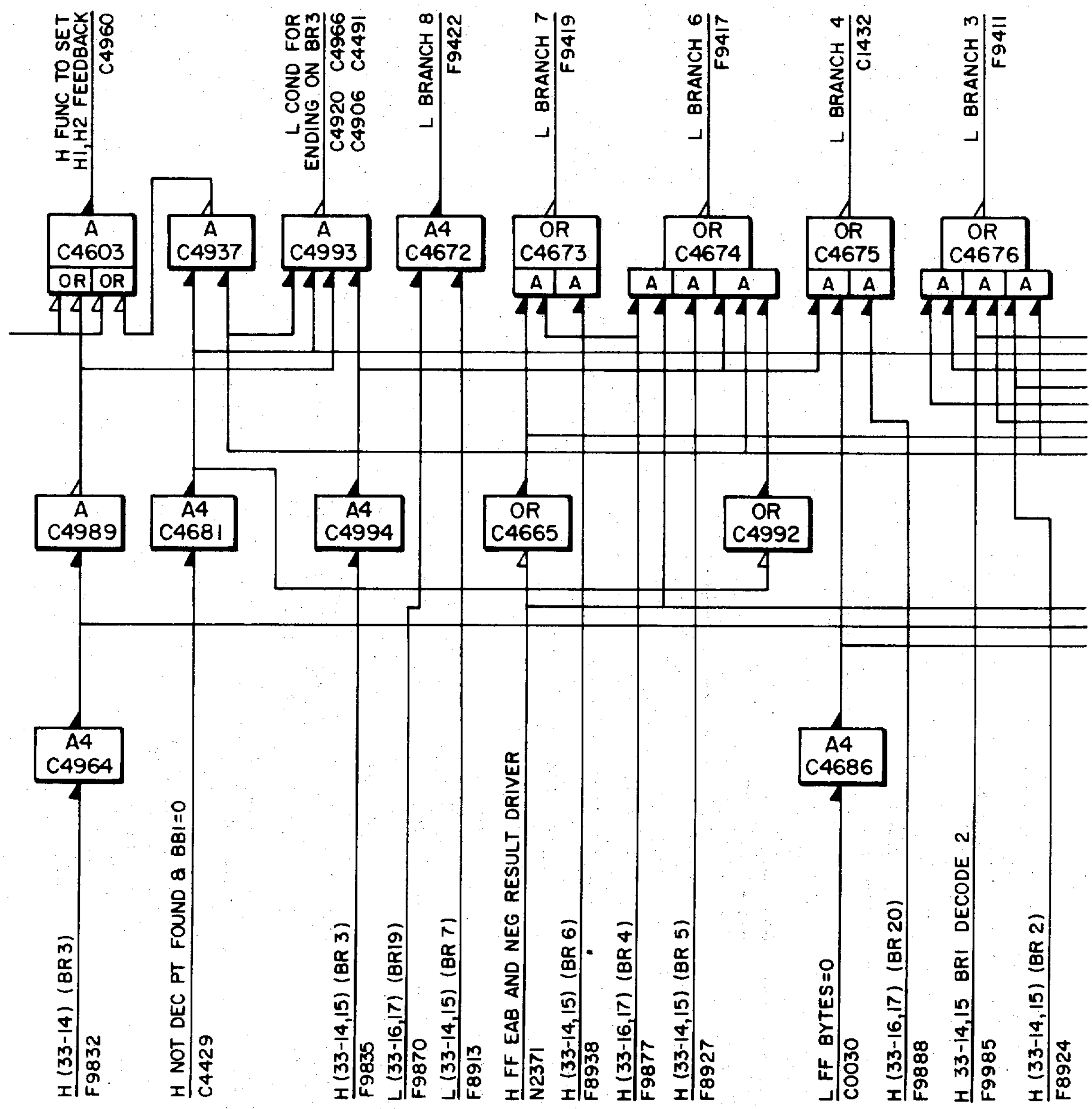
Figure 19B:
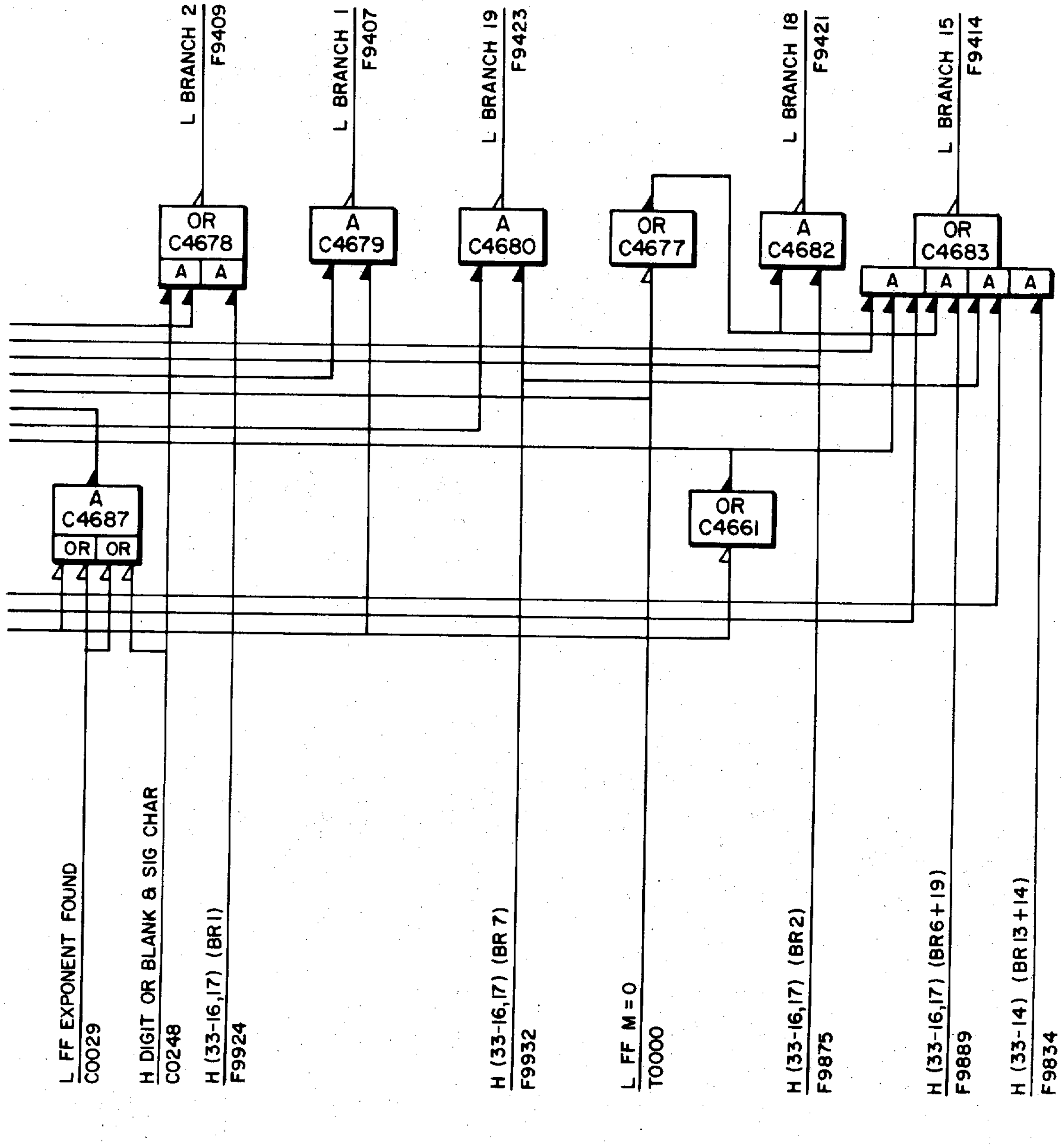
Figure 19C:
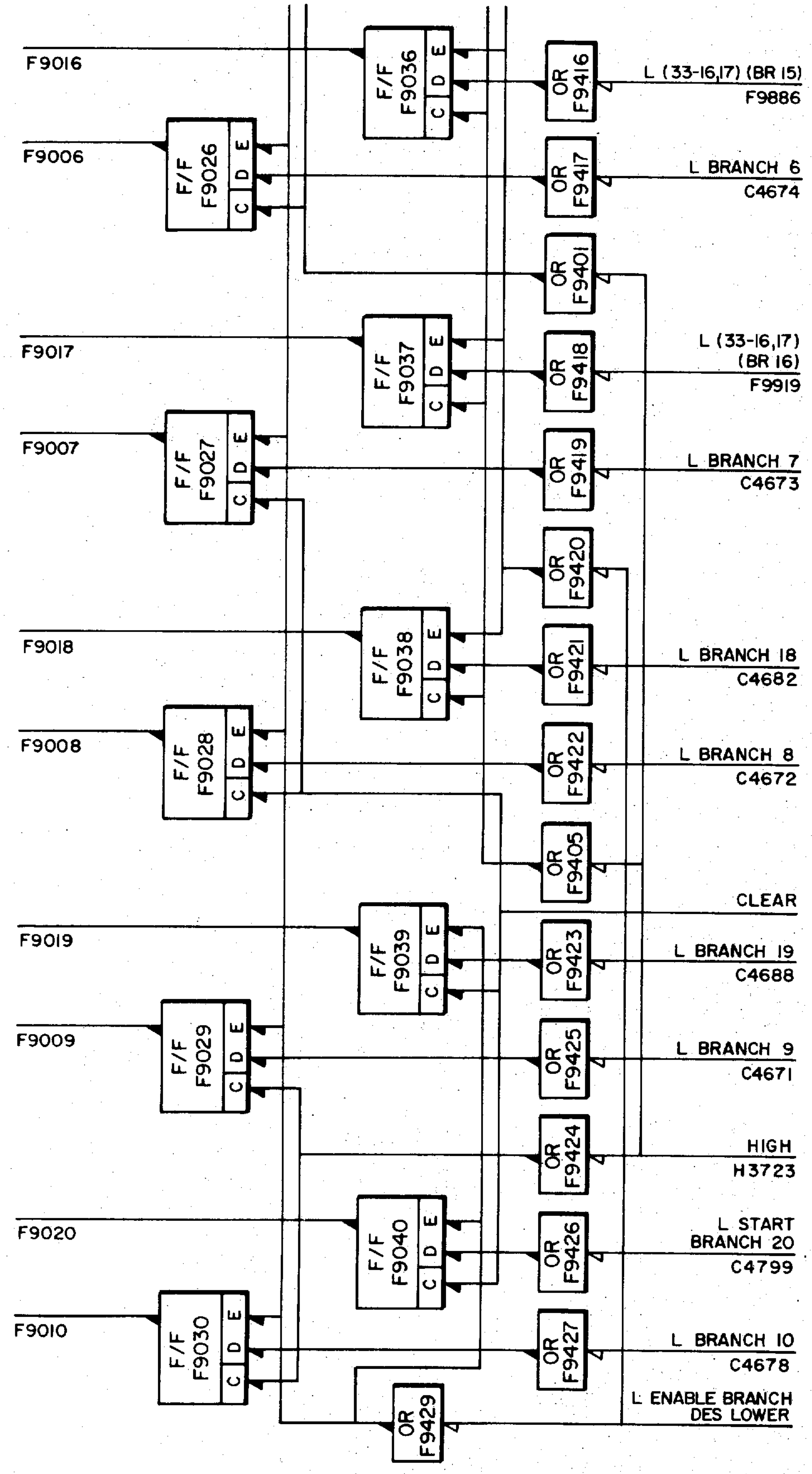
Figure 19C:
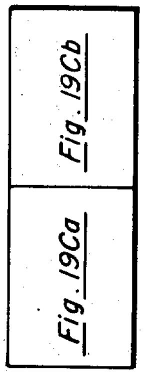
Figure 19C:
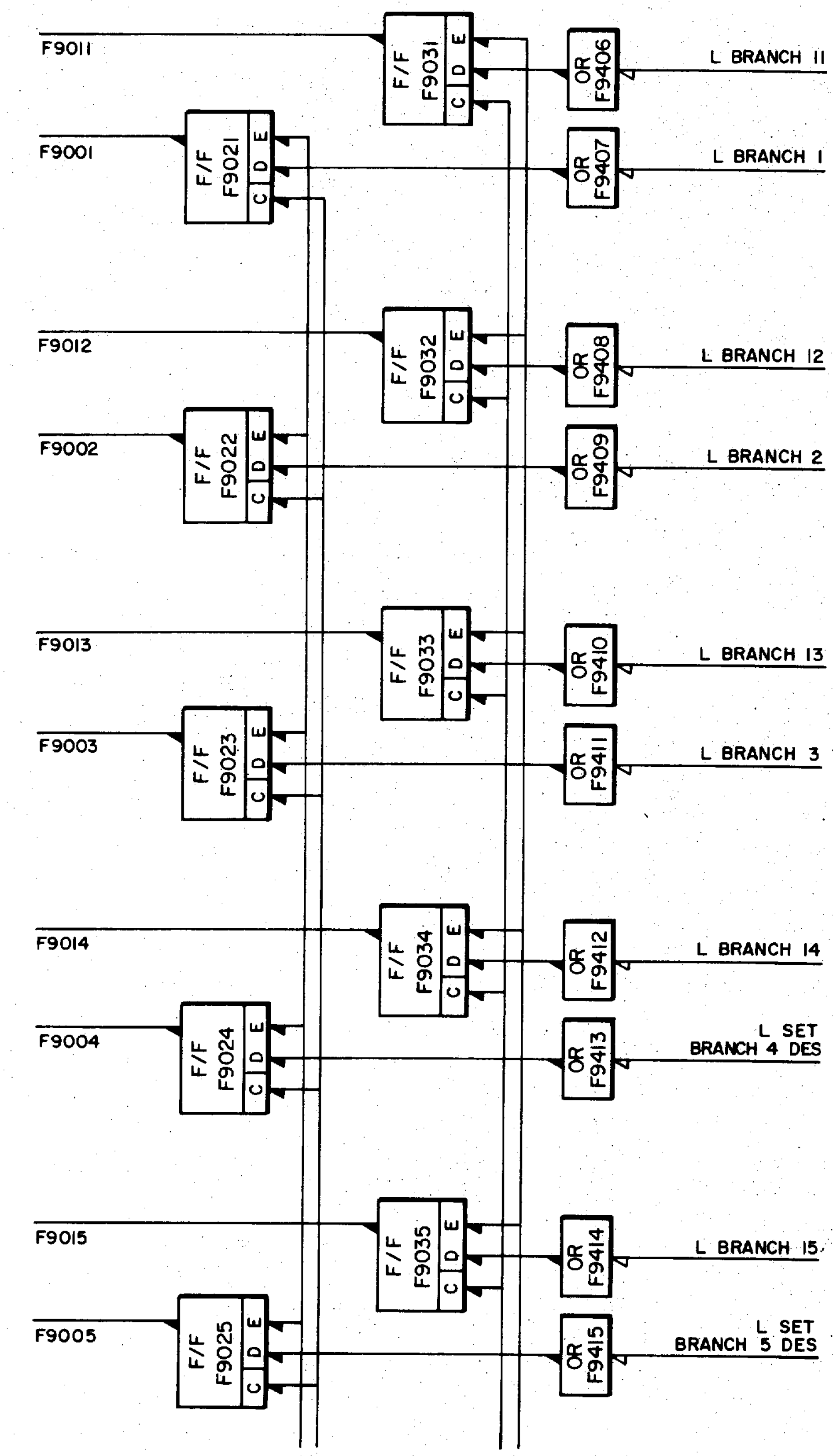
Figure 19D:
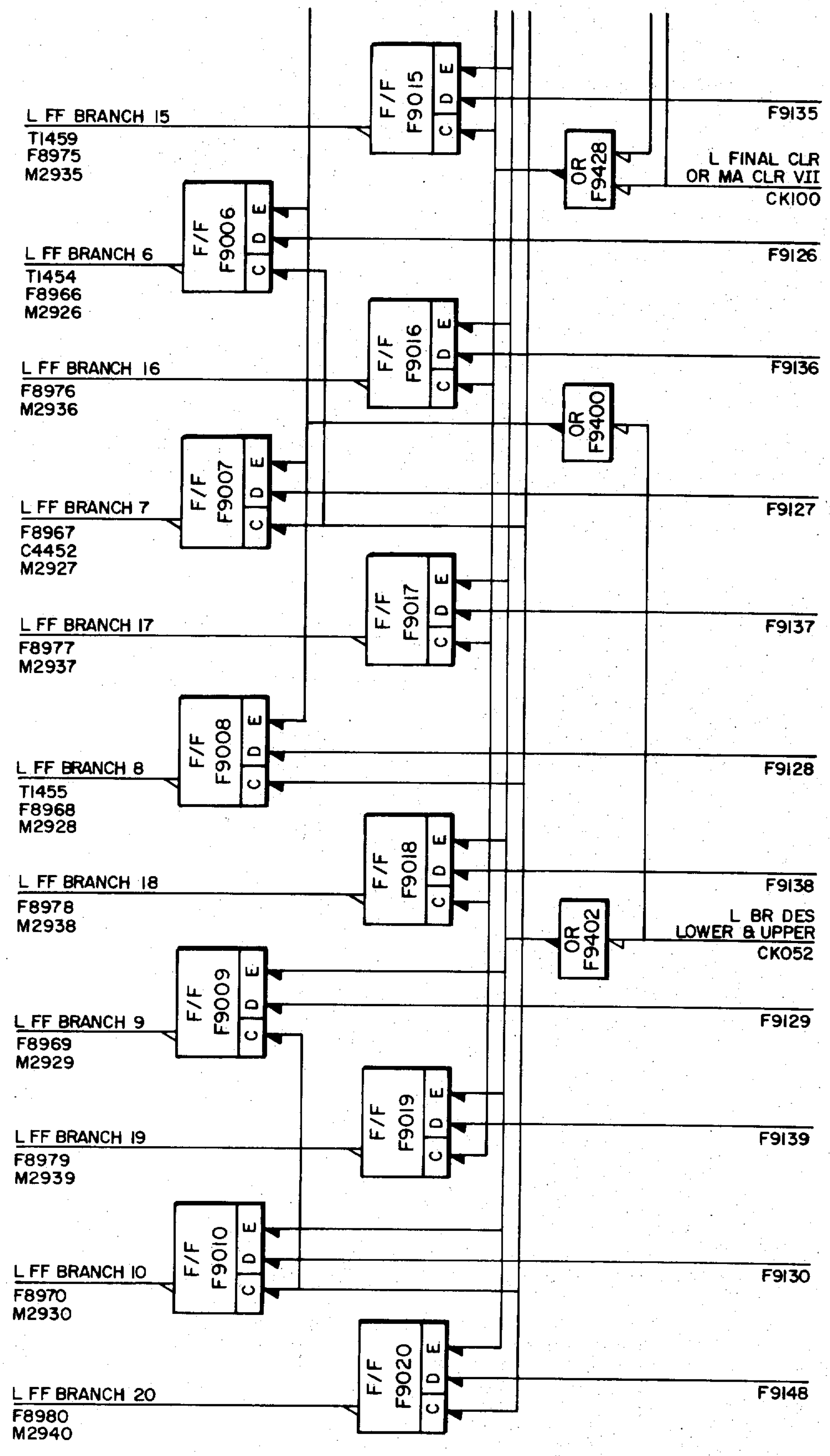
Figure 19D:
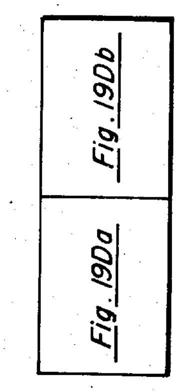
Figure 19D:
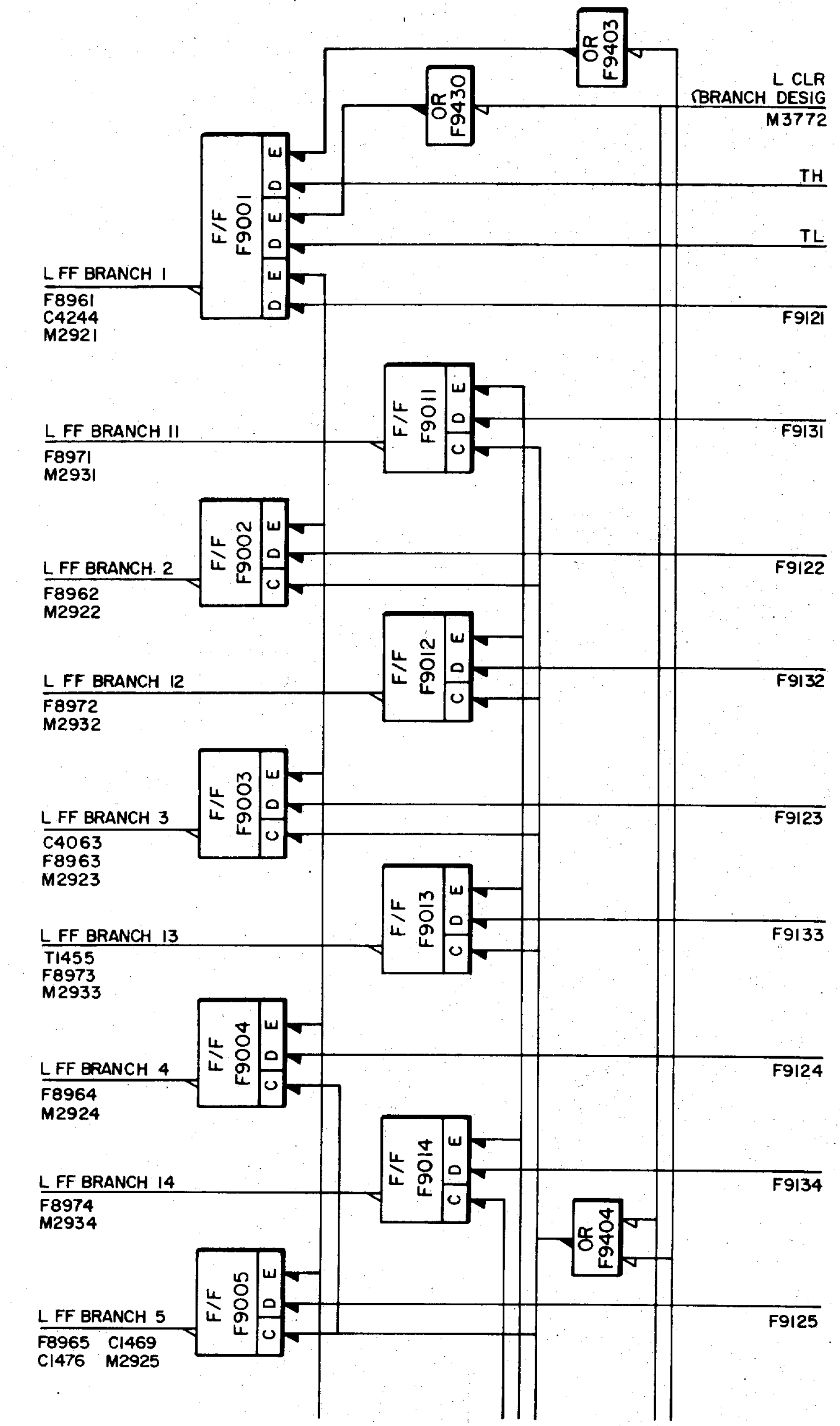
Figure 20:
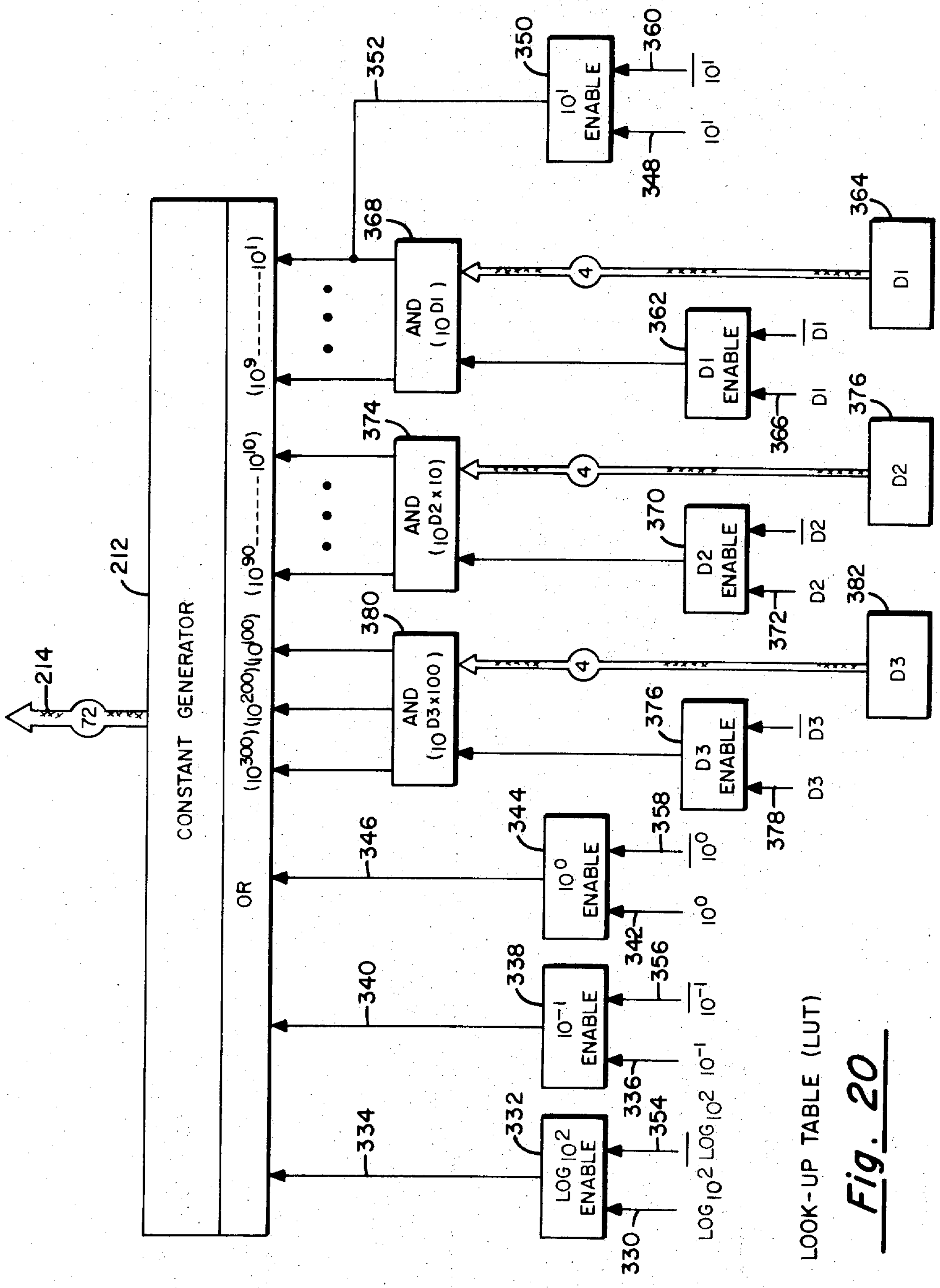
Figure 20A:
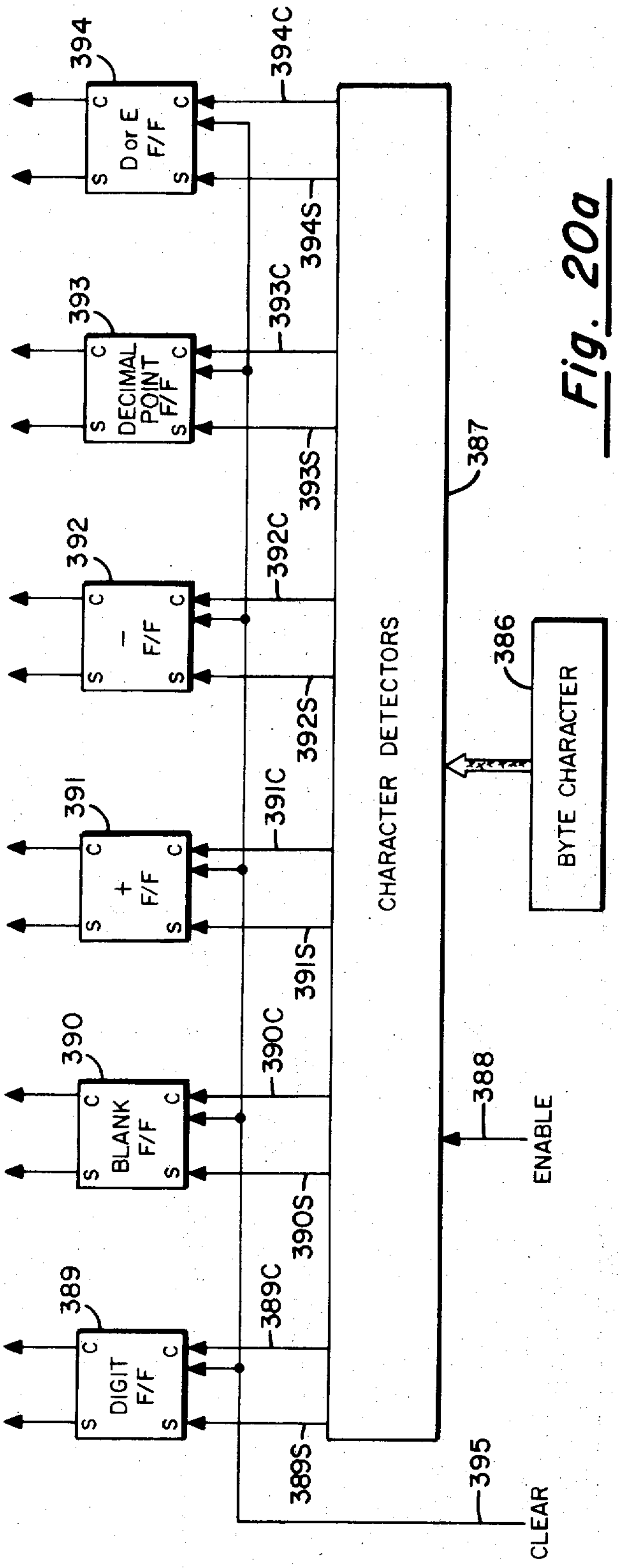
Figure 20A:
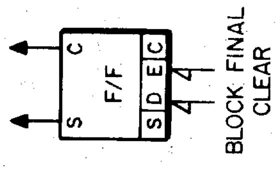
Figure 20B:
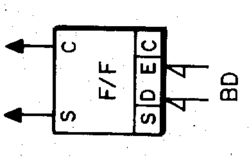
Figure 20C:
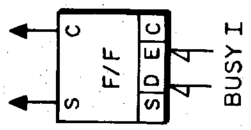
Figure 20D:
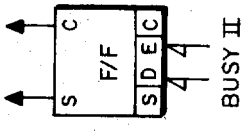
Figure 20B:
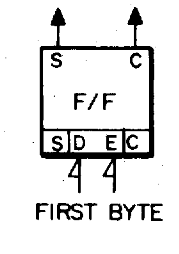
Figure 20C:
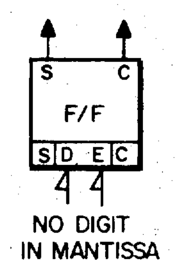
Figure 20D:
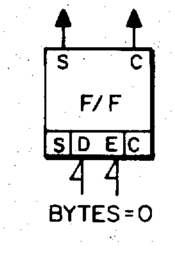
Figure 20E:
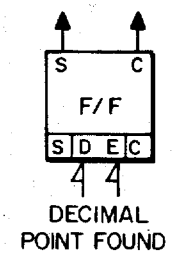
Figure 20F:
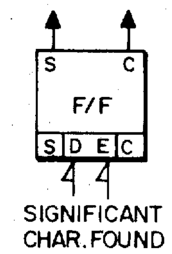
Figure 20G:
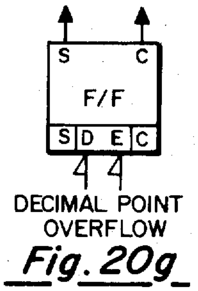
Figure 20H:
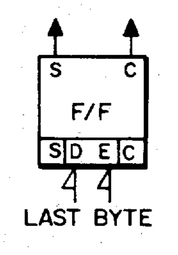
Figure 20I:
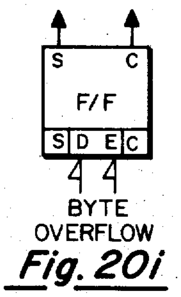
Figure 20J:
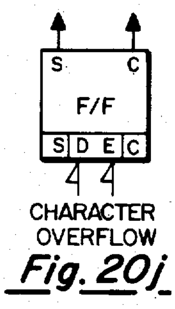
Figure 20K:
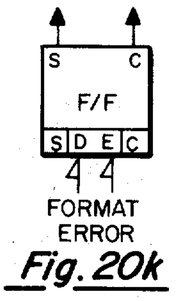
Figure 20L:
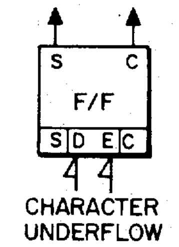
Figure 20M:
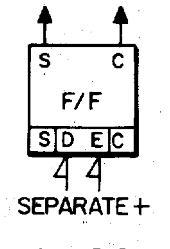
Figure 20N:
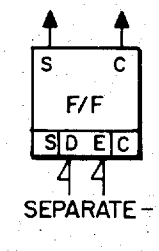
Figure 20O:
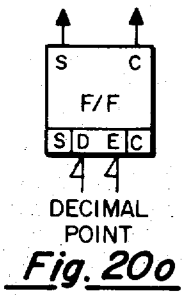
Figure 20P:
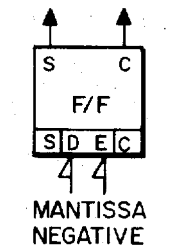
Figure 20Q:
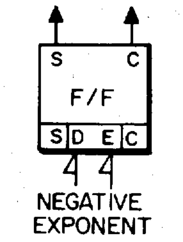
Figure 20R:
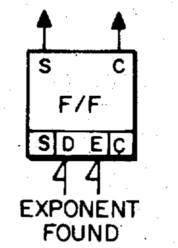
Figure 20S:
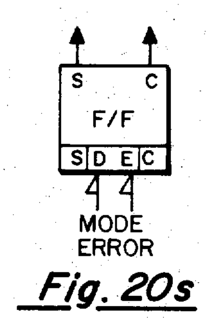
Figure 20T:
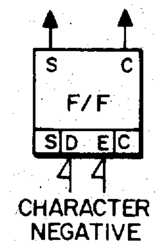
Figure 20U:
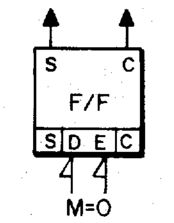
Figure 20V:
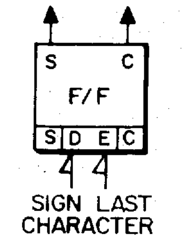
Figure 20W:
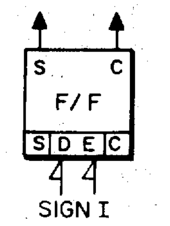
Figure 20X:
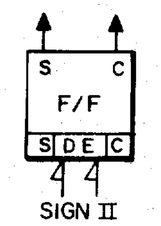
Figure 20Y:
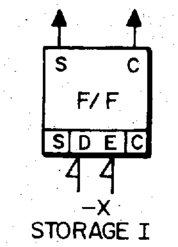
Figure 20Z:
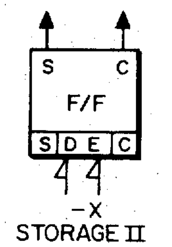
Figure 21:
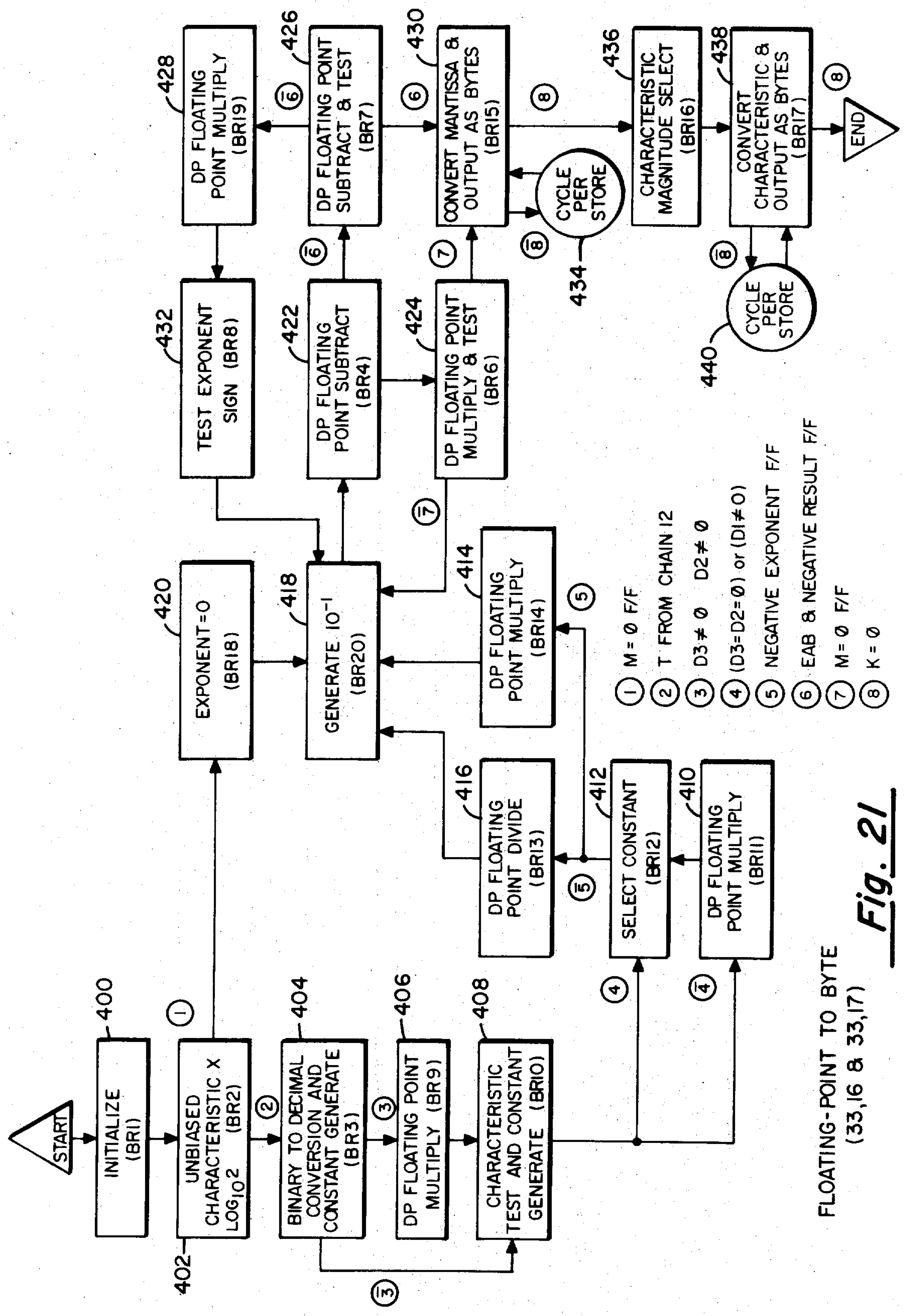
Figure 22C:
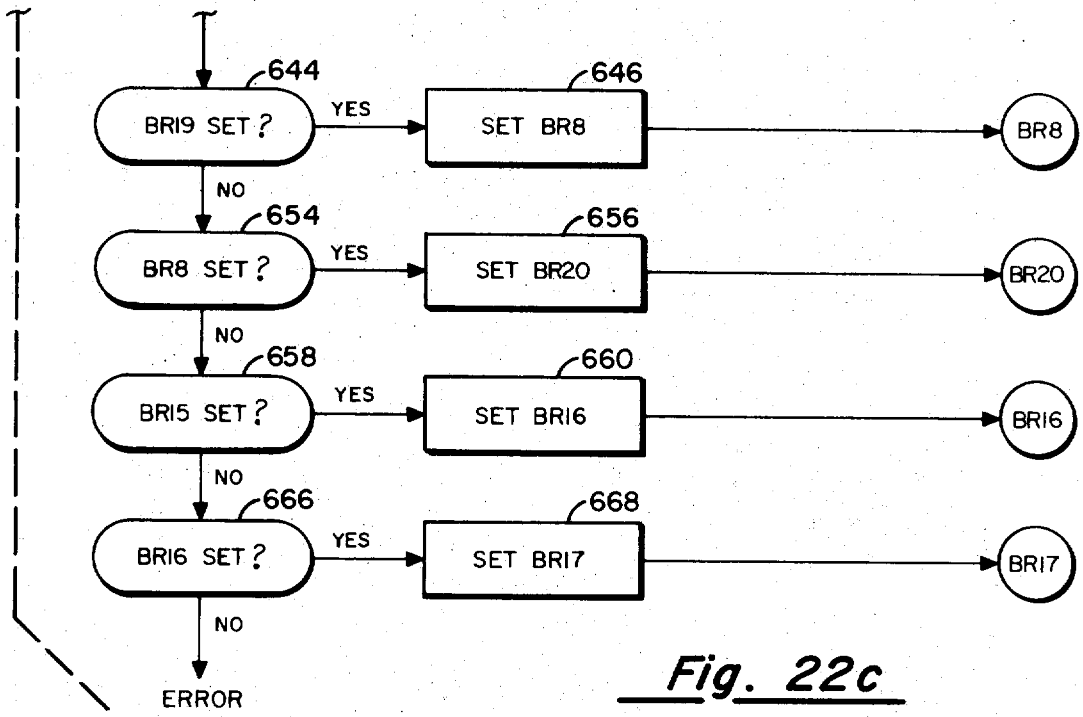
Figure 22:
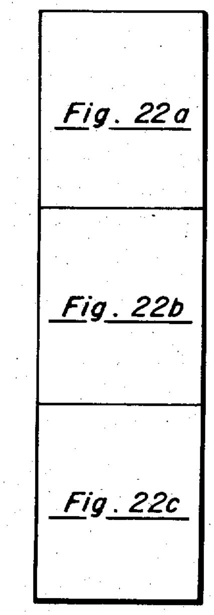
Figure 22A:
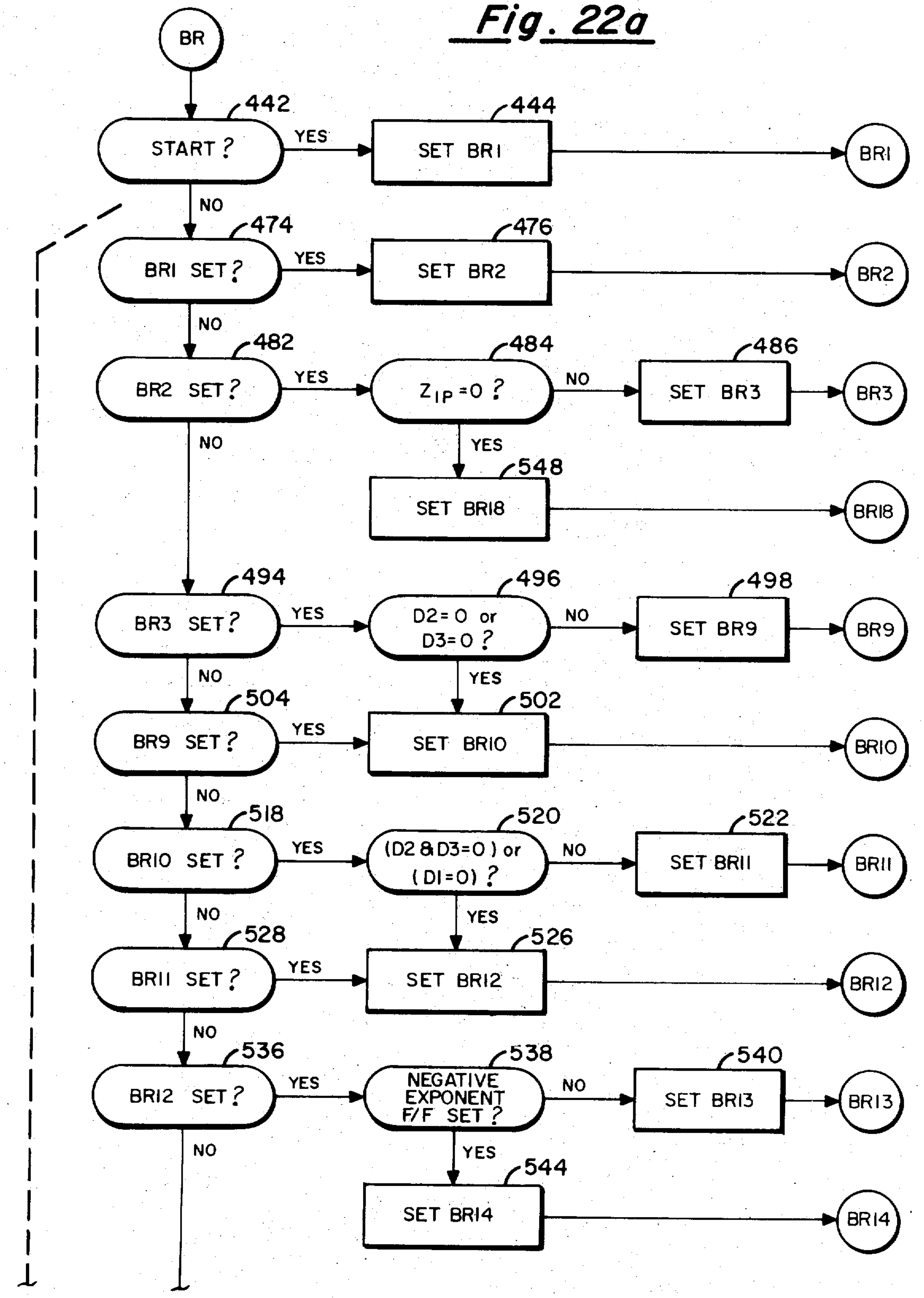
Figure 22B:
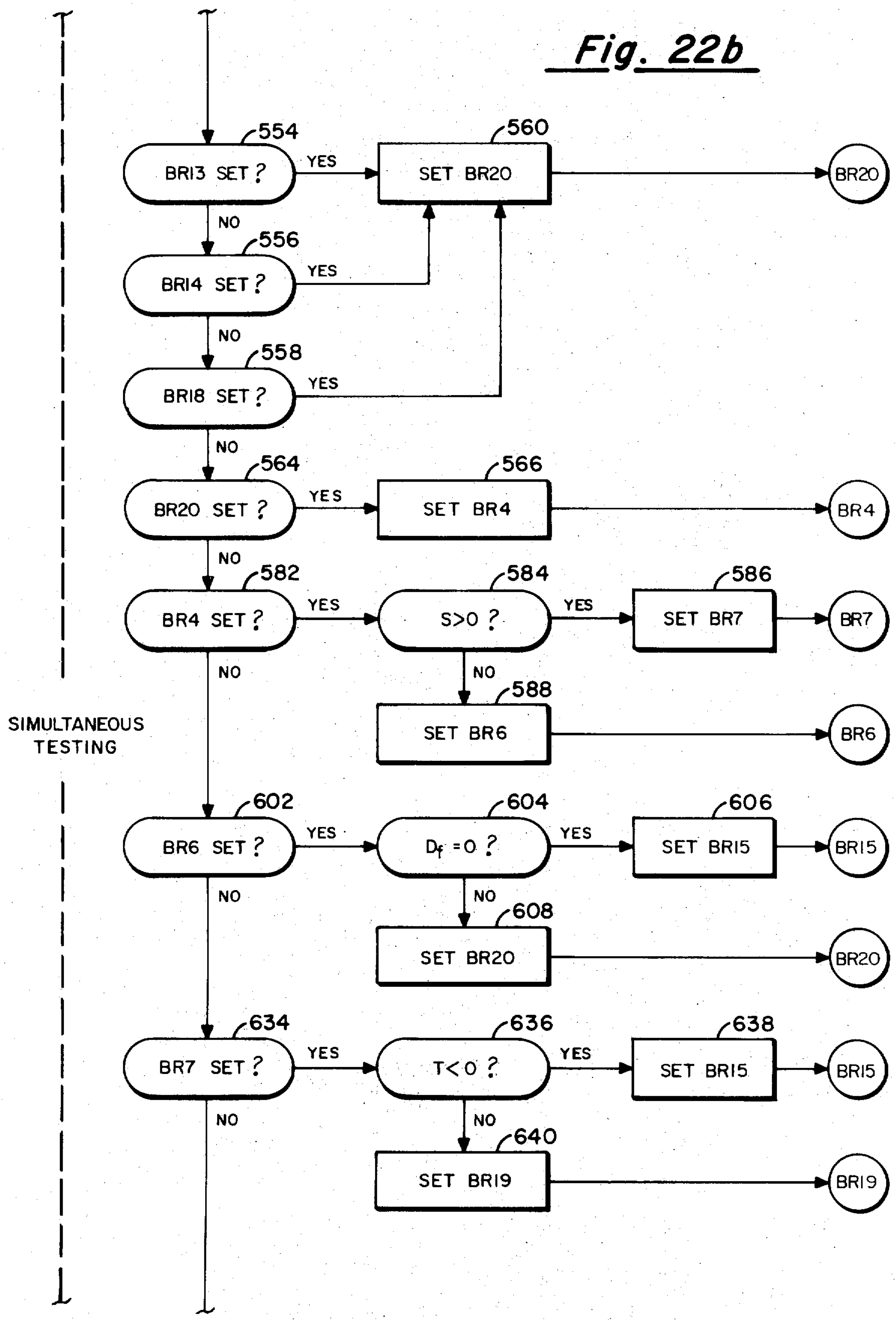
Figures 23, 24:
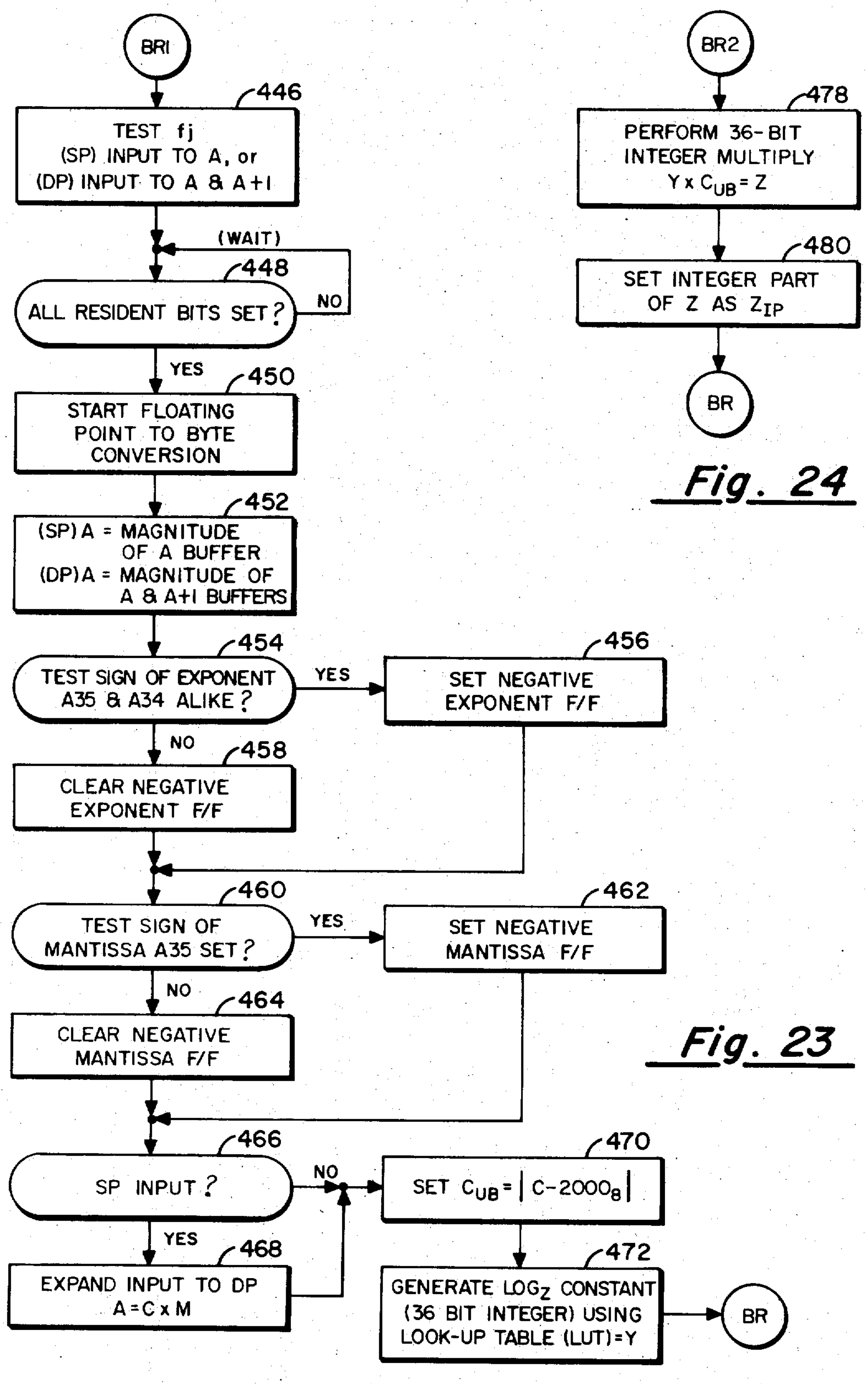
Figure 25:
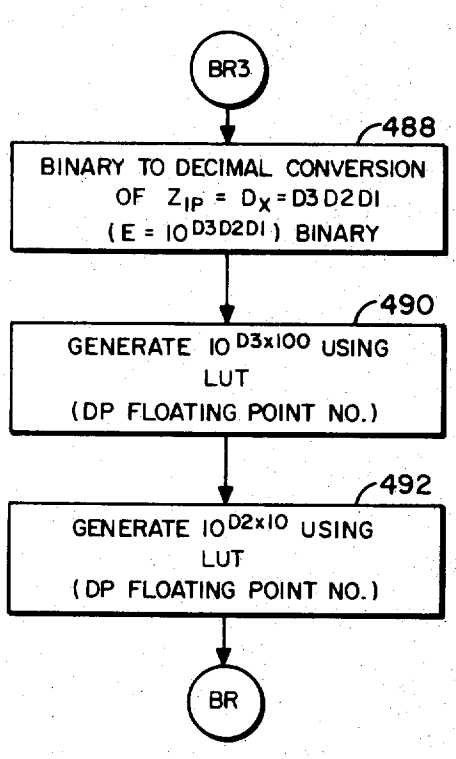
Figure 26:
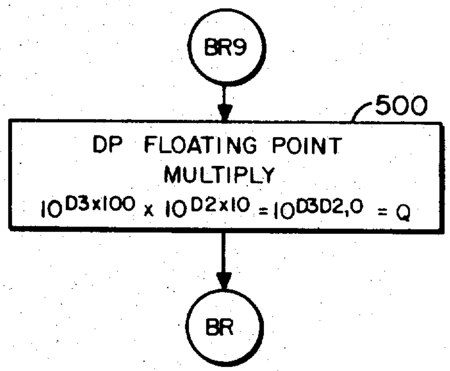
Figure 28:
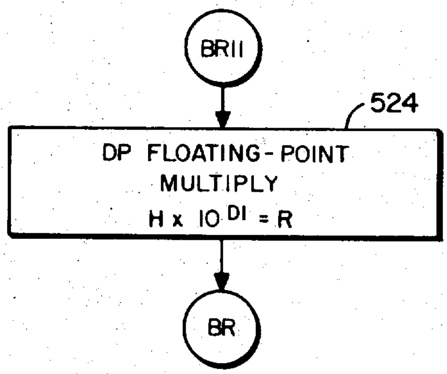
Figure 27:
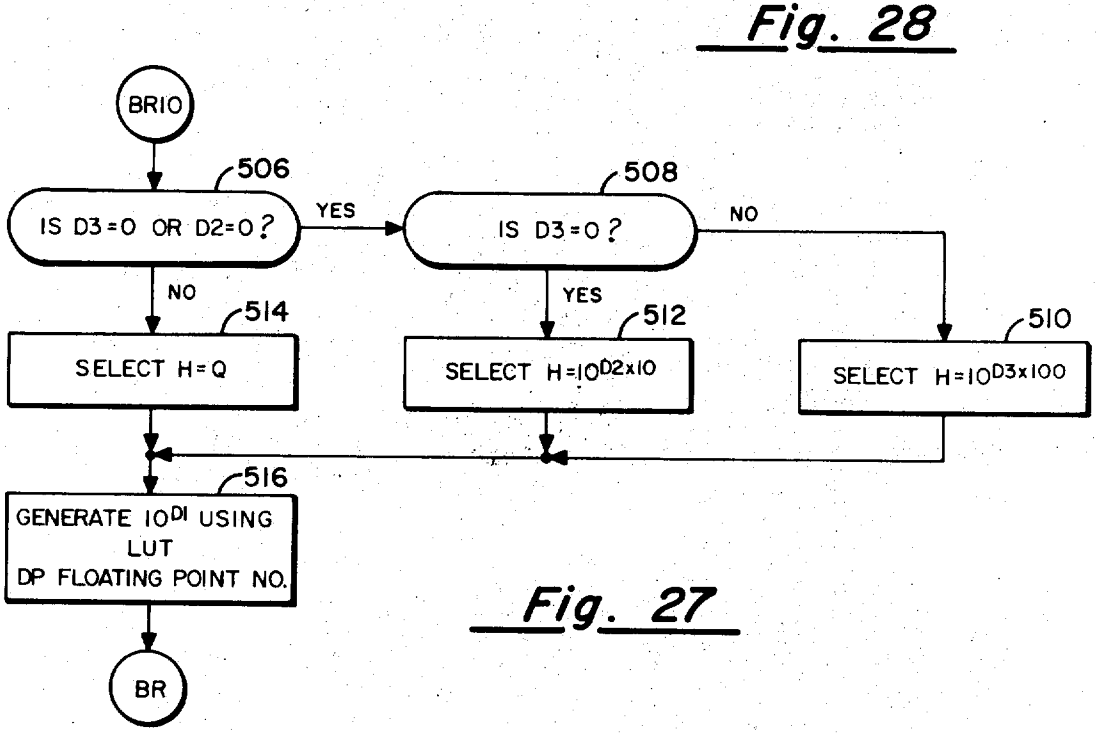
Figure 29:
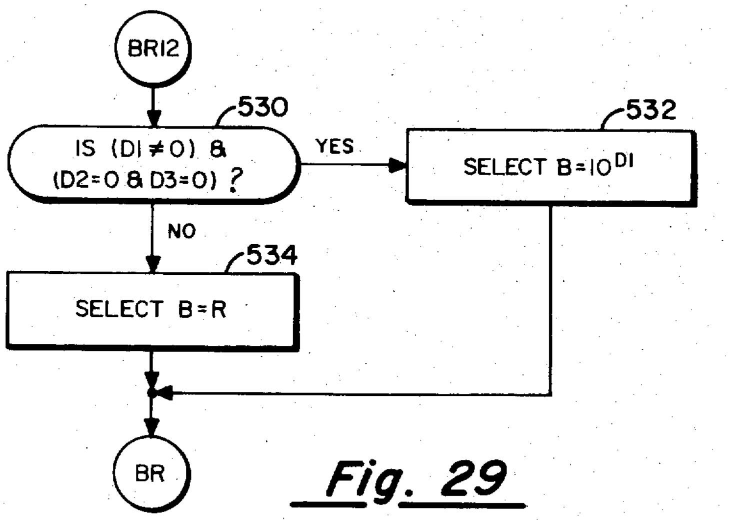
Figure 30:
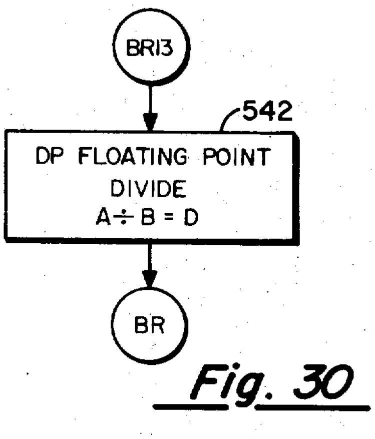
Figure 31:
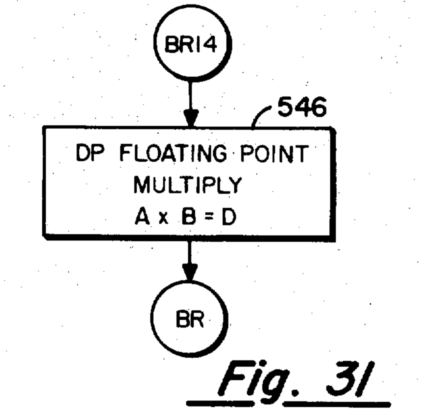
Figure 32:
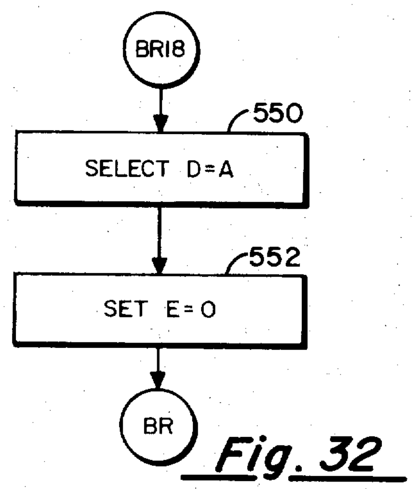
Figure 33:
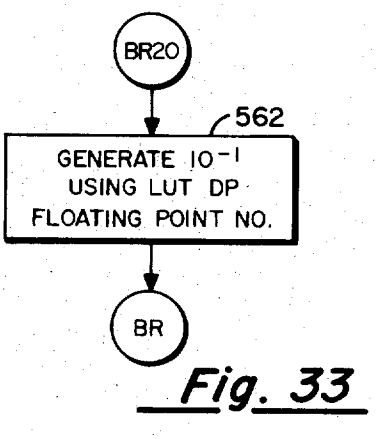
Figure 34:
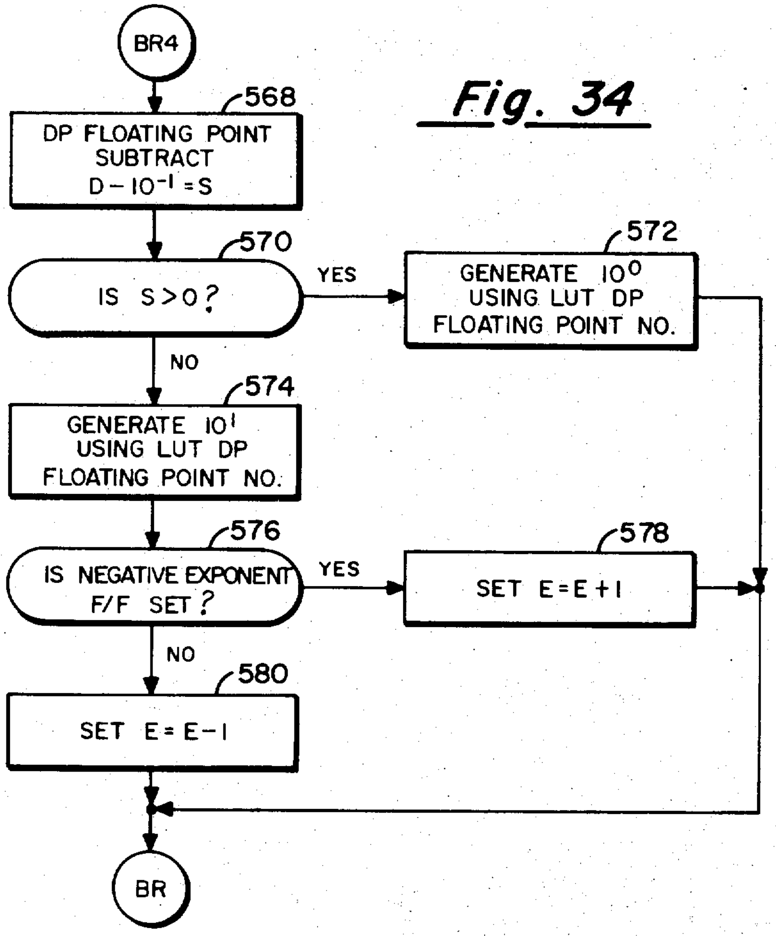
Figure 36:
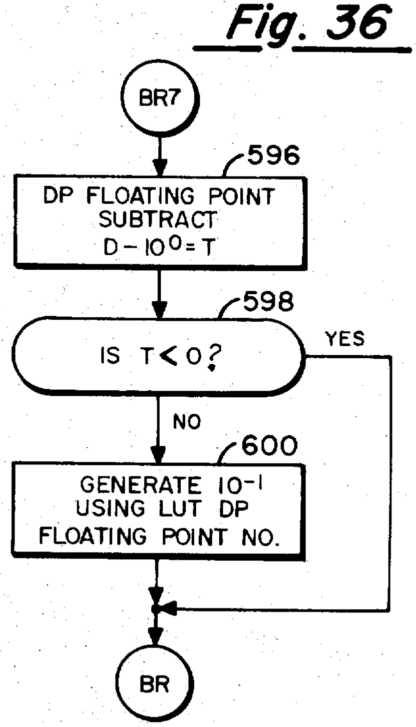
Figure 35:
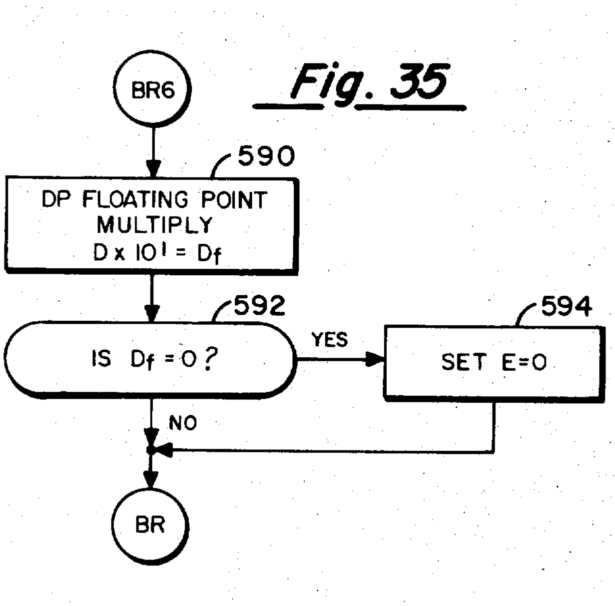
Figure 37:
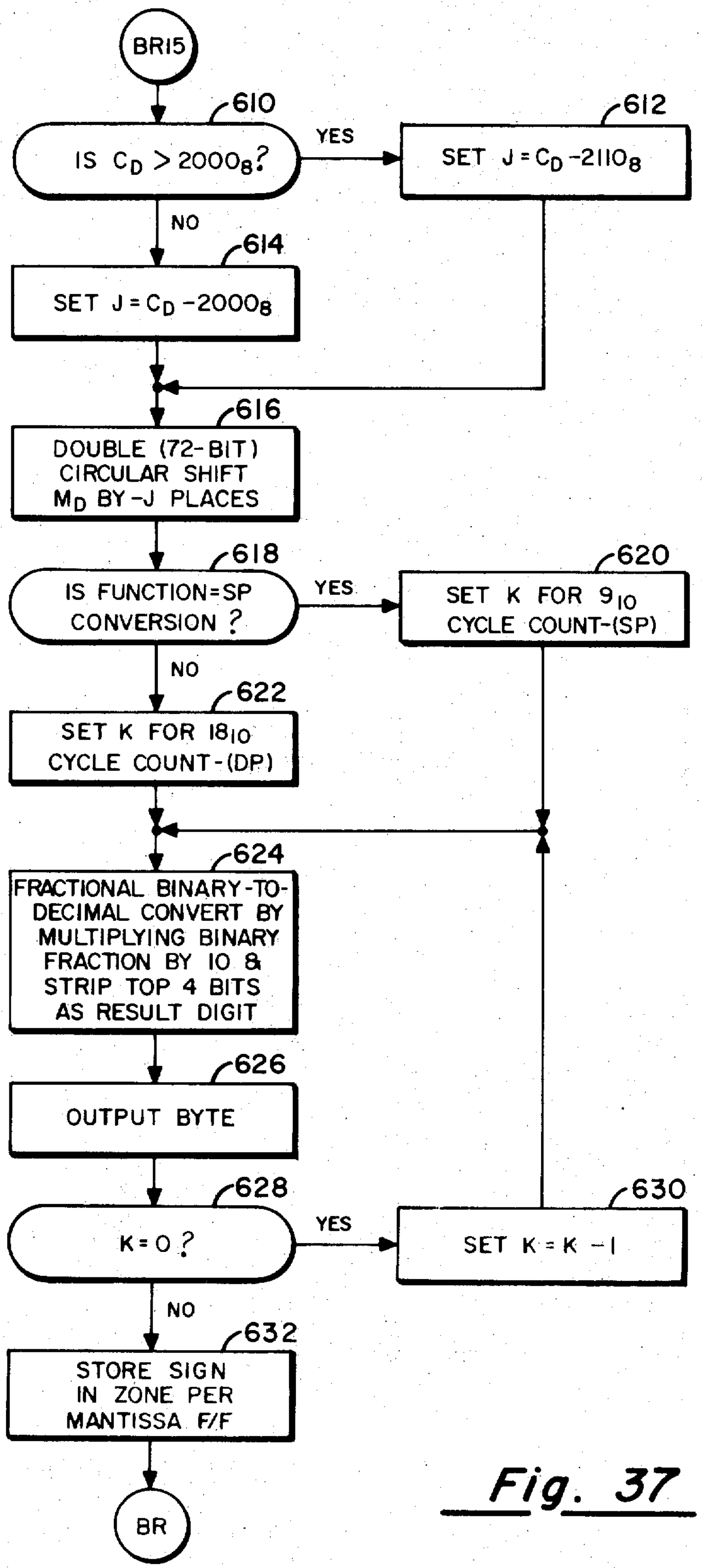
Figure 38:
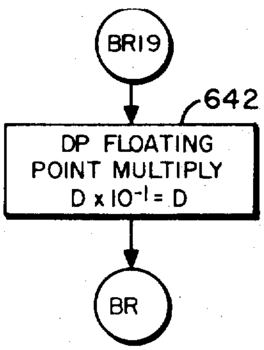
Figure 39:
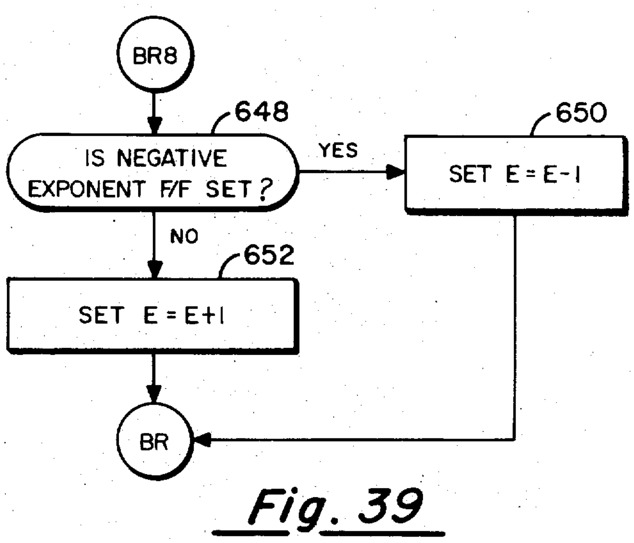
Figure 41:
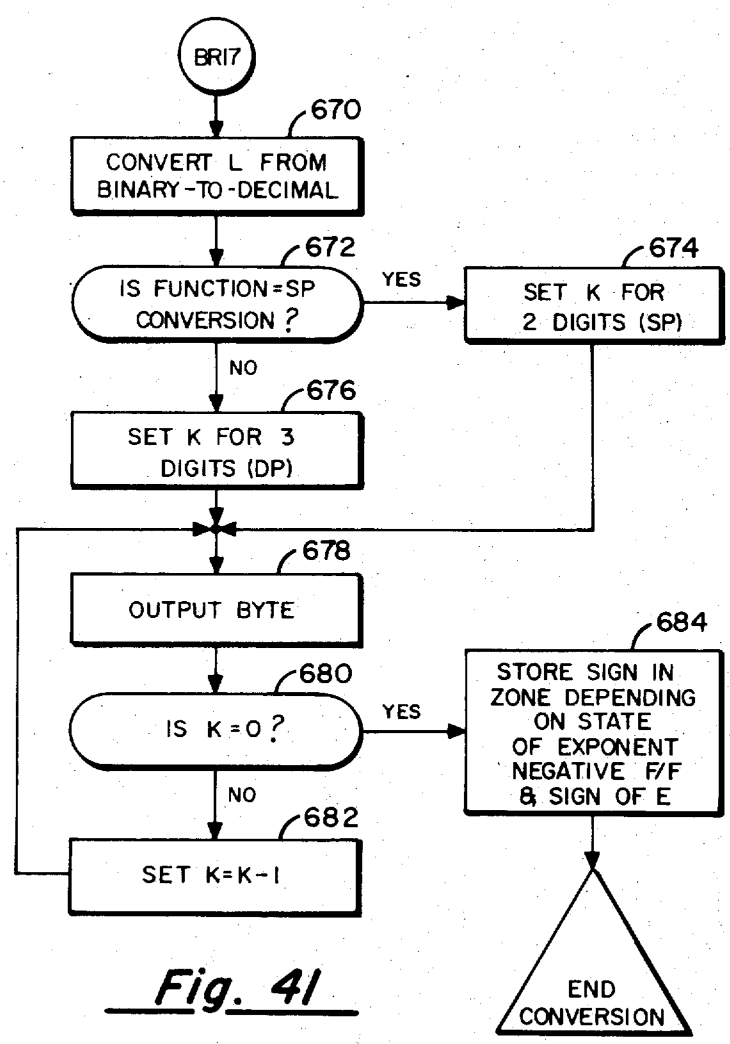
Figure 40:
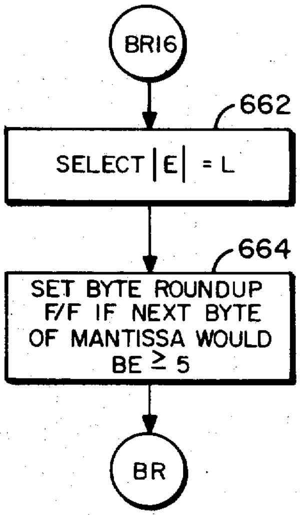
Figure 42:
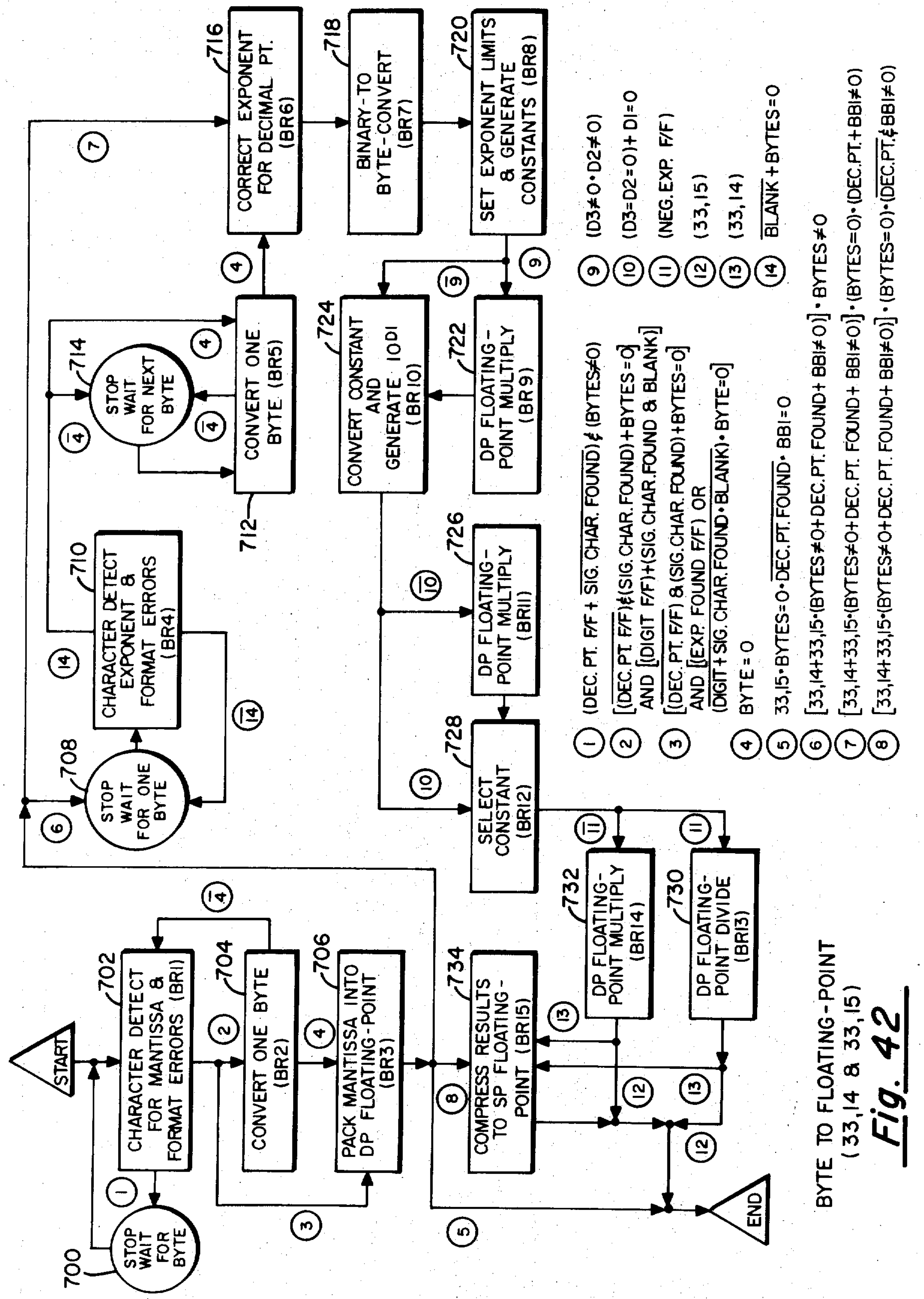
Figures 43, 43A:
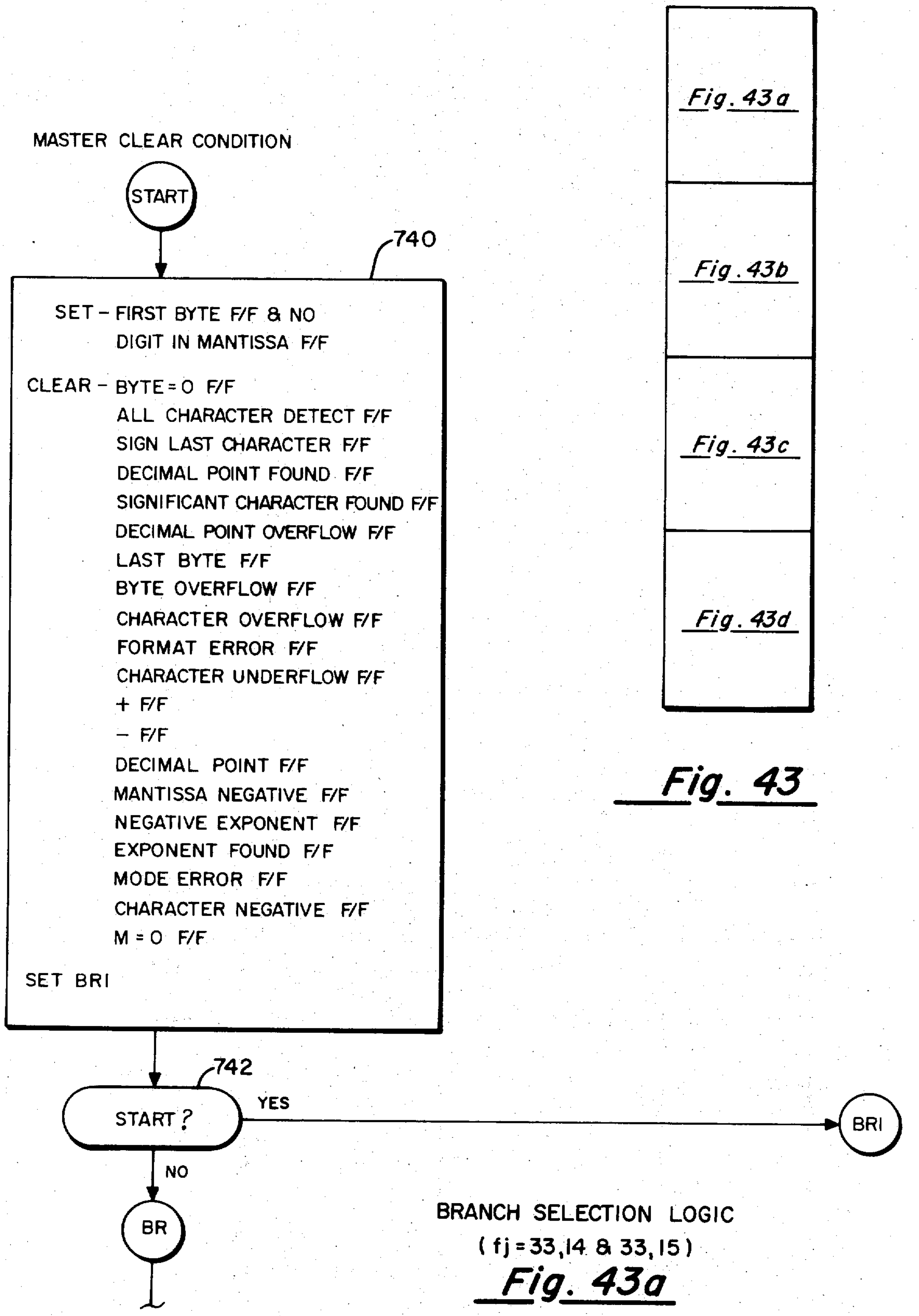
Figure 43B:
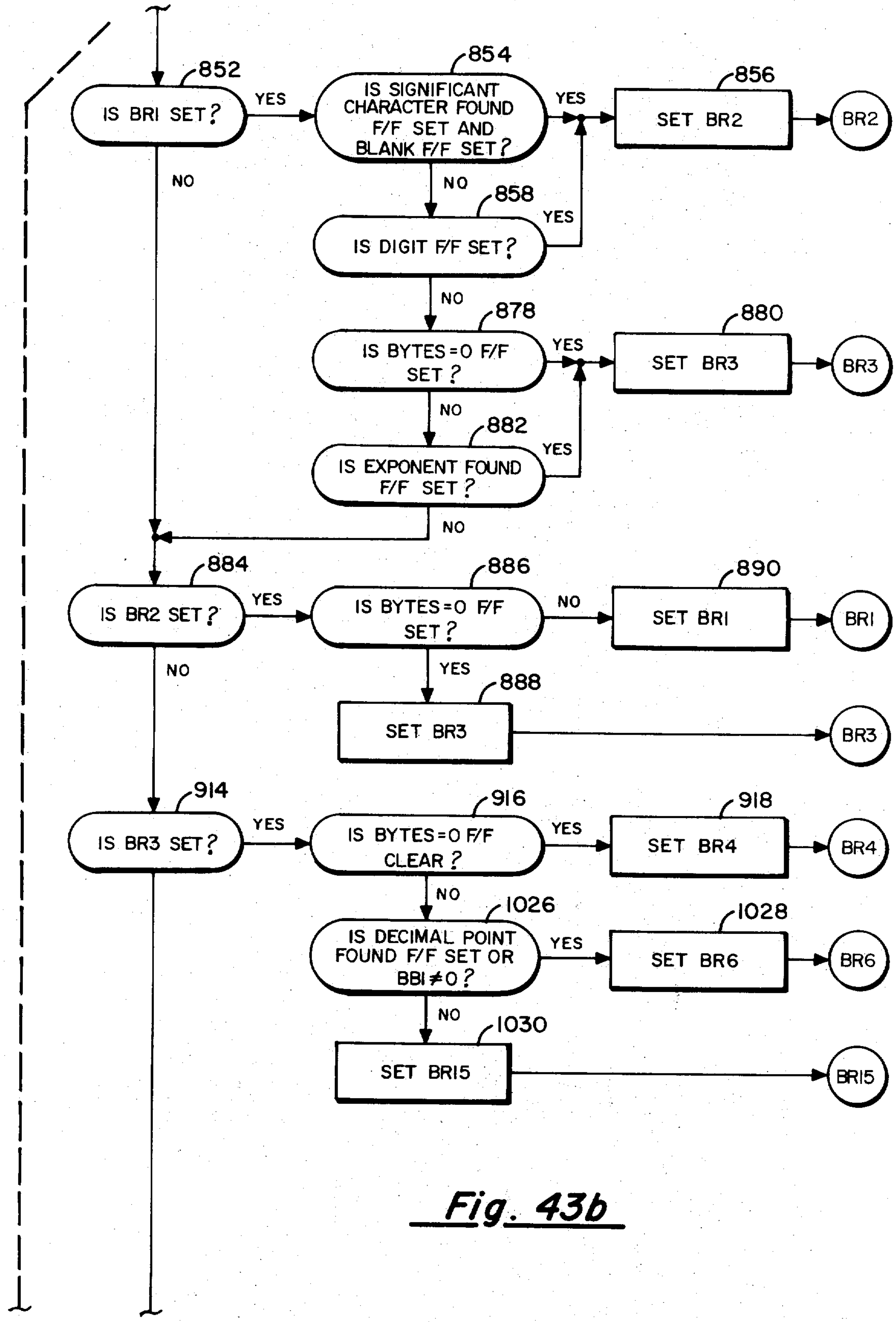
Figure 43C:
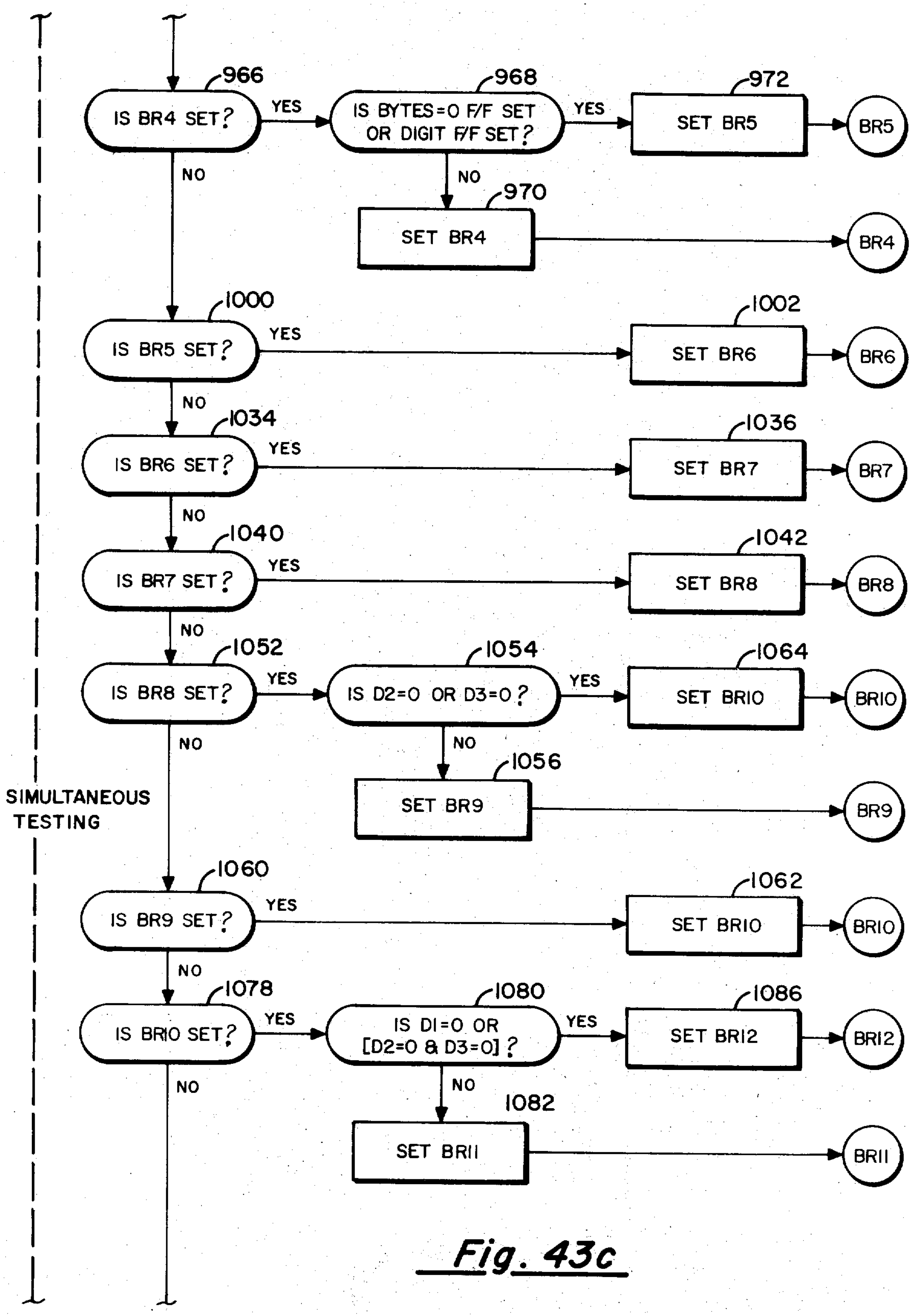
Figure 43D:
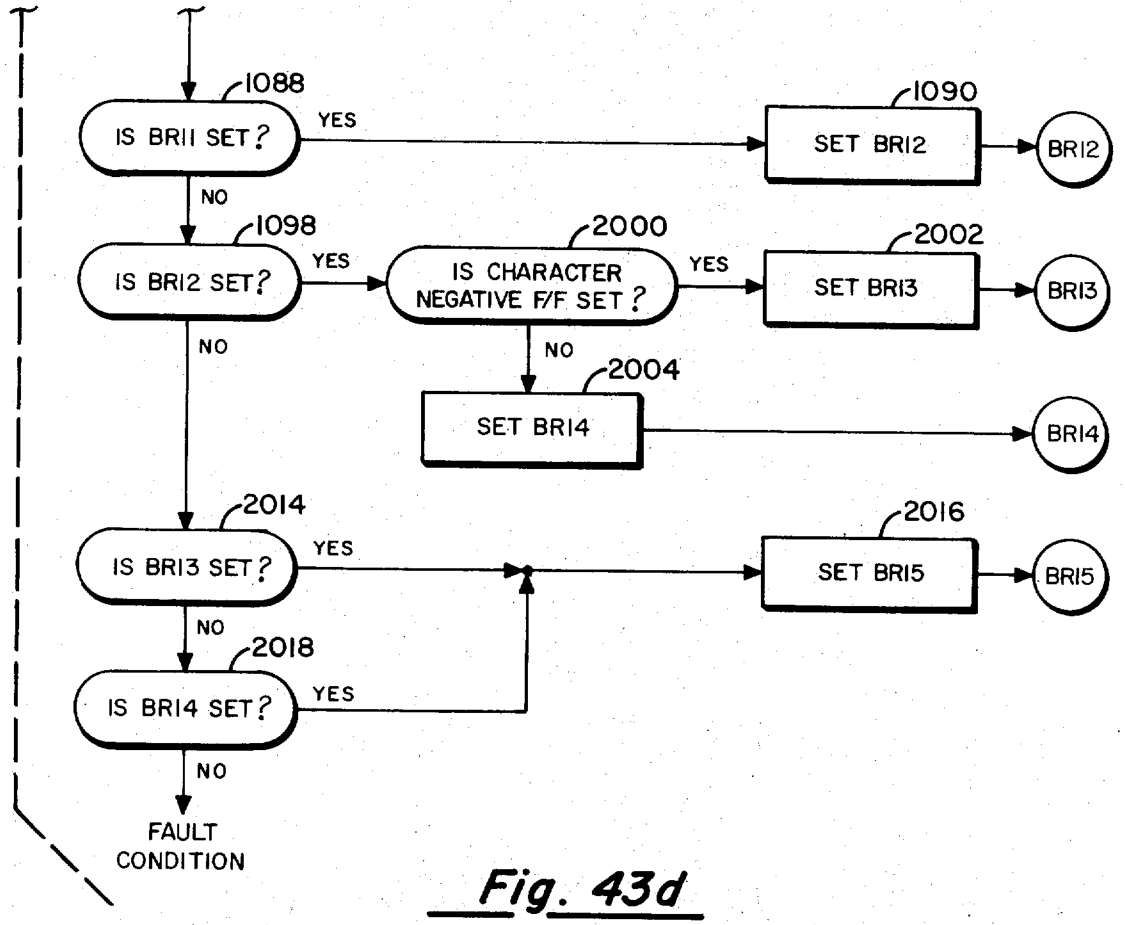
Figure 44A:
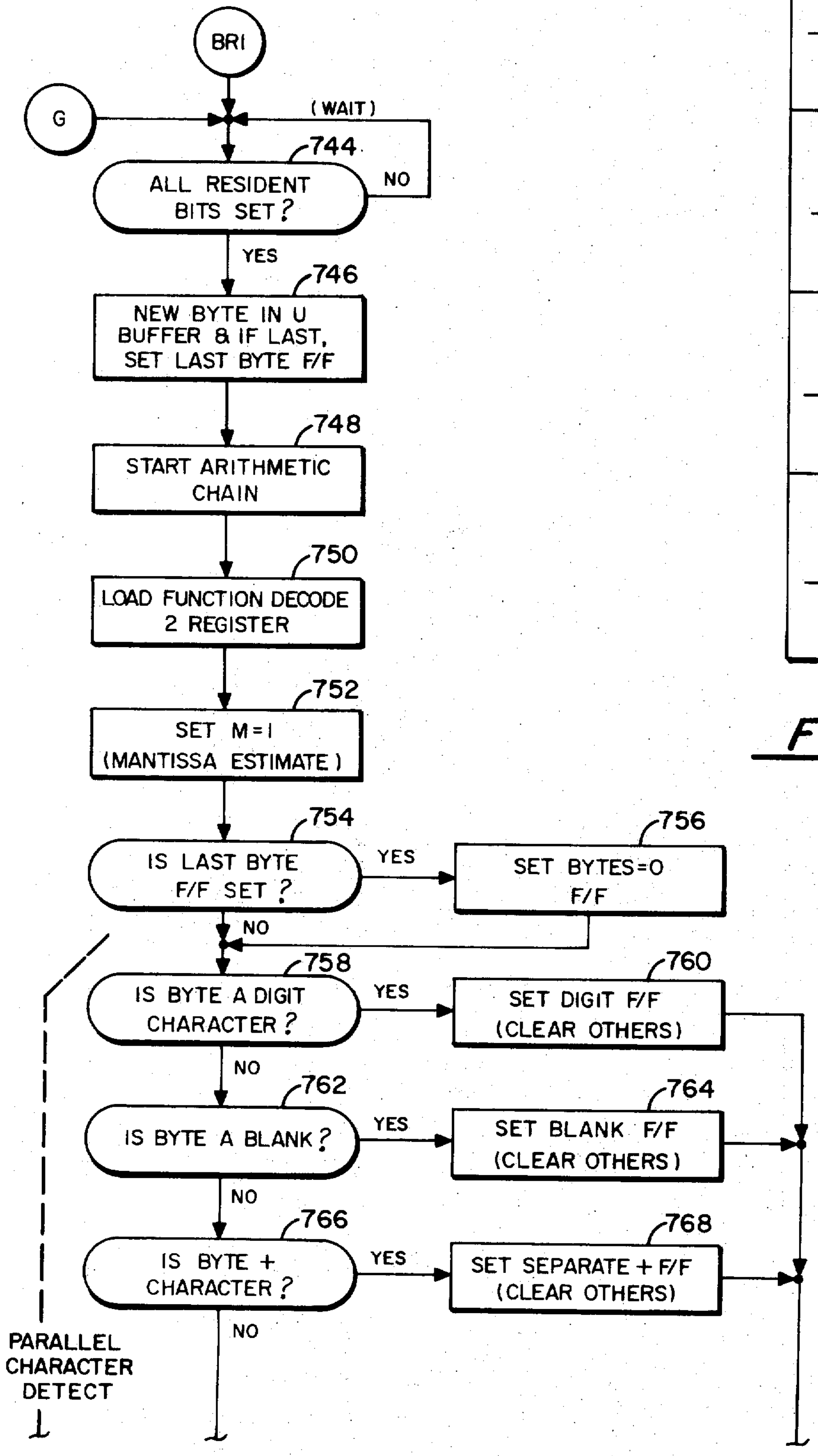
Figure 44:
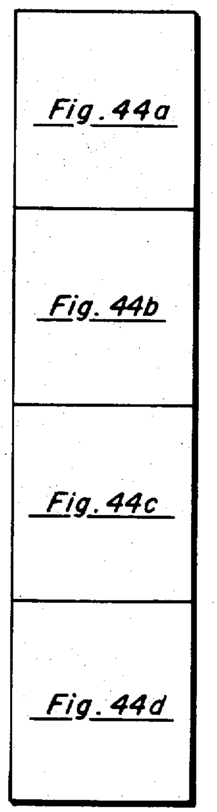
Figure 44B:
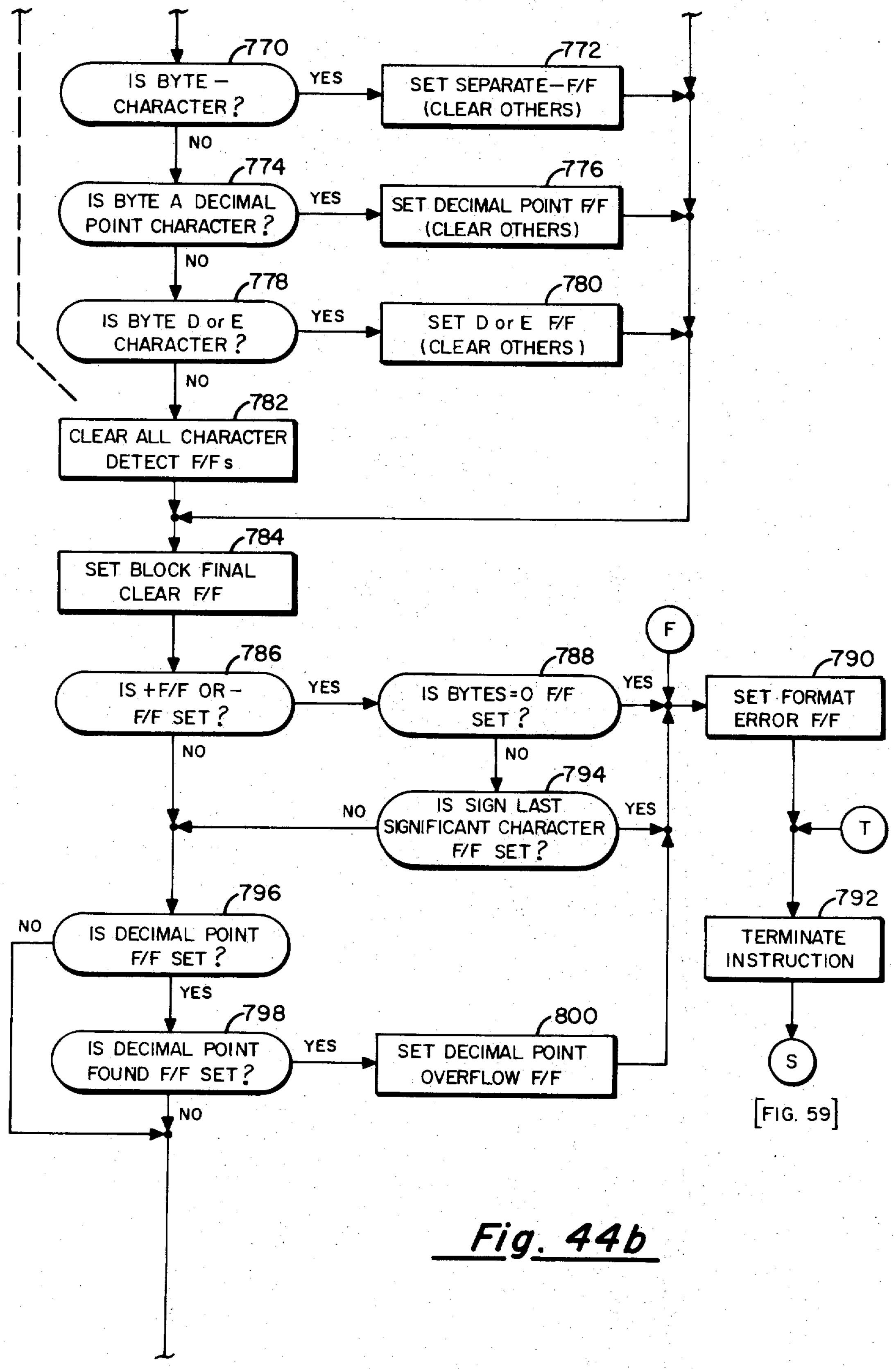
Figure 44C:
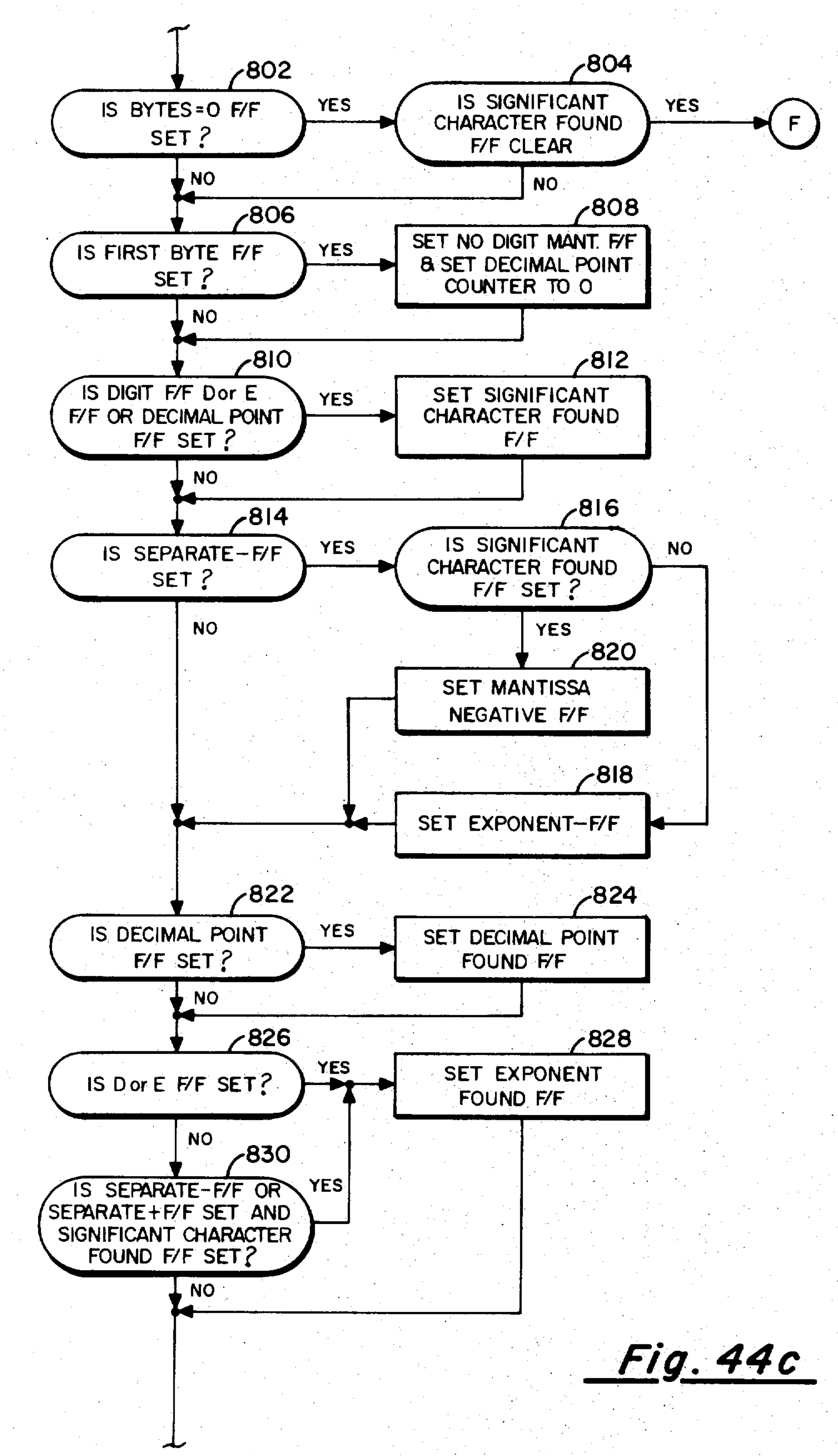
Figure 44D:
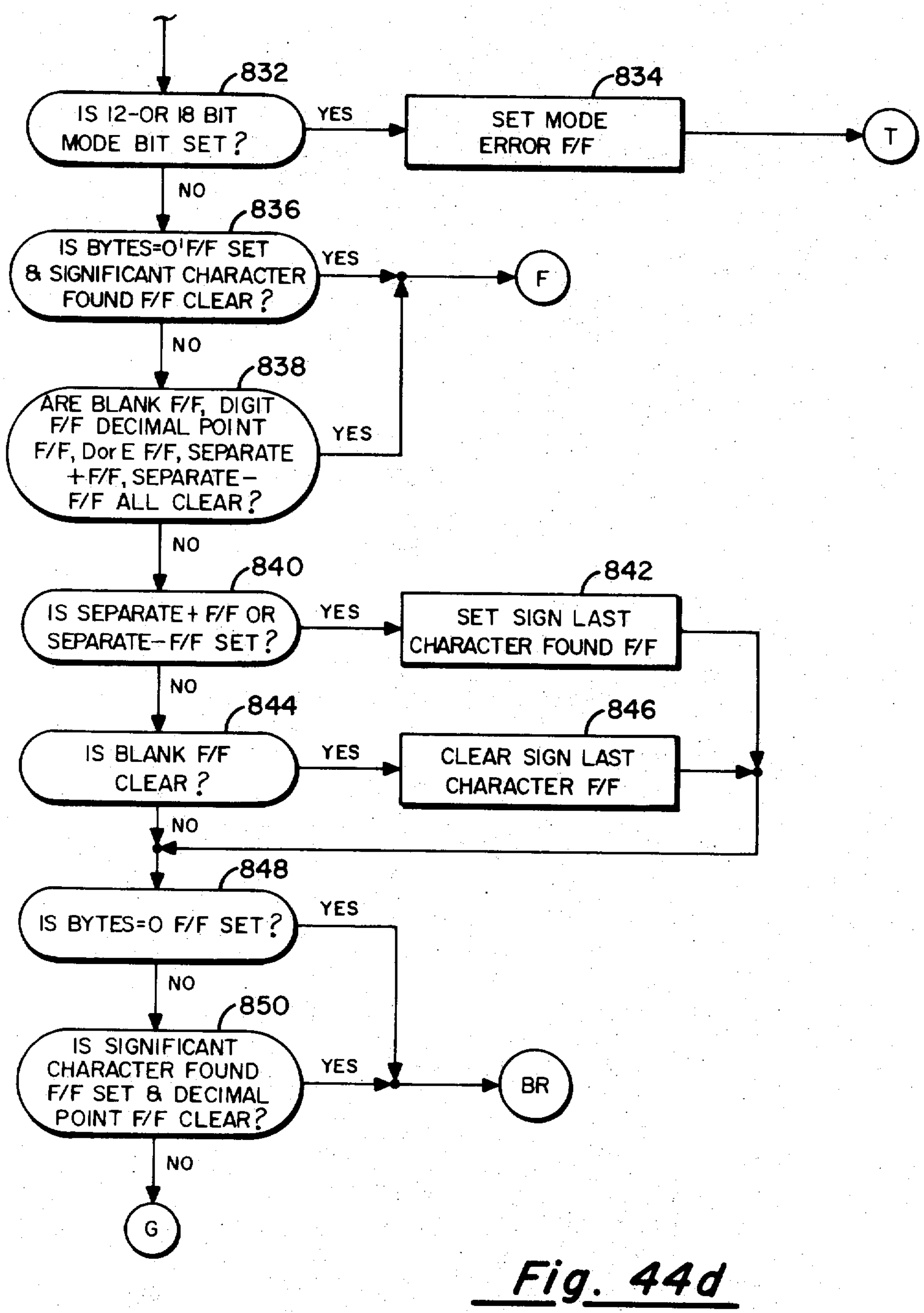
Figures 45, 58:
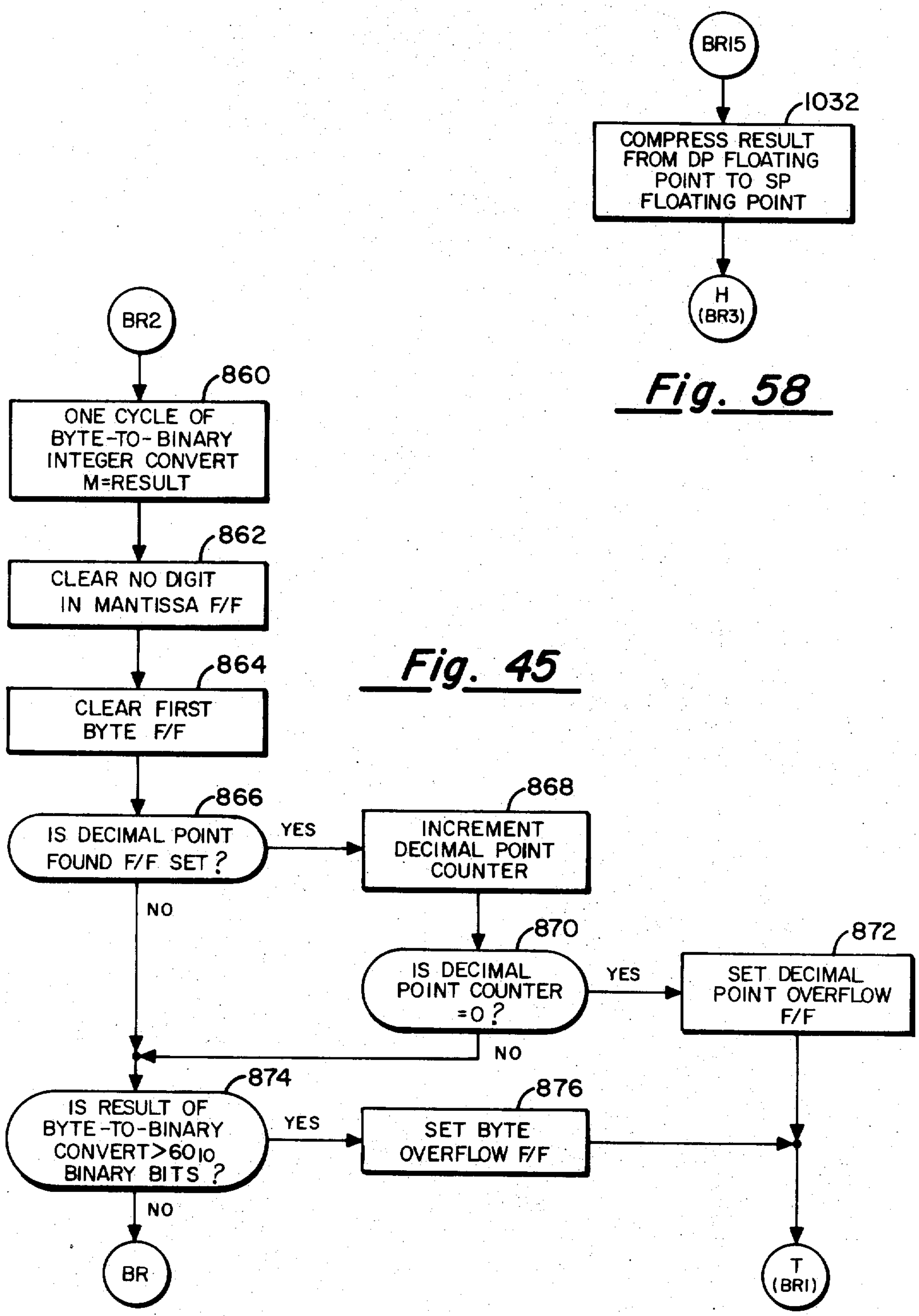
Figure 46:
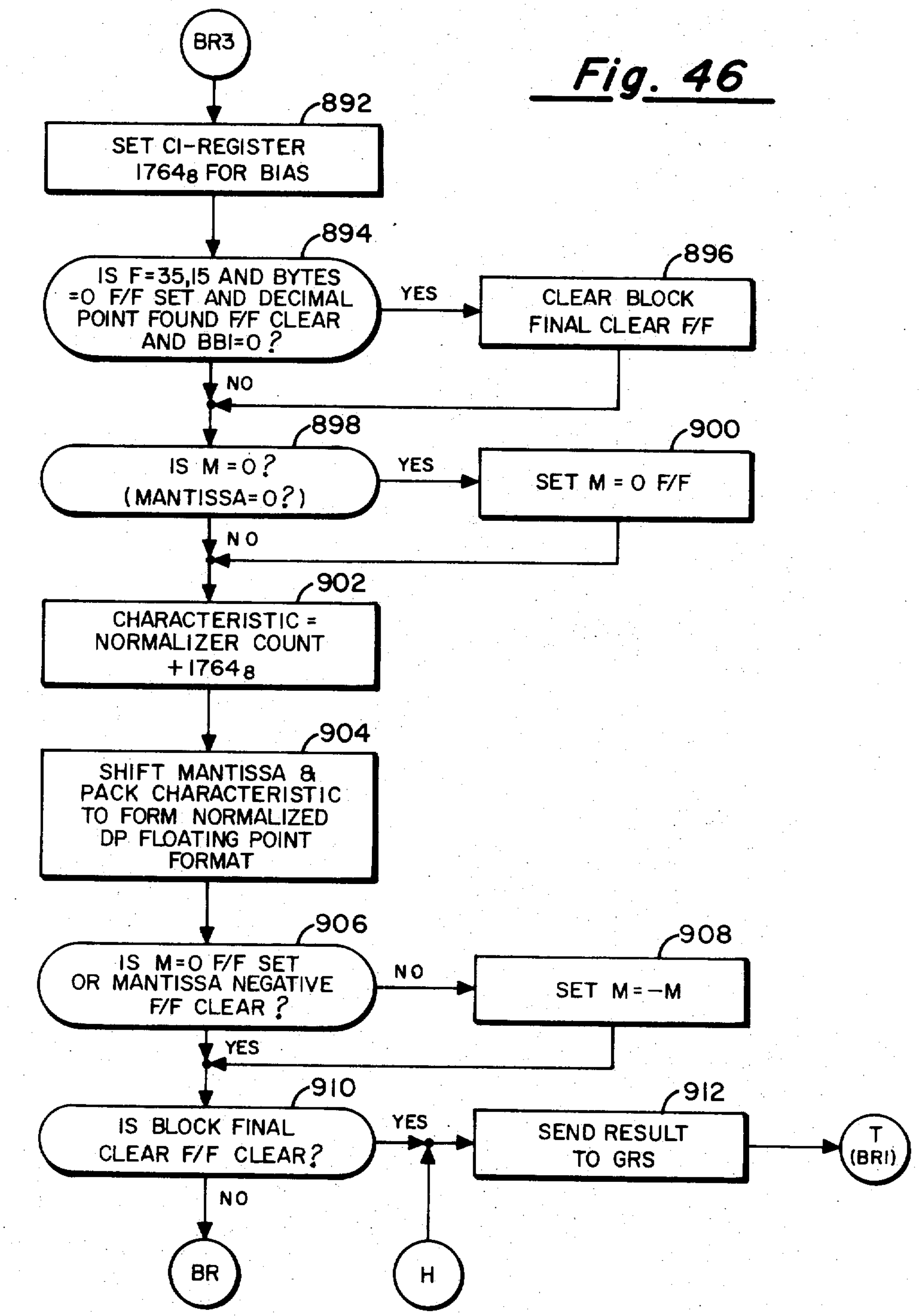
Figures 47, 47A:
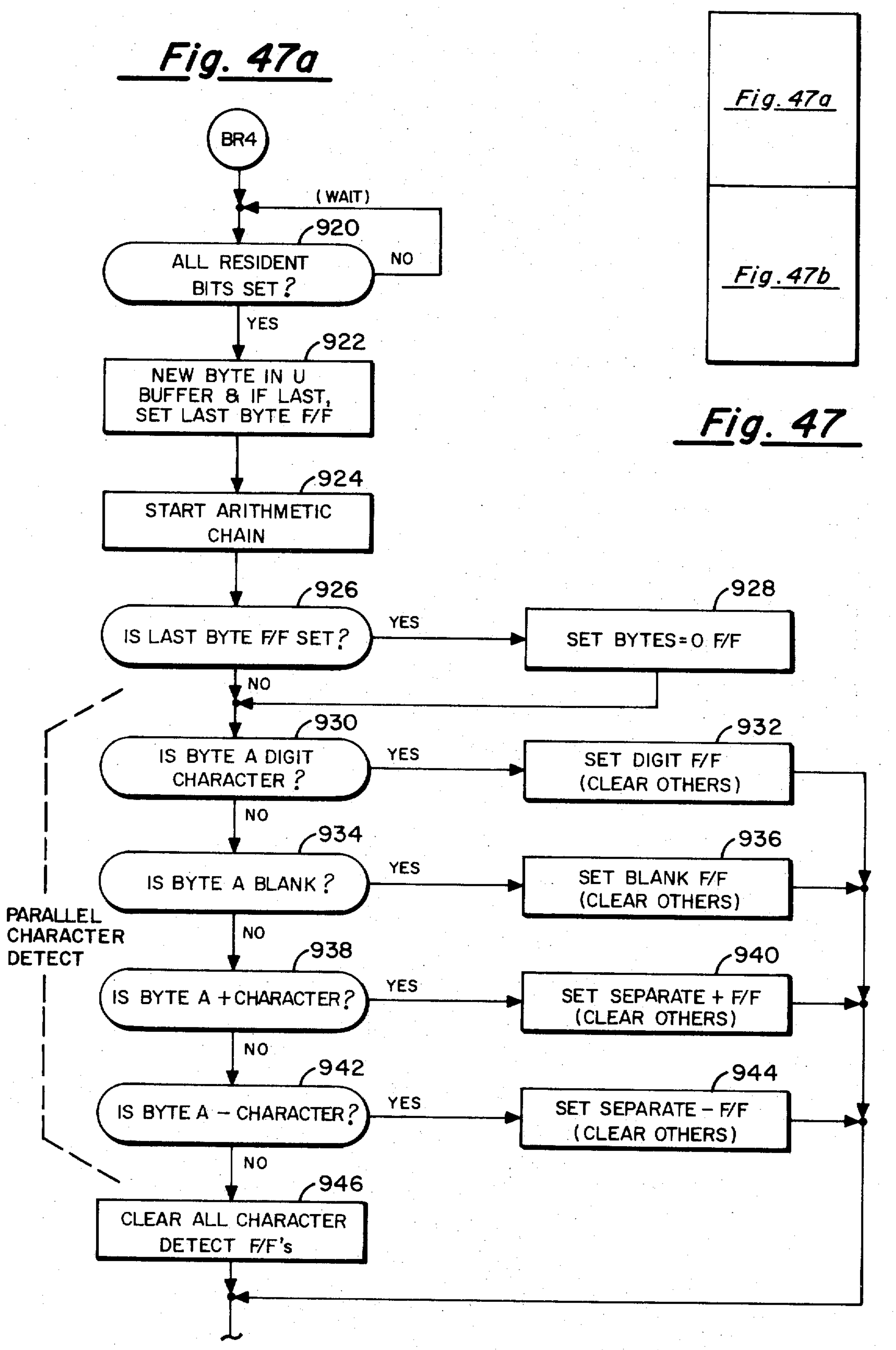
Figure 47B:
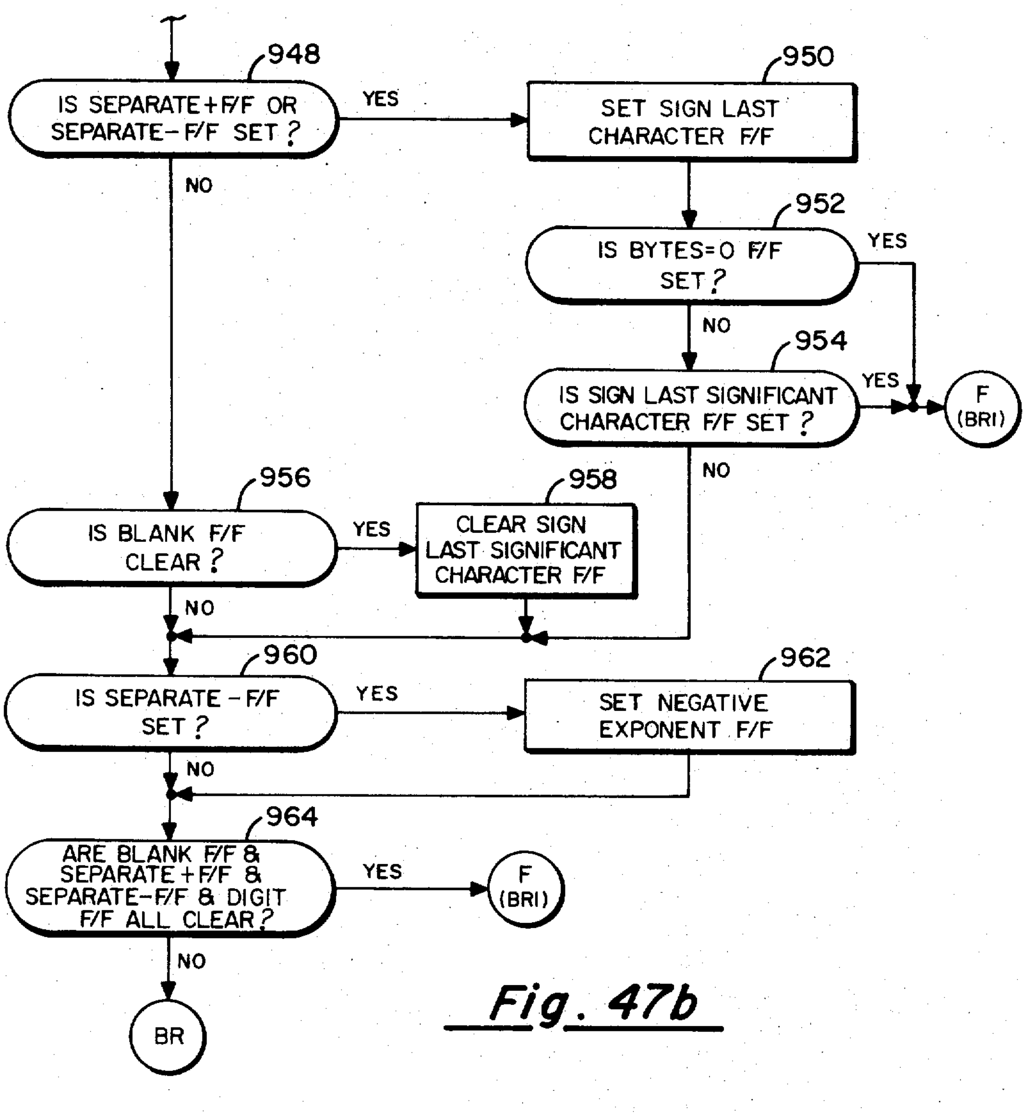
Figure 50:
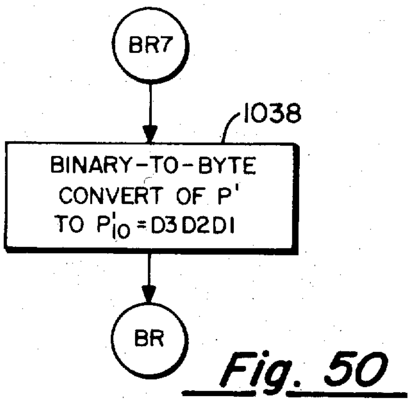
Figure 52:
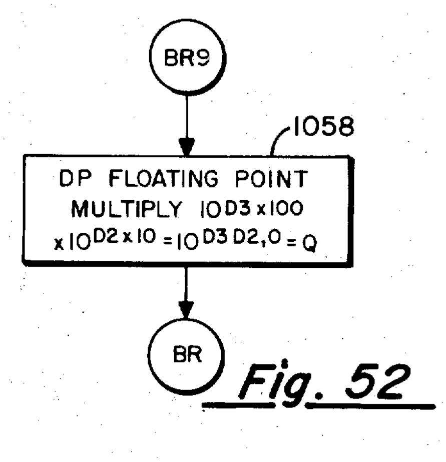
Figure 48:
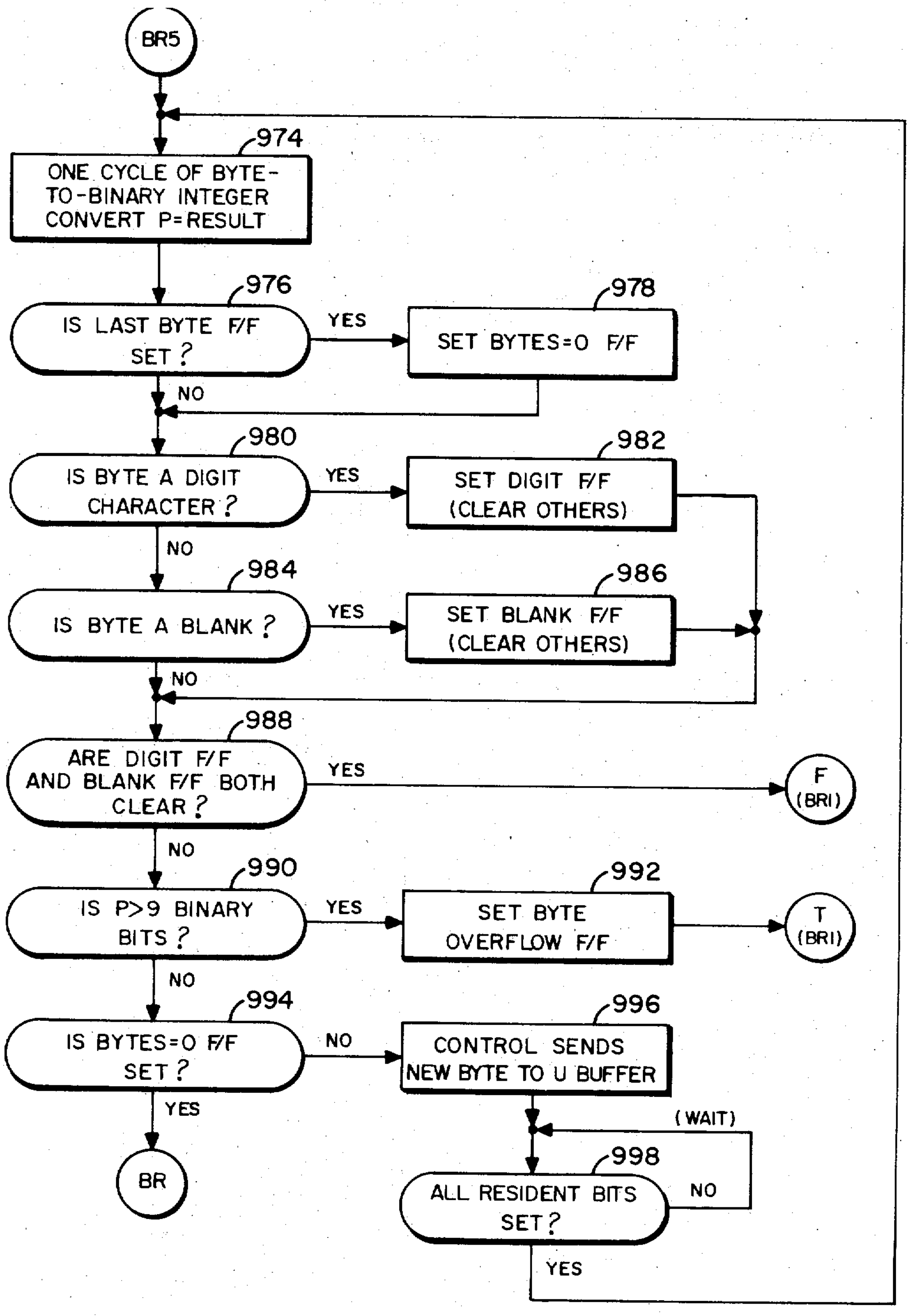
Figure 49:
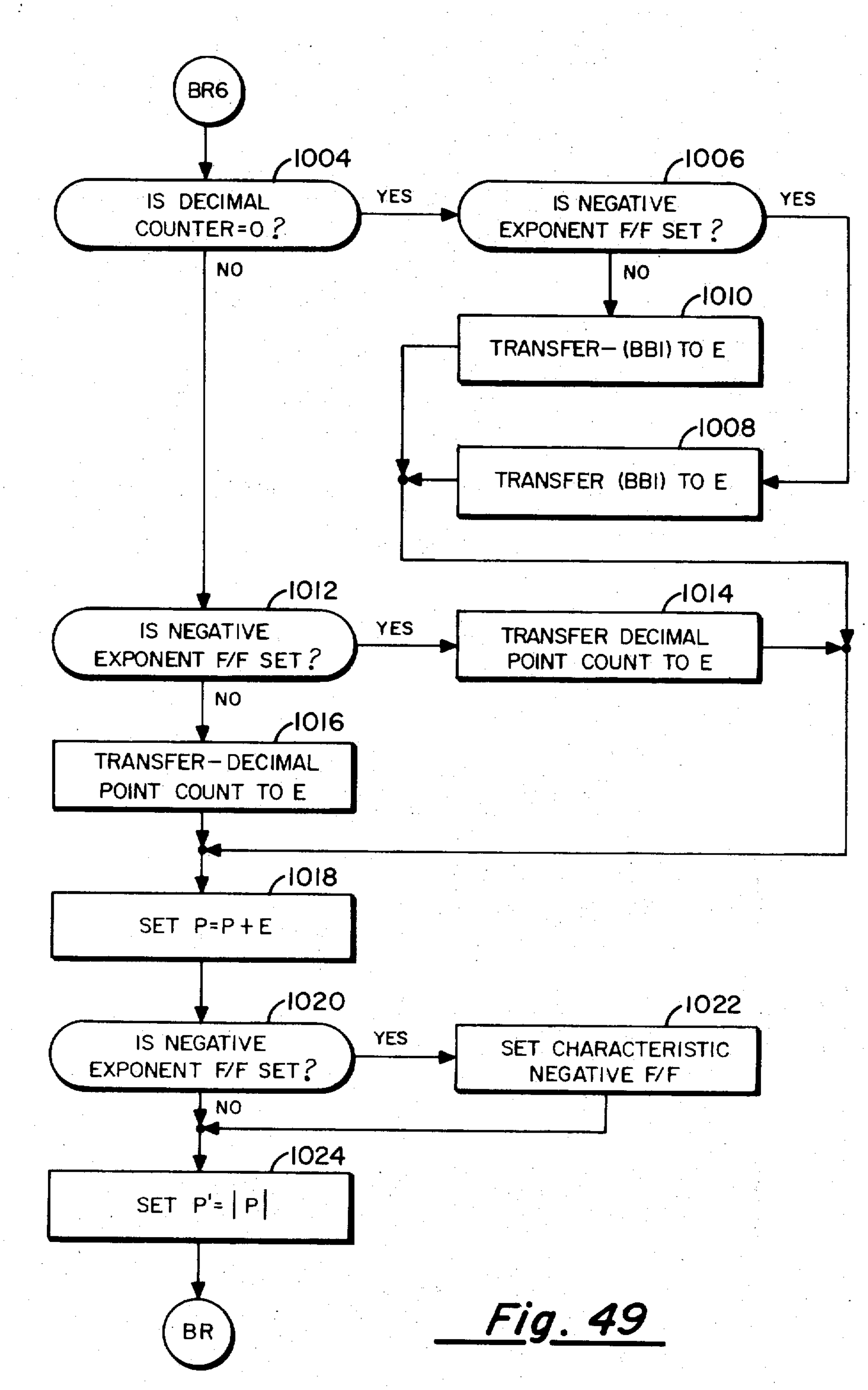
Figures 51, 54:
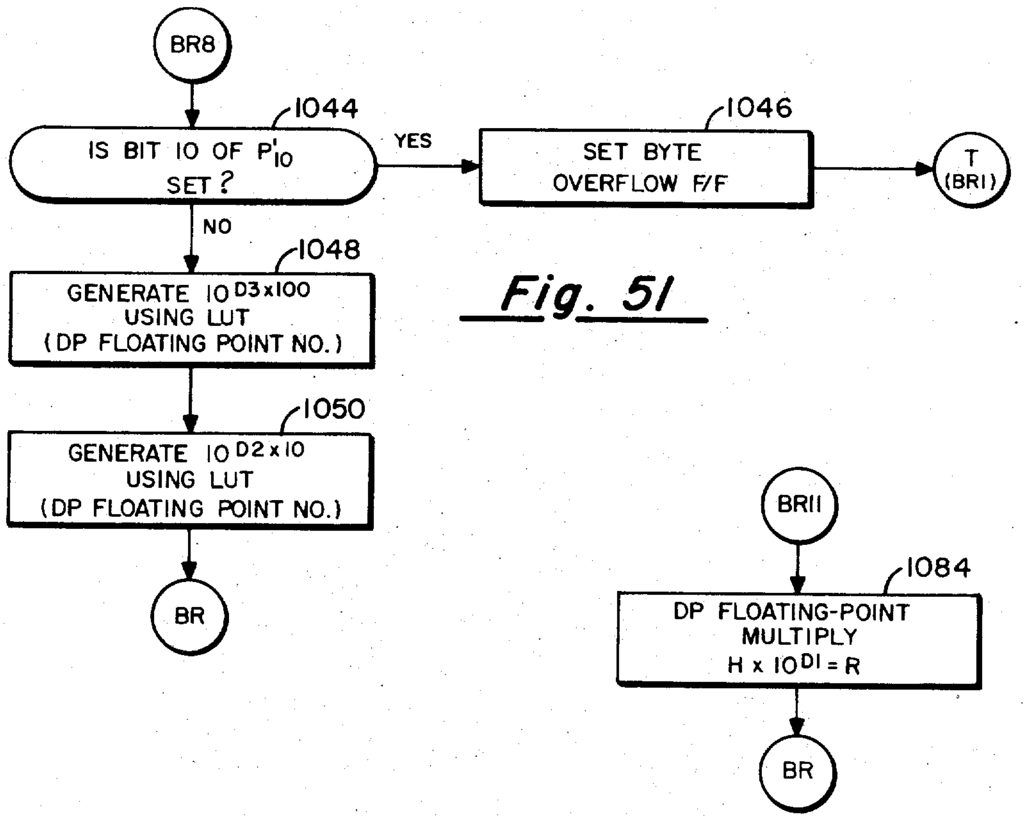
Figure 53:
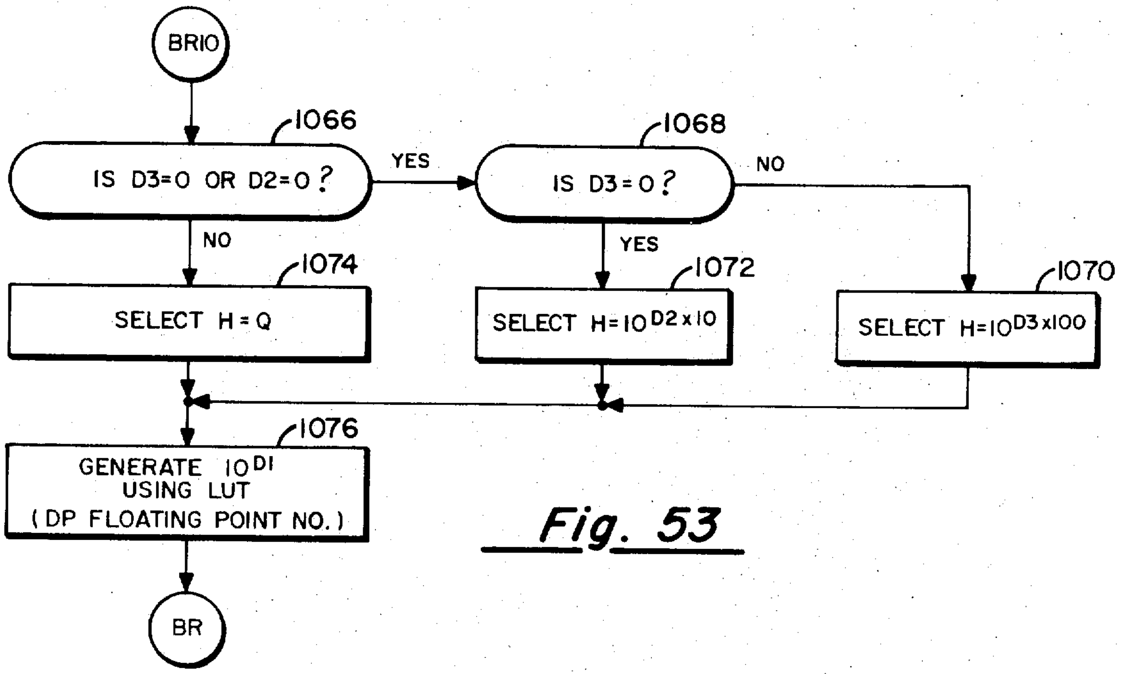
Figure 55:
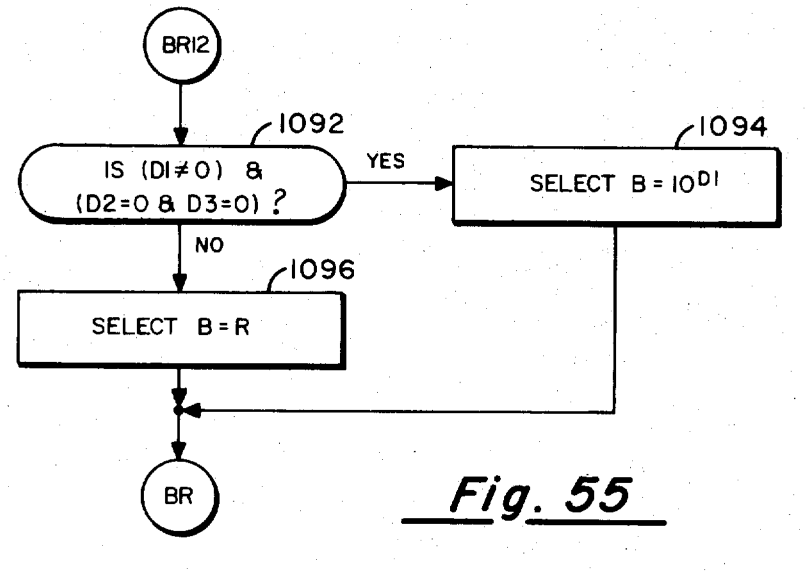
Figure 56:
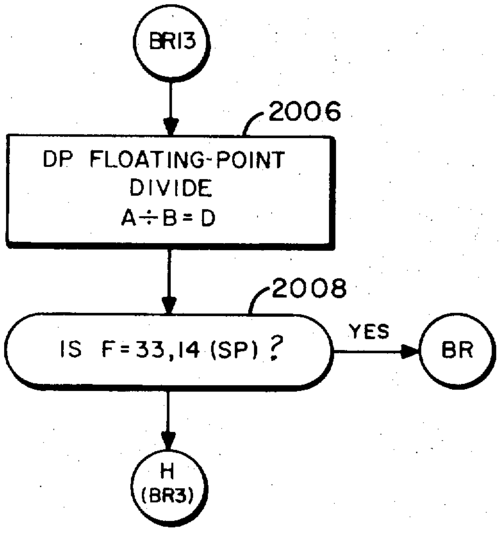
Figure 57:
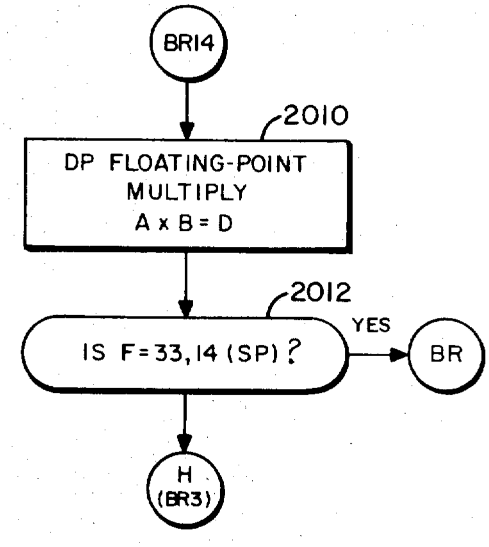
Figure 59:
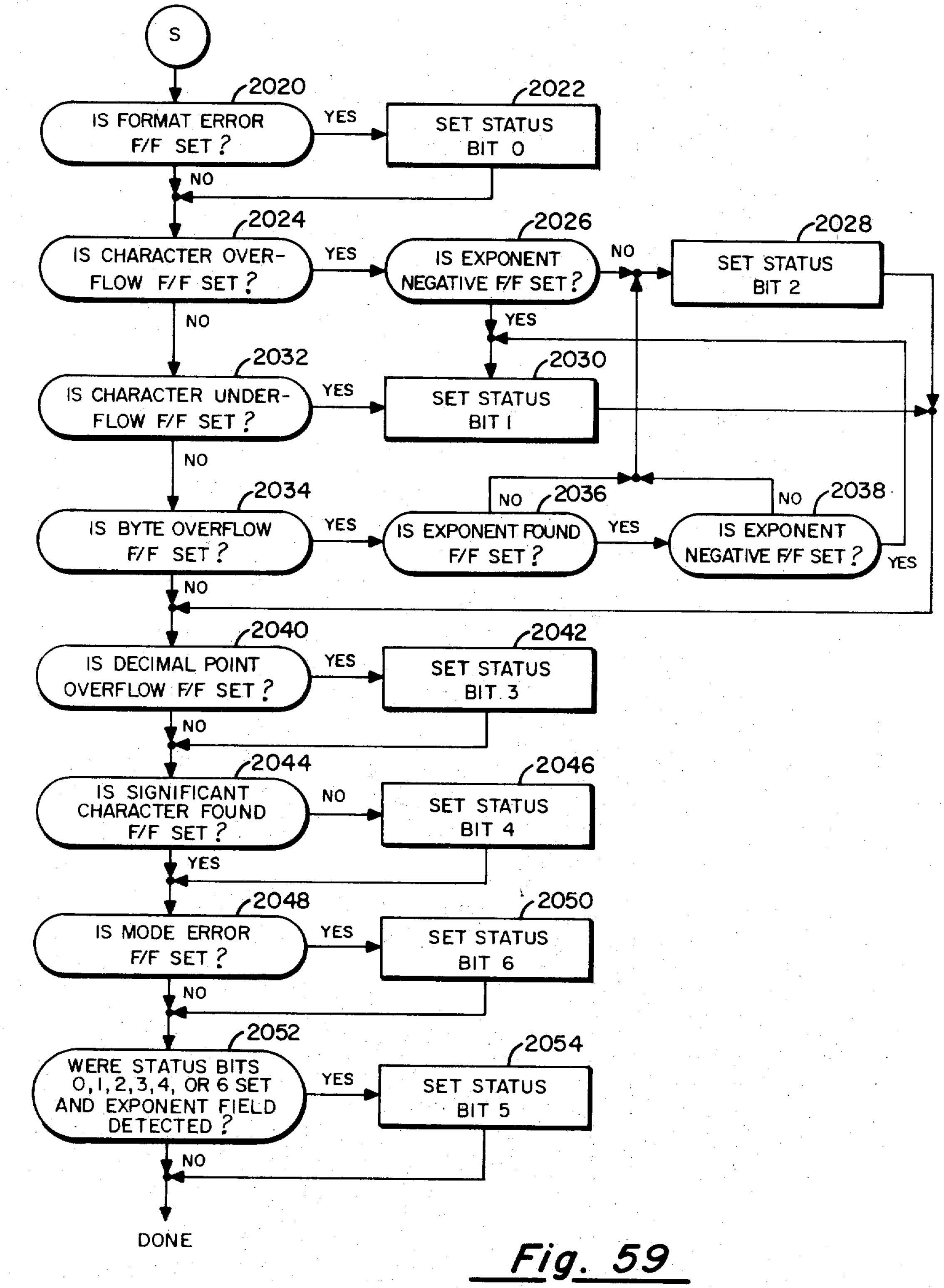

FIGS. **16*a*, 16*b*, and 16*c* illustrate the three R-Registers designated as SR1, SR2, and SR3**, respectively;

FIG. 17 illustrates the format of a data format of AFCII byte string;

FIGS. **18*a*, 18*b*, 18*c*, and 18*d*, when arranged as shown in FIG. 18**, comprise the block diagram of the arithmetic unit embodying the subject invention;

FIG. 19A is a logic block diagram that illustrates the logical functioning of the branch designators and controls;

FIGS. **19B*a*, 19B*b*, and 19B*c*, when arranged as shown in FIG. 19B**, illustrate the branch designator control logic;

FIGS. **19C*a*, and 19C*b*, when arranged as shown in FIG. 19C**, illustrate the first rank logic diagram of the floating-point branch designators;

FIGS. **19D*a* and 19D*b*, when arranged as shown in FIG. 19D**, illustrate selection logic and the second rank logic of the floating-point branch designators;

FIG. 20 illustrates in logic block diagram form the arrangement of the Look-Up Table (LUT), together with associated selection circuitry;

FIG. 20*a* illustrates a logic block diagram of the relationship by which a byte character is sampled and identified;

FIGS. 20*b* through 20*dd* illustrate designated control flip-flops, respectively;

FIG. 21 is a logic flow diagram that illustrates the branch selection and sequencing for the performance of the floating-point format to byte format conversion;

FIGS. 22*a*, 22*b*, and 22*c*, when arranged as shown in FIG. 22, illustrate the sequence of branch designator selection for accomplishing the single-precision or double-precision floating-point format conversion to the byte format; for the process of converting from floating-point to byte format;

FIG. 23 is a diagrammatic representation of the calculation and control functions performed during BR1;

FIG. 24 is a block diagram illustrating the operation performed during BR2;

FIG. 25 illustrates the operations performed during BR3;

FIG. 26 illustrates the functions performed during BR9;

FIG. 27 illustrates the functions performed during BR10;

FIG. 28 illustrates the operations performed during BR11;

FIG. 29 illustrates the functions performed during BR12;

FIG. 30 illustrates the operation performed during BR13;

FIG. 31 illustrates the operation performed during BR14;

FIG. 32 illustrates the functions performed during BR18;

FIG. 33 illustrates the function performed during BR20;

FIG. 34 illustrates the function performed during BR4;

FIG. 35 illustrates the function performed during BR6;

FIG. 36 describes the operation performed during BR7;

FIG. 37 illustrates the operation performed during BR15;

FIG. 38 illustrates the function performed during BR19;

FIG. 39 illustrates the function performed during BR8;

FIG. 40 illustrates the functions performed during BR16;

and FIG. 41 illustrates the conversions and operations accomplished during BR17;

FIG. 42 is a logic flow diagram that illustrates the branch selection and sequencing for the performance of the byte to floating-point format conversions;

FIGS. 43*a*, 43*b*, 43*c*, and 43*d*, when arranged as shown in FIG. 43, illustrate the branch selection logic for converting from byte to single-precision floating-point or for byte to double-precision floating-point formats; for converting from byte format to floating-point format, FIGS. 44*a*, 44*b*, 44*c*, and 44*d*, when arranged as shown in FIG. 44, comprise a diagrammatic representation of the operations and calculations performed during Branch 1;

FIG. 45 is the diagrammatic representation of the arithmetic operations and control operations performed in Branch 2;

FIG. 46 is a diagrammatic representation of the arithmetic operations and control functions performed in Branch 3;

FIGS. 47*a* and 47*b*, when arranged as shown in FIG. 47, illustrate the diagrammatic arrangement of the arithmetic and control operations performed in Branch 4;

FIG. 48 is the diagrammatic representation of the operations performed in Branch 5;

FIG. 49 is the diagrammatic representation of the operations performed in Branch 6;

FIG. 50 is the diagrammatic representation of the operations performed in Branch 7;

FIG. 51 is the diagrammatic representation of the operations performed in Branch 8;

FIG. 52 is the diagrammatic representation of the operations performed in Branch 9;

FIG. 53 is a diagrammatic representation of the operations performed in Branch 10;

FIG. 54 is a diagrammatic representation of the operations performed in Branch 11;

FIG. 55 is a diagrammatic representation of the operations performed in Branch 12;

FIG. 56 is a diagrammatic representation of the operations performed in Branch 13;

FIG. 57 is the diagrammatic representation of the operations performed in Branch 14;

FIG. 58 is a diagrammatic representation of the operations performed in Branch 15;

and FIG. 59 is the diagrammatic representation of the decision procedures that are followed in determining which of the status bits is to be set.

DESCRIPTION OF THE PREFERRED EMBODIMENTS

Figure 1:
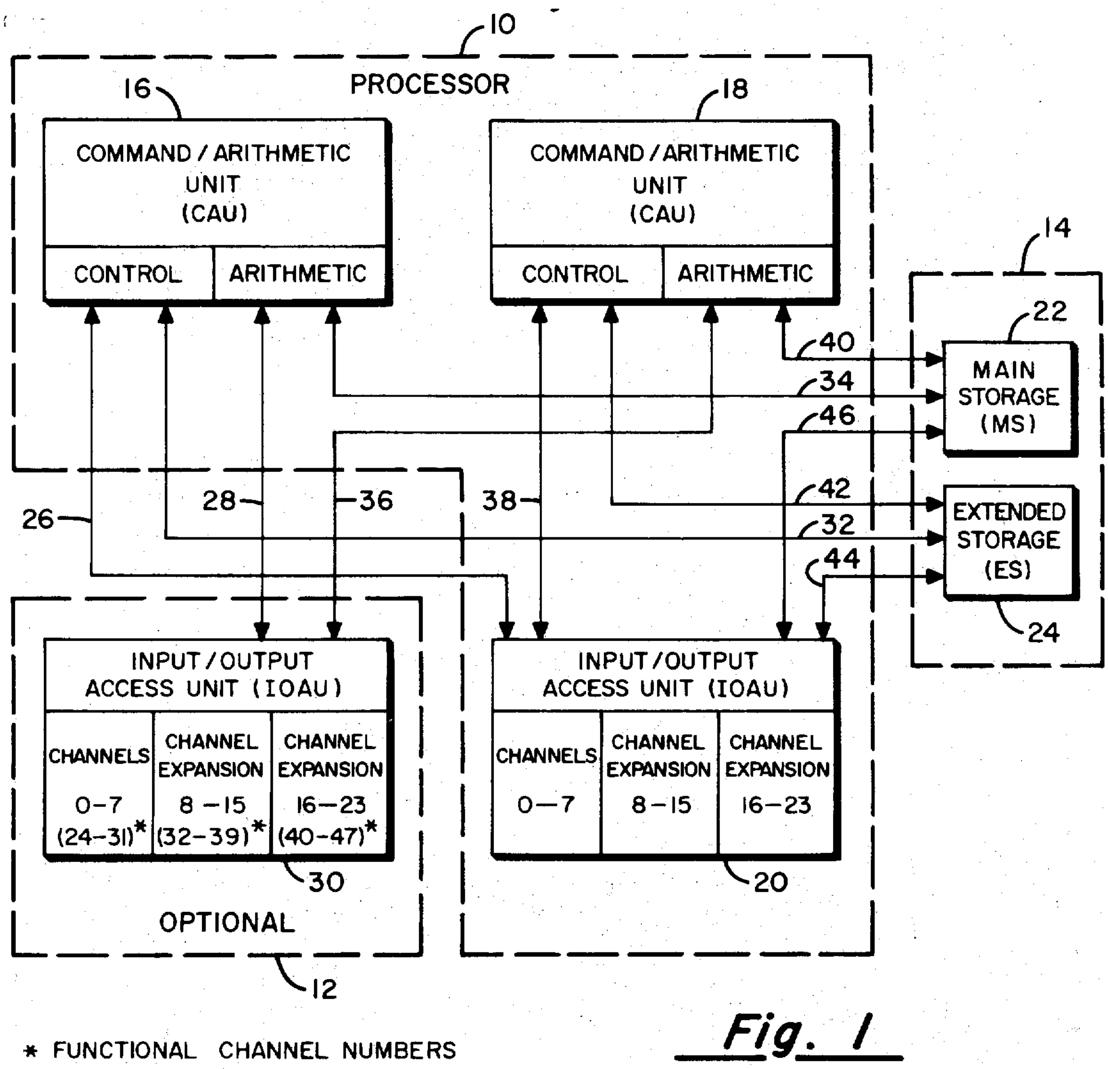
FIG. 1 is a block diagram of a data processing system adapted to include the data format conversion system of the subject invention.

FIG. 1 is a block diagram of a data processing system adapted to include the subject invention. The data processing system includes a Processor enclosed within dashed block 10, and optional Input/Output Access Unit shown within dashed block 12, and a Storage unit shown enclosed within dashed block 14. The Processor 10 is organized in a system basically that of a multi-task processor, and is intended for operation in a multiprocessor system environment. It includes Command Arithmetic Units 16 and 18 otherwise referred to as CAU, and an Input/Output Access Unit 20, referred to as IOAU. Generally speaking, the CAU is an instruction-stacked machine with up to four instructions at various stages of execution at any given time. Basically, there are two paths to Storage 14 for each CAU that may operate simultaneously, if not addressing within the same grouping of memory addresses comprising a storage module. In one configuration, a storage module is 8,192 words.

The Main Storage (MS) 22 consists of modules having 8,192 words each, with a 368 nanosecond read access time and a 550 nanosecond write cycle time as seen at the processor interface. Extended Storage (ES) 24 shall be referenced by way of a single access path from each CAU or IOAU. The Extended Storage 24 may consist of up to eight 131,072-word modules of core storage with an access time of approximately 1.5 microseconds. The extended storage access path from the CAU or the IOAU may be multiplexed, that is, a second reference can be initiated while waiting for the completion of a prior reference.

CAU 16 has a pair of access paths 26 and 28 in communication with IOAU 20 and IOAU 30, respectively. CAU 16 also has a pair of access paths 32 and 34 in communication with Extended Storage 24 and Main Storage 22, respectively. CAU 18 has a similar arrangement, and has a pair of access paths 36 and 38 in communication with IOAU 30 and IOAU 20, respectively. CAU 18 is in communication with Main Storage 22 by access path 40, and with Extended Storage 24 by access path 42. Extended Storage 24 and Main Storage 22 are in communication with IOAU 20 through access paths 44 and 46, respectively.

Processor 10 through CAU units 16 or 18 shall have direct-address generation capabilities of up to 16,000,000 words of storage, utilizing a 24-bit address configuration. The system electronics provide direct address capability of 262,144 words of storage in main storage 22, and 1,000,000 words of extended storage 24.

Each CAU 16 or 18 includes an arithmetic section and a control section. The arthmetic section does all of the actual computations such as addition, subtraction, multiplication, division, and byte format and floating-point format conversions. The arithmetic sections also perform certain logical functions such as shifting and comparing. As will be described in more detail below, the arithmetic sections also include various registers for providing intermediate storage.

The control sections of the CAU include circuitry for forming the operand addressing, indexing, memory limits decision checks, instruction buffering and instruction function code decoding and control, as well as providing over-all regulation of each instruction operation and timing. These functions, as they relate to the subject invention, will be discussed in more detail below.

The IOAU units 20 and 30 provide the capability of communicating bi-directionally with peripheral units.

The memory system 14, including Main Storage 22 and Extended Storage 24, provide data storage facilities constantly required by the data processing system as it performs its computation, as well as providing storage of the program being operated by the processing system. For the embodiment under consideration, a storage register is basically considered to be a 36-bit storage entity. Various full-word or partial-word addressing techniques are utilized.

Figure 2:
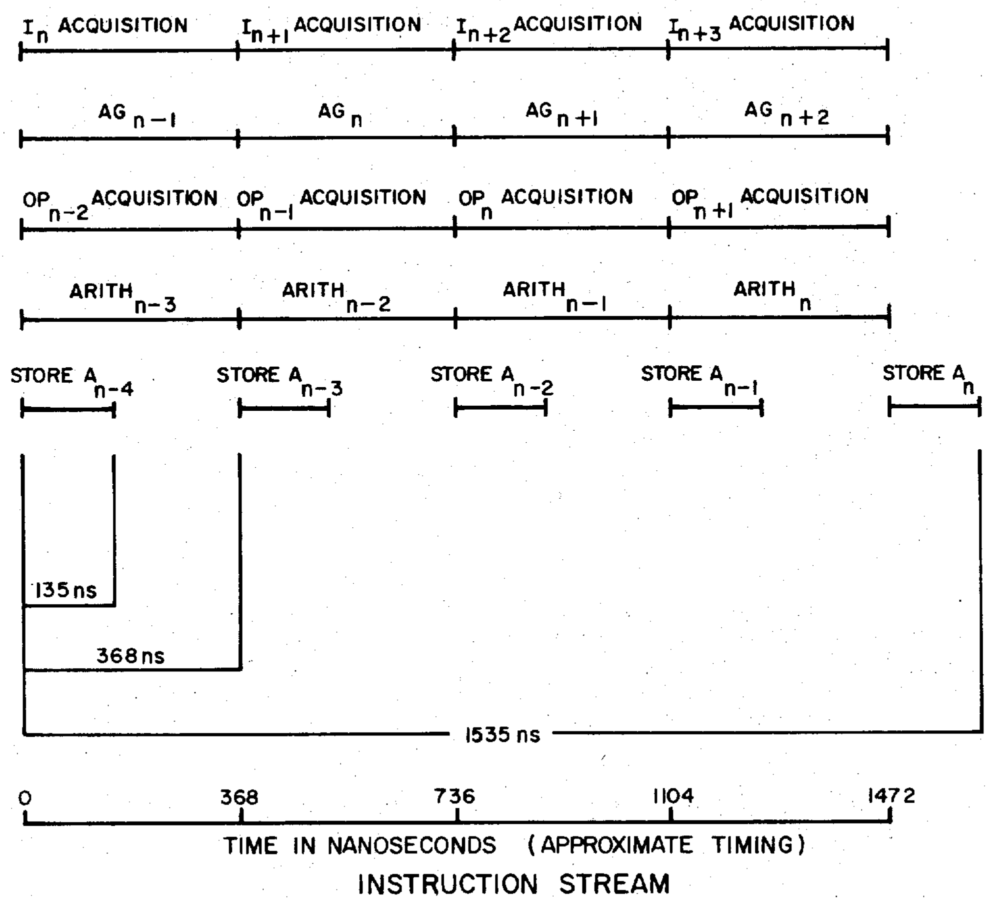
FIG. 2 illustrates the approximate timing relationship involved in the instruction overlapped mode of operation.

FIG. 2 illustrates the approximate timing relationship involved in the instruction overlapped mode of operation. The instruction executions are generally involved with a series of five basic timed operations or sequences. These sequences are:

1. Instruction acquisition sequence, a sequence which obtains an instruction from storage;
2. Address generation sequence, a sequence which generates an absolute address to be used for referencing storage;
3. Operand acquisition sequence, a sequence which obtains an operand from storage;
4. Arithmetic sequence, a sequence which uses arithmetic hardware to complete its execution of an instruction; and
5. Results storage sequence, a sequence which stores the results of an arithmetic operation in a hardware register.

Due to the four-deep instruction stack and dual-access path arrangements, these sequences may be initiated in such a manner that although approximately 1,535 nanoseconds may elapse between initial instruction acquisition and final instruction execution for a typical single-precision add instruction, an effective execution rate of one instruction per 350 nanoseconds is obtainable.

Figure 3:
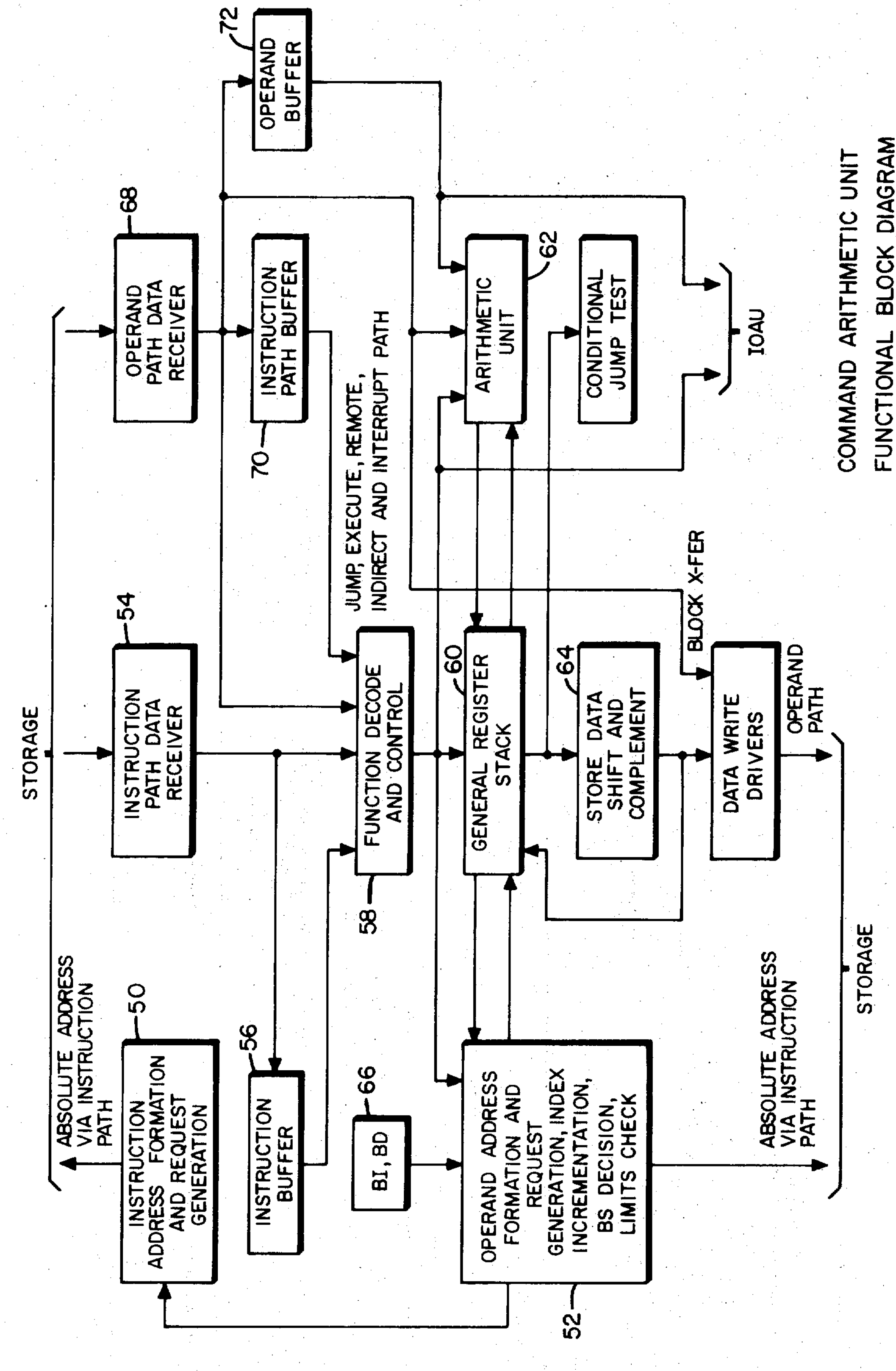
FIG. 3 is a functional block diagram of a command arithmetic unit, wherein address formulation, general register stack access, conditional jump operations, arithmetic computations, both binary and single-precision and double-precision are accomplished, and conversions between coded byte formats and floating-point formats are performed.

FIG. 3 is a functional block diagram of a command arithmetic unit, wherein address formulation, General Register Stack (GRS) access, conditional jump operations, arithmetic computations, and conversions between byte formats and floating-point formats are performed functionally under central control.

Figure 4:
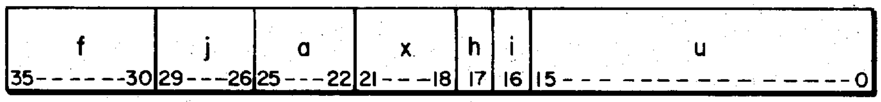
FIG. 4 illustrates the format of an Instruction Word.

FIG. 4 illustrates the format of an Instruction Word, and utilizes 36-bits. The function code designator (*f*-field) specifies the particular type of operation or function to be performed by the data processing system. The operand qualifier or minor function code designator (*j*-field) specifies whether a whole word or a certain portion of a word will be transferred to or from the memory area specified by the function. In certain instructions, the *j*-field combines with the *f*-field to form an extended function code or General Register Stack address. The A-Register designator (*a*-field) is interpreted in one of several ways depending upon the instruction function code. For various configurations, the *a*-field may specify, one, two, and three A-Registers, an R-Register, an X-Register, or in specific instances the *j*- and the *a*-fields are combined to specify a General Register Stack address. The *a*-field also is used to specify the I/O channel, jump keys, stop keys, or a variation in the operation performed by some instructions. The index register designator (*x*-field) when not in a zero state, shall specify that an indexing operation is to be performed, and shall specify which one of 15 possible index registers will be used in the indexing operation. The index register incrementation designator (*h*-field) if set, controls the modification of the index value ($X_m$) by the increment field ($x_i$) after indexing. If $h=1$ the ($X_m$) is modified by ($X_i$) of the index registers specified by the *x*-field, except that the I-bit of a J-Register may specify incrementing the J-Register instead of the X-Register. The indirect addressing designator (*i*-field) controls the use of indirect addressing during instruction execution. If $i=0$, the instruction functions normally. If $i=1$ and the program state register (PSR) bit (not shown) bits D7 and D11 are equal to zero, the 22 least significant bit positions of the instruction are replaced in the instruction register with the contents of the 22 least significant bit positions of the contents of the U address. Indirect addressing continues as long as $i=1$, with full indexing capability at each level. If bit D7 is set for base register supression, and $i=1$, the addition of BI or BD is inhibited so that U is the absolute address. If bit D11 is set to select the operand base selector, and $i=1$, a utility base is utilized. These indirect addressing operations will be discussed in more detail below. The displacement field (*u*-field) normally specifies the operand address. For certain instructions, the *u*-field designates a constant, and for shift instructions designates the shift count. In all instructions, the value specified in the *u*-field may be modified by the contents of an index register.

Table I illustrates the instruction word field designations.

| *f*-Field | *a*-Field |
|---|---|
| 00–77 | GRS address for the store of Arithmetic results or arithmetic operand (Aa) |
| *j*-Field | |
| Partial word qualifier if $f < 70_8$ and $f \neq 07, 33, 37$ | GRS address for the X Register (Xa) |
| If $j = 4, 5, 6$, or 7 & PSR D4 set (character addressing mode) will address J Register in GRS. | GRS address for the R Register (Ra) |
| Minor function designator if $f > 70_8$ | Designate an I/O Channel number (Ca) |
| Minor function designator if $f < 70_8$ and $f = 07, 33, 37$. | Designate a jump key (Ka) |
| $j = 16$ or 17 (Data) | Designate a stop key (Ka) |
| | Minor function code designator (such as a 7314) |
| $x = \phi - h, i, u$ | |
| $x = \phi - u, xm$ | *h*-Field |
| *x*-Field | Increment the X Register (X $\neq$ 0 and H = 1) |
| Index Register | |
| *u*-Field | *i*-Field |
| $u + xm \geqslant 200_8$ − storage address | Indirect addressing if PSR D7 and D11 = $\phi$ |
| $u + xm < 200_8$ − GRS address except $60_8 - 77_8$ | Base Register suppression if PSR D7 set and *i* bit set |
| Shift count on shift instruction | Use PSR U if PSR D11 set and if *i* bit set |

INSTRUCTION WORD DESIGNATIONS

TABLE I

Returning to a consideration of FIG. 3, the Instruction Address Formation and Request Generation circuitry 50 accepts a 24-bit absolute address from the Operand Addressing Section 52 after a jump or initial start. The jump or initial instructions are routed from the operand acquisition sequence to the instruction sequencing section. The address acepted by the Instruction Address Formation and Request Generation circuitry 50 is increased by 1 and upon receipt of the proper acknowledge, the next request is sent to storage. Consecutive instruction referencing continues until an executed jump instruction or an interrupt disrupts the sequence, in which cases a new absolute address is received from the Operand Addressing Section. When an instruction is referenced and read from storage, it is provided to the Instruction Path Data Receiver 54 and is routed either to the Instruction Buffer 56 or the Function Decode and Control 58. When an instruction is directed to Function Decode and Control 58, the *f*-, *j*-, and *a*-designators are interpreted by control circuitry and appropriate control paths are initiated.

The addressing portion of the instruction word is directed to Operand Address Formation and Request Generation, Index Incrementation and BS Decision circuitry 52.

Figure 5:
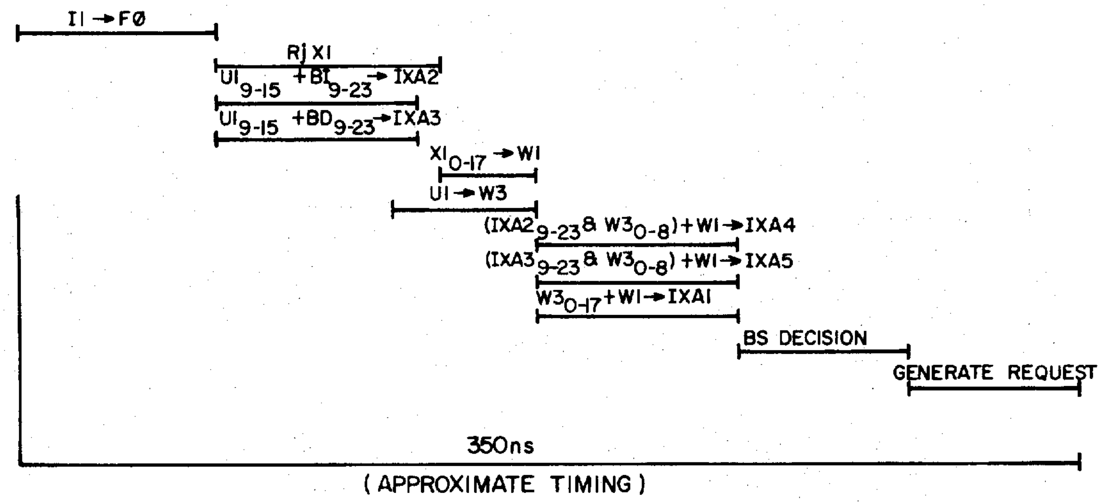
FIG. 5 illustrates the approximate timing of an operand address generation sequence.

FIG. 5 illustrates the approximate timing of an operand address generation sequence. During the address generation sequence, the contents of an index register is read and the lower half of the specified index register is added to the *u*-field of the instruction to form a relative address. A base register is added to the relative address to form the absolute address of a specified operand. If the relative address is determined to be less than $200_8$, the operand reference will fall within the General Register Stack. During the address generation sequence, if the *h* designator is set, the upper half of the specified index register is added to the lower half and the result restored in the General Register Stack locations specified by the *x*-field of the instruction. Depending upon the type of instruction, the temporary arithmetic holding register specified by the *a*-field of the instruction may be read out. If the data read from the General Register Stack 60 is to be used by the Arithmetic Section 62, it is passed to a holding register. If this data is to be used by a store instruction it is gated to the store data portion of the Store Data Shaft and Complement circuitry 64, or to the input data register for the General Register Stack 60 for those relative addresses less than $200_8$. If the instruction is a conditional jump instruction dependent on the contents of an arithmetic register, the A-Register specified shall be sampled during the address generation sequence, so that if a jump is to be taken, the operand acquisition sequence may read the first instruction along the jump path. The operand addressing system can be of a type illustrated and described fully in U.S. Pat. No. 3,389,380 entitled "Signal Responsive Apparatus" invented by James P. Ashbaugh, James C. Borgstrom, and Thomas C. Tollefson, and assigned to the assignee of the present invention.

Figure 6:
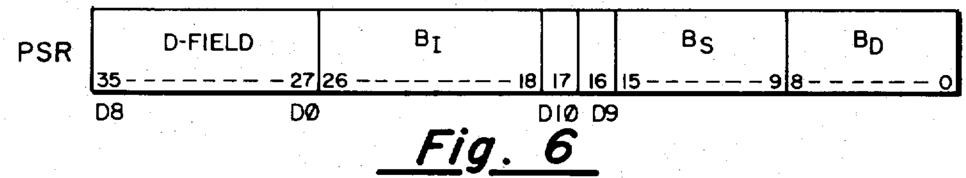
FIG. 6 illustrates the format of the Program State Register.

As used in the relative addressing calculation, the quantities BI, and BD shown as constants from circuitry 66, are the constants stored in the Program State Register PSR illustrated in FIG. 6.

Figure 7:
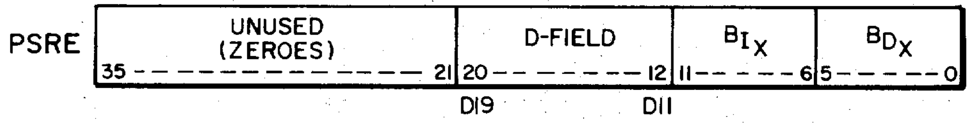
FIG. 7 illustrates the format of the Program State Register Extension.

FIG. 7 illustrates the Program State Register Extension (PSRE). Table II, set forth below, illustrates the processor state register word format designations.

PROCESSOR STATE REGISTER WORD FORMAT DESIGNATIONS

TABLE II

| | | |
|---|---|---|
| PSR | first word of main PSR | |
| PSRE | second word (extension portion) of main PSR | |
| D-Field | location of control bits D$\phi$through D8 | |
| $B_I$ | Instruction Bank Base Value | |
| $B_S$ | Base Selection Value | |
| $B_D$ | Data Bank Base Value | |
| D$\phi$ | carry designator | |
| D1 | overflow designator | |
| D2 | guard mode and storage protection | interaction |
| D3 | write only storage protection | |
| D4 | character addressing mode | |
| D5 | double-precision underflow | |
| D6 | control register (GRS) selection (EXEC ABR) | |
| D7 | base register supression (EXEC Mode) F$\phi$i Bit must also be "1" for supression) | |
| D8 | floating point zero | |
| D9 | index register mode selector (24 bit if set and D7 and the i-bit of instruction are also set) | |
| D10 | quarter-word mode | |
| D11 | operand base selector. If "$\phi$ — use BI, BD, BS from PSR and PSRE. If "1" and *i* is "1" — force use of BI, BD, BS from PSRU and PSRUE the jump operand is excluded. | |
| D12 | PSR SLR Selector (PSRU PSRUE and SLRU if set; PSR, PSRE and SLR if clear) Allows most used storage in fast storage and least used in slow storage. | |
| D13 | PSR I-bank write selector (write illegal if set) | |
| D14 | PSR D-bank write selector (write illegal if set) | |
| D15 | PSRU I-bank write selector (write illegal if set) | |
| D16 | PSRU D-bank write selector (write illegal if set) | |
| D17 | If set — return the residue (single precision F.P.) If clear — throw away the residue | |
| D18 | PSR and Storage Limits Register Auto-Switch on non jump inst. (D12 = $\phi$ and | |

TABLE II-Continued

| | |
|---|---|
| | D18 = 1, and limit error condition) use PSRU on next inst. only. On jump Inst. — (D12 = $\phi$ and D18 = 1 and Limit error condition) Set D12 which gives permanent switch. |
| D19 | EXEC MDP allow |
| $B_l$ | 6-bit extension value for $B_l$ |
| $B_u$ | 6-bit extension value for $B_u$ |

The unused field of the PSRE (bits 35–21) must be zeroes. Instruction execution time is extended if either D11 or D18 is set. control bits D7 and D11 must not both be set at the same time. Control bits D11 and D12 must not both be set at the same time.

The operand acquisition sequence normally involves an operand requested from storage. When the acknowledge has been received, and the operand is received at the input of the Operand Path Data Receiver 68, the operand is available either to be directed to the Function Decode and Control circuitry 58, to be directed to the Instruction Path Buffer 70, or to be directed to the Operand Buffer 72, depending upon the nature of the operand received. In the case of a double length operand, the sequence would be repeated. In the case of an operand reference to the General Register Stack 60, the contents of the designated storage location in the General Register Stack is read.

The arithmetic sequence accepts operands from the General Register Stack 60, and in some cases from storage, and performs the arithmetic operation indicated by the decoding of the instruction function code. The specific address designations of the General Register Stack is as illustrated in Table III below.

GENERAL REGISTER STACK (GRS) ADDRESS ASSIGNMENTS

TABLE III

| OCTAL | | DECIMAL | | |
|---|---|---|---|---|
| 0 | NONINDEXING REGISTER (X0) PSR TEMPORARY STORAGE | 0 | UNASSIGNED | |
| 1–13 | Xi XI-XII Xm | 1–11 | 15 INDEX REGISTERS (X) | |
| 14–17 | A$\phi$–A3 | 12–15 | 4 OVERLAPPED (X or A) | |
| 20–33 | A4–A15 | 16–27 | 16 ACCUMULATORS (A) | |
| 34–37 | | 28–31 | 4 UNASSIGNED | |
| 40, 41 | PROCESSOR STATE REGISTER (MAIN) TEMPORARY STORAGE | 32, 33 | TEMPORARY STORAGE FOR 4 PROCESSOR STATE REGISTERS | |
| 42, 43 | PROCESSOR STATE REGISTER (UTILITY) TEMPORARY STORAGE | 34, 35 | | |
| 44 | EXEC MEM. DESCRIPTOR POINTER REGISTER | 36 | 2 MEM. DESCRIPTOR POINTER REGISTERS | |
| 45 | USER MEM. DESCRIPTOR POINTER REGISTER | 37 | | |
| 46 | CURRENT MEM. DESCRIPTOR INDEXES (PACKED) FOR MAIN PSR | 38 | 2 MEM. DESCRIPTOR INDEXES | |
| 47 | CURRENT MEM. DESCRIPTOR INDEXES (PACKED) FOR UTILITY PSR | 39 | | |
| 50 | UNASSIGNED | 40 | UNASSIGNED | EXEC. |
| 51 | STORAGE PARITY CHECK STATUS WORD | 41 | 5 INTERRUPT STATUS WORDS | |
| 52 | INTERFACE PARITY CHECK STATUS WORD | 42 | | |
| 53 | GUARD MODE INTERRUPT STATUS WORD | 43 | | |
| 54 | UNDEFINED SEQUENCE INTERRUPT STATUS WORD | 44 | | |
| 55 | SYSTEM INTERRUPT STATUS WORD | 45 | | |
| 56 | MAIN STORAGE REFERENCE COUNTER | 46 | 2 STORAGE REFERENCE COUNTERS | |
| 57 | EXTENDED STORAGE REFERENCE COUNTER | 47 | | |
| 60–77 | NOT USABLE | 48–63 | 16 NOT USABLE | |
| 100 | REAL TIME CLOCK (R0) | 64 | 16 SPECIAL REGISTERS (R) | |
| 101 | REPEAT COUNT REGISTER (R1) | 65 | | |
| 102 | MASK REGISTER (R2) | 66 | | |
| 103–105 | STAGING REGISTERS (R3–R5 OR S R1–S R3) | 67–69 | | |
| 106–111 | J-REGISTERS (R6–R9 OR J0–J3) | 70–73 | | |
| 112–117 | UNASSIGNED (R10–R15) | 74–77 | | |

GENERAL REGISTER STACK (GRS) ADDRESS ASSIGNMENTS

TABLE III—Continued

| OCTAL | | DECIMAL | | |
|---|---|---|---|---|
| 120 | UNASSIGNED (R0) | 80 | 16 SPECIAL REGISTERS (R) | EXEC. |
| 121 | REPEAT COUNT REGISTER (R1) | 81 | | |
| 122 | MASK REGISTER (R2) | 82 | | |
| 123–125 | STAGING REGISTERS (R3–R5 OR SR1–SR3) | 83–85 | | |
| 126–131 | J-REGISTERS (R6–R9 OR J0–J3) | 86–89 | | |
| 132–137 | UNASSIGNED (R10–R15) | 90–95 | | |
| 140 | NONINDEXING REGISTER ($X_0$) | 96 | UNASSIGNED | |
| 141–153 | Xi Xm XI–XII | 97–107 | 15 INDEX REGISTERS (X) | |
| 154–157 | A0–A3 | 108–111 | OVERLAPPED (X or A) | |
| 160–173 | A4–A15 | 112–123 | 16 ACCUMULATORS (A) | |
| 174–177 | UNASSIGNED | 124–127 | 4 UNASSIGNED | |

←36 BIT & PARITY→

The Arithmetic Unit 62 will be described in more detail below, and is utilized for performing the format conversions of the subject invention.

When the Arithmetic Unit 62 has completed the specified operations, control signals are returned, and the results of the arithmetic operation are directed to the appropriate temporary arithmetic registers in the General Register Stack 60.

The memory address limits check illustrated in circuitry 52, provides for testing the absolute memory addresses as generated, for determining whether or not the addresses are within permissible address ranges. A system for performing the limits check can be similar to that described in U.S. Pat. No. 3,263,218, entitled "Selective Lockout Of Computer Memory" invented by Duane H. Anderson, and assigned to the assignee of this invention.

Figure 8:
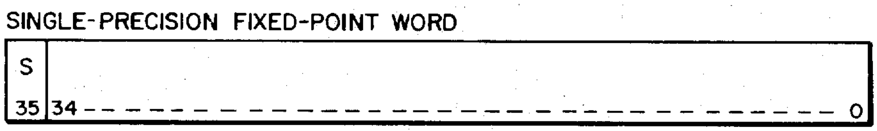
FIG. 8 illustrates the format of a single-precision fixed-point data word.

FIG. 8 illustrates the format of a single-precision fixed-point word comprised of 36-bits, and having the sign designated in bit position 35.

Figure 9:
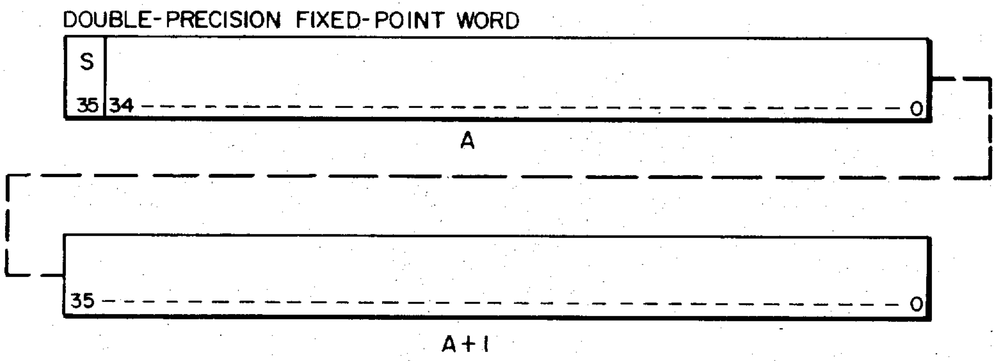
FIG. 9 illustrates a double-precision fixed-point word format.

FIG. 9 illustrates a double-precision fixed-point word format and indicates the continuity between two registers A and A+1 for denoting a 72-bit operand.

Figure 10:
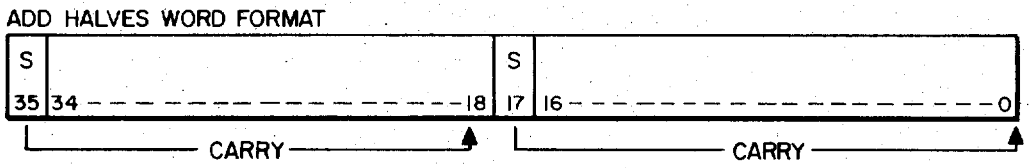
FIG. 10 illustrates the half-word data format.
Figure 11:
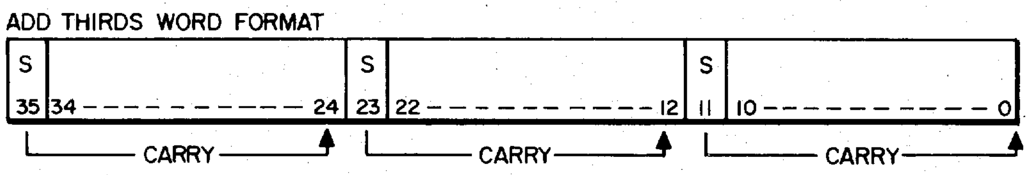
FIG. 11 illustrates the third-word data format.

The Arithmetic Unit 62 is capable of simultaneously adding pairs of half word operands having a format illustrated in FIG. 10. The Arithmetic Unit is also capable of simultaneously adding pairs of third word operands having a format as illustrated in FIG. 11. One form of adder that is capable of performing the add functions just described, is illustrated in U.S. Pat. No. 3,234,370, entitled "Segmented Arithmetic Device" invented by Gerald J. Erickson, and assigned to the assignee of the subject invention.

In computing devices employing floating-point arithmetic capability the data or operand upon which arithmentic functions are to be performed are in a format such that one portion of the data word contains the actual information and is called the mantissa, whereas another portion of the data word contains the characteristic. The characteristic is used primarily to indicate the relative position of the arithmetic point, such as decimal or binary point, in the information or data contained in the mantissa. In performing arithmetic operations on data in the floating-point format, the actual arithmetic operations are performed on the information contained in the mantissa portion of the data word and the characteristic is used primarily to indicate relative position of the arithmetic point in the information. Some arithmetic operations are performed on the characteristic portion to determine the characteristic of the result of the arithmetic operation on the mantissa. For example, in adding two operands in floating-point format, each having its own characteristic and its own mantissa portions, the arithmetic section of a computing device utilizes the two characteristics to determine the actual digit-by-digit alignment, i.e., to properly align the arithmetic points, of the two mantissas which are to be added. In the adder portion of the computing device the two aligned mantissas are then added together to produce a resulting floating-point sum. To preserve a floating-point format the sum of the addition of the mantissa is arranged to be a mantissa of a new floating-point data word. The characteristic of the sum is determined from the original two characteristics and additionally by any modification that might have resulted from addition of the two mantissas.

In computing devices the data words or operands are transferred and processed via a plurality of multistaged registers. Each stage of the register represents a power of the arbitrarily designated radix of the register, and the modulus of the register is the radix raised to the power equal to the number of stages in the register. For example, in a binary computing device using the "1's" complement notation, a six stage register has a modulus $2^6$ with the lowest digit order stage or least significant stage of the register containing a signal representation of the binary multiple of $2^0$, the signal representation in the second lowest digit stage indicating a binary multiple $2^1$ and so on up to the highest digit order or most significant stage of the register indicates a binary multiple of $2^5$. For use with operands in floating-point format the registers must comprise a number of stages for holding a signal representation of the mantissa portion of the data word and additional number of stages for holding the signal representation of the characteristic portion of the data word. Although the entire operand is contained in a single register in the single-precision format, the portion devoted to the mantissa is independent of that portion which contains the characteristic so that each portion of the word can be handled substantially as independent entities. In addition to stages containing the mantissa and the characteristic, the register has an additional stage to indicate the sign of the mantissa, that is, whether the mantissa is negative or positive.

For practical reasons, the size of registers utilizing computing devices normally are limited. The choice of size is arbitrary with the word size varying considerably from one computing device to another. Normally, the register size is chosen to be similar to that capacity of the memory registers. For instance, if the memory registers are adapted to store 36 binary digits, it is quite common for the registers in the arithmetic sections to operate on 36 binary digits. When floating-point operations are performed on the characteristic-mantissa arrangement within a single register, it is referred to as single-precision floating-point. An alternative mode of operation exists wherein two word-size registers are effectively placed end-to-end, whereby the characteristic-mantissa operand can be stored in the double length register as a single entity. This mode of operation is normally referred to as double-precision floating-point due to the additional register capacity over that available for single-precision operation. It is of course evident that the larger the number of binary digits in the mantissa, the greater the degree of accuracy of the computations performed thereon.

Many computing systems of the present day utilize both a single-precision and a double-precision floating-point computational capacity. In the past it has been customary to provide the same numerical capacity for the characteristics of the single- and double-precision floating-point operand. Conversion from single-precision to double-precision, where the characteristic is of the same numerical capacity is quite readily accomplished. The drawback to such an arrangement is that the full capacity of the double-precision floating-point operation cannot normally be utilized with a characteristic limited to the capacity of a single-precision floating-point operand. Accordingly, it is desirable that the characteristic for the double-precision floating-point operand be substantially larger, or of a greater numerical capacity, than that of the single-precision floating-point format. See discussion relative to FIGS. 23 and 58.

Any number can be expressed as a product of some numerical value multiplied times the predetermined numerical base of the system raised to a predetermined power. For example, the number 24 can be expressed with the numerical base 2 with any of the following arrangements:

Example I number
characteristic
mantissa

| | | |
|---|---|---|
| $2^4 \times 1.5 =$ | $16 \times 1.5$ | $= 24$ |
| $2^3 \times 3.0 =$ | $8 \times 3$ | $= 24$ |
| $2^2 \times 6.0 =$ | $6 \times 4$ | $= 24$ |

Note, since the numerical base 2 is used, the doubling of the mantissa (1.5 to 3 to 6), is compensated for by a reduction in the characteristic from 4 to 3 to 2. In a binary computer, this doubling (or halving) of a value can be done efficiently by a shifting of a number right or left.

Arithmetic operations involving two numbers expressed in the notation tabulated above, are simple provided that the characteristics are the same. With addition, for example, the mantissas are added and the characteristics remain the same. The base, once established, remains fixed. A simple addition is illustrated in Example II as follows:

EXAMPLE II $$(2^3 \times 3) + (2^3 \times 4) = 2^3 \times 7 = 8 \times 7 = 56$$
$$(8 \times 3) + (8 \times 4) = 8 \times 7 = 56$$
$$(24) + (32) = 56$$

When the exponents are different, an operation of this sort can be executed once either of the characteristics are modified so that they become equal. Example III is provided to illustrate such situation.

EXAMPLE III $$(0.3 \times 2^3) + (0.4 \times 2^2) = 4.0$$

can be set as either of the following:

$$(0.6 \times 2^2) + (0.4 \times 2^2) = 1.0 \times 2^2 = 4.0$$

or $$(0.3 \times 2^3) + (0.2 \times 2^3) = 0.5 \times 2^3 = 4.0$$

The application of the foregoing methods of adjusting the characteristic and the mantissa for representing a given desired value is called floating-point, and the foregoing examples illustrate the inter-relationship of adjustment of the characteristic and mantissa for purposes of performing arithmetic operations.

Figure 12:
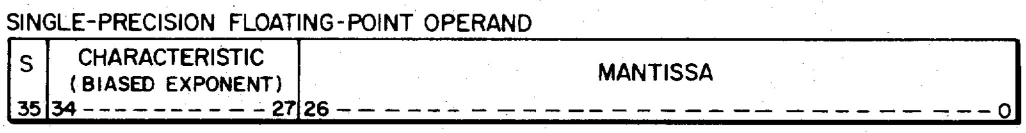
FIG. 12 illustrates the format of a single-precision operand or data word.
Figure 13:
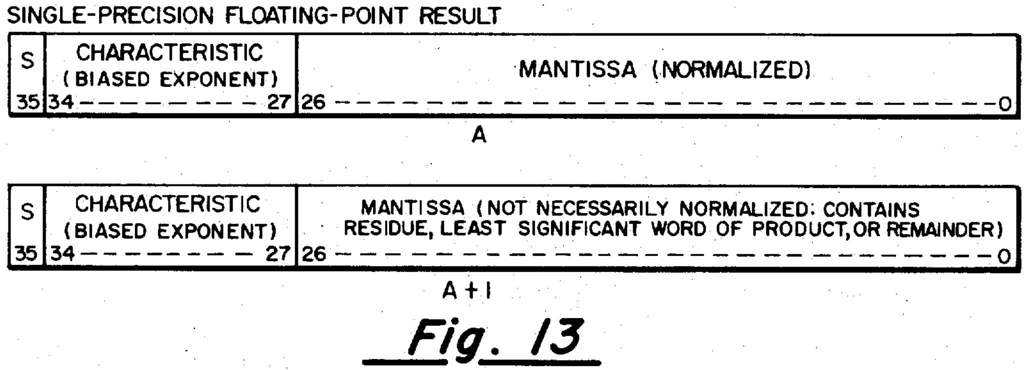
FIG. 13 illustrates the format of a single-precision floating-point result.
Figure 14:
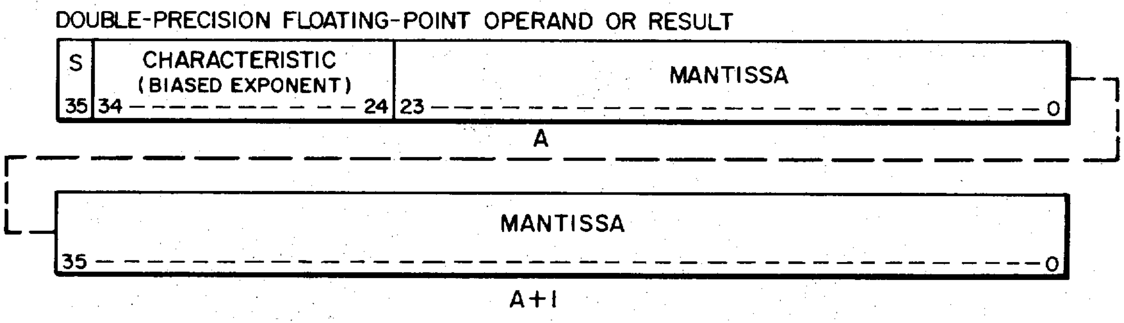
FIG. 14 illustrates the format of a double-precision operand or data word.

In the processor illustrated and described in FIG. 1, a positive mantissa, that is the numeral value of the data, is always considered to be a fraction. That is, when normalized the leading bit of the mantissa is equal to 1 and the value of a positive mantissa will always fall between 1 and ½ inclusive. A negative mantissa is normalized when the leading bit of the mantissa is equal to 0, and the value of a negative mantissa will always fall between the values of 1 and ½ inclusive. As mentioned above, the arithmetic system is capable of operating on two forms of floating-point operands, that is, single-precision and double-precision. Single-precision instructions produce double-precision results, i.e., an operand of twice the capacity of the standard arithmetic section register length. Double-precision arithmetic instructions also produce double-precision or double-length results. FIG. 12 illustrates the format of the single-precision operand for the embodiment of the subject invention. The single-precision mantissa is 27-bits and is stored in register bit positions 0 through 26. The single-precision characteristic is 8-bits and resides in a storage register stages 27 through 34. The sign bit S resides in bit position 35. The mantissa is the numerical value of the data and, as stated above, is always considered to be a fraction. It should be noted that the characteristic is not the exponent of the mantissa; but, instead, is the exponent of the numerical base. FIG. 13 illustrates the formats of the single-precision floating-point results. FIG. 14 illustrates the format of a double-precision operand. It will be noted that two full registers A and A+1 are utilized to store the double-precision operand. Recalling from above that a single-precision operand is illustratively shown as 36-bits, the double-precision operand requires 72-bits to completely define it. The least significant portion of the double-precision mantissa is stored in the 36-bits which are designated as the A+1 Register. The most significant portion of double-precision mantissa are stored in the lower ordered 24-bit positions of the designated A-Register. The composite portion of the A-Register and the entire A+1 results in a 60-bit double-precision mantissa. The double-precision characteristic is 11-bits in capacity and resides in bit positions 24 through 34 of the A-Register. In the double-length operand notation, this is equivalent to bit positions 60 through 70. The sign of the mantissa S is located in the highest numbered bit position of the A-Register. This is bit position 35 of the A-Register, and is bit position 71 of the overall double-precision floating-point operand.

Both the characteristic and mantissa for floating-point arithmetic operations, whether they be single- or double-precision, may represent positive or negative values. The sign bit S denotes the sign of the mantissa, and will be described in more detail below. To avoid using two separate signs, that is, one for the characteristic and one for the mantissa, within the same word, a system of characteristic biasing is employed to indicate the sign of the characteristic.

For single-precision, this consists of adding to the true or unbiased characteristic the bias value of 128 ($200_8$). The 8-bit characteristic permits a range of −128 to +127 ($-200_8$ to $+177_8$) as shown in Table IV.

TABLE IV - SINGLE-PRECISION

| (Characteristic Values) Decimal True | Biased | Octal True | Biased |
|---|---|---|---|
| −128 | 000 | −200 | $000_8$ |
| 000 | 128 | 000 | $200_8$ |
| +127 | 225 | 177 | $377_8$ |

To illustrate the principles involved, the value of $0.75_{10} \times 2^3$ is presented with every possible combination of signs.

| | | | | |
|---|---|---|---|---|
| (1) | $.75\times2^3$ | $.75\times2^3$ (unbiased) | = | $003\ 600\ 000\ 000_8$ |
| | | Bias | = | 200 |
| | | $.75\times2^3$ | = | $203\ 600\ 000\ 000_8$ |
| (2) | $-.75\times2^3$ | $.75\times2^3$ (unbiased) | = | $003\ 600\ 000\ 000_8$ |
| | | Bias | = | 200 |
| | | $.75\times2^3$ | | $203\ 600\ 000\ 000_8$ |
| | | 1's Complement $-.75\times2^3$ | | $574\ 177\ 777\ 777_8$ |
| (3) | $.75\times2^{-3}$ | $.75\times2^{-3}$ (unbiased) | = | $(-3)600\ 000\ 000_8$ |
| | | Bias | | 200 |
| | | $.75\times2^{-3}$ | | $175\ 600\ 000\ 000_8$ |
| (4) | $-.75\times2^{-3}$ | $.75\times2^{-3}$ (unbiased) | = | $(-3)600\ 000\ 000_8$ |
| | | Bias | | 200 |
| | | | | $175\ 600\ 000\ 000_8$ |
| | | 1's Complement $-.75\times2^{-3}$ | | 602 177 777 777 |

For double-precision, the true or unbiased characteristic is added to a bias value of 1024, $2000_8$. The 11-bit characteristic permits range of the values shown in Table V.

TABLE V - DOUBLE-PRECISION

| (Characteristic Values) Decimal True | Biased | Octal True | Biased |
|---|---|---|---|
| −1024 | 0000 | −2000 | $0000_8$ |
| 0000 | 1024 | 0000 | $2000_8$ |
| +1023 | 2047 | 1777 | $3777_8$ |

Double-Precision:

| | | | | |
|---|---|---|---|---|
| | | 1's Complement | | |
| (1) | $.75\times2^3$ | $.75\times2^3$ (unbiased) | = | $0003\ 60\ 000\ 000\ 000\ 000\ 000\ 000_8$ |
| | | Bias | = | 2000 |
| | | $.75\times2^3$ | = | $2003\ 60\ 000\ 000\ 000\ 000\ 000\ 000_8$ |
| (2) | $-.75\times2^3$ | $.75\times^3$ (unbiased) | = | $0003\ 60\ 000\ 000\ 000\ 000\ 000\ 000_8$ |
| | | Bias | = | 2000 |
| | | $.75\times2^3$ | = | $2003\ 60\ 000\ 000\ 000\ 000\ 000\ 000_8$ |
| | | 1's Complement $-.75\times2^3$ | = | $5774\ 17\ 777\ 777\ 777\ 777\ 777\ 777_8$ |
| (3) | $.75\times2^{-3}$ | $.75\times2^{-3}$ (unbiased) | = | $(-3)\ 60\ 000\ 000\ 000\ 000\ 000\ 000_8$ |
| | | Bias | = | 2000 |
| | | $.75\times2^{-3}$ | = | $1775\ 60\ 000\ 000\ 000\ 000\ 000\ 000_8$ |
| (4) | $-.75\times2^{-3}$ | $.75\times2^{-3}$ (unbiased) | = | $(-3)\ 60\ 000\ 000\ 000\ 000\ 000\ 000_8$ |
| | | Bias | = | 2000 |
| | | $.75\times2^{-3}$ | = | $1775\ 60\ 000\ 000\ 000\ 000\ 000\ 000_8$ |
| | | 1's Complement $-.75\times2^{-3}$ | = | $6002\ 17\ 777\ 777\ 777\ 777\ 777\ 777_8$ |

The foregoing illustrated biasing of the single-precision and double-precision characteristics allows negative or positive excursions from the median bias value. This biasing system permits the direct addition or subtraction of the mantissa and characteristics of two floating-point operands and permits the negative of a given positive value to be formed by calculating the 1's Complement value for the positive operand. It will be seen that whenever bit position 34 for the single-precision characteristic or bit position 70 for the double-precision characteristic contain a binary 1, the characteristic value is positive. When bit positions 34 and 70 are zero, the respective characteristics are a negative value.

The data processing system illustrated in FIG. 1 includes character addressing capabilities. These capabilities include the ability to manipulate character addresses in essentially the same manner as full word addresses. There are basically two modes of utilization of character addressing capability. The first of these modes of operation is specified in the following manner:

1. Designator bit D4 is PSR specifies the character indexing mode;
2. The instruction *f*-field values are within a specified grouping indicative of the capability of character addressing; and
3. The instruction *j*-field values of $4_8$ through $7_8$ are defined by addressing one of four J-Registers, where the J-Registers are identified as registers R6 through R9.

Figure 15:
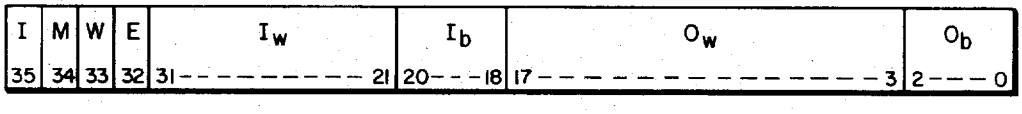
FIG. 15 illustrates the format of the J-Register.

The format of the J-Register is shown in FIG. 15. The information contained in the J-Register specifies a word offset, a character offset within a word, a sign extension and incrementation and decrementation of the word and character offset. This first mode extends full indexing capabilities to 6-bit, 9-bit, 12-bit, and 18-bit characters. Table VI, set forth below, provides the J-Register word format designations.

The second mode of character addressing operation applies to the character manipulation sub-set of the instruction repertoire. The second mode of operation generates addresses in the same manner as described above, however, the J-Registers are implicitly addressed by the function code in the instruction word instead of the *j*-field of the instruction word. This mode of operation is specified by the instruction *f*- and *j*-field values for the character instruction sub-set of instructions.

J-REGISTER WORD FORMAT DESIGNATIONS

TABLE VI

| Fields: | |
|---|---|
| I = * | J-Register modifier bit; used with the instruction word *h*-field to control J-Register and X-Register modification. |
| M = | Mode 6/9 bits: |
| | 0= 9-bit mode (ASCII) The eight least significant bits in each quarter-word are used; the most significant bit (left most bit in each quarter word) must be zero. |
| | 1= 6-bit mode (Field Data) |
| W = | Width 6–12 or 9–18 bits: |
| | 0 = 6/9 bits |
| | 1 = 12/18 bits |
| E = | 1 Sign is extended if receiving location is wider than character. Used only for character addressing; must be zero for all Byte instructions. |
| $I_w$= | Increment in words. |
| $I_b$= | Increment in bytes. |
| $O_w$= | Offset in words |
| $O_b$= | Offset in bytes. |

The generation of address in the character mode proceeds by reading the X and J Registers specified in the instruction from the General Register Stack. The 18-bit relative address is constructed by adding the 16-bit *u*-field of the instruction word to the 18-bit $X_m$-field of the index word and the 15-bit $O_w$-field of the J-Register that is selected by the instruction. The 3-bit $O_b$-field of the selected J-Register is used to select the desired character within a word and is not part of the address generation. The absolute storage address is generated as described above.

The character address incrementation is provided in two parts. The first part involves the word off-set, $I_w$ and $O_w$-fields, of the J-Register format; and the second part the offset characters $I_b$ and $O_b$-fields. The most significant bit of the $I_w$-field, that is bit-31, specifies the sign of the increments for both $I_w$ and $I_b$. The legal values of $I_b$ and $O_b$ are restricted to specifying characters within a word. When the value of $I_b + O_b$ exceeds the number of characters in a word the value of $I_w + O_w$ is incremented or decremented depending upon the sign of $I_w$. The *h*-bit in the instruction and the I-bit of the J-Register control the incrementation.

The set of processor instructions involving byte-manipulation includes extended sequence instructions. Certain ones of the byte-manipulation instructions have the capability of being interrupted. All staging and control information necessary to handle byte strings is held in registers that can be saved for future reference upon interrupt.

Figure 16A:
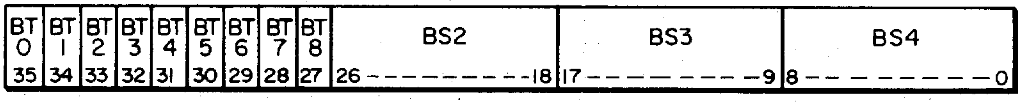
Figure 16B:
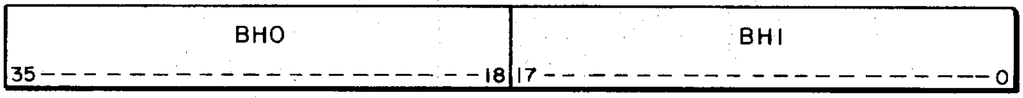
Figure 16C:
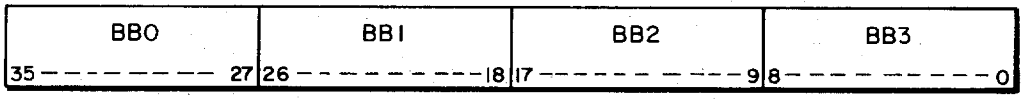

FIGS. 16*a*, 16*b*, and 16*c* illustrate the three R-Registers (R3, R4, and R5) designated as SR1, SR2, and SR3, respectively, and are utilized for the purposes of interrupt control. Due to the complexity of the conversion operations, the conversion from single-precision or double-precision floating-point format to a string of coded byte characters, and the conversion of the floating-point numbers represented in a byte string to binary single-precision or double-precision floating-point numbers are not subject to being interrupted.

When dealing with 9-bit bytes, the ASCII format shall be accepted, and only ASCII is generated when used for operations involving signed numeric-byte strings. An ASCII byte is the eight lowest-order bits in a quarter word. The byte is divided into 4-bit zone and 4-bit digit representation. The byte string illustrated in FIG. 17 illustrates an ASCII byte string having 5 decimal digits shown, but being of an indeterminate length. For an ASCII byte, the D portion represents a 4-bit binary coded decimal digit and the Z portion is a 4-bit zone designation. The L portion must be zero. The combination results in a 9-bit byte and can be handled as a quarter word. For this configuration, the sign of the byte string S is located in the lowest ordered digit position in the 4-bit portion that is normally the zone portion. For a negative string, S = 1011, with the input test being for negative only. For other than negative strings, S is equal 1010.

Field data codes will be used for all fixed-word operations on signed byte strings. The field data byte string format is similar to ASCII, with the exception of the absence of the L bits and the Z zone is only 2-bits in length and equals 11. For negative byte strings using field data codes, the sign S, if negative, is equal to $10_2$, while if the string is positive, S is equal $11_2$.

The sign convention described above for ASCII and field data codes will be used for all operations involving signed numeric byte strings. The conversion functions of the subject invention being the conversion of coded byte strings to single-precision or double-precision floating-point formats, or single-precision or double-precision floating-point conversions to coded byte strings. For these conversion functions, a separate non-included sign convention is used. Table VII, set forth below, illustrates the included and separate sign conventions for the types of coded bytes.

TABLE VII

BYTE STRING SIGN CODES

| Character Code Formats | | Sign Conventions + | Sign Conventions − |
|---|---|---|---|
| 1. ASCII | Included | 1010 | 1011 |
| 2. Field data | Included | 11 | 10 |
| 3. ASCII | Separate | 00101011 | 00101101 |
| 4. Field data | Separate | 100010 | 100001 |

Table VIII defines the field data to ASCII code conversion.

TABLE VIII

FIELD DATA TO ASCII CODE CONVERSION

| FIELD DATA CODE (OCTAL) | 80-COLUMN CARD CODE | HIGH SPEED PRINTER SYMBOL | ASCII OCTAL CODE | ASCII SYMBOL |
|---|---|---|---|---|
| 00 | 7–8 | @ | 100 | @ |
| 01 | 12–5–8 | [ | 133 | [ |
| 02 | 11–5–8 | ] | 135 | ] |
| 03 | 12–7–8 | # | 43 | # |
| 04 | 11–7–8 | Δ | 136 | ∧ |
| 05 | (blank) | (space) | 40 | (space) |
| 06 | 12–1 | A | 101 | A |
| 07 | 12–2 | B | 102 | B |
| 10 | 12–3 | C | 103 | C |
| 11 | 12–4 | D | 104 | D |
| 12 | 12–5 | E | 105 | E |
| 13 | 12–6 | F | 106 | F |
| 14 | 12–7 | G | 107 | G |
| 15 | 12–8 | H | 110 | H |
| 16 | 12–9 | I | 111 | I |
| 17 | 11–1 | J | 112 | J |
| 20 | 11–2 | K | 113 | K |
| 21 | 11–3 | L | 114 | L |
| 22 | 11–4 | M | 115 | M |
| 23 | 11–5 | N | 116 | N |
| 24 | 11–6 | O | 117 | O |
| 25 | 11–7 | P | 120 | P |
| 26 | 11–8 | Q | 121 | Q |
| 27 | 11–9 | R | 122 | R |
| 30 | 0–2 | S | 123 | S |
| 31 | 0–3 | T | 124 | T |
| 32 | 0–4 | U | 125 | U |
| 33 | 0–5 | V | 126 | V |
| 34 | 0–6 | W | 127 | W |
| 35 | 0–7 | X | 130 | X |
| 36 | 0–8 | Y | 131 | Y |
| 37 | 0–9 | Z | 132 | Z |
| 40 | 12–4–8 | ) | 51 | ) |
| 41 | 11 | — | 55 | — |
| 42 | 12 | + | 53 | + |
| 43 | 12–6–8 | < | 74 | < |
| 44 | 3–8 | = | 75 | = |
| 45 | 6–8 | > | 76 | > |
| 46 | 2–8 | & | 46 | & |
| 47 | 11–3–8 | $ | 44 | $ |
| 50 | 11–4–8 | * | 52 | * |
| 51 | 0–4–8 | ( | 50 | ( |
| 52 | 0–5–8 | % | 45 | % |
| 53 | 5–8 | : | 72 | : |
| 54 | 12–0 | ? | 77 | ? |
| 55 | 11–0 | ! | 41 | ! |
| 56 | 0–3–8 | ,(comma) | 54 | ,(comma) |
| 57 | 0–6–8 | \ | 134 | \ |
| 60 | 0 | 0 | 60 | 0 |
| 61 | 1 | 1 | 61 | 1 |
| 62 | 2 | 2 | 62 | 2 |
| 63 | 3 | 3 | 63 | 3 |
| 64 | 4 | 4 | 64 | 4 |
| 65 | 5 | 5 | 65 | 5 |
| 66 | 6 | 6 | 66 | 6 |
| 67 | 7 | 7 | 67 | 7 |
| 70 | 8 | 8 | 70 | 8 |
| 71 | 9 | 9 | 71 | 9 |
| 72 | 4–8 | ' (apostrophe) | 47 | ' (apostrophe) |
| 73 | 11–6–8 | ; | 73 | ; |
| 74 | 0–1 | / | 57 | / |
| 75 | 12–3–8 | .(period) | 56 | .(period) |
| 76 | 0–7–8 | □ | 42 | " |
| 77 | 0–2–8 | ≠ or stop | 137 | — |

Table IX illustrates the ASCII to field data code conversion.

TABLE IX

ASCII TO FIELD DATA CODE CONVERSION

| ASCII | | SYSTEM CONSOLE | | | FIELD DATA | |
|---|---|---|---|---|---|---|
| OCTAL CODE | SYMBOL | KEYBOARD SYMBOL | CRT SYMBOL | INCREMENTAL PRINTER SYMBOL | OCTAL CODE | SYMBOL |
| 40 | SP | (space bar) | (space) | (space) | 05 | (space) |
| 41 | ! | ← | → | ! | 55 | ! |
| 42 | " | ← | → | " | 76 | □ |
| 43 | # | ← | → | # | 03 | # |
| 44 | $ | ← | → | $ | 47 | $ |
| 45 | % | ← | → | % | 52 | % |
| 46 | & | ← | → | & | 46 | & |
| 47 | ' | ← | → | ' | 72 | ' |
| 50 | ( | ← | → | ( | 51 | ( |
| 51 | ) | ← | → | ) | 40 | ) |
| 52 | * | ← | → | * | 50 | * |
| 53 | + | ← | → | + | 42 | + |
| 54 | , | ← | → | , | 56 | , |
| 55 | — | ← | → | — | 41 | — |
| 56 | . | ← | → | . | 75 | . |
| 57 | / | ← | → | / | 74 | / |
| 60 | 0 | ← | → | 0 | 60 | 0 |
| 61 | 1 | ← | → | 1 | 61 | 1 |
| 62 | 2 | ← | → | 2 | 62 | 2 |
| 63 | 3 | ← | → | 3 | 63 | 3 |
| 64 | 4 | ← | → | 4 | 64 | 4 |
| 65 | 5 | ← | → | 5 | 65 | 5 |
| 66 | 6 | ← | → | 6 | 66 | 6 |
| 67 | 7 | ← | → | 7 | 67 | 7 |
| 70 | 8 | ← | → | 8 | 70 | 8 |
| 71 | 9 | ← | → | 9 | 71 | 9 |
| 72 | : | ← | → | : | 53 | : |
| 73 | ; | ← | → | ; | 73 | ; |
| 74 | < | ← | → | < | 43 | < |
| 75 | = | ← | → | = | 44 | = |
| 76 | > | ← | → | > | 45 | > |
| 77 | ? | ← | → | ? | 54 | ? |
| 100 | @ | ← | → | @ | 00 | @ |
| 101 | A | ← | → | A | 06 | A |
| 102 | B | ← | → | B | 07 | B |
| 103 | C | ← | → | C | 10 | C |
| 104 | D | ← | → | D | 11 | D |
| 105 | E | ← | → | E | 12 | E |
| 106 | F | ← | → | F | 13 | F |
| 107 | G | ← | → | G | 14 | G |
| 110 | H | ← | → | H | 15 | H |
| 111 | I | ← | → | I | 16 | I |
| 112 | J | ← | → | J | 17 | J |
| 113 | K | ← | → | K | 20 | K |
| 114 | L | ← | → | L | 21 | L |
| 115 | M | ← | → | M | 22 | M |
| 116 | N | ← | → | N | 23 | N |
| 117 | O | ← | → | O | 24 | O |
| 120 | P | ← | → | P | 25 | P |
| 121 | Q | ← | → | Q | 26 | Q |
| 122 | R | ← | → | R | 27 | R |
| 123 | S | ← | → | S | 30 | S |
| 124 | T | ← | → | T | 31 | T |
| 125 | U | ← | → | U | 32 | U |
| 126 | V | ← | → | V | 33 | V |
| 127 | W | ← | → | W | 34 | W |
| 130 | X | ← | → | X | 35 | X |
| 131 | Y | ← | → | Y | 36 | Y |
| 132 | Z | ← | → | Z | 37 | Z |
| 133 | [ | ← | → | [ | 01 | [ |
| 134 | \ | ← | → | \ | 57 | \ |
| 135 | ] | ← | → | ] | 60 | ] |
| 136 | ∧ | ← | → | ∧ | 04 | |
| 137 | — | ← | → | ⊤ | 77 | ≠ |
| 140 | \ | ← | → | @ | 00 | @ |
| 141 through 172 | a* through z* | A** through Z** | a* through z* | A** through Z** | 06 through 37 | A** through Z** |
| 173 | { | ← | → | [ | 54 | ? |
| 174 | \| | ← | → | \ | 57 | \ |
| 175 | } | ← | → | ] | 55 | ! |
| 176 | ~ | ← | → | ∧ | 04 | Δ |
| 177 | DEL | (no key) | /// | — | 77 | ≠ |

*Lower case alphabet

**Upper case alphabet

NOTES TO TABLE IX (1) Codes, which also represent collating sequence, are given in octal.

(2) ASCII codes from $00_8$ to $37_8$ are for communication, format, and separator control characters. These are not converted into Field data.

(3) The ASCII symbols represented by codes $40_8$ to $137_8$ are converted into the identical Field data symbols, except that the quotation marks symbol ($42_8$) is converted into a lozenge $76_8$ the circumflex ($136_8$) is converted into a delta ($04_8$) and the underscore ($137_8$) is converted into a not equal sign ($77_8$).

(4) There are no remaining unique Field data symbols into which to convert the balance of the ASCII symbols, represented by codes $140_8$ to $177_8$, so most of these codes are "folded" over codes $100_8$ to $137_8$ (by clearing bit 5, which amounts to subtracting $40_8$). This means that ASCII codes $101_8$ (A) and $141_8$ (a), for example, are both translated as if they were code $101_8$ (converted to Field data $06_8$ for A). Two exceptions to this general rule are the ASCII opening brace ($173_8$) and closing brace ($175_8$) which are converted to Field data question mark ($54_8$) and exclamation point ($55_8$), respectively, to satisfy overpunch sign considerations.

(5) THE SPECIAL CHARACTERS IN ASCII

| | |
|---|---|
| SP | designates space, which is normally nonprinting. |
| DEL | designates delete, and has a code of all 1 bits. This code obliterates any unwanted previous character — even on paper tape or other nonerasable medium. |

(6) Definitions of the 32 ASCII control characters, codes $00_8$ to $37_8$:

| | | | |
|---|---|---|---|
| 00 | NUL | Null-all zeros character which may serve as time fill | |
| 01 | SOH | Start of heading | |
| 02 | STX | Start of text | |
| 03 | ETX | End of text | |
| 04 | EOT | End of transmission | |
| 05 | ENQ | Enquire — "Who Are You?" | |
| 06 | ACK | Acknowledge — "Yes" | |
| 07 | BEL | Bell — human attention required | |
| 10 | BS | Backspace | format effectors for printing or punching |
| 11 | HT | Horizontal tabulation | |
| 12 | LF | Line feed | |
| 13 | VT | Vertical tabulation | |
| 14 | FF | Form feed | |
| 15 | CR | Carriage return | |
| 16 | SO | Shift out — nonstandard code follows | |
| 17 | SI | Shift in — return to standard code | |
| 20 | SLE | Data link escape — change limited data communication controls | |
| 21 | DC1 | Device controls for turning on or off ancillary devices | |
| 22 | DC2 | | |
| 23 | DC3 | | |
| 24 | DC4 | | |
| 25 | NAK | Negative acknowledge — "No" | |
| 26 | SYN | Synchronous idle — from which to achieve synchronism | |
| 27 | ETB | End of transmission block — relates to physical communication blocks | |
| 30 | CAN | Cancel previous data | |
| 31 | EM | End of medium — end of used, or wanted portion of information | |
| 32 | SUB | Substitute character for one in error | |
| 33 | ESC | Escape — for code extension — change some character interpretations | |
| 34 | FS | File separator | These information separators are ordered in descending hierarchy. They are followed by ASCII $40_8$ (space), which can also be thought of as a word separator. |
| 35 | GS | Group separator | |
| 36 | RS | Record separator | |
| 37 | US | Unit separator | |

FIGS. **18*a*, 18*b*, 18*c*, and 18*d*, when arranged as shown in FIG. 18, comprise the block diagram of the arithmetic unit 62 of the CAU illustrated in FIG. 3**. Generally speaking, the arithmetic hardware provides the capability of performing arithmetic and logical operations. The hardware is arranged to handle fixed- and floating-point numbers in both single-precision (36-bits) and double-precision (72-bits) formats. The capability of performing arithmetic test on operands together with shift capabilities are also present.

During the execution of an arithmetic instruction, storage registers within the Arithmetic Section itself shall be used for actual computation. As has been specified above, the Arithmetic Section is capable of performing addition or subtraction of corresponding full-words, half-words, or third-words, simultaneously.

The adder is a one's complement subtractive adder for 36-bit or 72-bit operations. The 16 arithmetic accumulators can be addressed directly by the programmer, and are available for storing operands and results of arithmetic computations. These arithmetic accumulators should not be confused with the non-addressable transient registers contained within the arithmetic section itself and used during actual computation.

The primary inputs to the Arithmetic Section are provided through the U Buffer Selectors 80, the U + 1 Buffer Selectors 82, the A Buffer Selectors 84, and the A + 1 Buffer Selectors 86. When selected, these selectors direct input data to the U Register 88, the U + 1 Register 90, the A Register 92, and the A + 1 Register 94, respectively. The A Buffer Selector 84 also provides input to the U + 1 Register 90 and the A + 1 Register 94, and the A + 1 Buffer Selector 86 provides an input to the U + 1 Register 90. The U Register 88 provides input paths to the Decimal Adder 96, and the U Selector 98. The U + 1 Register 90 provides an input path to the Decimal Adder 96 and to the U + 1 Selector 100. The output from the Decimal Adder 96 is directed to the U Selector 98. The U Register 88 also provides input signals to the U + 1 Selector 100, the A Selector 102, and the A + 1 Selector 104. The U + 1 Register 90 provides input paths to the A Selector 102 and A + 1 Selector 104 in addition to the U + 1 Selectors 100.

The A Register 92 provides an input path to the A Selector 102, to the U Selector 98, the T1 Register 106, the C3 Selector 108, and C1 Register 110. The A + 1 Register 94 provides input signals to the BC Selector 112, to the A + 1 Selector 104, to the U + 1 Selector 100, to the T2 Register 114, and to the C4 Selector 116.

The output from the BC Selector 112 is directed to the U Register 88. In addition to the other data paths previously mentioned, the A Register 92 also provides information to the DBC Selector 118.

The U Selector 98 provides input signals to the T3 Selector 120, the Parity Checking Circuit 122, and to Adder 1 124, as well as to the X0 Selector 126 and the X1 Selector 128. The U + 1 Selector 100 provides input signals to T4 Register 130, to T3 Selector 120, to Adder 2 132, as well as to the X0 Selector 126 and the X1 Selector 128. The A Selector 102 provides output signals to the T1 Register 106, to the Shift Matrix 134, and to the Q0 Selector Register 136. The A + 1 Selector 104 provides signals to the T2 Register 114, to the Shift Matrix 134, and to the QO Selector Register 136.

The T1 Register 106 provides signals to Adder 1 124 to the Digit Correct Circuitry 138, and to H1 Register 140. The T2 Register 114 provides signals to Adder 2 132, to the Digit Correct Circuitry 138, to H2 Register 142, and back as an input to the A + 1 Register 94. In addition to the other data paths described, the T1 Register 106 also provides a data path back as an input to the A Register 92.

The DBC Selector 118 provides input signals to the T3 Register 144, and the output of the Digit Correct Circuitry 138 is directed to the T3 Register 144 and the T4 Register 130. The output from the T3 Selector 120 is directed to the T3 Register 144 and to the T4 Register 130.

The output from Adder 1 124 is directed to the T3 Register 144, and the output from Adder 2 132 is directed to the T4 Register 130. Adder 1 124 and Adder 2 132 also provides signals to the Equality Testing Circuitry 146.

The output signals from the T3 Register 144 and the T4 Register 130 are directed to the Zero Test Circuitry 148, and are directed to the Normalizer 150. The output signals from the T3 Register 144 are also directed to the H1 Register 140 to the A Selector 102 and to the T1 Register 106. The output signals from the T4 Register 130 are also directed to the H2 Register 142, to the A + 1 Selector 104, and to the T2 Register 114.

The C3 Selector 108 provides signals to the C2 Register 152, and is adapted to receive the consant + or − 1600. The output from the C2 Register is directed to the C Adder 154, and to the E Register 156. The C Adder 154 is also provided with input signals from the C1 Register 110, with the C1 Register 110 providing its input signals to the C2 Register 152 also. The output signal from Normalizer 150 is provided as an input to the C4 Selector 116, and to the N Selector 158, and the signal line directed to the C4 Selector 116 is also directed to the N Selector 158. Constant Generator 1 160 provides the remaining input to the N Selector 158. The C4 Selector 116 and Constant Generator 2 162 provide input signals to the C1 Register 110.

The C Adder 154 provides signals to the C0 Register 164, to the H Selector 166. The N Translater 158 also provides signals to the C0 Register 164. The output signals from the C0 Register 164 are directed back to the C3 Selector 108 and are provided as signals to the Shift Count Translater 168. The output from the Shift Count Translater 168 and the output from the H Translater 166 are directed to the Shift Matrix 134 (SM), with the output signals from the Shift Matrix being directed to the T1 Register 106 and to the T2 Register 114. In addition to providing signals to the Shift Matrix, the H Translater 166 provides signals to the T3 Selector 120.

The E Register 156 receives input signals from the Decimal Point Counter 170, and the BB1 designator in the Control Section 172, and provides output signals to the C2 Register 152.

The X0 Selector 126 provides one set of input signals to the CSA Circuitry 178, and the X1 Selector 128 provides one set of input signals to the CSA Circuitry 180. CSA Circuitry 180 also receives input signals from the S1 Register 182 and the V1 Register 184. Output signals from CSA Circuitry 180 are directed to the S0 Register 186 and the V0 Register 188. In addition to the signals received from the X0 Selector 126, the CSA Circuitry 178 receives input signals from the SO Register 186 and the V0 Register 188. Output signals from CSA Circuitry 178 are directed to the S1 Register 182 and the V1 Register 184.

Output signals from the S0 Register are directed to the U Selector Circuitry 98, the U + 1 Selector Circuitry 100, and to the U Register 88. Output signals from the V0 Register 188 are directed to the A Register 92, and the A + 1 Register 94.

The 2-bit Adder 190 receives input signals from the S1 Register 182, the V1 Register 184, and the Carry Save Circuit 192. The 2-bit Adder 194 receives input signals from the S0 Register 186, the V0 Register 188, and the Carry Save Circuit 196.

Output signals from 2-bit adder 190 are directed to the Carry Save Circuitry 196, and to the Sum Save Circuitry 198. Output signals from the 2-bit Adder 194 are directed to Carry Save Circuitry 192 and to the Q0 Select Register 136. Output signals from the Sum Save Circuitry 198 are also directed to the Q0 Select Register 136. Output signals from the Q0 Select Register 136 are directed to the T1 Register 106 and the T2 Register 114, as well as to the QO Sense Circuitry 200 and to the Q1 Register 202. Output signals from the Q1 Register 202 are directed to the Q1 Sense Circuitry 204 and to the Q0 Select Register 136.

Output signals from the Fault Detection Circuitry 206 and the Skip Detection Circuitry 208 are directed back to control. Similarly, output signals from the H1 Register 140 are directed to control as input signals to the U Buffer Selector 80, the U + 1 Buffer Selector 82, the A Buffer Selector 84, the A + 1 Buffer Selector 86, and to the X5, X6 Circuitry 210, as well as to the General Register Stack 60. In a similar manner, output signals from the H2 Register 142 are directed to the General Register Stack 60 and back to control as input signals to the U Buffer Selector 80, the U + 1 Buffer Selector 82, the A Buffer Selector 84, the A + 1 Buffer Selector 86, and Circuitry 210. The Look-Up Table (LUT) 212 provides for constant generation, and provides signals on Line 214 to Circuitry 210 in control. The output signals from Circuitry 210 are directed to the X5, X6, SLR Selector 216 for recirculation back into the arithmetic unit. A more detailed consideration of the Look-Up Table 212 will be set forth below.

The Byte Designator Buffer Selector 218 in the control section directs signals to the Character Detection Circuitry 220 in the arithmetic section.

The foregoing discussion has been basically with relation to data signal flow paths, and describes the circuitry that is provided for accomplishing the arithmetic operations as well as the format conversions of the subject invention when appropriately sequenced.

The control of the Arithmetic Section 62 is derived from the resident bits *f*, U, U + 1, A, A + 1, in the Buffer Selector Circuitry 222 in control in conjunction with the *f*, *j*, *a*, Tag Buffer Selector Circuitry 224 in control. The resident bit controls from Circuitry 222 are directed to the T0 Drivers 226 which in turn supply control signals to the Inter-Delay-Line Control Circuitry 228. The Inter-Delay-Line Control Circuirty 228 provides the basic control of the Arithmetic Delay Lines 230, and provides the basic timing control for the Arithmetic Section 62. The Branch Designators and Control 232, to be described in more detail below, provide signals to the Decode 1 Circuitry 234, and basically provide the sequencing of the selected branch operations utilized to perform a designated operation within the Arithmetic Section. In addition to the signals received from the Branch Designators and Control 232, the Decode 1 Circuit 234 also receives signals from Control Circuitry 224. This same control signals from Control Circuitry 224 is provided to Decode 2 Register 236, with the output signals from Decode 2 Register 236 and the output signals from Branch Designators and Control Circuitry 232 being applied to Decode 2 Circuitry 238.

The K Counter 240 is utilized for retaining various count designations for the various steps in the conversion operations of this invention, and includes circuitry for modifying and testing the state of the counter.

As pointed out above, the Branch Designators and Control Circuitry 232 governs the sequencing of the various functions that are performed in the Arithmetic Section. FIG. 19A is a logic block diagram that illustrates the logical functioning of the Branch Designators and Control Circuitry 232. Each branch defines a series of logical operations performed in the Arithmetic Section, only one of which can be active at any given time. In order that the control circuitry within the Arithmetic Section can be made aware of which branch is active, there are provided a plurality of branch designator flip-flops. The branch designation flip-flops will be designated uniquely according to the branch that each controls.

At the Main Timing Start, a signal is directed to Branch Delay Line Timing circuitry 250, which sends a signal on Line 251 to the Branch Designator Control Logic circuitry 252. The Branch Designator Control Logic circuitry is illustrated in detail in FIG. 19B, and functions primarily to respond to various control conditions for determining which of a plurality of branch designator flip-flops will be set. The Conversion Instruction Selection circuitry 253 provides signals on Line 254 indicative of whether the conversion operation being performed is of the floating-point to byte type conversion (33,16 or 33,17) or whether the conversion is byte to floating-point (33,14 and 33,15).

There are a plurality of Branch Designator Flip-Flops in Rank I, as indicated by Block 255, and adapted to receive signals on Cable 256 and the Set/Clear Line 257 from the Branch Designator Control Logic 252. For this embodiment, Branch Designator Flip-Flops are bistable flip-flops of a double-gated variety that are available commercially, and for this embodiment there are twenty in number. The detail arrangement of Rank I of the Branch Designator Flip-Flops is illustrated in FIG. 19C. As will be described in more detail below, only one of the Rank I Branch Designator Flip-Flops will be set, and all others will be cleared.

The output signals from Rank I of the Branch Designator Flip-Flops 255 is provided on Cable 258 as input signals to the Branch Designator Flip-Flops (Rank II) 259. The Branch Designator Control Logic 252 provides set signals on Line 260 for transferring the set state of the appropriate Branch Designator Flip-Flip in Rank I to the corresponding Branch Designator Flip-Flop in Rank II. A clear signal is provided on Line 261 for clearing the Branch Designator Flip-Flops in Rank II, for an initialized condition. The detail arrangement of Branch Designator Flip-Flops for Rank II is illustrated in detail in FIG. 19D, and will be considered more fully below.

The output circuits of the Branch Designator Flip-Flops for Rank II are coupled through Cable 263 to the various branch control circuits, and activate the Selected Branch Controls and Register Gating 264. As mentioned, one and only one Rank II Branch Designator Flip-Flop will be set at any given time, thereby uniquely selecting the appropriate branch for operation. Each branch has a specific defined function, as will be described in more detail below. The state of the Rank II Branch Designator Flip-Flops 259 is provided as an input condition over Cable 265 to the Branch Designator Flip-Flops (Rank I) 255, thereby acting in conjunction with the Branch Designator Control Logic 252 to control the next Rank I Branch Designator Flip-Flop that will be set.

During the operation of the selected branch, signals will be provided on Cable 266 to the Control Flip-Flops 267 depending upon tested conditions that are found to exist. At the completion of a selected branch operation, timing is again initiated for processing the next branch operation, or terminating the conversion instruction.

The Control Flip-Flops 267 will be described in more detail below, and provide control signals on Cable 268 to the Branch Designator Control Logic 252 for conditioning the selection of the next Branch Designator Flip-Flop in Rank I that will be set.

A detailed consideration of the logic of each of the branches for each of the conversion processes will be discussed below, as will the various register transfers and arithmetic and data manipulation operations. It should be understood, and in the course of the detailed discussion of each of the branches it will become apparent, that the Arithmetic Section includes various sequences for performing various arithmetic operations, for example, double-precision multiply and divide, binary add, subtract, multiply, and divide, magnitude transfers, double-precision to single-precision format compaction, and various other logical and arithmetic instruction sequences. These existing instructions will be initiated and performed, as required, during the various branch operations, thereby utilizing existing hardware and instruction sequences that are available in the data processing system. These existing instruction sequences can be selected from those known in the art, and will not be described in detail.

FIGS. 19B*a*, 19B*b*, and 19B*c*, when arranged as shown in FIG. 19B, illustrate the detail logic diagram of the Branch Designator Control Logic 252 shown in FIG. 19A. The logic diagram elements illustrate circuits that are available commercially, and have functions individually that are well known. For example, OR Circuit C4655 has a single input and a single output. The input signal indicated by an open arrowhead and the output line having a closed arrowhead indicates inversion through the circuit. With only a single input shown, the circuit operates as an inverter. OR Circuit C4656 has two input lines and a single output line, thereby indicating that a signal on either of the two input lines will result in an inverted signal on its output line. Circuit C4666 can be viewed as a two level gated inverter, having two AND input circuits driving an OR Circuit with inversion. Circuit C4669 illustrates a circuit requiring two input signals to be ANDed and inverted to provide an activating output signal.

The input conditions are labeled at the bottom of the logic diagram, and define the various conditions for driving the individual circuits for making the selection as to which of the Branch Designator Flip-Flops will be set. Since the logical combinations will be described in detail below, a detailed description of the logic diagram and its interconnection of circuits will not be made. An examination of the logic circuit diagram clearly indicates the conbinations of control conditions that guide its operations, and the specific operations are clear from the symbology presented.

The output conditions are shown at the top of the diagram, with each output line having a circuit destination identification listed.

FIGS. 19C*a* and 19C*b*, when arranged as shown in FIG. 19C, illustrate the detail logic circuitry of the Branch Designator Flip-Flops (Rank I) shown in FIG. 19A, and is comprised of twenty double-gated bistable flip-flops, of a type available commercially. Each of the double-gated flip-flops includes an alpha-numeric representation indicative of the branch that it controls. These representations are F9021 through F9040, representing Branches 1 through 20, respectively. Each of the double-gated flip-flops includes a D input terminal for receiving data signals, a E input terminal for receiving an enable signal, it being required that there be both a data signal and an enable signal in order to set the flip-flop. Each flip-flop also has a C input terminal for receiving signals that will clear the flip-flop. The OR Inverter Circuits identified as F9406 through F9427 and F9429 are utilized for achieving the appropriate signal level, and for amplification for driving the Branch Designator Flip-Flops.

The input signal conditions are labeled on the bottom of the logic diagram, together with the source of the signals, and the destinations of the output signals are labeled at the top of the logic diagram.

FIGS. 19D*a* and 19D*b*, when arranged as shown in FIG. 19D, illustrate the Branch Designator Flip-Flops (Rank II) described in FIG. 19A. There is illustrated 20 double-gated bistable flip-flops identified by alpha-numeric representations of F9001 through F9020. In this designation system, it can be seen that the lowest two numeric digits represents the identification of the branch associated with the flip-flop.

The double-gating required to set the respective flip-flops is as described above. Again, the source of the input signals are identified at the bottom of the logic diagram, and the destination of the output signals is shown at the top of the diagram. It can be seen at the output designations, that the various Branch Designator Flip-Flops are directed to various points in the control logic, but will not be described in detail, except that the register transfers and functions of each of the branches will be described below.

It is of course clear, that the number of Branch Designator Flip-Flops utilized is related to the particular embodiment, and more or less Branch Designator Flip-Flops would be utilized in the event that more or less branch sequences would be required.

FIG. 20 illustrates in block diagram form the arrangement of the Look-Up Table (LUT), together with associated selection circuitry. While the Look-Up Table is referred to in that manner, the actual physical construction is that of a Constant Generator 212 wherein the activation of any one of a plurality of selection lines will cause the selection and activation of predetermined elements in the Constant Generator 212 to issue signals on associated ones of the Output Lines 214 in a manner such that the pattern of output signals will define the particular constant operand selected. For this embodiment, Table X illustrates the constant selection available in Constant Generator 212, together with the octal representation of the respective constants.

The Constant Generator 212, for the preferred embodiment, is a switching network having a matrix selection of a type available in the prior art. Alternatively, the Constant Generator could make use of storage devices together with an addressing arrangement, however, the selection and read-out of such a storage system would require a greater access time than does the switching selector matrix.

The arrangement is such diagrammatically that if it is desired to generate Log $10^2$, a signal would be provided on the Log $10^2$ Line 330, to the Log $10^2$ 332, which would result in a signal on Line 334 to cause the Constant Generator 212 to provide a 72-bit signal on Cable 214 having the binary signal arrangement equivalent of that of the octal representation in Table X.

TABLE X

| CONSTANT | 72-BIT LOOK-UP TABLE OCTAL REPRESENTATION |
|---|---|
| $LOG_{10}{}^2$ | 232 101 152 522 000 000 000 000 |
| $10^{-1}$ | 177 563 146 314 631 463 146 315 |
| $10^0$ | 200 140 000 000 000 000 000 000 |
| $10^1$ | 200 450 000 000 000 000 000 000 |
| $10^2$ | 200 762 000 000 000 000 000 000 |
| $10^3$ | 201 276 400 000 000 000 000 000 |
| $10^4$ | 201 647 040 000 000 000 000 000 |
| $10^5$ | 202 160 650 000 000 000 000 000 |
| $10^6$ | 202 475 022 000 000 000 000 000 |
| $10^7$ | 203 046 113 200 000 000 000 000 |
| $10^8$ | 203 357 536 040 000 000 000 000 |
| $10^9$ | 203 673 465 450 000 000 000 000 |
| $10^{10}$ | 204 245 201 371 000 000 000 000 |
| $10^{20}$ | 210 353 274 353 613 261 420 000 |
| $10^{30}$ | 214 462 371 311 632 021 472 356 |
| $10^{40}$ | 220 572 614 517 434 153 451 140 |
| $10^{50}$ | 224 742 154 166 127 714 446 321 |
| $10^{60}$ | 231 047 647 447 114 136 321 044 |
| $10^{70}$ | 235 156 272 726 555 670 717 103 |
| $10^{80}$ | 241 265 763 572 437 037 327 600 |
| $10^{90}$ | 245 376 654 170 222 453 161 646 |
| $10^{100}$ | 251 544 446 551 131 230 337 166 |
| $10^{200}$ | 323 151 634 306 575 354 226 427 |
| $10^{300}$ | 374 557 620 744 200 016 546 723 |

In a similar manner, to select the constant for the value $10^{-1}$, a signal would be applied on Selection Line 336 to the $10^{-1}$ Enable Circuit 338 for causing selection of Line 340. To generate the constant for $10^0$, a signal is applied on Line 342 to the $10^0$ Enable 344 for selecting Line 346. To select $10^1$, a signal is applied on Line 348 to the $10^1$ Enable 350 for providing a selection signal on Line 352. It is of course understood, that only one of the Enable Lines 334, 340, 346, or 352 will be enabled at any given time, and that the disable signals will be applied to the Control Lines 354, 356, 358, and 360.

The generation of the constants for $10^1$ through $10^9$ are controlled by the D1 Enable Circuit 362, in conjunction with the 4-bit constant derived from the D1

Storage 364. The activation of the D1 Enable 362 by a signal on Line 366 advises AND Circuits 368 that a power of 10 is to be generated. The value of the four binary digits stored in D1 Storage 364 will select the appropriate line to Constant Generator 212 for selecting the designated power of 10. In a similar manner, if a power of 10 in the range of 10 through 90 is selected, a signal will be applied to the D2 Enable 370 on D2 Line 372, thereby causing a signal to be applied to AND Circuits 374. The appropriate power of 10 will then be selected by the four binary digits stored in the D2 Storage 376, with the appropriate line to the Constant Generator 212 thereby being selected.

Finally, for the constants $10^{100}$, $10^{200}$, and $10^{300}$, the D3 Enable 376 receives an input signal on the D3 Line 378 for enabling the AND Circuits 380. The binary value stored in the D3 Storage 382 will then determine the selection of the appropriate selection line from AND Circuits 380 to be applied to the constant generator for selecting the designated 100's power 0f 10.

In the discussion that will follow relative to the specific arithmetic operations and control functions that are performed in the arithmetic unit, there will be reference to a plurality of flip-flop circuits that are utilized to store detected conditions relative to the conversion processes, as they occur. These flip-flop circuits are of a type available commercially and are bistable in nature providing for a set input signal on the S input terminal for producing the set output on the S output terminal. Similarly, a clear input signal is required on the C input terminal to cause the flip-flop to be cleared. As is well known in the conventional symbolic representation, the state of the flip-flop when cleared, can be alternatively referred to as "clear" or "not set" or "$\overline{\text{set}}$."- The characteristic designation for the state of the flip-flop when it is in the set condition, will alternatively be "set", or "not clear", or "$\overline{\text{clear}}$."

While other flip-flop or control circuits may be referred to in the following discussions, the primary control flip-flops utilized in the arithmetic unit for performing the conversion processes of the subject invention will be briefly described. A more specific description of each of these control flip-flops will be made in the subsequent descriptive material with particular reference to the particular control functions under consideration.

FIG. 20*a* illustrates the relationship by which a byte character is sampled and identified. A Byte Character 386 is applied in a bit parallel manner to the Character Detectors 387, where the Character Detectors are comprised of gating paths that provide a unique output signal depending upon the bit arrangement of the byte character applied. Gating arrangements of this type are well known in the art and need not be described in detail. When the Byte Character 386 is applied, it is necessary that an enable signal be provided on Line 388 in order to cause the Character Detectors 387 to pass the signal to the output portion. In the arrangement illustrated, there are six character types that are capable of being identified, and the identification will be stored as the set state of one of the six flip-flops. These flip-flops are the Digit Flip-Flop 389, the Blank Flip-Flop 390, the + Flip-Flop 391, the − Flip-Flop 392, the Decimal Point Flip-Flop 393, or the D or E Flip-Flop 394. The provision is made to clear all of the flip-flops by applying a clear signal on Line 395, or to clear the individual flip-flops by the receipt of clear signals to their respective C input terminals from the Character Detectors 387. The arrangement of the setting and clearing pulses being applied to the various flip-flops is similar to that described for the branch sequence control described in FIG. 19A. If the Character Detectors 387 determine that the byte character applied is an acceptable digit, a signal will be issued on the Set Line 389S to set the Digit Flip-Flop 389. Simultaneously, there will be clear signals issued on Lines 390C. 391C, 392C, 393C and 394C to clear the respective flip-flops. This results in a unique identification of the byte character applied. Similarly, if the byte character is detected to be a blank, a set signal will be applied on Line 390S to set Flip-Flop Blank Flip-Flop 390, and clear signals will be simultaneously applied on Clear Lines 389C, 391C, 392C, 393C, and 394C. If the byte character is detected to be a +, a set signal will be applied on Set Line 391S and clear signals will be applied to all other flip-flops. If the byte character is determined to be a −, a set signal will be applied on Set Line 392S and clear signals will be applied to all other flip-flops. If the byte character is determined to be a decimal point, a set signal will be applied on Line 393S and all other flip-flops will be cleared. Finally, if the byte is determined to be a D or E, a signal is applied on Set Line 394S and all other flip-flops are cleared.

The plurality of control flip-flops is illustrated with the specifically identified control condition in FIGS. 20*b* through FIG. 20*dd*. The specific control conditions will be described in more detail below in the detailed consideration of the arithmetic and control operations performed in the conversion steps.

The use of the various constants will be discussed in more detail below in the consideration of the actual conversion processes.

Turning now to a consideration of the specific format conversions of the subject invention, attention will first be directed to the conversion of floating-point numbers expressed in a binary floating-point format, to byte strings having a decimal fraction portion and an exponent portion, each of the two portions having a sign indication therewith. Basically, the conversion from single-precision floating-point format to the byte format and the double-precision floating-point format to byte format includes the same basic conversion tecniques. It is, however, necessary to take into account the difference in bias between single-precision and double-precision floating-point numbers, as well as the difference in the number of bits in the mantissa of the two floating-point formats. There is also the necessity of appropriately determining the number of digits for the decimal fraction and the decimal exponent in the two conversion operations.

The single-precision floating-point format to byte format conversion operation is selected by a function code *f* of 33, with a *j*-field of 16, and for convenience of reference will alternatively be referenced as the 33, 16 instruction. This 33, 16 instruction converts a single-precision floating-point number contained in the A-Register specified by the *a*-field of the 33, 16 instruction to a byte string to be stored starting at address E. The converted byte string will be referred to as the E string for convenience, and for the 33, 16 instruction will contain two numbers. The first number in the E string is a nine-byte decimal fraction that has its sign in the zone portion of the least significant byte. The second number in the E string resulting from the 33, 16 instruction execution, is a two-byte exponent with its sign in the least significant byte position.

The instruction for converting a double-precision floating-point number to a byte format string is selected by an instruction having an $f$-field of 33, and a $j$-field of 17. This instruction will alternatively be referred to as the double-precision floating-point to byte format instruction or the 33, 17 instruction. The function of the 33, 17 instruction is to convert a double-precision floating-point binary number contained in the A Register and A + 1 Register, as determined by the $a$-field of the 33, 17 instruction, and to store the converted byte string at an address E. The actual conversion process is similar to that of the 33, 16 instruction, except that the first number in the E string is an eighteen-byte decimal fraction rather than a nine-byte decimal fraction, and the second number is a three-byte exponent rather than a two-byte exponent.

In order to simplify the consideration of the actual conversion processes accomplished by the 33, 16 and 33, 17 conversion instructions, it will be assumed that the particular conversion instruction has been read from the storage section, has been translated, the floating-point operands have been secured from storage, and the conversion within the arithmetic unit 62 is about to commence.

The discussion of the actual conversion functions performed by the 33, 16 and 33, 17 instructions can be logically followed, the description of these conversion functions will be described in conjunction with block diagrams and control flow diagrams.

FIG. 21 is a logic flow diagram that illustrates the branch selection and sequencing for the performance of the floating-point format to byte format conversions of the 33, 16 and 33, 17 instructions. Each of the specific branch operations and the manner of making the branch selections will be described in more detail after a consideration of the general overall conversion process. Branch BR1, labeled 400, performs the initialization and setting up of the conversion processes. In BR2, the unbiased characteristic is multiplied times the Log $10^2$, as indicated in Block 402. Following the completion of BR2, a decision is made as to whether or not the exponent is zero. If not, there is a binary to decimal conversion and constant generation in BR3, as indicated by Block 404. A double-precision floating-point multiply is accomplished during BR9, as indicated by Block 406, after a decision has been made relative to the status of the exponent. The characteristic is tested and constants are generated during BR10, as indicated by Block 408. As a result of the test, there is a decision made whether to provide the double-precision floating point multiply of BR11, as indicated by Block 410, or to select constants in BR12 as indicated by Block 412. If the exponent is negative, a double-precision floating-point multiply is performed during BR14, as indicated by Block 414, but if the exponent is positive, there is a double-precision floating-point divide during BR13 as indicated by Block 416. During BR20, a constant for $10^{-1}$ is generated as indicated by Block 418. During BR18, the exponent is determined to be negative, as indicated by Block 420. A double-precision floating-point subtract is accomplished during BR4, as indicated by Block 422, with a decision being made based upon a test of whether or not the results are negative. During BR6, a double-precision floating-point multiply and test is accomplished as indicated by Block 424. During BR7 a double-precision floating-point subtract and test is performed as indicated by Block 426. Again a test is made, and under one condition BR19 is performed including a double-precision floating-point multiply as indicated by Block 428, or the decision is made to convert the mantissa and start the output of bytes during BR15 as indicated by Block 430. BR8 involves the testing of the exponent sign as indicated by Block 432, and continuing with the conversion process. The conversion of BR15 continues on the basis of one cycle per store operation as indicated by Block 434, and when completed, BR16 performs a characteristic magnitude selection, as indicated by Block 436. During BR17, the characteristic is converted as indicated by Block 438, and continued one cycle per store as indicated by Block 440 until the characteristic has been converted.

FIGS. 22$a$, 22$b$, and 22$c$, when arranged as shown in FIG. 22, illustrate the sequence of branch designator selections for accomplishing the single-precision or double-precision floating-point format conversions to the byte format as indicated for the instructions 33, 16 and 33, 17. These figures relate to the operation of the Branch Designators and Control Circuits 232, defined in the over-all block diagram, and as more particularly described in FIG. 19A. It should be understood, that the testing of the branch designators is actually accomplished in parallel, as indicated hereinbefore, but that for purposes of discussion of the sequence of the branch operations, the diagrams in FIGS. 22$a$, 22$b$, and 22$c$ illustrate the sequential occurrence of the various branch operations, and the testing of the branch designators is indicated as a sequential yes — no decision operation. The parallel testing of the branch designators does not lend itself to a clear diagrammatic representation on a parallel basis.

The symbol BR illustrates the reference back to testing of the branch designators, and upon completion of each of the branch operations, as will be described in more detail below, the simultaneous testing of the branch designators is accomplished. At the Start 442, BR1 is set 444, and BR1 is performed.

FIG. 23 is a diagrammatic representation of the calculations and control functions performed during BR1. At the outset, the $f$-field and $j$-field of the instruction is tested, to determine whether it is a single-precision floating-point conversion or a double-precision floating-point conversion. For 33, 16 instructions, the input is directed to the A Register, and for 33, 17 instructions, input is directed to the A and A + 1 Registers, as indicated by Block 446. A test is then made to determine if all resident bits are set, as indicated by Decision Element 448, and operation is held up until the resident bits are set. When all are set, the floating-point to byte conversion is commenced, as indicated by Block 450. For 33, 16 instructions, the value A is selected as the magnitude of the A Buffer, and for 33, 17 instructions, the value A is selected as the magnitude of A and A + 1 Buffers, as indicated by Block 452. The sign of the exponent is then tested by comparing bits A35 and A34, as indicated by Block 454, and if alike, the Negative Exponent Flip-Flop is set as indicated by Block 456. If bits A35 and A34 are different, the Negative Exponent Flip-Flop is cleared as indicated by Block 458. The sign of the mantissa is then tested by testing bit A35, as indicated by Block 460. If set, the Negative Mantissa Flip-Flop is set as indicated by Block 462, but if A35 is not set, the Negative Mantissa Flip-Flop is cleared as indicated by Block 464. The determination is then made as to whether or not this is a single-precision floating-point input operand as indicated by Block 466. If the operand is a single-precision floating-point operand, it is expanded to a double-precision format as indicated by Block 468. This expansion is accomplished in the manner described in U.S. Pat. No. 3,389,379, entitled "Floating Point System: Single and Double Precision Conversions" invented by Gerald J. Erickson and Thomas C. Tollefson, and assigned to the assignee of the present invention. Having thus converted the single-precision floating-point number to double-precision floating-point number the characteristic bias is removed by subtracting $2000_8$ from the floating-point characteristic, and identifying it for purposes of discussion as $C_{UB}$, as indicated in Block 470. A constant Y is then selected by generating the Log $10^2$ constant using the Look-Up Table 212, as indicated by Block 472. The initialization is now completed, and BR1 is terminated and a return is made to FIG. 22a. With BR1 having been set at Block 444, and now completed, the test of BR1, as indicated by Block 474 will result in BR2 being set as indicated by Block 476, and all other branch designators cleared. The operation then proceeds to perform BR2.

FIG. 24 is a block diagram illustrating the operations of BR2, and includes a 36-bit integer multiply of the constant Y selected in BR1, and the unbiased characteristic value $C_{UB}$. This result is identified as Z, and as indicated in Block 478. The integer portion of Z is selected and identified as $Z_{IP}$, as indicated by Block 480. BR2 is then completed, and control is returned to test the branch designators.

The test of BR2, as indicated by Block 482, will result in an indication that BR2 is set, and a test will be made of the value of $Z_{IP}$, as indicated by Block 484. If the integer portion is not zero, BR3 is set as indicated by Block 486, and all other branch designators are cleared. Control is then caused to execute the steps of BR3.

FIG. 25 illustrates the operations performed during BR3. This involves a binary-to-decimal conversion of the integer portion of the characteristic $Z_{IP}$ thereby forming a value D3, D2, D1, as indicated by Block 488. The Look-Up Table is then utilized to generate a constant for the number $10^{D3X100}$, as indicated by Block 490. The Look-Up Table is also utilized to generate a constant for the value $10^{D2}{}_{\times}{}^{10}$, as indicated by Block 492. BR3 is then completed, and control is returned to the branch testing logic and upon the sensing that BR3 is set, as indicated by Block 494 in FIG. 22*a*, an evaluation is made as to whether either D2 or D3 is equal to zero, as indicated by Block 496. If neither D2 nor D3 is zero, BR9 is set, as indicated by Block 498, and the BR9 operation is executed.

FIG. 26 illustrates the function performed during BR9, and includes the double-precision floating-point multiply of the constants generated by use of the Look-Up Table during BR3, and for purposes of reference the result is referred to as Q, as indicated in Block 500. The floating-point multiply, when completed, causes the BR9 to be terminated, and the branch designators to again be tested.

Returning to a consideration of the decision made at Decision Element 496 in FIG. 22*a*, if it is found that either D2 or D3 is equal to zero, BR9 is not performed, but rather the path is to set BR10 as indicated by Block 502 and proceed to perform BR10. If BR9 has been performed, a test of the branch designators will indicate at the Decision Element 504 that BR9 is set, and will similarly proceed at that point to set BR10 as indicated by Block 502.

FIG. 27 illustrates the functions performed during BR10, and again involves the testing of whether or not either D3 or D2 is equal to zero, as indicated by Block 506. If either are zero, a test is then made to determine if D3 is equal to zero, as indicated by Block 508. If D3 is not zero, the value $10^{D3}{}_{\times}{}^{100}$ is selected for the constant H as indicated by Block 510. If D3 is zero, the value $10^{D2}{}_{\times}{}^{10}$ is selected for the constant H, as indicated by Block 512. In the event that neither D3 nor D2 is zero, the value Q calculated during BR9 is selected as the constant H as indicated by Block 514. Having selected the constant H, the Look-Up Table is utilized to generate the constant for the value $10^{D1}$ as indicated by Block 516. Having thus completed BR10, control is returned to again test the branch designators.

The testing of the branch designators as indicated in FIG. 22*a*, will result in the test of BR10 indicating that it is set, as indicated by Block 518. Having completed BR10, a test is made to determine whether D2 and D3 both equal zero, or D1 equals zero, as indicated by Block 520. If neither of the conditions are met, BR11 is set as indicated by Block 522.

FIG. 28 illustrates the operation performed during BR11, wherein a double-precision floating-point multiply of the constant H selected during BR10 and the constant selected for $10^{D1}$ is performed, with the result referred to as R, as indicated by Block 524.

If either D2 and D3 equal zero or D1 equal zero, as indicated by Decision 520, BR11 is not performed, but rather the control proceeds to set BR12, as indicated by Block 526. If BR11 is performed, the testing of the branch designators will result in Element 528 indicating the BR11 is set, and control will then proceed to set BR12.

FIG. 29 illustrates the functions performed during BR12, and includes the determination of whether D1 does not equal zero and D2 and D3 equal zero, as indicated by Block 530. If this condition is met, the constant B is selected as the value of $10^{D1}$ as indicated by Block 532. If the condition is not met, the constant B is selected as the value R calculated during BR11, as indicated by Block 534.

When control is then returned to test the branch designators, BR12 will be found to be set, as indicated by Block 536, and a test will be made of the negative exponent flip-flop, as indicated by Block 538. If not set, BR13 is set, as indicated by Block 540, and control is passed to execute BR13.

FIG. 30 illustrates the operation performed during BR13, and includes the double-precision floating-point divide of the value A determined during BR1 by the value B calculated during BR12, with the result identified as D, as indicated by Block 542.

Returning to a consideration of the testing of the negative exponent flip-flop at Block 538 in FIG. 22*a*, if found to be set, will result in BR14 being set as indicated by Block 544.

FIG. 31 illustrates the operation performed during BR14, and includes the double-precision floating-point multiply of the value A calculated during BR1 and the value B selected during BR12, resulting in a value D as indicated by Block 546.

Returning to a consideration of the testing of the integer portion, as indicated by Block 484, if found to be zero, will result in the setting of BR18, as indicated by Block 548.

FIG. 32 illustrates the functions performed during BR18, and includes the selection of the value D as that determined for the value A during BR1, as indicated by Block 550. E is set equal to zero, as indicated by Block 552, and BR18 is terminated.

When the branch designators are again tested, whether BR13 is set, as indicated by Block 554, or whether BR14 is indicated as set, as indicated by Block 556, or whether BR18 is indicated as set, as indicated by Block 558, BR20 will be set as indicated by Block 560.

FIG. 33 illustrates the function performed during BR20, and includes the generation of the double-precision floating-point number indicative of $10^{-1}$ using the Look-Up Table, as indicated by Block 562.

Again returning to a testing of the branch designators, it will be indicated that BR20 is set, as indicated by Block 564 in FIG. 22*b*. This will result in BR4 being set, as indicated by Block 566.

FIG. 34 illustrates the functions performed during BR4, and includes the double-precision floating-point subtraction of the constant generated during BR20 from the value D selected either during BR13, BR14, or BR18, as described above. This operation is indicated at Block 568, with the result of the floating-point subtraction being designated as S. A test is then made of the result S, as indicated by Block 570, and if found to be greater than zero, the Look-Up Table is utilized to generate a double-precision floating-point number indicative of $10^0$, as indicated by Block 572. If S is equal or less than zero, the Look-Up Table is utilized to generate a double-precision floating-point number indicative of the value $10^1$, as indicated by Block 574. The Negative Exponent Flip-Flop is then tested, as indicated by Block 576, and if set, establishes a value E as equal to E + 1, as indicated by Block 578. If the Negative Exponent Flip-Flop is not set, the value E is determined to be the value E initially minus 1 as indicated by Block 580. Having completed BR4, control is again referred to testing of the branch designators.

If BR4 is determined to be set, as indicated by Block 582 in FIG. 22*b*, the value S calculated during BR4 is tested, as indicated by Block 584. If S is found to be greater than zero, BR7 is set as indicated by Block 586. If S is determined to be equal to or less than zero, BR6 is set as indicated by Block 588.

FIG. 35 illustrates the function performed by BR6, and includes the double-precision floating-point multiply of the value D, as determined during BR13, BR14, or BR18, times the constant value of $10^1$, with the result being designated $D_f$, as indicated by Block 590. The value of $D_f$ is tested for equality to zero, as indicated by Block 592, and if found to be zero E is set equal to zero, as indicated by Block 594.

For the condition where BR7 is selected, attention is directed to FIG. 36 which describes the operations performed during BR7. BR7 includes a double-precision floating-point subtraction of the constant value indicative of $10^0$, from the value D, determined during BR13, BR14, or BR18, resulting in a difference value T, as indicated by Block 596. The value of T is then examined, as indicated by Block 598, and if found to be less than zero BR7 is terminated. If the value of T is not less than zero, the Look-Up Table is utilized to generate the double-precision floating-point number indicative of the constant $10^{-1}$, as indicated by Block 600.

Returning to a consideration of FIG. 22*b*, if a testing of the branch designators indicates that BR6 is set, as indicated by Block 602, the value $D_f$ will be tested for equality to zero, as indicated by Block 604. If equal to zero, BR15 will be set, as indicated by Block 606, but if not equal to zero, BR20 will be set, as indicated by Block 608. If BR20 is selected, it will again be executed as described above, and will cause the decision indicated by the testing of BR20 at Block 564 to again be made. This results in a looping of the system operation.

FIG. 37 illustrates the operations performed during BR15. Initially a test is made of the value of the characteristic, to determine whether it exceeds the value $2000_8$, as indicated by Block 610. If the characteristic exceeds $2000_8$, the value $2110_8$ is subtracted therefrom and set as the value J, as indicated by Block 612. If the characteristic is equal to or less than $2000_8$, the value $2000_8$ is subtracted therefrom and established as the constant J, as indicated by Block 614. A 72-bit circular shift of the mantissa by minus J places is performed as indicated by Block 616. Having positioned the mantissa for conversion, a test is made to determine whether it is a single-precision or double-precision conversion, as indicated by Block 618. If a single-precision floating-point conversion, the count K is set to control nine cycles of output, as indicated by Block 620. If it is a double-precision conversion, the counter K is set for controlling 18 cycle counts, as indicated by Block 622. A fractional binary-to-decimal conversion is performed by multiplying the binary fraction by 10, and selecting the highest ordered 4-bits as a resultant binary coded digit, as indicated by Block 624. The binary coded digit thus established is provided as an output byte as indicated by Block 626. The value of the count in the counter K is tested for equality to zero, as indicated by Block 628, and if not zero, if reduced by one, as indicated by Block 630, the cycle is then returned to convert the next digit. Upon the determination that the count for the digit output control has reached zero, the sign is stored in the zone portion of the least significant digit in accordance with the state of the mantissa flip-flop, as indicated by Block 632.

When control is returned to test the branch designators, and the case is found that BR7 is set, as indicated by Block 634 in FIG. 22*b*, a determination is made as to whether or not the constant T calculated during BR7 is less than zero, as indicated by Block 636. If less than zero, BR15 is set as indicated by Block 638, and executed in the manner just described. In the event T is equal to or greater than zero, BR19 is set as indicated by Block 640.

FIG. 38 illustrates the function performed during BR19, and includes the double-precision floating-point multiply of the value D times the constant $10^{-1}$, with the result being identified as D, as indicated in Block 642.

Upon the completion of BR19, the testing of the branch designators will indicate that BR19 is set, as indicated by Block 644 in FIG. 22*c*, and will result in the setting of BR8, as indicated by Block 646.

FIG. 39 illustrates the functions performed during BR8, and includes the testing of the Negative Exponent Flip-Flop, as indicated by Block 648. If set, the value E is determined as the value E less 1, as indicated by Block 650. If the Negative Exponent Flip-Flop is not set, the value E is determined as the value E + 1, as indicated by Block 652.

When control is again returned to test the branch designators, it will determine that BR8 is set, as indicated by Block 654 in FIG. 22*c*. This will result in BR20 being set, as indicated by Block 656, and will cause the entire operation to again cycle. Once the path is taken wherein BR15 is set and executed, the next subsequent testing of the branch designators will indicate that BR15 is set as indicated in Block 658. This will result in BR16 being set as indicated by Block 660, and will start the output and conversion of the exponent.

FIG. 40 illustrates the functions performed during BR16, and includes the selection of the magnitude of E as the value for constant L, as indicated by Block 662. The Byte Round-Up Flip-Flop is set if the next byte of the mantissa would have been equal to or greater than 5, as indicated by Block 664. Upon termination of BR16, control is returned to the testing of the branch designators, and it will be seen upon a testing of BR16 that it is set as indicated in Block 666 in FIG. 22*c*. This will cause BR17 to be set, as indicated by Block 668.

FIG. 41 illustrates the conversions accomplished during BR17, and includes the step of converting the value L determined during BR16 from binary-to-decimal, as indicated by Block 670. A test is made of the conversion process to determine whether it is a single-precision or double-precision conversion, as indicated by Block 672, and if found to be a single-precision conversion (instruction 33, 16) the value of the K counter is set to control the output of two exponent digits, as indicated by Block 674. If the conversion is a double-precision conversion, (instruction 33, 17) the value of the K counter is set for three digits of output, as indicated by Block 676. Having established the number of digits, one byte of exponent is put out, as indicated by Block 678. The value of the K counter is tested for zero, as indicated by Block 680, and if found to be other than zero, is reduced by one as indicated by Block 682. The cycle is then repeated to output another byte of exponent. When the K counter is found to be equal to zero, the sign is established in the lowest significant byte, depending upon the state of the Negative Exponent Flip-Flop, and the sign of E, as indicated by Block 684. Upon completion of the insertion of the sign, the conversion process is completed, and control is removed from the Arithmetic Section back to the Control Section of the CAU.

Having considered the description of the operations performed by the various branches for the conversion from single-precision and double-precision floating-point format to a byte format, and having set forth the relationship of elements in the arithmetic section, the following is a sequential description of the functions directed within the arithmetic section for each of the phases. The following will be with relation to the hardware system previously described, with particular attention directed to FIG. 18. In this regard, the Branch Designators and Control Circuitry 232 control the functioning of the Arithmetic Unit without programmer intervention once the conversion has been initiated. The steps set forth for each of the branches are in timed sequence, and will be designated and identified by the respective branches.

SINGLE-PRECISION AND DOUBLE-PRECISION FLOATING-POINT TO BYTE FORMAT CONVERSION (33, 16 AND 33, 17)

BRANCH 1

T0 is set from the Buffer Resident Bits, and the A Selector Designator is set for causing the A Register to pass Bits 0 through 26 to the A Selector. The A + 1 Selector Designator is set, so that the contents of the A + 1 Register is passed to the A + 1 Selector. The C3 Selector Designator is set for selecting the transfer of A Register Bits 27 through 35 to the C3 Selector, and the others are cleared. The N Selector Designator is set such that the constant is directed to the N Selector and the others are cleared. The H Selector Designator is set such that the +C Adder is directed to the H Selector. The T3 Selector Designator is set causing the H Selector Bits 0 through 11 to be transferred to the T3 Selector with the others being cleared. The Shift Designator is set causing a double right circular shift of the character upper, being Bits 24 through 35. The magnitude of the A Buffer is transferred to the A Register and the magnitude of the A + 1 Buffer is transferred to the A + 1 Register. The sign is sampled and set, and a multiply clear is performed. The Negative Exponent flip-flop is set if A Buffer Bits 34 and 35 are alike. The Mantissa Negative flip-flop is set if the A Buffer sign bit is set. The constant $1600_8$ is directed to the C1 Register and the N Selector is directed to the C0 Register. The Busy I and Busy II controls are set. The C3 Selector is gated to the C2 Register and shifted right three places in the process. The Block Final Clear Flip-Flop is set. For 33, 16 instructions only, the $VO_L$ Register is transferred to the A + 1 Register. The upper 36 bits of the shift matrix $S_U$ are gated to the T1 Register, and the lower 36 bits of the shift matrix are directed to the T2 Register. A constant is directed to the U and U + 1 Buffer Designators. The enable for the $Log_{10}2$ Designator is set. The A Selector Designators are set to transfer Bits 27 through 35 from the A Register to the A Selector. For 33, 16 instructions only, the T1 Register is transferred to the A Register and the T2 Register is directed to the A + 1 Register. The C3 Selector is transferred to the C2 Register. The constant $-2000_8$ is transferred to the C1 Register. The contents of the A Selector is directed to the T1 Register. The A + 1 Selector is transferred to the T2 Register. The T1 Register is directed to the H1 Register. The T2 Register is directed to the H2 Register. The A Selector Designators are set to clear the A Register and A Selector Bits 0 through 35 and to set the T Register to the A Selector. The H Selector Designator is set to transfer the +C Adder to the H Selector if C addition is positive or to transfer the −C Adder to the H Selector if the C addition is negative. T3 Selector transfers to the T3 Register. The A Selector transfers to the T1 Register. The T1 Register transfers to the A Register. And finally the constant designator is set.

BRANCH 2

Branch 2 performs an integer multiply sequence with the results in the T3 and T4 Registers. It involves transferring the magnitude of the U Buffer to the U Register. The A Selector Designator is set to transfer the A Register to the A Selector Bits 0 through 35 with others cleared. The U Selector Designator is set to transfer the contents of the A Register to the U Selector Bits 0 through 35. The U + 1 Selector Designator is set to transfer the U Register to the U + 1 Register Bits 0 through 35. The Sign I Flip-Flop is set if the U Buffer is negative, and the Sign II Flip-Flop is set if the A Buffer is negative. SO, VO, S1 and V1 are cleared. The Adder Designator is set for a 36-bit add. The A Selector is directed to the lower half of the QO Register ($Q0_L$). The counter K is set to a count of nine. The content of the Q0 Register is directed to the Q1 Register. The lower half of the V0 Register ($V0_L$) is directed to the A Register. The branch is directed into a multiply cycle. The lower rank of the K counter is transferred to the K counter upper rank. Full Adder 2 is directed to the Q Buffer Register. The S1 and V1 Registers are enabled. The contents of the Q1 Register is transferred to the Q0 Register and shifted right four places in the process. The Q Buffer is transferred to the Q0 Register. The upper rank of the K counter is transferred to the lower rank K. The Q Carry 2 flip-flop is set. The Storage I and Storage II flip-flops are set. The S0 and V0 Registers are enabled. Full Add 1 is directed to the Q Buffer 1. The contents of the Q0 Register are transferred to Q1 Register. Q Carry 1 flip-flop is set. The U Selector Designator is cleared and the A Register is transferred to the U Selector. U + 1 Selector Designator is cleared and the U Register is transferred to the U + 1 Selector. The U Selector Designator is set and the U Register is directed to the U Selector. The Full Adder is transferred to the Q Buffer and the Q Buffer is transferred to Q0. The contents of the Q1 Register are directed to the Q0 Register and shifted right four places in the process. $V0_L$ is transferred to the A Register and $S0_L$ is transferred to the U Register. The A Selector is directed to the T1 Register. Adder 1 is transferred to the T3 Register. Adder 2 is transferred to the T4 Register. The A Selector Designators are set to transfer the T3 Register to the A Selector. The A Selector Designators for the A Register to A Selector and U Register to A Selector are cleared. The M = 0 Flip-Flop is set if T3 is positive or a −0. The H1 and H2 Control Flip-Flops are set if T3 equals zero. If the M = 0 Flip-Flop is set, the branch is blocked and a selection is made for Branch 19, while if cleared, the branch continues. The T3 Selector Designator is set for H Selector to T3 Selector. The A Selector is transferred to the T1 Register. The C2 Register is cleared. The H Selector Designator is set for the +C Adder to H Selector. The T1 Register is gated to the A Register. The $A_L$ Register is gated to the C1 Register. The T3 Selector is directed to the T3 Register. The A Selector is transferred to the T1 Register. The T1 Register is transferred to the A Register, and the branch is terminated.

BRANCH 3

The Q1 Register is cleared. The contents of the Q1 Register are shifted left one place and transferred to Q0 Register, and the odd constant designation is cleared. The constant to A and A + 1 Designator is set with the constant to U and U + 1 Designator being cleared. The complement of the C1 Register is gated to the C2 Register. $Q0_U$ Register is transferred to the T1 Register. The $Q0_L$ Register is gated to the T2 Register. The K counter is set to 12. The divide chain is cycled K times. The Digit Correction Selectors transfer contents to the T3 Register and T4 Register. The lower rank of the K counter is gated to the upper rank. The contents of the A Register are shifted left one place and gated into the T1 Register and the contents of the A + 1 Register are left shifted one place and loaded into the T2 Register. If the A Register Bit 35 is 1, the BD Flip-Flop is set. The K counter upper rank is transferred to the lower rank of the K counter. The contents of the T1 Register are transferred to the A Register. The contents of the T2 Register are transferred to A + 1 Register. The contents of the T3 Register are left shifted one place while being gated to T1 Register. The contents of the T4 Register are left shifted one place and gated to the T2 Register. The BD Flip-Flop is gated to the T2 Register, bit 0. Control is returned from the divide cycle when the counter equals zero. The complement of the C2 Register is gated to the E Register. The double precision floating point representation of $10^{D3}$ is forced through the U and U + 1 Buffers from the 72-bit constant generator. The contents of the A Buffer are transferred to the A Register. The contents of the A + 1 Buffer are gated to the A + 1 Register. Set constants to U and U + 1 Designator, and clear the constants to the A and A + 1 Designator. Set Enable D2 Designator. The double precision floating-point representation of $10^{D2}$ is forced through U and U + 1 Buffers from the 72-bit constant generator. The contents of the U Buffer are transferred to the U Register. The contents of the U + 1 Buffer are gated to the U + 1 Register. At the close of Branch 3, there is entry to Branch 9 or Branch 10.

BRANCH 4

The complement of the contents of the U Buffer are transferred to the U Register. The complement of the contents of the U + 1 Buffer are transferred to the U + 1 Registers. The Q1 Register is cleared. The C4 Selector Designators are set such that, if the U Register is positive the complement of U Register Bits 24 through 35 are gated through the C4 Selector, otherwise, the U Register Bits 24 through 35 are gated through the C4 Selector. Set the C3 Selector Designators for +A Register Bits 24 through 35. The A Selector Designator is set to enable the transfer of the T3 Register contents to A Selector. Set the T3 Selector Designator for U Selector to T3 Selector with others cleared. Set the Adder Designator for 72-bit add. Set the Shift Matrix Designator for double right algebraic shift. Set N Selector Designator for transferring the Normalizer to the N Selector. The contents of the Q1 Register are transferred to Q0 Register and shifted left one place in the process. The C3 Selector is gated to C2 Register. Set C4 Selector to C1 Register. Set C4 Selector Designator such that the Normalizer is selected through the C3 Selector. Set C3 Selector Designator such that the C0 Register is selected. Set the U Selector Designator for sign to U Selector for Bits 24 through 26 and sign to U Selector Bits 27 through 35. Also, if a characteristic end around borrow (EAB) occurs, set A Register to U Selector Designator, bits 0 – 23, otherwise set the U-Register to U Selector Designator Bits 0–23. Set the A + 1 Selector Designator for a U + 1 Register to A + 1 Selector transfer if the characteristic end around borrow (EAB) occurs or the A + 1 Register to A + 1 Selector Bits 0 through 17 and A + 1 Register to A + 1 Selector Bits 18 through 35 if the characteristic EAB does not occur. The characteristic EAB Flip-Flop is set for the designated condition. The complement of C Adder output is transferred to the C0 Register and shifted left three places if the characteristic EAB occurs. The +C Adder output is transferred to the C0 Register and shifted left three places if characteristic EAB did not occur. The complement of the contents of the C1 Register are gated to the C2 Register if characteristic EAB occurs. The T3 Selector is gated to T3 Register. Set U + 1 Selector Designators for U + 1 Register to U + 1 Selector if the characteristic EAB occurred or A + 1 Register to U + 1 Selector Bits 0 through 26 and A + 1 Register to U + 1 Selector for Bits 27 through 35 if a characteristic EAB does not occur. A constant −72 is transferred to the C1 Register. The U Selector Designator clears the A Register to the U Selector Bits 0 through 23 and sets the U Register to the U Selector Bits 0 through 23 for a characteristic EAB, and clears the U Register to the U Selector Bits 0 through 23 and sets the A Register to the U Selector Bits 0 through 23 if not a characteristic EAB. The constant 28 Designator is set. The upper portion of the Shift Matrix is directed to the T1 Register if C0 is less than or equal to 63. The lower portion of the Shift Matrix is directed to the T2 Register if C0 is less than or equal to 63. The Q0 Register is transferred to the T1 Register if C0 is greater than 63.

The Q0 Register contents are transferred to the T2 Register if C0 is greater than 63. The A + 1 Selector Designator is set to gate the T4 Register to the A + 1 Selector. The E Register is transferred to the C2 Register. Adder 1 is transferred to the T3 Register. Adder 2 is transferred to the T4 Register. The constant is transferred to the C1 Register as a −1 if the Negative Exponent Flip-Flop is not set or a positive 1 if the Negative Exponent Flip-Flop is set. Set or clear EAB Flip-Flop depending on the EAB condition. Set the $10^0$ Designator if the EAB Flip-Flop is not set. Set the $10^1$ Designator if the EAB Flip-Flop is set. Set the constant 1B Designator. The complement of the C Adder is gated to C0 Register. The C3 Selector to the C2 Register Designator is enabled. The complement of the C2 Register contents are gated to the E Register if the EAB Flip-Flop is set. At the close of the branch, there is a selection of continuing with either Branch 6 or Branch 7.

BRANCH 6

The Branch 6 performs a double-precision floating-point multiply with the results residing in the T1 and T2 Registers. The magnitude of the U buffer is directed to the U Register. The magnitude of the U + 1 Buffer is transferred to the U + 1 Register. S0, V0, S1, and V1 Registers are cleared. The Sign I Flip-Flop is set if the U Buffer is negative. The Sign II Flip-Flop is set if the A Buffer is negative. The U Selector Designators are set for U Register to U Selector Bits 0 through 23 along with the sign to U Selector Bits 27 through 35 and the sign to U Selector Bits 24 through 26. The U + 1 Selector Designators are set for gating the U + 1 Register contents to U + 1 Selector. The A Selector Designators are set for controlling the transfer of the A Register contents to A Selector bit positions 0 through 23 with the others cleared. The A + 1 Selector Designators are set for controlling the transfer of the A + 1 Register contents to A + 1 Selector bit positions 0 through 17 and the A + 1 Register contents to A + 1 Selector bit positions 18 through 35 with others cleared. The C3 Selector Designators are set for controlling the transfer of the A Register contents to the C3 Selector bit positions 27 through 35 and the transfer of A Register contents to the C3 Selector bit positions 24 through 26 with the others cleared. The C4 Selector Designators are set for gating the U Register contents to C4 Selector bit positions 27 through 35 and the U Register contents to the C4 Selector bit positions 24 through 26 with the others cleared. The N Selector Designators are set for transferring the constant to the N Selector. The H Selector Designators are set for gating the +C Adder to the H Selector. The Shift Matrix Designators are set for a double right circular shift along with the Shift Matrix upper characteristic Enables 27 through 35 and Shift Matrix upper characteristic Enables 24 through 36 with the others cleared. The Adder Designator is set for a 72-bit add. The C4 Selector is transferred to the C1 Register. The C3 Selector is transferred to the C2 Register. The A Selector is transferred to the $Q0_U$ Register. The A + 1 Selector is transferred to the $Q0_L$ Register. The C3 Selector Designators are set for clearing the A Register to the C3 Selector for Bits 27 through 35, and clearing the A Register to the C3 Selector for Bits 24 through 26, and setting the C0 Register to the C3 Selector. The C4 Selector Designators are cleared for the U Register to the C4 Selector Bits 27 through 35 and the U Register to C4 Selector Bits 24 through 26. The K counter is set. The C Adder is transferred to the C0 Register. The Q0 Register is transferred to the Q1 Register. The lower 36 bits of the V0 Register are transferred to the A Register. The branch is caused to go into the multiply cycle. The K counter lower rank is transferred to the K counter upper rank. The −X Storage Flip-Flop is set. Full Add 2 is transferred to the Q Buffer 2. The Carry Save Adder output is transferred to the S1 and V1 Registers. Q1 Register R4 is transferred to Q0 Registers. Q Buffer is transferred to Q0. The K counter upper rank is transferred to the K counter lower rank. The Q Carry 2 Flip-Flop is set. The −X Storage Flip-Flop 2 is set. The Carry Save Output is transferred to the S0 and V0 Registers. The Gate Q Buffer Flip-Flop is set if K = 1. The Full Add 1 is transferred to Q Buffer 1. The Q0 Register is transferred to the Q1 Register. The Q Carry 1 Flip-Flop is set. The return is made from the multiply cycle. The A Selector Designator is set for gating the A Register to A Selector bit positions 27 through 35, and gating the A Register to A Selector bit positions 24 through 26. The U Selector Designators are set for clearing the U Register to U Selector Bits 0 through 23, clearing the sign to the U Selector bits 27 through 35, and clearing the sign to U Selector Bits 24 through 26, and setting the $S0_U$ Register to U Selector. The C3 Selector is transferred to the C2 Register. The Full Adder is gated to the Q Buffer. $V0_U$ Register is gated to the A Register. $V0_L$ Register is gated to the A + 1 Register. The Q Buffer is gated to Q0 Register. The Q1 Register is gated to Q0 Register and shifted right four places in the process. The A Selector is gated to T1 Register. The A + 1 Selector is gated to the T2 Register. The U + 1 Selector Designators are set for clearing the U + 1 Register to U + 1 Selector and setting the $S0_L$ Register to U + 1 Selector. The A Selector Designators are set for clearing the A Register to the A Selector Bits 0 through 23 and setting the T3 Register to the A Selector. The A + 1 Selector Designators are set for clearing the A + 1 Register to A + 1 Selector Bits 0 through 17, clearing the A + 1 Register to A + 1 Selector Bits 18 through 35, and setting the T4 Register to the A + 1 Selector. The QO Register Bits 30 through 35 are transferred to the A Register Bits 30 to 35. The T1 Excess to T3 Selector Designator is set. Adder 1 is transferred to the T3 Register. Adder 2 is transferred to the T4 Register. The Q1 Register is cleared. The top 12 bits of the T3 Selector are transferred to the top 12 bits of the T3 Register. A constant of either $-2000_8$ or $-2001_8$ is gated to the C1

Register. The N Selector is gated to the C0 Register. The contents of the Q1 Register are transferred to the Q0 Register and shifted left one place in the process. The M = 0 Flip-Flop is set or cleared from a test of T3 or T4. The Mantissa Negative Flip-Flop and Exponent Negative Flip-Flop are cleared if the M = 0 Flip-Flop is set. The decimal point counter is gated to the E Register which clears the E Register if the M = 0 Flip-Flop is set. The Q0 Register contents are gated to the T1 Register under controlled conditions of mantissa equals zero or C Adder negative and D5 is set and C2 is positive or D20 is cleared and C Adder is negative. If the foregoing condition is not met, $SM_U$ is gated to the T1 Register, and $SM_L$ is gated to the T2 Register. At the close of Branch 6 there is a selection of either Branch 15 or 20.

BRANCH 7

This Branch 7 involves a double-precision floating-point subtract, and commences with the transfer of the complement of the contents of the U Buffer to the U Register. The complement of the contents of the U + 1 Buffer is transferred to the U + 1 Register. The Q1 Register is cleared. The C4 Selector Designators are set for the complement of U Register Bits 27 through 35 and Bits 24 through 26 to be gated to the C4 Selector if the U Register contents are positive, the other bits being cleared, or if the U Register is negative, +U Register Bits 27 through 35 and 24 through 26 are transferred to the C4 Selector with the others cleared. The C3 Selector Designators are set for gating the +A Register Bits 27 through 35 to the C3 Selector and +A Register Bits 24 through 26 to the C3 Selector with the others cleared. The A Selector Designator is set for transferring the T3 Register contents to the A Selector with the others cleared. The T3 Selector Designators are set for gating the U Selector to the T3 Selector with the others cleared. The Adder Designator is set for a 72-bit add. The Shift Matrix (SM) Designator is set for a double right algebraic shift with the others cleared. The N Selector Designator is set for gating from the Normalizer to the N Selector. The Q1 Register is transferred to the Q0 Register and left shifted one place in the process. The C3 Selector is transferred to the C2 Register. The C4 Selector is transferred to the C1 Register. The C4 Selector Designators are set for clearing the + and − U Registers to C4 Selector and setting the plus Normalizer to the C4 Selector. The C3 Selector Designator is set for clearing the + and − *A* Register to the C3 Selector and setting the C0 Register to the C3 Selector. The U Selector Designators are set for the sign to U Selector Bits 24 through 26 and the sign to U Selector Bits 27 through 35 with the A Register to U Selector Bits 0 through 23 if the characteristic causes an EAB, or U Register to U Selector Bits 0 through 23 if no EAB occurs. The A + 1 Selector Designators are set for the U + 1 Register to A + 1 Selector if there is a characteristic EAB and A + 1 Register to A + 1 Selector Bits 0 through 17 and A + 1 Register to A + 1 Selector Bits 18 through 35 if there is no EAB. The characteristic EAB Flip-Flop is set if a characteristic EAB is detected. The complement of the contents of the C Adder is transferred to the C0 Register and left shifted three places if an EAB characteristic occurs. The + C Adder is gated to the C0 Register and left shifted three places in the process if no EAB characteristic. The complement of the contents of the C1 Register is gated to C2 Register if an EAB characteristic occurs. The T3 Selector is enabled to allow a transfer to the T3 Register. The U + 1 Selector Designators are set for U + 1 Register to U + 1 Selector transfer if an EAB characteristic or A + 1 Register to U + 1 Selector Bits 0 through 26 and A + 1 Register to U + 1 Selector Bits 27 through 35 transfer if not an EAB characteristic. A constant, −72, is transferred to the C1 Register. The U Selector Designators are set to clear the A Register to the U Selector Bits 0 through 23 and set the U Register to the U Selector Bits 0 through 23 if it is an EAB characteristic, or to clear the U Register to the U Selector Bits 0 through 23 and set the A Register to the U Selector Bits 0 – 23 if not an EAB characteristic. $SM_U$ is transferred to the T1 Register if C0 is less than or equal to 63. $SM_L$ is transferred to the T2 Register if C0 is less than or equal to 63. The Q0 Register is gated to T1 Register if C0 is greater than 63. The Q0 Register is gated to the T2 Register if C0 is greater than 63. The A + 1 Selector Designators are set for a transfer of the T4 Register to A + 1 Selector. Adder +1 is directed to T3 Register. Adder 2 is directed to the T4 Register. The $10^{-1}$ Enable Designator is set. At the close of the branch chain it is set to either Branch 15 or Branch 19.

BRANCH 8

The contents of the E Register are transferred to the C2 Register. A constant is transferred to the C1 Register as a +1 if the Negative Exponent Flip-Flop is not set or a −1 if the Negative Exponent Flip-Flop is set. The C3 Selector Designators are set for gating the contents of the CO Register to C3 Selector. The −C Adder is transferred to the C0 Register. The C3 Selector is transferred to the C2 Register. The complement of the contents of the C2 Register is transferred to the E Register. At the close of Branch 8 there is a setting for initiation of Branch 20.

BRANCH 9

Branch 9 includes the calculation of a double-precision floating-point multiply and concludes with the results in the T1 and T2 Registers. To initialize, the S0, V0, S1, and V1 Registers are cleared. The Sign I Flip-Flop is set if the U Buffer is negative. The Sign II Flip-Flop is set if the A Buffer is negative. The U Selector Designator is set for a U Register to U Selector Bits 0 through 23 transfer, the sign to U Selector Bits 27 through 35 transfer and the sign to U Selector Bits 24 through 26 transfer, with the other bits being cleared. The U + 1 Selector Designators are set for the U + 1 Register to U + 1 Selector transfer with the others cleared. The A Selector Designator is set for the A Register to the A Selector Bits 0 through 23 transfer with the other designator bits being cleared. The A + 1 Selector Designator is set for the A + 1 Register to A + 1 Selector Bits 0 through 17 transfer, and the A + 1 Register to A + 1 Selector Bits 18 through 35 transfer, with the other bits cleared. The C3 Selector Designators are set for a transfer of the A Register to C3 Selector Bits 27 through 35 and the A Register to C3 Selector Bits 24 through 26 with the others cleared. The C4 Selector Designator is set for a transfer of the U Register to C4 Selector Bits 27 through 35 and the U Register to C4 Selector Bits 24 through 26 with the others cleared. The N Selector Designator is set for a constant to the N Selector transfer. The H Selector Designator is set for the +C Adder to H Selector transfer. The Shift Designator is set for a double right circular shift with SM upper being a characteristic enable for Bits 27 through 35 and SM upper being a characteristic enable for Bits 24 through 26 with the others cleared. The Adder Designator is set for a 72-bit add. The C4 Selector is transferred to the C1 Register. The C3 Selector is transferred to the C2 Register. The A Selector is transferred to the $Q0_U$ Register. The A + 1 Selector is transferred to the $Q0_L$ Register. The C3 Selector Designators are set for clearing the A Register to the C3 Selector Bits 27 through 35, clearing the A Register to the C3 Selector Bits 24 through 26, and setting the C0 Register to the C3 Selector. The C4 Selector Designators are cleared for the U Register to the C4 Selector Bits 27 through 35, and the U Register to the C4 Selector Bits 24 through 26. A constant is set in the K counter. The content of the C Adder is transferred to the C0 Register. The Q0 Register is transferred to the Q1 Register. The $V0_L$ Register is transferred to the A Register. The branch is caused to go into the multiply cycle. The K counter lower rank is transferred to the K counter upper rank. The Storage I Flip-Flop is set. The output of Full Add 2 is transferred to the Q Buffer 2. The S1 and V1 Registers are enabled. The content of the Q1 Register is transferred to Q0 Register and shifted right four places in the process. The Q Buffer contents are transferred to Q0. The K counter upper rank is is transferred to the K counter lower rank. The Q Carry 2 Flip-Flop is set. The Storage II Flip-Flop is set. Enables are provided to the S0 and V0 Registers. The Gate Q Buffer Flip-Flop is set if K = 1. The output of Full Add 1 is gated to Q Buffer 1. The Q Register is transferred to the Q1 Register. The Q Carry 1 Flip-Flop is set. Return from the multiply cycle. The A Selector Designators are set for an A Register to A Selector for Bits 27 through 35 transfer and A Register to A Selector for Bits 24 through 26 transfer. The U Selector Designators are set for clear U Register to U Selector for Bits 0 through 23, clear sign to U Selector for Bits 27 through 35, and clear sign to U Selector Bits 24 through 26, and set $S0_U$ Register to U Selector. The C3 Selector is transferred to the C2 Register. The Full Adder output is gated to the Q Buffer. The $V0_U$ Register is gated to the A Register. The $V0_L$ Register to A + 1 Register. Q Buffer to Q0 Register. The Q1 Register contents are transferred to the Q0 Register and right shifted four places in the process. The A Selector is transferred to the T1 Register. The A + 1 Selector is transferred to the T2 Register. The U + 1 Selector Designators are set for clear U + 1 Register to U + 1 Selector, setting the $S0_L$ Register to the U + 1 Selector. The A Selector Designators are set for clearing the A Register to the A Selector Bits O through 23, and setting the T3 Register to the A Selector. The A + 1 Selector Designators are set for clearing the A + 1 Register to the A + 1 Selector Bits O through 17, clearing the A + 1 Register to A + 1 Selector Bits 18 through 35, and setting the T4 Register to A + 1 Selector. The Bits 30 through 35 of the Q0 Register are transferred to Bit positions 30 through 35 of the A Register. The T1 Excess is transferred to the T3 Selector Designators. Adder 1 is transferred to the T3 Register. Adder 2 is transferred to the T4 Register. The Q1 Register is cleared. The T3 Selector is transferred to the T3 Register. The constant $-2000_8$ or $-2001_8$ is transferred to the C1 Register. The N Selector is transferred to the C0 Register. The Q1 Register content is transferred to the Q0 Register and left shifted one place in the process. The M = 0 Flip-Flop is either set or cleared resulting from a test of T3 or T4. The Q0 Register is transferred to the T1 Register if the mantissa equals zero or if the C Adder is negative, and D5 is set and C2 is positive or D20 is cleared and C Adder is negative. The Q0 Register is transferred to the T2 Register if the mantissa equals zero or if the C Adder is negative and D5 is set and C2 is positive or D20 is cleared and C Adder is negative. Otherwise, the $SM_U$ will be transferred to the T1 Register and the $SM_L$ will be transferred to the T2 Register. Branch 10 is selected at the close of the branch.

BRANCH 10

The A Selector Designators are set for the U Register to the A Selector if D3 is equal to zero or the A Register to the A Selector if D3 is not equal to zero. The A + 1 Selector Designators are set for U + 1 Register to A + 1 Selector if D3 = 0, or A + 1 Selector is D3 does not equal zero. The Enables for the D1 Designator are set. The A Selector is transferred to the T1 Register if D3 = 0 or D2 = 0. The A + 1 Selector is transferred to the T2 Register if D3 = 0 or D2 = 0. The T1 Register is transferred to the A Register. The T2 Register is transferred to the A + 1 Register. The U Buffer is transferred to the U Register. The U + 1 Buffer is transferred to the U + 1 Register. The H1 and H2 Control Flip-flop is set. The exit from Branch 10 is either to Branch 11 or Branch 12.

BRANCH 11

The basic function of Branch 11 is to perform a double-precision floating-point multiply, with the result to reside in the T1 and T2 Registers. As the branch proceeds, the S0, V0, S1 and V1 Registers are cleared. The Sign I Flip-Flop is set, if the U Buffer is negative, and the Sign II Flip-Flop is set if the A Buffer is negative. The U Selector Designators are set for the U Register to transfer Bits 0 through 23 to the U Selectors, the sign is to be transferred to the U Selector Bits 27 through 35, and the sign is to be transferred to the U Selector Bits 24 through 26. The U + 1 Selector Designators are set for transferring the U + 1 Register to the U + 1 Selector. The A Selector Designators are set for the A Register to transfer Bits 0 through 23 to the A Selector. The A + 1 Selector Designators are set for the A + 1 Register to transfer Bits 0 through 17 to A + 1 Selector and the A + 1 Register to transfer Bits 18 through 35 to the A + 1 Selector with the others to be cleared. The C3 Selector Designators are set for the A Register to transfer Bits 27 through 35 to the C3 Selector, and the A Register to tranfer Bits 24 through 26 to the C3 Selector, with others to be cleared. The C4 Selector Designators are set for transferring Bits 27 through 35 from the U Register to the C4 Selector, and for transferring BIts 24 through 26 from the U Register to the C4 Selector, with the others to be cleared. The N Selector Designators are set for transferring a constant to the N Selector with others to be cleared. The H Selector Designators are set for transferring +C Adder to H Selector. The SM Designators are set for a double right circular shift with SM upper characteristic enables for Bits 24 through 35 with the others cleared. The Adder Designators are set for a 72-bit add. The C4 Selector is transferred to the C1 Register. The C3 Selector is transferred to the C2 Register. The A Selector is transferred to the $Q0_U$ Register. The A + 1 Selector is transferred to the $Q0_L$ Register. The C3 Selector Deisgnators are set for clearing the A Register to the C3 Selector Bits 27 through 35, clearing the A Register to C3 Selector Bits 24 through 26, and setting the C0 Register to C3 Selector. The C4 Selector Designators are cleared for transferring the U Register to Bits 27 through 35 of C4 Selector, and U Register Bits 24 through 26 to the C4 Selector. The K counter is set, and the C Adder is transferred to the C0 Register. The Q0 Register is transferred to the Q1 Register. The $V0_L$ Register is transferred to the A register. The multiply cycle is entered. The K counter lower ramp is transferred to the K counter upper ramp. The Storage I flip-flop is set. Full adder 2 is directed to the Q Buffer 2. Enables are applied to the S1 and V1 Registers. The Q1 Register is transferred to the Q0 Register and shifted right from places in the process. Q Buffer is transferred to Q0. The K counter upper rank is transferred to the K counter lower rank. The Q Carry 2 flip-flop is set. The Storage II flip-flop is set. Enables are applied to the S0 and V0 Registers. If the K = 1, the Gate Q Buffer Flip-Flop is set. Full Adder 1 is directed to Q Buffer 1, Q0 Register is transferred to the Q1 Register. The Q carry 1 flip-flop is set. The sequence returns from the multiply cycle. A Selector Designators are set for Bits 24 through 35 to be transferred from the A Register to the A Selector. U Selector Designators are set for clearing the U Register to the U Selector Bits 0 through 23, and clearing the sign to U Selector Bits 24 through 35, and setting $S0_L$ Register to the U Selector. The C3 Selector is transferred to the C2 Register and the Gate Q Buffer Flip-Flop is cleared. The Full Adder output is fed to the Q Buffer. $V0_L$ Register contents are gated to the A Register. $V0_L$ Register contents are gated to the A + 1 Register. The Q Buffer is transferred to the Q0 Register. The contents of the Q1 Register is transferred to the Q0 Register and right shifted from places in the process. A Selector is transferred to the T1 Register and the A +1 Selector is transferred to the T2 Register. The U + 1 Selector Designators are set for clearing the U +1 Register to the U + 1 Selector, setting $S0_L$ Register to the U + 1 Selector. The A Selector Designators are set for clearing the A Register to the A Selector Bits 0 through 23, and setting the T3 Register to the A Selector. The A + 1 Selector Designators are set for clearing the A + 1 Register to Bits 0 through 17 of the A + 1 Selector, clearing the A + 1 Register to Bits 18 through 35 of the A + 1 Selector, and setting the T4 Register to the A + 1 Selector. Bit positions 30 through 35 of the Q Register are transferred to Bit positions 30 through 35 of the A Register. The T1 Excess is sent to the T3 Selector Designator. Adder 1 is transferred to the T3 Register and Adder 2 is transferred to the T4 Register. The Q1 Register is cleared. The T3 Selector is transferred to the T3 Register top 12 positions. A constant $-2000_8$ or $2001_8$ is transferred to the C1 Register. The N Selector has constants 68 or 67 shifted left three places in being gated to the C0 Register. The Q1 Register contents is gated to the Q0 Register and left shifted one place. Based on the contents of T3 and T4, the M = 0 Flip-Flop is either set or cleared. $SM_U$ is directed to the T1 Register and $SM_L$ is transferred to the T2 Register. At the close of the branch it is set to proceed to Branch 12.

BRANCH 12

The A Selector Designators are set for transferring the U Register to the A Selector with others cleared. The A + 1 Selector Designators are set for transferring the U + 1 Register to the A + 1 Selector with the others cleared. The contents of the H1 Register and H2 Register are transferred to the A and A + 1 Buffer Selector. The $D^X$ Designator is cleared and the selected constant is gated to the Buffer Designator. If D1 is not equal to zero and D2 equals D3 = 0, the A Selector is transferred to the T1 Register. If D1 does not equal zero and D2 and D3 equal zero, the A + 1 Selector is directed to the T2 Register. The T1 Register contents are transferred to the H1 Register, and the T2 Register contents are transferred to the H2 Register. The H1 Register and H2 Register contents are directed to the U and U + 1 Buffer Selectors, respectively. At the close of Branch 12 the selection is made as to whether to proceed to Branch 13 or Branch 14.

BRANCH 13

Branch 13 is basically a branch that performs the function of performing a double-precision floating-point divide sequence, with the results residing in the T1 and T2 Registers. In performing this sequence, the negative magnitude of the U Buffer contents are transferred to the U Register, and the negative magnitude of the U + 1 Buffer contents are transferred to the U + 1 Register. The magnitude of the A Buffer contents are transferred to the A Register, and the magnitude of the A + 1 Buffer contents are transferred to the A + 1 Register. The S0, V0, S1, and V1 Registers are cleared. If the U Buffer is negative, Sign I Flip-Flop is set, and if the A BUffer is negative, the Sign II Flip-Flop is set. The A Selector Designators are set for tranferring the A Register contents to the A Selector Bits 0 through 23, with the others cleared. The A + 1 Selector designators are set for transferring the A + 1 Register to the A + 1 Selector Bits 0 through 17, and the A + 1 Register to the A + 1 Selector Bits 18 through 35, with the others cleared. The U Selector Designators are set for transferring the U Register contents to the U Selector Bits 0 through 23, with the sign to U Selector Bits 24 through 35, with the others cleared. The U + 1 Selector Designators are set for transferring the U + 1 Register to the U + 1 Selector with the others cleared. The T3 Selector Designators are set for transferring the U Selector to the T3 Selector, with the others cleared. The C3 Selector Designator is set for transferring the A Register to the C3 Selector Bits 27 through 35, and the A Register to the C3 Selector Bits 24 through 26 with the others cleared. The C4 Selector Designator is set for transferring the U Register to the C4 Selector Bits 27 through 35, and the U Register to the C4 Selector Bits 24 through 26, with the others cleared. The N Selector Designator is set for transferring a constant to the N Selector. The H Selector Designator is set for gating the +C Adder output to the H Selector. The SM Designator is set for double right circular shift. The Adder Designators are set for a 72-bit add. The C3 Selector is transferred to the C2 Register and the C4 Selector is transferred to the C1 Register. The U + 1 Selector is transferred to the T4 Register. The A Selector is transferred to the T1 Register and the A + 1 Selector is transferred to the T2 Register. The T3 Selector is transferred to the T3 Register for performing a zero test. The C3 Selector Designators are set for clearing the A Register to the C3 Selector Bits 27 through 35 and clearing the A Register to the C3 Selector Bits 24 through 26, and setting the C0 Register to the C3 Selector. The C4 Selector Designator is cleared for the transfer of the U Register contents to the C4 Selector Bits 27 through 35, and the U Register to the C4 Selector Bits 24 through 26. The K counter is set. The C Adder output is transferred to the C0 Register. The Divide Fault flip-flop is set upon a zero test. The sequence is transferred to the divide cycle. The K counter lower rank is transferred to the K counter upper rank. On EAB conditions the EAB Flip-Flop is set, and on overflow conditions the Divide Overflow Flip-Flop is set. K counter upper rank is transferred to K counter lower rank. The Q0 Register content is transferred to the Q1 Register. The T1 Register is transferred to the A Register. The T2 Register is transferred to the A + 1 Register. Adder 1 is transferred to the T3 Register, and Adder 2 is transferred to the T4 Register. The A Selector Designators are set for the T3 Register to the A Selector when the EAB Flip-Flop is not set, or for the A Register to the A Selector when the EAB Flip-Flop is set. The A Selector Designators are cleared for T3 Register to A Selector when the EAB Flip-Flop is set, or the A Register to A Selector if the EAB Flip-Flop is not set. The A + 1 Selector Designators are set for T4 Register to A + 1 Selector when the EAB Flip-Flop is not set, or the A + 1 Register to A + 1 Selector when EAB Flip-Flop is set. The A + 1 Selector Designators are cleared for a T Register to A + 1 Selector transfer when the EAB Flip-Flop is set, or for a A + 1 Register to A + 1 Selector transfer when EAB Flip-Flop is not set. The T3 Register contents are transferred to the T1 Register and left shifted one place when the EAB Flip-Flop is not set and it is not the last cycle. Similarly, the T4 Register contents are directed to the T2 Register and left shifted one place in the process when the EAB Flip-Flop is not set and it is not the last cycle. The Q1 Register contents are directed to the Q0 Register and left shifted by one place in the process. If the EAB Flip-Flop is set, a 0 is entered into the Q0 Register Bit 0, or if the EAB Flip-Flop is not set, a 1 is inserted into the Q0 Register Bit 0 position. The A Register contents are transferred to the T1 Register and left shifted one place if the EAB Flip-Flop is set and it is not the last cycle. The A + 1 Register contents are left shifted one place and entered into the T2 Register if the EAB Flip-Flop is set and it is not the last cycle. On the last cycle, the A Selector is transferred to the T1 Register and the A + 1 Selector is transferred to the T2 Register. Upon a return from the divide cycle, the C3 Selector is transfered to the C2 Register. A constant $2000_8$ or $2001_8$ is transferred to the C1 Register. The $Q0_U$ Register is transferred to the T1 Register and the $Q0_L$ Register is transferred to the T2 Register. The U Selector Designators are set for clearing the U Register to the U Selector Bits 0 through 23, clearing the sign to U Selector Bits 27 through 35, and clearing the sign to the U Selector Bits 24 through 26, and setting the $S0_U$ Register to the U Selector. The U + 1 Selector Designators are set for clearing the U + 1 Register to the U + 1 Selector and setting the $S0_L$ Register to the U + 1 Selector. The T1 Register is transferred to the A Register, and the T2 Register is transferred to the A + 1 Register. The N selector bit 72 is shifted left three places and entered into the C0 Register. The Q1 Register is cleared. The M = 0 Flip-Flop is set or cleared depending on the equality test of bit 72. The A Selector Designator is set for the A Register to A selector, and the A + 1 Selector Designator is set for the A + 1 Register to A + 1 Selector. The Q1 Register content is transferred to the Q0 Register and right shifted four places. The characteristic Overflow Flip-Flop is set if the C Adder result is negative and C2 is positive and M = 0 Flip-Flop is not set and there is no divide fault. In correct operation of the equipment, this condition cannot occur. The Character Underflow Flip-Flop is set if M = 0 Flip-Flop is not set and it is not a divide fault, and C2 is negative, and the C Adder is negative. As just mentioned, for proper operation of the equipment, this combination of conditions cannot occur. If the mantissa = 0 or the C Adder is negative and C2 negative and D5 or not D20, the $Q0_U$ is transferrred to T1 Register and $Q0_L$ is transferred to the T2 Register. Otherwise, $SM_U$ is transferred to the T1 Register and $SM_L$ is transferred to the T2 Register. At the close of the branch, selection is made to proceed to Branch 20.

BRANCH 14

The basic function of Branch 14 is to perform a double-precision floating-point multiply, with the results to reside in the T1 and T2 Registers. At the outset, the U Buffer content is transferred to the U Register. The magnitude of the A Buffer is transferred to the A Register. The U + 1 Buffer is transferred to the U + 1 Register. The magnitude of the A + 1 Buffer is transferred to the A + 1 Register. The S0, V0, S1, and V1 Registers are cleared. If the U Buffer is negative, the Sign I Flip-Flop is set, and if the A Buffer is negative, the Sign II Flip-Flop is set. The U Selector Designators are set for the U Register to the U Selector Bits 0 through 23, Sign to U Selector Bits 27 through 35, and sign to U Selector Bits 24 through 26. The U + 1 Selector Designators are set for the U + 1 Register to the U + 1 Selector transfer. The A Selector Designators are set for the A Register to the A Selector Bits 0 through 23 transfer with the other designators being cleared. The A + 1 Selector Designators are set for the A + 1 Register to the A + 1 Selector Bits 0 through 17, and the A + 1 Register to the A + 1 Selector Bits 18 through 35 with the others cleared. The C3 Selector Designators are set for the A Register to the C3 Selector Bits 27 through 35 transfer, and the A Register to C3 Selector Bits 24 through 26 transfer, with the other cleared. The C4 Selector Designators are set for the U Register to C4 Selector Bits 27 through 35, and the U Register to C4 Selector Bits 24 through 26, with the others cleared. The N Selector Designators are set for transferring the constant to N Selector, with the others cleared. H Selector Designator is set for +Adder to H Selector. The SM Designator is set for a double length right circular shift. The Adder Designator is set for a 72-bit add. C4 Selector is transferred to the C1 Register, and the C3 Selector is transferred to the C2 Register. The A Selector is transferred to the $Q0_U$ Register. The A + 1 Selector is transferred to the $Q0_L$ Register. The C3 Selector Designators are set for clearing the A Register to the C3 Selector Bits 27 through 35, clearing the A Register to the C3 Selector Bits 24 through 26, and setting the C0 Register to the C3 Selector. The C4 Selector Designators for U Register to C4 Selector Bits 27 through 35, and U Register to C4 Selector Bits 24 through 26 are cleared. The K counter is set. The C Adder to the C0 Register. The Q0 Register contents are gated to the Q1 Register. The $V0_L$ Register contents are gated to the A Register. The muliply cycle is entered. The K counter lower rank is transferred to the K counter upper rank. Set the Storage I Flip-Flop. The Full Adder 2 output is directed to the Q Buffer 2. Enables are provided to the S1 and V1 Registers. The contents of the Q Register are gated to the Q0 Register and right shifted four places in the process. The Q Buffer contents are gated to Q0. K counter upper rank is gated to the K counter lower rank. The Q carry 2 flip-flop is set. The Storage II flip-flop is set. Enables are provided to the S0 and V0 Registers. When K = 1, the Gate Q Buffer Flip-Flop is set. The Full Adder 1 output is gated to Q Buffer 1. The Q0 Register contents are gated to the Q1 Register. The Q Carry 1 flip-flop is set. Return is made from the multiply cycle. The A Selector Designators are set for an A Register to A Selector Bits 27 through 35 transfer, and an A Register to A Selector Bits 24 through 26 transfer. The U Selector Designators are set for clearing the U Register to the U Selector Bits 0 through 23, clearing the sign to U Selector Bits 27 through 35, and clearing the sign to U Selector Bits 24 through 26, and setting the $S0_U$ Register to the U Selector. The C3 Selector is transferred to the C2 Register. The Full Adder output is gated to the Q Buffer. The $V0_U$ Register is gated to the A Register, and the $V0_L$ Register is gated to the A + 1 Register. The Q Buffer is transferred to the Q0 Register. The Q1 Register contents are right shifted four places and transferred to the Q0 Register. The A Selector is gated to the T1 Register, and the A + 1 Selector to the T2 Register. The U + 1 Selector Designators are set for clearing U + 1 Register to the U + 1 Selector, and setting $S0_L$ Register to U + 1 Selector. The A Selector Designators are set for clearing the A Register to A Selector Bits 0 through 23, and setting the T3 Register to A Selector Designator. The A + 1 Selector Designators are set for clearing the A + 1 Register to A + 1 Selector Bits 0 through 17, and clearing the A + 1 Register to A + 1 Selector Bits 18 through 35, and setting the the T4 Register to A + 1 Selector Designator. Q0 Register Bits 30 through 35 are transferred to the A Register Bits 30 through 35. The T1 Excess to T3 Selector Designator is set. Adder 1 is transferred to the T3 Register, and Adder 2 is transferred to the T4 Register. The Q1 Register is cleared. The top 12 positions of the T3 Selector are transferred to the T3 Register. A constant, either $-2000_8$ or $-2001_8$ is transferred to the C1 Register. N Selector Bits 68 or 67 are left shifted three place and transferred to the C0 Register. The Q1 Register contents are left shifted one place and transferred to the Q0 Register. The T3 and T4 Registers are tested and the M = 0 Flip-Flop is set or cleared based on the test. If the mantissa is 0, or the C Adder is negative and D5 and C2 positive or D20 is cleared, the Q0 Register content is transferred to the T1 and T2 Registers. Otherwise, $SM_U$ is transferred to the T1 Register and $SM_L$ is transferred to the T2 Register. At the close of the branch selection is made to go to Branch 20.

BRANCH 15

The primary function of Branch 15 is to convert the mantissa to byte format, and to insert the sign in the least significant byte. In operation, it commences by setting the A Selector Designators for A Register to A Selector Bits 0 through 23 with the others cleared. The A + 1 Selector Designators are set for the A + 1 Register to A + 1 Selector Bits 0 through 35 transfer with the others cleared. The U Selector Designators, the U + 1 Selector Designators, and the T3 Selector Designators are all cleared. The C3 Selector Designators are set for the A Register to the C3 Selector Bits 24 through 35, with the others cleared. All of the C4 Selector Designators are cleared. The N Selector Designator is set for a constant to the N Selector transfer, with the others cleared. The SM Designator is set for the double right circular shift. If A Register Bit 34 is equal zero, the constant $-2000_8$ is transferred to the C1 Register, or if the A Register Bit 34 is equal to 1, the constant $-2110_8$ is transferred to the C1 Register. The Adder Designator is set for a 72-bit add. C3 Selector is transferred to the C2 Register. The Sign Store I Flip-Flop, the Minus Store I Flip-Flop, and the Minus Store IA Flip-Flop are all cleared, and a constant 2R is set. The complement of the C Adder is transferred to the C0 Register and left shifted three places. The K counter is set to 18 if the instruction is a 33, 17 instruction, or is set to 9 if the instruction is a 33, 16 instruction. $SM_U$ is transferred to the T1 Register, and $SM_L$ is transferred to the T2 Register. The C4 Selector is transferred to the C1 Register. The C2 Register is cleared. N Selector Bit 69 is left shifted three places and transferred to the C0 Register. Adder 1 is transferred to the T3 Register, and Adder 2 is transferred to the T4 Register. The BD Flip-Flop is set if Adder 1 Bit 35 is set, otherwise it is cleared. The constant 2R Designator is cleared. The U + 1 Selector Designators are set for ++ 1 Register to U + 1 Selector Bits 0 through 35. The A Selector Designators are set for T3 Register to A Selector transfer. A Selector Designators are cleared for an A Register to A Selector transfer. The A + 1 Selector Designators are cleared for the A + 1 Register to A + 1 Selector. The A + 1 Selector Designators are set for the T4 Register to A + 1 Selector transfer. The U Selector Designators are set for an A Register to U Selector Bits 0 through 35 transfer. The K counter lower rank is transferred to the K counter upper rank. The T3 and T4 Register contents are left shifted one place and entered into the T1 and T2 Registers. The T1 Register is transferred to the A Register. The T2 Register is transferred to the A + 1 Register. The K counter upper rank is transferred back to the K T1 lower rank. $SM_U$ is transferred to the T1 Register. $SM_L$ is transferred to the T2 Register. If K is 0, the Sign Store I Flip-Flop is set. The Minus Store IA Flip-Flop is set or cleared, with setting taking place if the Mantissa Negative Flip-Flop is set when K is 0. Adder 1 is transferred to the T2 Register. Adder 2 is transferred to the T4 Register. The BD Flip-Flop is set if Adder 1 Bit 35 is set, otherwise it is cleared. The A Selector Designators are set for clearing the T3 Register to A Selector Designator, and setting the U Register to A Selector Designator. The N Selector is gated to the U Register for T3 Register Bits 24 through 27 through the constant generator. T3 Selector Bits 24 through 30 are gated to the T3 Register. The A Selector is gated to the T1 Register. The Output Available Flip-Flop is set. The T1 Register is transferred to the H1 Register and the Write Enables are set for controlling writing. When the Sign Store I Flip-Flop is set, the sign is stored in the byte. If the Minus Store IA Flip-Flop is set, Minus Store II. When K is 0 the store chain is operated. Upon completion of the conversion, control is transferred to the Branch 16 control.

BRANCH 16

The primary function of Branch 16 is to select the magnitude of the exponent for conversion. The A Selector Designators are set for transferring the T Register to the A Selector with the others cleared. The T3 Selector Designators are set for transferring the H Selector to T3 Selector Bits 24 through 35, then others are cleared. All C4 Selector Designators are cleared. The H Selector Designators are set for +C Adder to H Selector transfer. The E Register is transferred to the C2 Register. The C4 Selector is transmitted to the C1 Register. If T3 Bit 23 is set, the Byte Round-Up Flip-Flop is set. This conditions the setting of the Byte Round-Up Flip-Flop depending upon whether the next byte of the mantissa would have been greater than or equal to 5. The H Selector Designators are set or cleared dependent upon the status of the C Adder. The T3 Selectors are transferred to the T3 Register. The A Selector is transferred to the T1 Register. T1 Register is transferred to the A Register. At the completion of Branch 16, there is conditioning for setting of Branch 17.

BRANCH 17

Branch 17 has as its primary function the binary-to-decimal conversion of the exponent, together with establishing and inserting the appropriate exponent sign in the converted byte string. The A + 1 Selector Designators are set for an A + 1 Register to A + 1 Selector Bits 0 through 35 transfer with the others cleared. The N Selector Designator is set for a constant to N Selector transfer. The Q1 Register is cleared. The Sign II Flip-Flop is set if the A Buffer Bit 35 is equal to 1. The Q1 Register contents are directed to the Q0 Register and left shifted one place in the process. $Q0_U$ Register is transferred to the T1 Register, and the $Q0_L$ Register is transferred to the T2 Register. The Exponent Negative Flip-Flop is cleared if T3 if equal to a positive 0. The control flip-flops, Sign Store I, Minus Store I, Minus Store IA are all cleared. The Constant 2R Designator is set.

The K counter is set to 12. The second K Counter Designator is set. The Divide chain cycles K times. The Digit Correction Selector is transferred to the T3 Register. The Digit Correction Selector is transferred to the T4 Register. K counter lower is transferred to the K counter upper. The A Register contents are transferred to the T1 Register and left shifted one place. A + 1 Register is transferred to the T2 Register and left shifted one place. If the A Register Bit 35 is equal to 1, the BD Flip-Flop is set. T1 Register is transferred to the A Register. T2 Register is transferred to the A + 1 Register. The K counter upper rank is transferred to the K counter lower rank. The T3 Register contents are left shifted one place and entered into the T1 Register. The T4 Register contents are left shifted one place and directed to the T2 Register. The state of the BD Flip-Flop is transferred to T20. When K = 0 there is a return from the divide cycle. The A Selector Designators are cleared for A Register to A Selector Bits 0 through 35. The N Selector is transferred to the C0 Register 44 (left three) if the instruction is a 33, 16 instruction, or 48 (left three) if a 33, 17 instruction is involved. The K counter is set to 2 if it is a 33, 16 instruction or to the value 3 if a 33, 17 instruction. The T2 Register is transferred to the A + 1 Register. The constant 2R Designator is cleared. $SM_L$ is transferred to the T2 Register. The first K Counter Designator is set. N Selector transfers the constant 68 left three places to the C0 Register. The chain cycles K times. The K counter lower rank is directed to the K counter upper rank. The Busy control flip-flop is cleared when K = 0. The T2 Register is transferred to the A + 1 Register. The K counter upper rank is transferred to K counter lower rank. $SM_U$ is transferred to the T1 Register. $SM_L$ is transferred to the T2 Register. The Sign Store I Flip-Flop is set if K = 0. The Minus Store IA Flip-Flop is set when K = 0 if the Exponent Negative Flip-Flop and the E Register is positive or the Exponent Negative Flip-Flop is not set and the E Register is negative. The Block Final Clear Flip-Flop is cleared when K = 0. The T1 Register is transferred to the H1 Register. to store the equivalent of T = 700. The Output Available Flip-Flop is set. The Write Enables are set for controlling the writing, and if Sign Store I is set, there is storage of the sign. When K is determined to equal 0, the chain is terminated.

BRANCH 18

In Branch 18, the A Selector Designators are set for transferring the A Register to the A Selector, with the others cleared. The A + 1 Selector Designators are set for transferring the A + 1 Register to the A + 1 Selector with the others cleared. The H1 and H2 Registers are transferred to the A and A + 1 Buffers. The Decimal Point Counter is transferred to the E Register, thereby clearing the E Register. A Buffer is transferred to the A Register. A + 1 Buffer is transferred to the A + 1 Register. The A Selector is transferred to the T1 Register. The A + 1 Selector is transferred to the T2 Register. Upon completion of Branch 18, the branching is conditioned normally to go to Branch 20.

BRANCH 19

The basic function of Branch 19 is to perform a double-precision floating-point multiply, with the results being directed to the T1 and T2 Registers. At the outset, the S0, V0, S1 and V1 Registers are cleared. The Sign I Flip-Flop is set if the U Buffer is negative, and the Sign II Flip-Flop is set if the A Buffer is negative. The U Selector Designators are set for U Register to U Selector Bits 0 through 23 transfer, sign to U Selector Bits 27 through 35, transfer and a sign to U Selector Bits 24 through 26 transfer with the others cleared. U + 1 Selector Designator is set for U + 1 Register to U + 1 Selector. The A Selector Designator is set for A Register to A Selector Bits 0 through 23, with the others cleared. A + 1 Selector Designators are set for A + 1 Register to A + 1 Selector bits 0 through 17 transfer, A + 1 Register to A + 1 Selector Bits 18 through 35 transfer, with others cleared. The C3 Selector Designators are set for A Register to C3 Selector Bits 27 through 35, and A Register to C3 Selector Bits 24 through 26, with others cleared. The C4 Selector Designators are set for the U Register to the C4 Selector Bits 27 through 35, and the U Register to C4 Selector Bits 24 through 26, with the others cleared. The N Selector Designator is set for a constant to N Selector. The H Selector Designators are set for +C Adder to H Selector. The SM Designator is set for double right circular shift, with SM upper characteristic enable for Bits 27 through 35, SM upper characteristic enable for Bits 24 through 26, and others cleared. The Adder Designator is set for a 72-bit add. The C4 Selector is transferred to the C1 Register. The C3 Selector is transferred to the C2 Register. The A Selector is transferred to the $Q0_U$ Register. The A + 1 Selector is transferred to the $Q0_1$ Register. The C3 Selector Designators are set for clearing the A Register to the C3 Selector Bits 27 through 35, clearing the A Register to the C3 Selector Bits 24 through 26, setting C0 Register to C3 Selector. The C4 Selector Designator is set for U Register to C4 Selector Bits 27 through 35, and U Register to C4 Selector Bits 24 through 26. The K counter is set. C Adder is transferred to the C0 Register. The Q0 Register is transferred to the Q1 Register. $V0_L$ Register is transferred to the A Register. The cycle then transfers to the multiply cycle. The K counter lower is transferred to the K counter upper. The −X Storage I Flip-Flop is set. Full Adder 2 is gated to the Q Buffer. THe S1 and V1 Registers are enabled. The Q1 Register R4 is transferred to the Q0 Register. The Q Buffer is transferred to the Q0. The K counter upper rank is transferred to K counter lower rank. The Q Carry 2 Flip-Flop is set. Set − Storage II Flip-Flop is set. Enables are applied to the S0 and V0 Registers. The Gate Q Buffer Flip-Flop is set if K = 1. The Full Adder 1 output is gated to Q Buffer 1. Q0 Register is transferred to the Q1 Register. The Q carry 1 flip-flop is set. Return from the multiply cycle. The A Selector Designators are set for A Register to A Selector Bits 27 through 35 and A Register to A Selector Bits 24 through 26. The U Selector Designators are set for clearing the U Register to U Selector Bits 0 through 23, clearing the sign to U Selector Bits 27 through 35, clearing the sign to U Selector Bits 24 through 26, setting $S0_U$ Register to U Selector. The C3 Selector is transferred to the C2 Register. The Full Adder is gated to the Q Buffer. $V0_U$ Register is transferred to the A Register. $V0_L$ Register is transferred to A + 1 Register. The Q Buffer is transferred to Q0 Register. The Q Register is directed to the Q0 Register and right shifted four places in the process. The A Selector is transferred to the T1 Register. The A + 1 Selector is transferred to the T2 Register. The U + 1 Selector Designators are set for clearing the U + 1 Register to U + 1 Selector, and setting the $S0_L$ Register to U + 1 Selector. The A Selector Designator is set to clear A Register to A Selector Bits 0 through 23, and to set the T3 Register to A Selector. The A + 1 Selector Designators are set to clear A + 1 Register to A + 1 Selector Bits 0 through 17, clear A + 1 Register to A + 1 Selector Bits 18 through 35, and setting the T4 Register to A + 1 Selector. Q0 Register Bits 30 through 35 are transferred to the A Register Bits 30 through 35. The T1 Excess to T3 Selector Designator is set. Adder 1 is directed to the T3 Register. Adder 2 is directed to T4 Register. The Q1 Register is cleared. The T3 Selectors are transferred to the top 12 bits of the T3 Register. A constant of either $-2000_8$ or $-2001_8$ are directed to the C1 Register. The Q1 Register is transferred to the Q0 Register and left shifted one place in the process. T3 and T4 are tested, for determining the setting or clearing of M = 0 Flip-Flop. Q0 Register is transferred to the T1 Register if the mantissa is 0 or the C Adder is negative and D5 and C2 positive or not D20, and for the same conditions Q0 Register is transferred to the T2 Register. If the conditions are not met, $SM_U$ is transferred to the T1 Register, and $SM_L$ is transferred to the T2 Register. At the conclusion of the branch, the operation would normally continue to Branch 8.

BRANCH 20

The $10^{-1}$ double-precision floating-point number enable to the Look-Up Table is set. The U and U + 1 Buffer Designators are set with a constant. The T1 Register is transferred to the A Register. The T2 Register is transferred to the A + 1 Register. The H and H2 Feed Back Flip-Flops are cleared.

Throughout the discussion of the various branches, there have been references to specific designated control flip-flops and certain specified designators. These circuits are available commercially, and have not been shown in detail. The descriptive references to the various flip-flops and designators defines the operation and the nature of the control, and the physical arrangements are readily discernible from the text material. It is of course apparent that the timing and gating functions provided by the control circuitry internal to the arithmetic unit are required to control the transfers and arithmetic operations referred to in the specific branch discussions. The specific timing and control sequencing will depend upon the type of electronic circuitry selected to implement the various circuits described.

BYTE FORMAT TO FLOATING-POINT FORMAT CONVERSION

Having considered the conversion from floating-point, either single-precision or double-precision, to byte formats above, attention will now be directed to the conversion from the byte format to either single-precision or double-precision floating-point formats.

The byte to single-precision floating-point format conversion is identified as instruction 33, 14, indicative of the *f*-field and *j*-field designation to select the instruction. The 33, 14 instruction converts an E String composed of N bytes of Fortran type input into a single-precision floating-point number. Either 8-bit ASCII, or 6-bit field data format of the input bytes must be used. The instruction may be terminated by detection of a format error, and the byte status word will indicate the type of error detected.

The byte format to double-precision floating-point format conversion is referred to as the 33, 15 instruction again indicating the *f*-field and *j*-field of values for selecting this instruction. The 33, 15 instruction converts an E String composed of N bytes in a Fortran type input into a double-precision floating-point number. Again, either 8-bit ASCII or 6-bit field data format must be used. This instruction also may be terminated by detection of format error.

Table XI lists the general input formats for byte to floating-point instructions, and is set forth below, together with notes as to limitations on the format of the input byte string.

TABLE XI

GENERAL INPUT FORMATS FOR BYTE TO FLOATING-POINT INSTRUCTIONS

| Fields: | B | MS | Byte String M | ED | ES | E |
|---|---|---|---|---|---|---|
| Legal Characters: | bbb... | ± | Digit, Decimal Point, or bbb... | Dbbb... or Ebbb... | ± | Digits or bbb... |

B Leading Blank (b) characters. Blanks in this field will be ignored.

TABLE XI—Continued

GENERAL INPUT FORMATS FOR BYTE TO FLOATING-POINT INSTRUCTIONS

| Fields: | B | MS | M (Byte String) | ED | ES | E |
|---|---|---|---|---|---|---|

| | |
|---|---|
| MS | Mantissa Sign: field may include one plus (+) or minus (−) character. |
| M | Mantissa: first digit or decimal point character indicates start of field. Blanks in this field will be interpreted as zeros. |
| ED | Exponent Delineator: field may include either a D or E character followed by blanks. Blanks in this field will be ignored. |
| ES | Exponent Sign: field may include one plus (+) or minus (−) character. |
| E | Exponent: field may include digits or blanks. Blanks in this field will be interpreted as zeros. |

NOTE:

Any of the fields may be included or omitted in the input byte string subject only to the limitations listed below:

1. The legal characters indicated for each field are the only allowable characters.
2. The Mantissa Sign (MS) and the Exponent Sign (ES) must be separated by at least one non-blank character.
3. The last character in the string cannot be a sign character.
4. Overflow will occur if the number is too large to represent in single-precision format for the Byte to Single Floating Conversion (*fj*/33,14) instruction or double-precision format for the Byte to Double Floating Conversion (*fj*/33,15) instruction.
5. Underflow will occur if the number is too small to represent in single-precision format for the Byte to Single Floating Conversion (*fj*/33,14) instruction or double-precision format for the Byte to Double Floating Conversion (*fj*/33,15) instruction.
6. Underflow will occur if the exponent alone is too small to represent in double-precision floating-point format.
7. The mantissa must be representable in 60 binary bits when it is interpreted as an integer, i.e., ignoring the decimal point.
8. The decimal point count (number of digits or blanks to the right of the decimal point) must not be greater than 31.
9. Two decimal points in the mantissa will be detected as an error.
10. At least one non-blank and one non-sign character must be included in the string.
11. If the last character is a decimal point, it must be preceded by at least one non-blank and one non-sign character.

For either the 33, 14 or 33, 15 instruction, BB1 contains the assumed decimal point count which is used if no decimal point is included in the byte string. Only the lower 5-bits of BB1 are used, with the upper 4-bits being ignored. BB1 is contained in SR3, as illustrated in FIG. 16*c*.

Examples of inputs for the 33, 15 instruction are shown in Table XII. This table illustrates some illegal inputs as well as interpretation of some example input byte strings.

TABLE XII

EXAMPLES OF INPUTS FOR fj/33,15 INSTRUCTION

| ILLEGAL INPUTS | COMMENT |
|---|---|
| bbbb | Significant character not found |
| bbb− | Sign last character or significant character not found |
| bb+bbb−3 | Signs not separated by non-blank character |
| 6.7543210987654 219876E2 | Mantissa too large |
| 9E−3 | Signs not separated by non-blank character. Also illegal character in exponent |
| 6.73.62E2 | Two decimal points in mantissa |
| 3.98765432109876 543210 987654321098765 | Decimal point count > 31 and mantissa too large |
| 87J3E4 | Illegal character |
| 27E3.6 | Illegal character in exponent |
| E406 | Overflow |
| 98765432.1+306 | Overflow |
| D−320 | Underflow |
| 987654321D−309 | Underflow even though the number is in the legal range |
| 19E+ | Sign last character |
| 216+ | Sign last character |
| 326DE2 | Illegal character in exponent field |
| −62.−E26 | Illegal character in exponent field |
| −bbb | Significant character not found |

TABLE XII A

| LEGAL INPUTS | COMMENT |
|---|---|
| 23Ebbbbbbbbb-3 | = 23*10**−3 |
| 23E-bbbbbb3 | = 23*10**−3 |
| bbbbb6.2-31 | = 6.2*10**−31 |
| bb+bbb3.1-6 | = +3.1*10**−6 |
| E61 | = 1*10**61 |
| 2.6 | |
| 4D6 | = 4*10**6 |
| bφE21 | will store all zero word |
| φ.φφb | will store all zero word |
| bb.bbE21 | will store all zero word |
| −bbE21 | =−10**21 |
| 23E | = 23*10**0 |
| 23Ebb | = 23*10**0 |
| +.E23 | = 10**23 |
| 312+bb | = 312**10**0 |
| .+26 | = 10**26 |
| .E | = 10**0 |
| bbb.b | will store all zero word |
| bbbD | = 10**0 |
| b32b6.1Eb2b | =3206.1*10**20 |
| +D+b | = 10**0 |

If errors are detected, the byte status word will indicate the type of error detected. Some examples of status word generation for the 33, 14 and 33, 15 instructions are shown in Table XIII.

TABLE XIII

EXAMPLE OF STATUS WORD GENERATION FOR fj/33,14 and 33,15 INSTRUCTIONS

| BYTE STRING | BYTE STATUS WORD BITS | | | | | | |
|---|---|---|---|---|---|---|---|
| | BIT 6 | BIT 5 | BIT 4 | BIT 3 | BIT 2 | BIT 1 | BIT 0 |
| 36E–492 | | X | | | | X | |
| bbbR236.15–3 | | | X | | | | X |
| bb32.67E2M | | X | | | | | X |
| bb32.R3E21 | | | | | | | X |
| 23.76.42–7 | | | | X | | | X |
| 56.3E–3,4 | | X | | | | | X |
| 298.76543219b7654321E–2 | | | | | X | | |
| 9876543.1E305 | | X | | | X | | |
| 978–3 | | X | | | | | X |
| b++32 | | | X | | | | X |
| 98765432.1E–308 | | X | | | | X | |
| bbbb | | | X | | | | |
| bbbb+ | | | X | | | | X |
| 3.263bb–436 | | X | | | | X | |
| .00000000000213–305 | | X | | | | X | |
| –62–E26 | | X | | | | | X |
| Decimal point count<31 | | | | X | | | |
| E23* | | | X | | | | |
| .E23* | | | X | | | | |
| bbER36 | | X | X | | | | X |
| –bbb. | | | | X | | | X |
| bbb.. | | | | X | | | X |
| bbb.b. | | | | X | | | X |
| +bbb–23 | | | X | | | | X |
| .–23* | | | X | | | | |

*These are legal, they will be converted to $10^{E}$.

The following are conditions that will cause status bits to be set for the identified instructions.

BYTE STATUS WORD

BIT 0 FORMAT ERROR
33,14 and 33,15

A. Two signs in string not separated by at least one non-blank character.
B. Two decimal points in mantissa.
C. Significant character not found.
D. Illegal character in string.
E. Illegal character in exponent.
F. Decimal point last character and no digit in string.
G. Sign last byte.

BIT 1 UNDERFLOW
33,14 Magnitude of input too small to represent in Single-Precision Floating-Point.
33,15 Magnitude of input too small to represent in Double-Precision Floating-Point.
33,14 and 33,15
Exponent negative and power of ten too small to represent in Double-Precision Floating-Point format.

There may be more than one type of error condition generated during the execution of the 33, 14 or 33, 15 instruction. Interpretation of the combinations of status bits is illustrated in Table XIV.

TABLE XIV

INTERPRETING COMBINATIONS OF STATUS BITS

| INSTRUCTION (fj code) | STATUS WORD BITS | ERROR |
|---|---|---|
| 33-14,15 | $4.\bar{0}$ | No digit in mantissa field (blanks after decimal point are considered digits). Hardware will store result as though mantissa equals "1". |
| 33-14,15 | 4.0 | No non-sign and non-blank character in string before error detected (byte count can be used to determine all blank cases, etc.). |
| 33-14,15 | $3.\bar{0}$ | Decimal point count>31. |
| 33-14,15 | $2.\bar{5}$ | Mantissa interpreted as integer too large to represent in 60 binary bits. |
| 33-14,15 | 2.5 | Magnitude of input too large to represent in single-precision floating-point (fj/33,14) or double-precision floating-point (fj/33,15) |
| 33-14,15 | 3.0 | Either two decimal points in mantissa or decimal point is last byte with no preceding digits. |
| 33-14,15 | $0.\bar{5}$ | Format error in mantissa field. |
| 33-14,15 | 0.5 | Format error in exponent field. |

NOTE:

Since more than 1 bit can be set as the result of a fault condition, certain combinations of bits can be used to distinguish particular errors. Note that the status bit and function code itself isolate most of the non $fj$/33,14 and 33,15 faults.

The largest floating-point number that can be represented in a standard 72-bit format is 3777.77 . . . 77, which is approximately $10^{307}$. Overflow detection for the 33,14 and 33,15 instructions is accomplished at several stages throughout the instruction operation.

The various stages of detection are as follows:

a. The exponent byte string is brought into the Arithmetic section and converted "on the fly" to binary integer format. If the binary integer is larger than can be represented in nine binary bits, then a byte overflow error will be detected. This limits the largest exponent value to $777_8 = 511_{10}$.

b. The exponent is corrected for the decimal point count by subtracting the decimal point count from the exponent value if the exponent is positive; or by increasing the magnitude of the exponent by the decimal point count if the exponent is negative. The result is converted back to decimal byte format. If this value is greater than $400_{10}$, a byte overflow error is detected. Note that the decimal point count is limited to five binary bits. Therefore, the largest exponent possible, before the error detect, is $542_{10}$. The largest possible exponent after the error detect is $399_{10}$. Leading zeroes are permissible for the byte and exponent fields, but a decimal point cannot be placed in the mantissa such that it would give a count greater than $31_{10}$.

c. The power of 10 generated by paragraph *b* above is expanded using a 72-bit double-precision floating-point look up table. The largest number which may be generated using the look up table is $10^{399}$. However, during the multiplies involved in generating the number, normal characteristic overflow detection will generate a byte fault for those numbers greater than 3777.77 . . . 77, but less than $10^{399}$.

d. The mantissa which has been converted to a double-precision floating-point number prior to paragraph *a* is then multiplied by the floating-point representation of the exponent (if the exponent is positive). If the exponent is negative, it is divided into the mantissa. Again normal characteristic underflow or overflow detection for floating-point multiply and divide would be indicated by a byte fault. The 33,15 instruction would be complete at this point.

e. For the 33,14 instruction, a final compress from double-precision to single-precision floating-point is made. Normal characteristic overflow or underflow detection will indicate a byte fault for those numbers representable in double, but not single-precision format.

Turning now to a consideration of the byte format to single-precision or double-precision floating-point format conversion apparatus, attention is directed to FIG. 42 which is a block diagram illustrating the operations performed and the branching conditions. As described in conjunction with the 33,16 and 33,17 instruction, the conversion process for the 33,14 and 33,15 instructions takes place wholly within the arithmetic section. When a 33,14 or 33,15 instruction is called out by the program being run in the command arithmetic unit, there is the translation of the various fields of the instruction word. The translation is done in control, and includes the generation of the address for securing the byte string that is to be converted. The control reads out the byte string to be converted, and supplies the initiating control signals and the byte that is to be converted to the arithmetic section. At that time, the arithmetic section takes over, and performs the conversion in accordance with the control that is generated in the various selected branches. The conversion takes place without intervention of the programmer, or the necessity of execution of any overhead type instructions.

Upon the translation of the function code, the *f*-field and the *j*-field, and the availability of the addressed byte string, the conversion process is started. The first basic operation is to wait for the availability of a complete byte, as indicated by Block 700, and upon availability of a byte, Branch 1 is entered. Branch 1 has as its basic operation the detecting of the type of character available, and checking the characters for format errors, as indicated by Block 702. When a character has been detected and found to be free of format errors, Branch 2 is entered and one byte is converted, as indicated at Block 704. Depending upon the state of the control flip-flops, the process either returns to Branch 1 to read in another character, or proceeds to pack the mantissa into a double-precision floating-point format in the Branch 3 operation, as indicated by Block 706. Again, depending upon the state of the various control indicators, the path of the operation is selected. If more characters are coming, but one is not yet available, the process stops and waits for one byte, as indicated by Element 708. Once the next byte is available, the process enters Branch 4 where the byte is evaluated to detect the character identification, and to check for format errors, as indicated by Block 710. When a byte for the exponent has been detected and found to be free of format errors, it is provided as the input for Branch 5 where one byte of the exponent is converted, as indicated by Block 712. Upon completion of the conversion of one byte, the process either stops to wait for the next byte, as indicated by Element 714, or proceeds to Branch 6 to correct the exponent for the decimal point, as indicated by Block 716. Branch 7 performs a binary-to-byte conversion, as indicated by Block 718. Branch 8 evaluates the exponent and sets the exponent limit, and generates constants utilizing the Look Up Table, as indicated by Block 720. Based on an evaluation of two digits of the exponent, the decision is made to either enter Branch 9 to perform a double-precision floating-point multiply, as indicated by Block 722, or to enter Branch 10 to select constants based on a further evaluation of the digits of the exponent, as indicated by Block 724. Again, based upon an evaluation of digits of the exponent, the decision is made whether to enter Branch 11 to perform a double-precision floating-point multiply, as indicated by Block 726, or to go directly to Branch 12 to select constants for further calculation, as indicated by Block 728. Depending upon the sign of the exponent, the decision will be made whether to enter Branch 13 to perform a double-precision floating-point divide, as indicated by Block 730, or to enter Branch 14 to perform a double-precision floating-point multiply, as indicated by Block 732. For 33,15 instruction, the process is then completed and the exit from the instruction to the generation of the status word is accomplished. However, if it is a 33,14 instruction, it is necessary to enter Branch 15 to compress the results to single-precision floating-point format, as indicated by Block 734, before exiting from the conversion portion of the sequence.

FIGS. 43*a*, 43*b*, 43*c*, and 43*d*, when arranged as shown in FIG. 43, describe the branch selection logic for the 33,14 and 33,15 instructions. The Branch Designator Flip-Flops are the same flip-flops as described above, but the branches designated differ from the branches described above, and are selected by the combination of the particular branch designator that is set, in conjunction with the function code selection of the 33,14 or 33,15 instruction. It should be understood, therefor, that even though the same branch numbers exist for the 33,14 and 33,15 instructions as exist for the 33,16 and 33,17 instructions, they are in fact different sequences of control logic. It will be recalled from above, that the branch selection designators are actually probed in parallel, with only one branch flip-flop designator being set at any given time. This is even though the diagram of the branch selection logic indicates a serial testing of the branch designators. The serial showing is merely for ease of describing the sequencing of the setting and performance of the designated branch operations.

The branch selection logic for the 33,14 and 33,15 instructions is commenced by the master clear condition. At the outset, a plurality of control and indicating flip-flops are either set or cleared to conditions to put them in a known state for evaluation during the various branch operations. The setting and clearing of these flip-flops together with the setting of the BR1 Designator is set forth in Block 740. The various control and indicating flip-flops referred to in Block 740 are of the commonly known bistable type, and are not specifically shown, but are described as to their functional and operational relationship to the control circuitry within the arithmetic unit.

Having initialized the control and designating flip-flops, and set BR1 Designator, the decision is made as to whether this is the start of the branch selection logic operation, as indicated by Block 742. Since this is the start operation, Branch 1 is entered. FIGS. 44*a*, 44*b*, 44*c*, and 44*d*, when arranged as shown in FIG. 44, comprise the diagrammatic representation of the operations and calculations performed during the Branch 1 sequence. The primary function of the Branch 1 sequence is to detect a character for the mantissa, identify the character, and evaluate format errors that might exist. At the start of Branch 1, it is necessary to determine that all resident bits are set, as indicated by Block 744, the status of the resident bits advising as to whether or not a complete byte is available for conversion. When the resident bits are all set, there is a new byte in the U Buffer, which is evaluated to determine if it is the last byte, and if so, the Last Byte Flip-Flop is set, as indicated by Block 746. Once the evaluation has been accomplished, the arithmetic chain is started, as indicated by Block 748. The Function Decode 2 Register is loaded, as indicated by Block 750, and the value M equal to 1 is established as the estimated mantissa, as indicated by Block 752. Having set the estimated mantissa, the test is made as to whether or not the Last Byte Flip-Flop is set, as indicated by Block 754. If the Last Byte Flip-Flop is set, set the Bytes Equal 0 Flip-Flop, as indicated by Block 756. If the Last Byte Flip-Flop is not set, the character detectors are probed in parallel. Again, the description of the detection of the identity of the character will be described as a serial process, but in actuality, the byte is applied to the detector circuitry, with the combination of bits in the byte resulting in a unique output that will set the appropriately actuated identifying flip-flop, while clearing all other identifying flip-flops. The evaluation is made as to whether the byte is a digit character, as indicated by Block 758, and if so, the Digit Flip-Flop is set, as indicated by Block 760, while clearing all other character detector flip-flops. If the byte is not a digit, the decision is made as to whether the byte is a blank, as indicated by Block 762. If it is a blank, the Blank Flip-Flop is set, as indicated in Block 764, while clearing all other character detect flip-flops. If the byte is not a blank, the decision is made as to whether the byte is a + character, as indicated by Block 766, and if so, the Separate + Flip-Flop is set, as indicated by Block 768, while clearing all other character detect flip-flops. If the byte is not a + character, the decision is made as to whether it is a − character, as indicated by Block 770. If it is a − character, the Separate − Flip-Flop is set, as indicated by Block 772, while other character detect flip-flops are cleared. The next evaluation is to whether or not the byte is a decimal point character, as indicated by Block 774, and if so, set the Decimal Point Flip-Flop, as indicated by Block 776, while clearing all other character detect flip-flops. Finally, the evaulation is made whether the byte is a D or E character, as indicated by Block 778. If a D or E character, set the D or E Flip-Flop, as indicated by Block 780, and clear all other character detect flip-flops. If none of the mentioned characters are identified, all character detect flip-flops are cleared, as indicated by Block 782, and the process proceeds to set the Block Final Clear Flip-Flop as indicated by Block 784. This operation results in inhibiting the final clear that normally occurs at the completion of an instruction, and permits the storage sequences to be entered, without terminating the conversion processes being carried forward in the Arithmetic Section. The decision is then made whether the Separate + Flip-Flop or Separate − Flip-Flop are set, as indicated by Block 786. If either is set, the test is made as to whether the Bytes = 0 Flip-Flop is set, as indicated by Block 788. If this condition is also found to exist, the Format Error Flip-Flop is set, as indicated by Block 790, and the Flip-Flop is terminated as indicated by Block 792. Upon termination, the operation proceeds to establish the status word, starting at reference S, which will be described in more detail below. If the Bytes = 0 Flip-Flop is not set, the test is made as to whether the Sign Last Significant Character Flip-Flop is set, as indicated by Block 794. Reference back to the permissible arrangement of characters, will indicate that if the sign is the last detected significant character, it is a format error. Therefore, if this condition is found to exist, the entry will again be made to set the Format Error Flip-Flop as indicated at Block 790 and to terminate the instruction as indicated at Block 792. If the decision is made that it is neither a Separate + Flip-Flop or Separate − Flip-Flop, nor is the Sign Last Significant Character Flip-Flop set, the determination is made as to whether the Decimal Point Flip-Flop is set, as indicated by Block 796. If the Decimal Point Flip-Flop is set, the evaluation is made as to whether the Decimal Point Found Flip-Flop is already set, as indicated by Block 798. If so, the Decimal Point Overflow Flip-Flop is set, as indicated by Block 800, and the instruction again exits through the format error route. The next evaluation is whether the Bytes = 0 Flip-Flop is set, as indicated by Block 802. If so, a further test is made as to whether the Significant Character Found Flip-Flop is clear, as indicated by Block 804. If clear, the format error condition again has arisen, and the instruction exits to the format error termination path F. The basic format checks having been made, the next evaluation is whether the First Byte Flip-Flop is set, as indicated by Block 806. If so, the No Digit Mantissa Flip-Flop is set, and the decimal point counter is set to 0, as indicated by Block 808. An evaluation is then made as to whether or not the Digit Flip-Flop or the D or E Flip-Flop or the Decimal Point Flip-Flop is set, as indicated by Block 810. If so, set the Significant Character Found Flip-Flop, as indicated by Block 812, and continue the evaluation. A test is then made as to whether the Separate − Flip-Flop is set, as indicated by Block 814, and if so, a further evaluation is made as to whether the Significant Character Found Flip-Flop is set, as indicated by Block 816. In the absence of the Significant Character Found Flip-Flop being set, the Exponent − Flip-Flop is set, as indicated by Block 818. If the Significant Character Found Flip-Flop is set, the Mantissa Negative Flip-Flop is set, as indicated by Block 820. The test is then made as to whether the Decimal Point Flip-Flop is set, as indicated by Block 822, and if so, set the Decimal Point Found Flip-Flop, as indicated by Block 824. If the Decimal Point Flip-Flop is not set, continue to test whether the D or E Flip-Flop is set, as indicated by block 826. If so, set the Exponent Found Flip-Flop as indicated by Block 828, and continue with the operation. If the D or E Flip-Flop is not set, the test is made as to whether the Separate − Flip-Flop or Separate + Flip-Flop are set in conjunction with the Significant Character Found Flip-Flop being set, as indicated by Block 830. If this condition is met, again the Exponent Found Flip-Flop is set, as indicated by Block 828. If not, the process continues. An evaluation is then made as to whether the 12- or 18-bit mode bit is set, as indicated by Block 832. As indicated above, the conversion of the 33,14 or 33,15 instruction is limited to converting 6-bit or 8-bit bytes. Therefore, if the 12-bit or 18-bit mode bit is set, the Mode Error Flip-Flop is set, as indicated by Block 834, and the instruction proceeds to T to terminate the instruction. If the instruction is continuing, the evaluation is made as to whether the Bytes = 0 Flip-Flop is set and the Significant Character Found Flip-Flop is clear, as indicated by Block 836. If this condition exists, there is a format error and the instruction exits to point F to set the Format Error Flip-Flop and terminate. If the instruction is continuing, the evaluation is made as to whether the Blank Flip-Flop, the Digit Flip-Flop, the Decimal Point Flip-Flop, the D or E Flip-Flop, the Separate + Flip-Flop, and the Separate − Flip-Flop are all clear, as indicated by Block 838. If so, there is again a format error and the instruction exits to point F. An evaluation is then made as to whether the Separate + Flip-Flop or Separate − Flip-Flop is set, as indicated by Block 840. If either is set, set the Sign Last Character Found Flip-Flop as indicated by Block 842. If neither the Separate + Flip-Flop nor Separate − Flip-Flop is set, the test is made as to whether the Blank Flip-Flop is clear, as indicated by Block 844. If so, clear the Sign Last Character Flip-Flop, as indicated by Block 846, and proceed to test is Bytes = 0 Flip-Flop set as indicated by Block 848. If the Bytes = 0 Flip-Flop is set, there is exit to BR to return to the branch selection logic for continuation with the conversion instruction. If the Bytes = 0 Flip-Flop is not set, the evaluation is made as to whether the Significant Character Found Flip-Flop is set and the Decimal point Flip-Flop is clear, as indicated by Block 850. If this condition is found to exist, the branch is terminated and control is returned to BR for selecting the next operational branch. If not, however, the sequence returns to G to read in another mantissa byte and repeat the evaluations that have just been described. This operation will continue until the mantissa has been completed, or until a format error exists.

Having completed Branch 1, and having returned to the branch selection logic, an evaluation is made as to whether BR1 is set, as indicated in Block 852. If so, an evaluation is made as to whether the Significant Character Found Flip-Flop is set and the Blank Flip-Flop is set, as indicated by Block 854. If this condition is satisfied, the BR2 Designator is set, as indicated by Block 856, and all other branch designators are cleared. The control is then transferred to Branch 2 for operation. Before considering Branch 2, however, the condition should be considered where either the Significant Character Found Flip-Flop or the Blank Flip-Flop or both are clear. In any of these cases, the test is made as to whether the Digit Flip-Flop is set, as indicated by Block 858. If the Digit Flip-Flop is set, the Branch Designator 2 is again set.

Having set Branch Designator 2, control is transferred to Branch 2. FIG. 45 is the diagrammatic representation of the arithmetic operations and control operations performed in Branch 2. The basic function of Branch 2 is to convert one byte of the mantissa to a binary format and to accumulate the converted portions of the mantissa as they are generated. There is basically one cycle of Branch 2 for each byte of the mantissa in the byte string that is being converted. The first step is to execute one cycle of byte-to-binary integer conversion, setting M equal to the result, as indicated by Block 860. This conversion is accomplished by a left shift of 3, being the equivalent of multiplying times 8, and a left shift of 1, being the equivalent of multiplying times 2, the combination of the shifts and adds being equivalent of multiplying by 10. The converted byte is accumulated with the other bytes of the mantissa that have been converted. Having performed one cycle of conversion, the No Digit In Mantissa Flip-Flop is cleared, as indicated by Block 862. The First Byte Flip-Flop is also cleared as indicated by Block 864. A test is then made to determine if the Decimal Point Flip-Flop is set, as indicated by Block 866, and if so, the decimal point counter is incremented as indicated by Block 868. Having added 1 to the decimal point counter, the evaluation is made as to whether the decimal point counter is = to 0, as indicated by Block 870. The decimal point counter is a 5-bit counter, and if it has been incremented enough times to again read 0, it has exceeded the allowable count, and the Decimal Point Overflow Flip-Flop is set, as indicated by Block 872. If the overflow condition exists, the branch is terminated and control is returned to point T in Branch 1 for termination of the instruction. If the Decimal Point Found Flip-Flop is not set, and the decimal point counter is = to something other than 0, the test is made as to whether the result of the byte-to-binary conversion resulted in a converted mantissa having more than $60_{10}$ binary bits, as indicated by Block 874. If so, set the Byte Overflow Flip-Flop, as indicated by Block 876, and exit to point T in Branch 1 for terminating the instruction. If the mantissa is expressed in 60 or less bits, the branch exits to BR for further conversion. Returning to a consideration of the branch selection logic for the 33,14 and 33,15 instruction, and before considering further evaluation of the branch designators, the condition should be considered where the Digit Flip-Flop is not set, at Block 858, in which case Branch 2 is not entered, but instead, a test is made of the Bytes = 0 Flip-Flop to determine whether it is set, as indicated by Block 878. If the Bytes = 0 Flip-Flop is set, the operation is to set BR3, as indicated by Block 880, and to exit to Branch 3. However, if Bytes = 0 Flip-Flop is not set, a test is made to determine if the Exponent Found Flip-Flop is set, as indicated by Block 882. If so, the Branch 3 Designator is set, and Branch 3 is entered.

Upon the return from Branch 2, the test of the branch designators is made, and the response to the probe of Branch 2, as indicated at Block 884, will indicate that Branch BR is set. This results in an evaluation as to whether the Bytes = 0 Flip-Flop is set, as indicated at Block 886. If it is set, BR3 is set as indicated at Block 888, and control is passed to the Branch 3 operation. If the Bytes = 0 Flip-Flop is not set, the Designator BR1 is set as indicated at Block 890, and Branch 1 is repeated.

FIG. 46 is a diagrammatic representation of the arithmetic operations and control functions performed in Branch 3. In summary, Branch 3 is entered when it has been determined that the mantissa read in has been completed, or there has been an exponent detected. Branch 3 functions to pack the mantissa into a double-precision floating-point format. At the outset the C1 Register is loaded with a constant $1764_8$ for bias. This relationship is determined by subtracting $14_8$ from $2000_8$, $14_8$ being the equivalent of $12_{10}$ characteristic positions. The loading of the C1 Register is shown at Block 892. As mentioned above, BB1 can have the assumed decimal point count, that is the number of digits to the right of the decimal point in the mantissa, stored for reference. The actual decimal point count will override the value of BB1. Having set the C1 Register, an evaluation is made as to whether the function is a 35,15 instruction, and Bytes = 0 Flip-Flop is set, and the Decimal Point Found Flip-Flop is clear, and BB1 is = to 0, as indicated by Block 894. If this condition exists, the Block Final Clear Flip-Flop is cleared, as indicated by Block 896, but if the condition is not met, an evaluation is made as to whether the mantissa is = to 0, as indicated by Block 898. If the mantissa is 0, set M = 0 Flip-Flop, as indicated by Block 900.

The mantissa is applied to the normalizer, which provides a shift count to define the required number of shift operations to achieve a normalized value. The characteristic is adjusted to the value of the normalizer count + the bias $1764_8$, as indicated by Block 902. The mantissa is shifted and packed with the characteristic to form the normalized double-precision floating-point format operand, as indicated by Block 904. A test is then made to determine whether M = 0 Flip-Flop is set or the Mantissa Negative Flip-Flop is clear, as indicated by Block 906. If this condition is not met, set M = −M, as indicated by Block 908. A test is then made to determine if the Block Final Clear Flip-Flop is clear, as indicated by Block 910, and if not, the result is set to the General Register Stack, as indicated by Block 912, and control is returned to T in Branch 1 to terminate the instruction. If the Final Clear Flip-Flop is not clear, control is returned to BR for further operation.

Having completed Branch 3, and returned to the branch selection logic, the test is made as to whether BR3 is set, as indicated by Block 914. The test is then made as to whether the Bytes = 0 Flip-Flop is clear, as indicated by Block 916, and if so, set BR4, as indicated by Block 918.

FIGS. 47*a* and 47*b*, when arranged as shown in FIG. 47 illustrate the diagrammatic arrangement of the arithmetic and control operations performed in Branch 4. Branch 4 has as its primary function the character detection and evaluation of the bytes of the exponent, together with detection of format errors. At the outset it is necessary to determine if all of the resident bits are set, as indicated by Block 920, to determine whether a full byte is available for evaluation. When the resident bits are all set, there is a new byte in the U Buffer, and if it is determined to be the last byte, set the Last Byte Flip-Flop, as indicated by block 922. The arithmetic chain is started, as indicated by Block 924, and a test is made to determine if the Last Byte Flip-Flop is set as indicated by Block 926. If the Last Byte Flip-Flop is set, set the Bytes = 0 Flip-Flop, as indicated by Block 928, and continue with the conversion. In either event, there is a parallel evaluation of the character detectors, as described above. These detectors will be described individually, but it should be understood that the character selection proceeds simultaneously. A first decision is made as to whether the byte is a digit character, as indicated by Block 930. If so, set the Digit Flip-Flop, as indicated by Block 932, and clear the other character detector flip-flops. If it is not a byte character it is determined whether the byte is a blank, as indicated by Block 934. If so, set the Blank Flip-Flop, as indicated by Block 936, and clear the other character detector flip-flops. The test is made to determine whether the byte is a + character, as indicated by Block 938, and if so, set the Separate + Flip-Flop as indicated by Block 940. Finally, a test is made as to whether the byte is a − character, as indicated by Block 942. If so, set the Separate − Flip-Flop, as indicated by Block 944, and clear the other character detector flip-flops. If no character is identified within the grouping just described, all of the character detector flip-flops are cleared, as indicated by Block 946. The test is then made to determine whether the Separate + Flip-Flop or Separate − Flip-Flop is set, as indicated by Block 948. If so, set the Sign Last Character Flip-Flop as indicated by Block 950. The test is then made whether the Bytes = 0 Flip-Flop is set, as indicated by Block 952, and if so, exit to fault point F in BR1 for terminating the instruction. If the Bytes = 0 Flip-Flop is not set, the test is made whether the Sign Last Significant Character Flip-Flop is set, as indicated by Block 954. Again, if the Sign Last Significant Character Flip-Flop is set, there is an exit to fault point F in BR1 for terminating the instruction. If the Separate + Flip-Flop or Separate − Flip-Flop are not set, a test is made as to whether the Blank Flip-Flop is clear, as indicated by Block 956. If clear, clear the Sign Last Significant Character Flip-Flop, as indicated by Block 958. The test is made whether the Separate − Flip-Flop is set, as indicated by Block 960, and if so, set the Negative Exponent Flip-Flop, as indicated by Block 962. If the Separate − Flip-Flop is not set, the test is made as to whether the Blank Flip-Flop and the Separate + Flip-Flop and the Separate − Flip-Flop and the Digit Flip-Flop are all clear, as indicated by Block 964. If all of these flip-flops are clear, exit is to fault point F in Branch 1. If not, control is returned to BR.

Returning to the branch selection logic consideration of FIG. 43, the evaluation is made as to whether BR4 is set, as indicated by Block 966. If so, a test is made as to whether the Bytes = 0 Flip-Flop is set or the Digit Flip-Flop is set, as indicated by Block 968. If not, set BR4, as indicated by Block 970, and return to the control of BR4 as just described. If either Bytes = 0 Flip-Flop is set or Digit Flip-Flop is set, set BR5, as indicated by Block 972 and proceed to execute Branch 5.

FIG. 48 is the diagrammatic representation of the arithmetic and control operations performed in Branch 5. The control operates to execute one cycle of byte-to-binary integer convert, setting P = result, as indicated in Block 974. A test is then made whether the Last Byte Flip-Flop is set, as indicated by Block 976, and if so, set Bytes = 0 Flip-Flop as indicated by Block 978. A test is made as to whether the byte is a digit character, as indicated by Block 980. If it is a digit character, set the Digit Flip-Flop, as indicated by Block 982, and clear the other character detector flip-flops. If the byte is not a digit character, a test is made as to whether the byte is a blank, as indicated by Block 984. If the byte is a blank, set the Blank Flip-Flop, as indicated by Block 986, and clear the other character detect flip-flops. After evaluating the byte for character identification, a test is made as to whether the Digit Flip-Flop and Blank Flip-Flop are both clear, as indicated by Block 988. If they are, exit to fault point F in BR1. If not, a test is made as to whether P is greater than nine binary bits, as indicated by Block 990. This test limits the exponent to $511_{10}$, and is a part of the overflow detection described above. If P exceeds 9 binary bits, set the Byte Overflow Flip-Flop, as indicated by Block 992, and exit to point T in BR1 for terminating the instruction. Otherwise, test to determine if the Bytes = 0 Flip-Flop is set, as indicated by Block 994, and if not, wait for control to send a new byte to the U Buffer as indicated by Block 996. A test is made as to whether all resident bits are set, as indicated by Block 998, and when set, proceed to convert the byte just supplied to the U Buffer. BR5 continues to cycle until all bytes have been read and converted, at which time the Bytes = 0 Flip-Flop will be set, and control will be returned to BR.

Returning to a consideration of the branch selection logic of FIG. 43, after having considered the operation of Branch 5, a test will be made as to whether BR5 is set, as indicated by Block 1000. If so, set BR6, as indicated by Block 1002, and proceed to execute Branch 6.

FIG. 49 is the diagrammatic representation of the arithmetic and control operations performed in Branch 6. The basic function of Branch 6 is to correct the exponent for decimal point considerations. At the outset, a test is made as to whether the decimal counter is = 0, as indicated by Block 1004. If so, a test is made as to the Negative Exponent Flip-Flop being set, as indicated by Block 1006. If the Negative Exponent Flip-Flop is set, transfer the count in BB1 to E, as indicated by Block 1008. If the Negative Exponent Flip-Flop is not set, transfer the negative value of the count in BB1 to E as indicated by Block 1010. If the decimal counter was equal to some value other than 0, as indicated at Block 1004, a test is made as to whether the Negative Exponent Flip-Flop is set, as indicated by Block 1012. If the Negative Exponent Flip-Flop is set, the decimal point count is transferred to E, as indicated by Block 1014. If the Negative Exponent Flip-Flop is not set, the negative decimal point count is transferred to E, as indicated by Block 1016. Having selected the quantity to be stored in the E Register, the value P is calculated as the sum of P calculated in Branch 5, + the value stored in the E Register, as indicated by Block 1018. The test is then made as to whether the Negative Exponent Flip-Flop is set, as indicated by Block 1020, and if so, set the Characteristic Negative Flip-Flop as indicated by Block The correction has been made for the decimal point count, and control is returned to BR.

Returning to the branch selection logic of FIG. 43, attention is directed back to the conditions and testing done following the determination that BR3 had been set, as determined by Block 914. It will be recalled that when the Bytes = 0 Flip-Flop was tested to be clear, as indicated by Block 916, the branch was taken to BR4. If at that time, it had been determined that the Bytes = 0 Flip-Flop was not clear, a determination would have been made as to whether the Decimal Point Found Flip-Flop was set or whether BB1 was not = 0, as indicated by Block 1026. If that condition was found to exist, BR6 would be set, as indicated by Block 1028, and Branch 6 would have been entered at that time. This would have resulted in Branch 4 and Branch 5 not having been performed. In the event that the Decimal Point Found Flip-Flop has been determined to have been cleared, or BB1 had been determined to be = to 0, the control would have gone immediately to set BR15, as determined by Block 1030, and control would have passed to execute Branch 15.

FIG. 58 is a diagrammatic representation of the conversion operation that is accomplished during Branch 15. The operation of Branch 15 is to compress the results of the byte to floating-point conversion from a double-precision floating-point result to a single-precision floating-point number, as indicated by Block 1032. This conversion operation is essentially the double-precision to single-precision floating-point conversion described and set forth in detail in U.S. Pat. No. 3,389,379, entitled "Floating-Point System: Single and Double Precision Conversions" invented by Gerald J. Erickson and Thomas C. Tollefson, and assigned to the assignee of the present invention. Having made the double-precision to single-precision floating-point conversion, Branch 15 terminates at point H in BR3 where the results are sent to the General Register Stack, and from where the status word is generated and the instruction terminated. If those conditions giving rise to entry to Branch 15 at this time had been met, the instruction would now be completed.

Returning to a consideration of the branch selection logic of FIG. 43, and now assuming that Branch 6 had just been completed, a test of the branch designators would indicate that Branch 6 is set, as indicated by Block 1034. This would result in BR7 being set, as indicated by Block 1036, and control would pass to execute BR7.

FIG. 50 is the diagrammatic representation of the arithmetic operation performed in Branch 7, and is the binary-to-byte conversion of P′, as calculated in Branch 6, to $P'_{10}$ and is = to D3 D2 D1, as indicated by Block 1038. The binary-to-byte conversion involves the process of left shift by 1, and the evaluation of each 4-bit grouping other than the lowest ordered 4-bits for being equal to or greater than 5. When the condition that the highest ordered 4-bits is equal to or greater than 5, 3 is added to the highest ordered 4-bits and the shifting is continued. The following example illustrates the conversion process, and converts the number $25_8$ which is equal to $10101_2$ into the binary coded decimal number $21_{10}$. The following example illustrates the steps of the conversion process.

1022. If the Negative Exponent Flip-Flop is not set, set P′ = to the magnitude of P, as indicated by Block 1024.

EXAMPLE IV

| | XXXX | $10101 = 25_8$ | |
|---|---|---|---|
| | 0001 | 0101 | left 1 |
| | 0010 | 101 | left 1 |
| | (101) | 01 | left 1 |
| | +11 | | $101 \geq 5$ so add 3 |
| | 1000 | 01 | left 1 |
| 1 | 0000 | 1 | left 1 |
| 10 | 0001 | | |
| 2 | 1 | | |

$21_{10} = 25_8$

Upon completion of the conversion, control is returned to BR.

Returning now to a consideration of the branch selection logic of FIG. 43, a test of the branch designators will indicate that BR7 is set, as indicated by Block 1040. This condition results in BR8 being set, as indicated by Block 1042, with control being transferred to BR8.

FIG. 51 is the diagrammatic representation of the control evaluations and the generation of constants performed in Branch 8. At the outset, Bit 10 of $P'_{10}$ is evaluated to determine whether it is set or not, as indicated by Block 1044. This evaluation determines whether or not the exponent will exceed 399. The bit positions for $P'_{10}$ are

| | | X | X | X | X | X | X | X | X | X | X |
|---|---|---|---|---|---|---|---|---|---|---|---|
| 11 | 10 | 9 | 8 | 7 | 6 | 5 | 4 | 3 | 2 | 1 | 0 |

$P'_{10}$ BIT POSITIONS

If Bit 10 is found to be set, set the Byte Overflow Flip-Flop, as indicated by Block 1046, and exit to T in Branch 1 for terminating the instruction. If the exponent is within limits, generate $10^{D3 \times 100}$, using the Look-Up Table, thereby generating a double-precision floating-point number, as indicated by Block 1048. Then the branch operates to generate the constant $10^{D2 \times 10}$ using the Look-Up Table, as a double-precision floating-point number, as indicated by Block 1050. Having tested the exponent to make sure that it is within limits, and having generated the constants, control is returned to BR.

Returning to a consideration of the branch selection logic of FIG. 44, a test of the branch designators will indicate that BR8 is set, as indicated by Block 1052. This will result in a testing of digits of the exponent, where the test is whether D2 is = to 0 or D3 is = to 0, as indicated by Block 1054. If neither is = to 0, set BR9, as indicated by Block 1056, and execute the function of BR9.

FIG. 52 is the diagrammatic representation of the arithmetic operation performed in Branch 9. Branch 9 is the operation of a double-precision floating-point multiply of the constant values selected in BR8, and representative of $10^{D3 \times 100} \times 10^{D2 \times 10}$, which = $10^{D3D2.0}$, the quantity being defined as Q. This floating-point multiply is represented by Block 1058. Having completed the multiply, control is returned to BR.

Returning to a consideration of the branch selection logic of FIG. 43, it will be seen that if BR9 is executed, and the branch selectors are tested, that it will be determined that BR9 is set, as determined by Block 1060. This will result in BR10 being set, as indicated by Block 1062. When the digits of the exponent were tested at Block 1054, if it was determined that either D2 or D3 = 0, BR10 would have been set, as indicated by Block 1064, and Branch 10 would have been entered. The double-precision floating-point multiply executed during Branch 9 operates automatically to detect overflow for the case between $308_{10}$ and $399_{10}$.

FIG. 53 is the diagrammatic representation of the evaluation of the digits of the exponent, together with the selection of constants to be used in further calculation. Upon entry in BR10, an evaluation is made as to whether D3 = 0 or D2 = 0, as indicated by Block 1066. If either or both = 0, the determination is made whether D3 = 0, as indicated by Block 1068. If D3 does not = 0, the constant H is selected = $10^{D3 \times 100}$, as indicated by Block 1070. If D3 is = to 0, the constant H is selected to be = $10^{D2 \times 10}$, as indicated by Block 1072. If the initial evaluation of D3 and D2 had indicated that neither was = to 0, the value Q calculated in Branch 9 would be selected for the value H, as indicated by Block 1074. Having made the selection for the value H, the Look-Up Table is utilized to generate the double-precision floating-point number equivalent of $10^{D1}$, as indicated by Block 1076. Control is then returned to BR.

The testing as to whether or not BR10 is set, as indicated by Block 1078 in the consideration of the branch selection logic of FIG. 43, will result in the evaluation and determination whether D1 is = to 0 or whether both D2 and D3 are = to 0, as indicated by Block 1080. If the conditions are not met, set BR11 as indicated by Block 1082, and execute BR11.

FIG. 54 is the diagrammatic representation of the mathematical operation performed in Branch 11. The mathematical operation is the double-precision floating-point multiply of the value H selected in Branch 10 × the constant selected for $10^{D1}$, with the product being identified as R. This operation is identified as Block 1084. Upon completion of the double-precision floating-point multiply, control is returned to BR.

Returning to a consideration of the branch selection logic of FIG. 43, it can be seen that if either D1 was = to 0, or both D2 and D3 were = to 0, as determined by Block 1080, that BR12 would have been set, as indicated by Block 1086, and control would have passed to Branch 12. Under those circumstances, Branch 11 would not have been performed. Taking the condition when Branch 11 had been executed, a test of the branch selection designators would indicate that BR11 is set, as indicated by Block 1088. This will also result in the setting of BR12, as indicated by Block 1090.

FIG. 55 is the diagrammatic representation of the evaluation of the digits of the exponent that occur during Branch 12. At the outset, the decision is made whether D1 does not = 0, and D2 and D3 = 0, as indicated by Block 1092. If this condition is met, B is selected to be the constant generated for $10^{D1}$, as indicated by Block 1094. If the condition was not met, the value B is selected as the quantity R calculated during Branch 11, as indicated by Block 1096. Having selected the appropriate value for B, control is returned to BR.

Returning to a consideration of the branch selection logic of FIG. 43, a test of the branch selection circuits will indicate that BR12 is set, as indicated by Block 1098. The test is then made to determine whether the Character Negative Flip-Flop is set, as determined by Block 2000. If the Character Negative Flip-Flop is set, set BR13, as indicated by Block 2002, and Branch 13 is executed. If the Character Negative Flip-Flop is not set, set BR14, as indicated by Block 2004 and execute Branch 14.

FIG. 56 is the diagrammatic representation of the arithmetic operations performed in Branch 13. The character negative control indicates that the operation should be the double-precision floating-point divide of the mantissa by the exponent, where the mantissa is identified as quantity A, and the exponent is identified as quantity B, the value determined during Branch 12, with the result identified as D. This arithmetic operation is shown as Block 2006. The function is then evaluated to determine if the function is a 33,14 instruction, as indicated by Block 2008. If not, control is passed to point H in BR3 for sending the result to the GRS, and calculating the status word. If the function is a 33,14 instruction, control is returned to BR for single-precision packing.

FIG. 57 is the diagrammatic representation of the arithmetic operation performed in Branch 14. Branch 14 is alternative to Branch 13. The arithmetic operation is the double-precision floating-point multiply of the mantissa X the exponent. The mantissa is identified as A, and the exponent is the value B calculated in Branch 12. The result is identified as D. The floating-point multiply operation is shown in Block 2010. The function code is evaluated for determing if it is the 33,14 instruction, as indicated by Block 2012. Again, if the function is the 33,14 instruction, control is returned to BR. If it is a 33,15 instruction, the process passes to point H in BR3 for termination of the instruction.

Returning to a consideration of the branch selection logic of FIG. 43, it can be seen that if Branch 13 has been executed, that a test of the branch designators will indicate that BR13 is set, as indicated by Block 2014. This will result in the setting of BR15, as indicated by Block 2016. Alternatively, if BR14 has been executed the test of BR14 as indicated by Block 2018 will indicate that BR15 should be set. As described above, the function of Branch 15 is to compress the converted results from double-precision floating-point format to single-precision floating-point format with the exit being from Branch 15 to the generation of the status word.

When the conversion process is completed, it is necessary only to determine which, if any, status bits should be set. FIG. 59 is the diagrammatic representation of the decision procedures that are followed in determining which of the status bits is to be set. Entry to this portion of the control logic is from BR1, and starts at reference point S. It will be recalled, that the various arithmetic operations, for example, in Branch 9, Branch 11, Branch 13, or Branch 14, that can result in character overflow or character underflow will result in the setting of the Character Overflow or Character Underflow Flip-Flop in the arithmetic sequences described. For the specific setting of the status bits, then, the first decision is to test the Format Error Flip-Flop to determine if it is set, as indicated by Block 2020. If set, set the status bit 0, as indicated by Block 2022. The Character Overflow Flip-Flop is tested to determine if it is set, as indicated by Block 2024. The Exponent Negative Flip-Flop is tested to determine if it is set, as indicated by Block 2026. If not set, set status bit 2, as indicated by Block 2028. If the Exponent Negative Flip-Flop is set, set status bit 1, as indicated by Block 2030. If the Character Overflow Flip-Flop is not set, the test is made of the Character Underflow Flip-Flop to determine if it is set, as indicated by Block 2032. If set, it also causes status bit 1 to be set, as indicated by Block 2030. If the Character Underflow Flip-Flop is not set, the Byte Overflow Flip-Flop is tested to determine if it is set, as indicated by Block 2034. If the Byte Overflow Flip-Flop is set, the test is made to determine if the Exponent Found Flip-Flop is set, as indicated by Block 2036. If the Exponent Found Flip-Flop is not set, the status bit 2 is set as indicated in Block 2028. If the Exponent Found Flip-Flop is set, a test is made to determine if the Exponent Negative Flip-Flop is set, as indicated by Block 2038. Again, if the Exponent Negative Flip-Flop is not set, status bit 2 is set, as indicated by Block 2028. If the Exponent Negative Flip-Flop is set, set status bit 1 as indicated by Block 2030.

If the Byte Overflow Flip-Flop is not set, as determined by a test indicated at Block 2034, the test is made to determine if the Decimal Point Overflow Flip-Flop is set, as indicated by Block 2040. If set, set the status bit 3, as indicated by Block 2042. If the Decimal Point Overflow Flip-Flop is not set, a test is made to determine if the Significant Character Found Flip-Flop is set, as indicated by Block 2044. If set, set status bit 4, as indicated by Block 2046. If the Significant Character Found Flip-Flop is not set, as indicated by Block 2044, a test is made to determine if the Mode Error Flip-Flop is set, as indicated by Block 2048. If set, set status bit 6, as indicated by Block 2050. The test is then made to determine if either status bits 0, 1, 2, 3, 4, or 6 were set, and the exponent field was detected, as indicated by Block 2052. If these conditions exist, set status bit 5, as indicated by Block 2054. Following these operations, the conversion for either instruction 33,14 or 33,15 is completed, and control is returned from the Arithmetic Section to Control Section.

Having described the various arithmetic and control operations performed in each of the branches for the 33, 14 and 33, 15 instructions, together with the conditions for selecting the various branches, attention will now be directed to the actual machine operations performed to accomplish those functions.

BRANCH 1 (33,14 and 33,15)

Before actually entering the Branch 1 operation, the set-up includes the transfer of a byte to the U Buffer. The function code is transferred to the Decode 2 Register. The U Buffer is transferred to the U Register. The A Selector Designators are set with the T3 Register to A Selector with the others cleared. The A + 1 Selector Designator is set for the T4 Register to A + 1 Selector with the others cleared. The H Selector Designator is set for +C Adder to H Selector. If the First Byte Flip-Flop is set, the T3 and T4 Registers are cleared. The C2 Register is cleared. The Constant 1 is transferred to the C1 Register as the estimated mantissa. The input byte is tested to determine whether it is a digit character, a blank character, a + character, a − character, a decimal point, or a D or E character, and the appropriate identifying flip-flop is set. The Busy I and Busy II flip-flops are set. The T3 Selector Designators are set for an H Selector to T3 Selector Bits 0 through 11 transfer. The Block Final Clear Flip-Flop is set. The Format Error Flip-Flop is set if either the condition Bytes = 0 Flip-Flop is set or the Sign Last Significant Character Flip-Flop is set and the Separate + Flip-Flop or the Separate − Flip-Flop is set or the Decimal Point Flip-Flop is set and the Decimal Point Flip-Flop is set, or the Bytes = 0 Flip-Flop is set and the Significant Character Found Flip-Flop is cleared. If the First Byte Flip-Flop is set, the No Digit In Mantissa Flip-Flop is set. If the Decimal Point Flip-Flop and either the Decimal Point Found Flip-Flop is set or the Significant Character Found Flip-Flop is cleared and the Bytes = 0 Flip-Flop is set, the Decimal Point Overflow Flip-Flop is set. If the byte being considered is the first byte, the decimal point counter is cleared. If the Digit Flip-Flop is set or the D or E Flip-Flop is set, or the Decimal Point Flip-Flop is set, the Significant Character Found Flip-Flop is set. If the Separate − Flip-Flop is set and the Significant Character Found Flip-Flop is set, the Exponent Negative Flip-Flop is set. If the Separate − Flip-Flop is set and the Significant Character Found Flip-Flop is cleared, the Mantissa Negative Flip-Flop is set. If the Separate Decimal Point Flip-Flop is set, the Decimal Point Found Flip-Flop is set. If the D or E Flip-Flop is set or if the Separate − Flip-Flop or Separate + Flip-Flop are set and the Significant Character Found Flip-Flop is set, the Exponent Found Flip-Flop is set. If the Mode Flip-Flop is set indicating either 12- or 18-bit mode, the Mode Error Flip-Flop is set. If Bytes = 0 Flip-Flop is set and Significant Character Found Flip-Flop is cleared, or the Character Flip-Flop is cleared, or the Format Error Flip-Flop is set, the format error condition flip-flop is set. If the Separate + Flip-Flop is set, or the Separate − Flip-Flop is set, the Sign Last Significant Character Flip-Flop is set. If the Blank Flip-Flop is cleared and neither the Separate + Flip-Flop or Separate − Flip-Flop is set, the Sign Last Character Flip-Flop is cleared. If the First Byte Flip-Flop is set, the T3 Selector is gated to T4 Register. If either the Decimal Point Flip-Flop is set or the Significant Character Flip-Flop is cleared, and Bytes = 0 Flip-Flop is cleared, the Busy I and Busy II flip-flops are cleared. If the Decimal Point Flip-Flop is cleared, and the Significant Character Found Flip-Flop is set, or the Bytes = 0 Flip-Flop is set, there is a return to the branch chain, otherwise there is cycling within Branch 1 until the mantissa bytes have been read in and identified. At the conclusion of Branch 1, either Branch 2 or Branch 3 will be selected.

BRANCH 2 (33,14 and 33,15)

As indicated, the basic function of Branch 2 is to provide one cycle of byte-to-binary integer conversion, with the results being left in the T3 and T4 Registers. If the Not First Byte Flip-Flop is cleared, the T3 and T4 Registers are cleared. The N Selector is transferred to the C0 Register. A multiply clear is performed. The U Selector Designators are set for an A Register to U Selector Bits 0 through 23, Bits 24 through 26 and Bits 27 through 35 transfer with the others cleared. The U + 1 Selector Designator is set for the A + 1 Register to the U + 1 Selector Bits 0 through 26 and Bits 27 through 35 transfer the others being cleared. The A Selector Designator is set for the T3 Register to the A Selector transfer. The A Selector Designator is set for the T3 Register to the A Selector transfer with the others cleared. The A + 1 Selector Designator is set for the T4 Register to the A + 1 Selector transfer with the others cleared. The N Selector Designator is set for gating the constant 69 to the N Selector and left shifting same three places with the others cleared. SM Designator is set for double right circular shift. The Adder Designator is set for 72-bit add. T3 Register is transferred to the T1 Register and left shifted one place in the process. The T4 Register is transferred to the T2 Register. The character detection circuitry, as described in Branch 1, is selected. The contents of the T1 Register are transferred to the A Register. The T2 Register content is transferred to the A + 1 Register. If the Decimal Point Found Flip-Flop is set, the decimal point counter is advanced by 1. $SM_U$ is transferred to the T1 Register. $SM_L$ is transferred to the T2 Register. The No Digit In Mantissa Flip-Flop is cleared. If the Decimal Point Found Flip-Flop is set and the decimal point counter = 0, the Decimal Point Overflow Flip-Flop is set. The Not First Byte Flip-Flop is set. If the Blank Flip-Flop is set, the $SO_L$ Register contents are gated to the U Register. The Adder output is transferred to the T3 Register. The Adder output is gated to the T4 Register. If Adder 1 Bits 24, 25, 26 or 27 are set, the Byte Overflow Flip-Flop is set, thereby indicating that the result cannot be expressed in 60 binary bits. The A Selector output is gated to the T1 Register. A + 1 Selector is gated to the T2 Register. The U Selector Designators are set for clearing the A Register to U Selector and setting the $SO_U$ Register to the U Selector Designators. The U + 1 Selector Designators are set for clearing the A + 1 Register to U + 1 Selector and setting the U Register to U + 1 Selector. The result of the Add is transferred to the T3 Register and the T4 Register. If Adder 1 Bit 24, 25, 26 or 27 are set, the Byte Overflow Flip-Flop is set. Either Branch 1 or Branch 3 is selected at the conclusion of Branch 2.

BRANCH 3 (33,14 and 33,15)

A Selector Designators are set for a T3 Register to A Selector transfer and the others are cleared. The A + 1 Selector Designators are set for a T4 Register to A + 1 Selector transfer and the others are cleared. The N Selector Designators are set for a Normalizer to N Selector transfer. All T3 Selector Designators are cleared. The C4 Selector Designators are set for a + Normalizer to C4 Selector transfer and the others are cleared. The Shift Matrix designator is set for a double right circular shift for Shift Matrix upper character enable for Bits 27 through 35 and Bits 24 through 26 if T3- and T4-Registers are not 0. The H Selector Designator is set for a +C Adder to H Selector transfer. The Constant $-1764_8$ is entered into the C1 Register. The negative of the contents of the C1 Register are transferred to the C2 Register. If this is a 33,15 instruction and the Bytes = 0 Flip-Flop is set, and the Decimal Point Found Flip-Flop is cleared and BB1 = 0, the Block Final Clear Flip-Flop is cleared. The N Selector contents are gated to the C0 Register. The C4 Selector output is right shifted three places and entered into the C1 Register. If T3 and T4 = 0, the M = 0 Flip-Flop is set. If a 33,14 instruction is involved and the Bytes = 0 Flip-Flop is set, and the Decimal Point Found Flip-Flop is cleared, and BB1 =

0, the H1 and H2 Wrap Around Flip-Flop is set. $SM_U$ is gated to the T1 Register. $SM_L$ is gated to the T2 Register. The negative value of the T1 Register is gated to the H1 Register if the Mantissa Negative Flip-Flop is set and the M = 0 Flip-Flop is cleared, or the positive value of the T1 Register is gated to the H1 Register if the Mantissa Negative Flip-Flop is cleared or M = 0 Flip-Flop is set. The negative value of the T2 Register is transferred to the H2 Register if the Mantissa Negative Flip-Flop is set and the M = 0 Flip-Flop is cleared, or the positive value of the T2 Register is transferred to the H2 Register if the Mantissa Negative Flip-Flop is set and M = 0 Flip-Flop is set. The T3 Selector is directed to the T2 Register. If a 33,15 instruction is involved and the Bytes = 0 Flip-Flop is set and the Decimal Point Found Flip-Flop is cleared and BB1 = 0, the Busy I and Busy II flip-flops are cleared. If this is a 33,15 instruction and Bytes = 0 Flip-Flop is set and Decimal Point Found Flip-Flop is cleared and BB1 = 0, a final clear is executed. If a 33,15 instruction is involved and the Bytes = 0 Flip-Flop is set and Decimal Point Found Flip-Flop is clear and BB1 = 0, the output available indicator is set, and the write enables are also set. If the branch is not in a condition for final clear, there will be a selection of either Branch 4, Branch 6, or Branch 15.

BRANCH 4 (33,14 and 33,15)

The main function of Branch 4 is to detect and evaluate exponent bytes, and requires as a set up that a byte be available to the U Buffer. The U Buffer is then transferred to the U Register. If the byte is a blank character, the Blank Flip-Flop is set. The Digit Flip-Flop is either set or cleared. If this is the last byte, the Bytes = 0 Flip-Flop is set. The Not First Byte Flip-Flop is cleared. The character detection is gated to determine whether the byte is a digit character, the byte is a blank character, the byte is a + character, or the byte is a − character, with the appropriate controlling flip-flop being set for the type of byte detected. The Busy I and Busy II flip-flops are set. The Format Error Flip-Flop is set if the Bytes = 1 Flip-Flop is set or the Sign Last Significant Character Flip-Flop is set and either the Separate + Flip-Flop or Separate − Flip-Flop is set or the Decimal Point Flip-Flop is set and the Decimal Point Found Flip-Flop is set or either Bytes = 0 Flip-Flop is set and Significant Character Found Flip-Flop is cleared. If the Separate − Flip-Flop is set, the Exponent Negative Flip-Flop is set. If the Blank Flip-Flop is cleared and neither the Separate + Flip-Flop or Separate − Flip-Flop is set, the Sign Last Character Flip-Flop is cleared. If the Separate + Flip-Flop or Separate − Flip-Flops are set, the Sign Last Character Flip-Flop is set. If the Blank Flip-Flop is clear and the Separate + Flip-Flop is clear and the Separate − Flip-Flop is clear and the Digit Flip-Flop is clear, the Format Error Flip-Flop is set. The exit from Branch 4 will be to either Branch 4 or Branch 5.

BRANCH 5 (33,14 and 33,15)

The basic function of Branch 5 is to provide one cycle of byte-to-binary integer conversion of the exponent, with the result to be put in the T3 Register. As a set up, it requires a byte in the U Buffer if the Bytes = 0 Flip-Flop is clear, and the First Byte Flip-Flop is clear. If the byte under consideration is not a first byte, the U Buffer is gated to the U Register. If the Not First Byte Flip-Flop is clear, the T3 and T4 Registers are cleared. The N Selector is transferred to the CO Register. The U Selector Designators are set for the A Register to U Selector Bits 0 through 23, Bits 24 through 26, and Bits 27 through 35 transfer and the others are cleared. The U + 1 Designators are set for the A + 1 Register to the U + 1 Selector Bits 0 through 26 and Bits 27 through 35 transfer with the others cleared. The A Selector Designator is set for the T3 Register to the A Selector transfer with the others cleared. The A + 1 Selector Designators are set for the T4 Register to the A + 1 Selector transfer with the others cleared. The N Selector Designator is set for gating the constant 69 to the N Selector and left shifting same three places in the process. The Shift Matrix Designator is set for double right circular shift. The Adder Designators are set for a 72-bit add. If a blank character is present, the Blank Flip-Flop is set. The digit is tested and the Digit Flip-Flop is either set or cleared. If the T0 Pulse is received from the Buffer Resident Bits, the Bytes = 0 Flip-Flop is set. The T3 Register is transferred to the T1 Register and left shifted one place in the process. The T4 Register is transferred to the T2 Register and left shifted in the process one place. The character detectors are gated for evaluating whether the byte is a digit character or a blank character, with the appropriate indicating flip-flop being set if detected. The Busy I and Busy II Flip-Flops are set. The T1 Register content is transferred to the A Register. The T2 Register is transferred to the A + 1 Register. If the Digit Flip-Flop is clear and the Blank Flip-Flop is clear, the Format Error Flip-Flop is set. $SM_U$ is transferred to the T1 Register. $SM_L$ is transferred to the T2 Register. $S0_L$ Register is transferred to the U Register if the blank flip-flop is set. Adder 1 is transferred to the T3 Register. Adder 2 is transferred to the T4 Register. If Adder 1 Bits 9 or 10 or 11 or 12 are set, the Byte Overflow Flip-Flop is set. The A Selector is transferred to the T1 Register. The A + 1 Selector is transferred to the T2 Register. The U Selector Designators are set for clearing the A Register to U Selector Designator and setting the U Register to U Selector Designator. The U + 1 Selector Designators are set for clearing the A + 1 Register to U + 1 Selector Designator and setting the $SO_L$ Register to U + 1 Selector. The Adder 1 is transferred to T3 Register. The Adder 2 is transferred to T4 Register. If the Bytes = 0 Flip-Flop is cleared, the Busy I and Busy II Flip-Flops are cleared. If the Bytes = 0 Flip-Flop is set, continue. If Adder Bits 9, 10, 11, or 12 are set, the Byte Overflow Flip-Flop is set, thereby limiting the largest input exponent to $511_{10}$. There will be cycling within Branch 5 until all of the bytes of the exponent have been read and converted. Upon exit from Branch 5, there will normally be entrance to Branch 6.

BRANCH 6 (33,14 and 33,15)

The basic function of Branch 6 is to correct the exponent for a decimal point count. The T3 Selector Designators are set for the H Selector to T3 Selector for Bits 27 though 35 and Bits 24 through 26 transfer and the others are cleared. The A Selector Designator is set for the T3 Register to the A Selector transfer and the others are cleared. If the decimal point counter is not = 0 and the Negative Exponent Flip-Flop is set, the positive decimal point counter value is directed to the E Register. If the decimal point counter is not equal to 0 and the Negative Exponent Flip-Flop is cleared, the negative value of the decimal point counter is directed to the E Register. If the decimal point counter = 0 and the Negative Exponent Flip-Flop is set, the positive value stored in BB1 is transferred to the E Register. If the decimal point counter = 0, and the Negative Exponent Flip-Flop is not set, the negative value stored in BB1 is transferred to the E Register. The S0, V0, S1 and V1 Registers are cleared. The A Selector is directed to the T1 Register. The T1 Register is directed to the A Register. The $A_L$ Register is transferred to the C1 Register. The E Register is transferred to the C2 Register. The H Selector Designators are set for the + Adder if the C Adder is positive, or for the −C Adder if the C Adder is negative. If the C Adder is negative or if the Exponent Negative Flip-Flop is set, the Characteristic Negative Flip-Flop is set. The T3 Selector is transferred to the T3 Register. The A Selector is transferred to the T1 Register. The T1 Register is transferred to the A Register. At the close of Branch 6, control is normally passed to Branch 7.

BRANCH 7 (33,14 and 33,15)

The basic function of Branch 7 is a binary-to-byte conversion, with the result transferred to the T2 Register. The A + 1 Selector Designators are set for A + 1 Register to A + 1 Selector Bits 0 through 17 and Bits 18 through 35 transfer and the others are cleared. The Q1 Register is cleared. The Q1 Register contents are left shifted one place and gated to the Q0 Register. The $Q0_U$ Register is gated to the T1 Register. The $Q0_L$ Register is transferred to the T2 Register. The K counter is set to 12. The divide chain of the Arithmetic Section is cycled K times. The T1 Register is transferred to the T3 Register. The T2 Register is transferred to the T4 Register. The K counter lower rank is transferred to the K counter upper rank. The A Register is transferred to the T1 Register and left shifted one place in the process. The A + 1 Register is transferred to the T2 Register and left shifted one place in the process. If the A Register Bit 35 equals 1, the BD Flip-Flop is set. The K counter upper rank is transferred to the K counter lower rank. The T1 Register is transferred to the A Register. The T2 Register is transferred to the A + 1 Register. The T3 Register is transferred to the T1 Register and left shifted one place. The T4 Register is transferred to the T2 Register and left shifted one place. The output from the BD Flip-Flop is directed to T20. When K equals 0, the branch chain is entered from the divide chain. Branch 8 is normally operated after Branch 7.

BRANCH 8 (33,14 and 33,15)

Branch 8 normally operates to set the exponent limit and to generate constants. At the outset, the flip-flops representative of DX are set. A constant is entered into the A and A + 1 Buffers to enable D3. If the T2 Register Bit 10 is set, the Byte Overflow Flip-Flop is set. This tests for an exponent greater than 399. The A Buffer is transferred to the A Register. The A + 1 Buffer is transferred to the A + 1 Register. A constant to U and U + 1 Buffer Designators are set. The constant to the A and A + 1 Buffer Designators are cleared. The D2 Designator is set. The U Buffer is transferred to the U Register. The U + 1 Buffer is transferred to the U + 1 Register. At this point, the double-precision floating-point numbers generated from the Look Up Table for the values $10^{D3}{}_{x}{}^{100}$ and $10^{D2}{}_{x}{}^{100}$ are available. At the conclusion of Branch 8, the process will proceed either to Branch 9 or Branch 10.

BRANCH 9 (33,14 and 33,15)

Branch 9 performs a double-precision floating-point multiply, with the result residing in the T1 and T2 Registers. At the outset, the S0, V0, S1 and V1 Registers are cleared. If the U Buffer is negative, the Sign I Flip-Flop is set. The Selector Designators are set for a U Register to U Selector Bits 0 through 23 transfer, a sign to U Selector Bits 27 through 35 transfer, a sign to U Selector Bits 24 through 26 transfer, and the others are cleared. The U + 1 Selector Designators are set for a U + 1 Register to U + 1 Selector transfer, and the others are cleared. The A Selector Designators are set for the A Register to A Selector Bits 0 through 23 transfer with the others cleared. The A + 1 Selector Designator is set for an A + 1 Register to A + 1 Selector Bits 0 through 17 transfer, the A + 1 Register to A + 1 Selector Bits 18 through 35 transfer, and the others are cleared. The C3 Selector Designators are set for the A Register to C3 Selector Bits 27 through 35 transfer, the A Register to C3 Selector Bits 24 through 26 transfer and the others are cleared. The N Selector Designators are set for the constant to the N Selector transfer and the others are cleared. The H Selector Designator is set for a +C Adder to H Selector transfer. The Shift Matrix Designator is set for a right circular shift with the SM upper character enable for Bits 27 through 35, the SM upper character enable for Bits 24 through 26, and the others are cleared. The Adder Designator is set for a 72-bit add. If the A Buffer is negative, the Sign II Flip-Flop is set. The C4 Selector is directed to the C1 Register. The C3 Selector is directed to the C2 Register. The A Selector is transferred to the $Q0_U$ Register. The A + 1 Selector is transferred to the $Q0_L$ Register. The C3 Selector Designators are set for clearing the A Register to C3 Selector Bits 27 through 35, clearing the A Register to C3 Selector Bits 24 through 26, and setting the CO Register to C3 Selectors. The C4 Selector Designators are cleared for the U Register to C4 Selector Bits 27 through 35, and the U Register to C4 Selector Bits 24 through 26. The count is set in the K counter. The C Adder is gated to C0 Register. The Q0 Register is transferred to the Q1 Register. The $V0_L$ Register is transferred to the A Register. At this point there is entry in the multiply cycle. The K counter lower rank is transferred to the K counter upper rank. The −X Storage I Flip-Flop is set. Full Add 2 is directed to the Q Buffer 2. Enables are sent to the S1 and V1 Registers. The contents of the Q1 Register are gated to the Q0 Register and right shifted four places. The Q Buffer is transferred to Q0. The K counter upper rank is transferred to the K counter lower rank. The Q carry 2 flip-flop is set. The −X Storage II Flip-Flop is set. Enables are sent to the SO Register and the V0 Register. If K = 1, the Gate Q Buffer Flip-Flop is set. Full Add 1 is directed to the Q Buffer 1. Q0 Register is transferred to the Q1 Register. The Q carry 1 flip-flop is set. A return occurs from the multiply cycle. The A Selector Designators are set for the A Register to A Selector Bits 27 through 35 transfer, and an A Register to A Selector Bits 24 through 26 transfer. The full Adder output is gated to the Q Buffer. The U Selector Designators are set for clearing the U Register to U Selector Bits 0 through 23, clearing the sign to U Selector Bits 27 through 35, clearing the sign to U Selector Bits 24 through 26, and setting the $S0_U$ Register to U Selector Designator. The C3 Selector is transferred to the C2 Register. $V0_U$ Register is transferred to the A Register. $V0_L$ Register is transferred to the A + 1 Register. The Q Buffer is transferred to the Q0 Register. The contents of the Q1 Register are gated to the Q0 Register and right shifted four places. The A Selector is gated to the T1 Register. The A + 1 Selector is gated to the T2 Register. The U + 1 Designators are set for clearing the U + 1 Register to U + 1 Selector, and setting the $S0_L$ Register to U + 1 Selector. The A Selector Designators are set for clearing the A Register to A Selector Bits 0 through 23, and setting the T3 Register to A Selector. The A + 1 Selector Designators are set for clearing the A + 1 Register to A + 1 Selector Bits 0 through 17, clearing the A + 1 Register to A + 1 Selector Bits 18 through 35, and setting the T4 Register to the A + 1 Selector. The Bits 30 through 35 of the Q0 Register are transferred to Bit Positions 30 through 35 of the A Register. The T1 Excess to T3 Selector Designators are set. Adder 1 is transferred to the T3 Register. Adder 2 is transferred to the T4 Register. The Q1 Register is cleared. The high ordered 12-bits of the T3 Selector are transferred to the T3 Register. The constant, either $-2000_8$ or $-2001_8$, is transferred to the C1 Register. The N Selector is gated to the C0 Register. The contents of the Q1 Register are gated to the Q0 Register and left shifted one place. T3 and T4 are tested to determine the condition to set the Mantissa = 0 Flip-Flop. If the C Adder is negative, and C2 is positive, and the mantissa is not 0, and is not D5, the Character Underflow Flip-Flop is set. If the C Adder negative and C2 is negative and the mantissa is not = 0, the Character Overflow Flip-Flop is set. If the mantissa = 0 or the C Adder is negative and either D5 and C2 is positive or not D20, the Q0 Register is gated to the T1 Register. If the mantissa = 0 or the C Adder is negative and either D5 and C2 positive or D20 is zero, the Q0 Register is transferred to the T2 Register. If not either mantissa = 0 or C Adder negative and either D5 and C2 positive or D20 is zero, the $SM_U$ is gated to the T1 Register and $SM_L$ is gated to the T2 Register. Normally Branch 10 will follow the completion of this branch.

BRANCH 10 (33,14 and 33,15)

The A Selector Designators are set for U Register to A Selector Bits 0 through 35 is D3 = 0, or if D3 does not = 0, the A Register is transferred to A Selector Bits 0 through 35, with the others being cleared. If D3 = 0, the A Selector Designators are set for a U + 1 Register to A + 1 Selector Bits 0 through 35 transfer, or if D3 does not = 0, the A + 1 Selector Designators are set for A + 1 Register to A + 1 Selector Bits 0 through 35 transfer and the others are cleared. The Enable is set for the D1 generation of the floating-point number through the Look-Up Table. If D3 = 0 or D2 = 0, the A Selector is gated to the T1 Register. If D3 = 0 or D2 = 0, the A + 1 Selector is directed to the T2 Register. The T1 Register is transferred to the A Register, and the T2 Register is transferred to the A + 1 Register. The U Buffer is transferred to the U Register, and the U + 1 Buffer is transferred to the U + 1 Register. The H1 and H2 Wrap Around Flip-Flop is set. At the close of Branch 10, normally control will be turned over to either Branch 11 or Branch 12.

BRANCH 11 (33,14 and 33,15)

The basic function of Branch 11 is to perform a double-precision floating-point multiply, with the results being directed to the T1 and T2 Registers. At the outset, S0, V0, S1 and V1 Registers are cleared. If the U Buffer is negative, the Sign I Flip-Flop is set. If the A Buffer is negative, the Sign II Flip-Flop is set. The U Selector Designators are set for a U Register to U Selector Bits 0 through 23 transfer, the sign to U Selector Bits 27 through 35 transfer, the sign to U Selector Bits 24 through 26 transfer, and the others are cleared. The U + 1 Selector Designators are set for U + 1 Register to U + 1 Selector transfer and the others are cleared. The A Selector Designators are set for an A Register to A Selector Bits 0 through 23 transfer and the others are cleared. The A + 1 Selector Designators are set for A + 1 Register to A + 1 Selector Bits 0 through 17 transfer, an A + 1 Register to A + 1 Selector Bits 18 through 35 transfer and the others are cleared. The C3 Selector Designators are set for an A Register to C3 Selector Bits 27 through 35 transfer, an A Register to C3 Selector Bits 24 through 26 transfer and the others are cleared. The C4 Selector Designators are set for a U Register to C4 Selector Bits 27 through 35 transfer, the U Register to C4 Selector Bits 24 through 26 transfer and the others are cleared. The N Selector Designator is set for constant to N Selector. The H Selector Designator is set for +C Adder to H Selector. The shift matrix designator is set for double right circular shift, the SM upper character enable Bits 27 through 35, the SM upper character enable Bits 24 through 26. The Adder Designator is set for a 72-bit add. The C4 Selector is transferred to the C1 Register. The C3 Selector is transferred to the C2 Register. The A Selector is transferred to the $Q0_U$ Register. The A + 1 Selector is transferred to the $Q0_L$ Register. The C3 Selector Designators are set for clearing the A Register to C3 Selector Bits 27 through 35 designator, clearing the A Register to C3 Selector Bits 24 through 26 designator and setting the C0 Register to C3 Selector designator. The C4 Selector Designators are cleared for the U Register to C4 Selector Bits 27 through 35 transfer and U Register to C4 Selector Bits 24 through 26 transfer. The K counter is set. The C Adder is gated to C0 Register. The Q0 Register is transferred to the Q1 Register. $V0_L$ Register is transferred to the A Register. At this point the multiply cycle is entered. The K counter lower rank is transferred to the K counter upper rank. the −X Storage I Flip-Flop is set. The Full Adder 2 is transferred to the Q Buffer 2. Enables are sent to the S1 and V1 Registers. The Q1 Register contents are right shifted four places and gated to the Q0 Register. The Q Buffer is transferred to the Q0. K counter upper rank is transferred to the K counter lower rank. The Q carry 2 flip-flop is set. The −X Storage II Flip-Flop is set. Enables are sent to the S0 and V0 Registers. If K = 1, the Gate Q Buffer Flip-Flop is set. Full Adder 1 is gated to the Q Buffer 1. The Q0 Register is gated to Q1 Register. The Q carry 1 flip-flop is set. At this point a return is made from the multiply cycle. The A Selector Designator is set for an A Register to A Selector Bits 27 through 35 transfer and an A Register to A Selector Bits 24 through 26 transfer. The Full Adder is gated to the Q Buffer. The U Selector Designators are set for clearing the U Register to U Selector Bits 0 through 23, clearing the sign to U Selector Bits 27 through 35, clearing the sign to U Selector Bits 24 through 26, and setting the $S0_U$ Register to U Selector Designator. The C3 Selector is gated to the C2 Register and the Gate Q Buffer Flip-Flop is cleared. $V0_U$ Register is gated to the A Register. The $V0_L$ Register is gated to the A + 1 Register. The Q Buffer is directed to Q0 Register. The Q Register is gated to the Q Register and right shifted four places. A Selector to T1 Register. The A + 1 Selector is directed to the T2 Register. The U + 1 Selector Designators are set for clearing the U + 1 Register to U + 1 Selector, and setting the $S0_L$ Register to U + 1 Selector. The A Selector Designator is set to clear the A Register to the A Selector Bits 0 through 23, and set the T3 Register to A Selector Designator. The A + 1 Selector Designators are set to clear the A + 1 Register to A + 1 Selector Bits 0 through 17, and clear the A + 1 Register to A + 1 Selector Bits 18 through 35, and set T4 Register to A + 1 Selector. Bits 30 through 35 of the Q0 Register are transferred to Bits 30 through 35 of the A Register. The T1 Excess to T3 Selector Designators are set. Adder 1 is directed to the T3 Register. Adder 2 is directed to the T4 Register. The Q1 Register is cleared. The top 12-bits of T3 Selector are transferred to the T3 Register. The constant either $-2000_8$ or $-2001_8$ is directed to the C1 Register. The N Selector is gated to the C0 Register. The Q1 Register contents are left shifted one place and entered into the Q0 Register. T3 and T4 are tested to determine whether the M = 0 Flip-Flop should be set. If the C Adder is negative and C2 is positive and the mantissa is not 0 and D5 is cleared, the Character Underflow Flip-Flop is set. If the C Adder is negative and C2 is negative and mantissa is not 0, the Character Overflow Flip-Flop is set. If either the mantissa = 0 or the C Adder is negative and either D5 and C2 are positive or D20 is cleared, the Q0 Register contents are gated to the T1 Register and the Q0 Register is gated to the T2 Register. If either the mantissa is not equal to 0 or the C Adder is negative and either D5 and C2 positive or D20 is cleared, $SM_U$ is gated to the T1 Register and $SM_L$ is gated to the T2 Register. At the close of Branch 11, normally control will pass to Branch 12.

BRANCH 12 (33,14 and 33,15)

The A Selector Designators are set for effecting a U Register to A Selector Bits 0 through 35 transfer and the others are cleared. The A + 1 Selector Designators are set for U + 1 Register to A + 1 Selector transfer and the others are cleared. The H1 and H2 Registers are transferred to the A and A + 1 Buffer Selectors. The DX Designator enables are cleared. The clear Constant to the Buffer Designators is set. If D1 is not = 0 and D2 and D3 = 0, the A Selector is transferred to the T1 Register. If D1 is not 0 and D2 and D3 = 0, the A + 1 Selector is transferred to the T2 Register. The T1 Register is transferred to the H1 Register. The T2 Register is transferred to the H2 Register. H1 and H2 Registers are transferred to U and U + 1 Buffer Selectors. At the close of Branch 12, control will normally pass either to Branch 13 or Branch 14.

BRANCH 13 (33,14 and 33,15)

The primary function of Branch 13 is to execute a double-precision floating-point divide operation with the results ultimately residing in the H1 and H2 Registers. At the outset, the S0, V0, S1 and V1 Registers are cleared. The negative magnitude of the U Buffer is transferred to the U Register, and the negative magnitude of the U + 1 Buffer is transferred to the U + 1 Register. The magnitude of the A Buffer is transferred to the A Register, and the magnitude of the A + 1 Buffer is transferred to the A + 1 Register. If the U Buffer is negative, the Sign I Flip-Flop is set. If the A Buffer is negative, Sign II Flip-Flop is set. The A Selector Designators are set for an A Register to A Selector Bits 0 through 23 transfer with the others being cleared. The A + 1 Selector Designator is set for an A + 1 Register to A + 1 Selector Bits 0 through 17 transfer and an A + 1 Register to A + 1 Selector Bits 18 through 35 transfer and the others are cleared. The U Selector Designators are set for a U Register to U Selector Bits 0 through 23 transfer, a sign to U Selector Bits 27 through 35 transfer, a sign to U Selector Bits 24 through 26 transfer, and the others are cleared. the U + 1 Selector Designators are set for a U + 1 Register to U + 1 Selector transfer, and the others are cleared. The T3 Selector Designators are set for a U Selector to T3 Selector transfer and the others are cleared. The C3 Selector Designator is set for the A Register to the C3 Selector Bits 27 through 35 transfer and the A Register to C3 Selector Bits 24 through 26 transfer and the others are cleared. The C4 Selector Designator is set for the U Register to C4 Selector Bits 27 through 35 transfer, and the U Register to C4 Selector Bits 24 through 26 transfer and the others are cleared. The N Selector Designator is set for a Constant to the N Selector transfer. The H Selector Designator is set for a +C Adder to H Selector transfer. The shift matrix designator is set for double right circular shift. SM upper Bits 27 through 35 and SM upper Bits 24 through 26 are enabled and the others are cleared. The Adder Designator is set for a 72-bit add. The C3 Selector is transferred to the C2 Register. The C4 Selector is transferred to the C1 Register. The U + 1 Selector is transferred to the T4 Register. The A Selector is transferred to the T1 Register. The A + 1 Selector is transferred to the T2 Register. The T3 Selector is transferred to the T3 Register. The C3 Selector Designators are set for clearing the A Register to C3 Selector Bits 27 through 35, clearing the A Register to the C3 Selector to Bits 24 through 26, and setting the C0 Register to the C3 Selector. The C4 Selector Designators are cleared for U Register to C4 Selector Bits 27 through 35, and U Register to C4 Selector Bits 24 through 26. The K counter is set. The C Adder is transferred to the C0 Register. If the zero test is met, the Divide Fault Flip-Flop is set. For a 33,15 instruction, the Block Final Clear Flip-Flop is cleared and the H1 and H2 Feed Back Flip-Flops are cleared. At this point the divide cycle is entered. The K counter lower rank is transferred to the K counter upper rand. If an EAB occurs, the EAB Flip-Flop is set. For overflow conditions, the Divide Overflow Flip-Flop is set. The QO Register is transferred to the Q1 Register. The K counter upper rank is transferred to the K counter lower rank. The T1 Register is transferred to the A Register. The T2 Register is transferred to the A + 1 Register. Adder 1 is transferred to the T3 Register. Adder 2 is transferred to the T4 Register. if the EAB Flip-Flop is not set, the A Selector Designator is set for a T3 Register to A Selector transfer, but if the EAB Flip-Flop is set, the A Selector Designators are set for an A Register to A Selector transfer. If the EAB Flip-Flop is set, the A + 1 Designators are set for a T4 Register to A + 1 Selector transfer, but if the EAB Flip-Flop is not set, the A + 1 Designators are set for an A + 1 Register to A + 1 Selector transfer. If the EAB Flip-Flop is set, the A + 1 Selector Designators are cleared for a T4 Register to A + 1 Register transfer, and if the EAB Flip-Flop is not set, the A + 1 Selector Designators are cleared for an A + 1 Register to A + 1 Selector transfer. If the EAB Flip-Flop is not set and it is not the last cycle, the T3 Register contents are left shifted one place and gated to the T1 Register and the T4 Register contents are gated to the T2 Register and left shifted one place in the process. The Q1 Register contents are left shifted one place and gated to the Q0 Register. If EAB Flip-Flop is set, 0 is forced into the Q0 Register Bit 0. If the EAB Register is clear, a 1 is forced into Q0 Register Bit 0. If the EAB Flip-Flop is set and it is not the last cycle, the A Register contents are left shifted one place and gated to the T1 Register and the A + 1 Register is left shifted one place and gated to the T2 Register. If it is the last cycle, the A Selector is transferred to the T1 Register and the A + 1 Selector is transferred to the T2 Register. There is a return from the divide chain. The C3 Selector is transferred to the C2 Register. Constant $2000_8$ or $2001_8$ is set in the C1 Register. the $Q0_U$ Register is transferred to the T1 Register. The $Q0_L$ Register is transferred to the T2 Register. The U Selector Designators are set for clearing the U Register to U Selector Bits 0 through 23, clearing the Sign to U Selector Bits 27 through 35, clearing the Sign to U Selector Bits 24 through 26, and setting the $S0_U$ Register to U Selector. The U + 1 Selector Designators are set for clearing the U + 1 Register to U + 1 Selector, and setting the $S0_L$ Register to U + 1 Selector. The T1 Register is transferred to the A Register. The T2 Register is transferred to the A + 1 Register. For a 33,15 instruction, the Busy I flip-flop is cleared. The N Selector bit 72 is transferred to the C0 Register and shifted left three places. The Q1 Register is cleared. The M = 0 Flip-Flop is set if equal test 72-bit. The A Selector Designators are set for an A Register to A Selector transfer. The A + 1 Selector Designators are set for an A + 1 Register to A + 1 Selector transfer. The contents of Q1 Register are right shifted four places and entered into the Q0 Register. If the C Adder is negative and C2 is positive and M is unequal to 0 and no divide fault exists, the Character Overflow Flip-Flop is set. If M does not equal 0 and it is not a divide fault condition and C2 is negative and the C Adder is negative, the Character Underflow Flip-Flop is set. The constant 2R Designator is cleared. If either mantissa = 0 or the C Adder is negative, and either C2 is negative and D5 or not D20, the Q0 Register contents are transferred to the T1 Register and to the T2 Register. Otherwise $SM_U$ is transferred to the T1 Register and $SM_L$ to the T2 Register. If the mantissa = 0 or the signs are alike or D5 and C Adder are negative and C2 is negative or a fault exists, the positive value of the T1 Register is transferred to the H1 Register and the positive value of the T2 Register is transferred to the H2 Register. Otherwise, the negative value of the T1 Register is transferred to the H1 Register, and the negative value of the T2 Register is transferred to the H2 Register. If the Block Final Clear Flip-Flop is not set, Busy II flip-flop is cleared. If the Block Final Clear Flip-Flop is not set, a final Clear is executed. If a 33,15 instruction is involved, the Output Available Flip-Flops are set and the write enables are also set.

BRANCH 14 (33,14 and 33,15)

The primary function of Branch 14 is to execute a double-precision floating-point multiply sequence, with the result residing in the H1 and H2 Registers. At the outset, the S0, V0, S1 and V1 Registers are cleared. The magnitude of the U Buffer is gated to the U Register and the magnitude of the A Buffer is gated to the A Register. The magnitude of the U + 1 Buffer is gated to the U + 1 Register and the magnitude of the A + 1 Buffer is gated to the A + 1 Register. If the U Buffer is negative, the Sign I Flip-Flop is set. If the A Buffer is negative, the Sign II Flip-Flop is set. The U Selector Designators are set for a U Register to U Selector Bits 0 through 23 transfer, a sign to U Selector Bits 27 through 35 transfer, a sign to U Selector Bits 24 through 26 transfer, and the others are cleared. The U + 1 Selector Designators are set for a U + 1 Register to U + 1 Selector transfer with the others being cleared. The A Selector Designators are set for an A Register to A Selector Bits 0 through 23 transfer and the others are cleared. The A + 1 Selector Designators are set for an A + 1 Register to A + 1 Selector Bits 0 through 17 transfer, an A + 1 Register to A + 1 Selector Bits 18 through 35 transfer and the others are cleared. The C3 Selector Designators are set for the A Register to C3 Selector Bits 27 through 35 transfer, the A Register to C3 Selector Bits 24 through 26 transfer, and the others are cleared. The C4 Selector Designators are set for the U Register to C4 Selector Bits 27 through 35 transfer, the U Register to C4 Selector Bits 24 through 26 transfer and the others are cleared. The N Selector Designator is set for a constant to N Selector transfer. The H Selector Designators are set for +C Adder to H Selector transfer. The Shift Matrix Designator is set for double right circular shift. The SM upper Bits 27 through 35, and the SM upper Bits 24 through 26 are enabled, with the others being cleared. The Adder Designator is set for a 72-bit add. The C4 Selector is transferred to the C1 Register. The C3 Selector is transferred to the C2 Register. The A Selector is transferred to the $Q0_U$ Register. The A + 1 Selector is transferred to the $Q0_L$ Register. The C3 Selector Designators are set for clearing A Register to C3 Selector Bits 27 through 35, clearing the A Register to C3 Selector Bits 24 through 26, and setting the C0 Register to C3 Selector Designator. The C4 Selector Designator is set for a U Register to C4 Selector bits 27 through 35 transfer, and a U Register to C4 Selector Bits 24 through 26 transfer. The K counter is set. The C Adder is transferred to the C0 Register. The Q0 Register is transferred to the Q1 Register. The $V0_L$ Register is transferred to the A Register. If a 33,15 instruction is involved, the Block Final Clear Flip-Flop is cleared and the H1 and H2 Wrap Around Flip-Flops are cleared. The multiply cycle is entered. The K counter lower rank is transferred to the K counter upper rank. The –X Storage I Flip-Flop is set. Full Adder 2 is gated to Q Buffer 2. The S1 and V1 Registers are enabled. The contents of the Q Register are gated to the Q0 Register and right shifted four places. The Q Buffer is transferred to Q0. The K counter upper rank is transferred to K counter lower rank. The Q carry 2 flip-flop is set. The –X Storage II Flip-Flop is set. The S0 and V0 Registers are enabled. If K = 1, the Gate Q Buffer Flip-Flop is set. Full Adder 1 is gated to Q Buffer 1. The Q0 Register is transferred to the Q1 Register. The Q carry 1 flip-flop is set. At this point, there is return from the multiply cycle. The A Selector Designators are set for an A Register to A Selector Bits 27 through 35 transfer and the A Register to A Selector Bits 24 through 26 transfer. The U Selector Designators are set for clearing the U Register to U Selector Bits 0 through 23, clearing the sign to U Selector Bits 27 through 35, clearing the sign to U Selector Bits 24 through 26, and setting the $S0_U$ Register to U Selector. The C3 Selector is transferred to the C2 Register. The Full Adder is gated to the Q Buffer. The contents of the $V0_U$ Register are gated to the A Register. The contents of the $V0_L$ Register are gated to the A + 1 Register. The Q Buffer is gated to the Q0 Register. The contents of the Q1 Register are right shifted four places and entered into the Q0 Register. The A Selector is transferred to the T1 Register. The A + 1 Selector is transferred to the T2 Register. The U + 1 Selector Designators are set for clearing the U + 1 Register to U + 1 Selector enable and setting the $S0_L$ Register to U + 1 Selector Designator. If a 33,15 instruction is involved, the Busy I flip-flop is cleared. The A Selector Designators are set to clear the A Register to A Selector Bits 0 through 23, and set the T3 Register to the A Selector. The A + 1 Selector Designators are set for clearing the A + 1 Register to A + 1 Selector Bits 0 through 17, clearing the A + 1 Register to A + 1 Selector bits 18 through 35 and setting the T4 Register to A + 1 Selector. Bits 30 through 35 of the Q0 Register are transferred to the A Register. The T1 Excess to T3 Selector Designator is set. Adder 1 is transferred to the T3 Register. Adder 2 is transferred to the T4 Register. The Q1 Register is cleared. The top 12-bits of the T3 Selector are transferred to the T3 Register. The constant $-2000_8$ or $-2001_8$ is transferred to the C1 Register. The N Selector bits 68 or 67 are left shifted three places and sent to the C0 Register. The contents of the Q1 Register are transferred to the Q0 Register and left shifted one place in the process. The test of T3 and T4 will determine whether the M = 0 Flip-Flop is set or cleared. If the C Adder is negative and C2 is positive and the mantissa is unequal to 0 and D5 is clear, the Character Underflow Flip-Flop is set. If the C Adder is negative and C2 is negative and the mantissa is unequal to 0, the Character Overflow Flip-Flop is set. If either mantissa = 0 or the C Adder is negative and either D5 and C2 are positive or D20 is cleared, the Q0 Register is gated to the T1 Register and to the T2 Register. Otherwise, $SM_U$ is gated to the T1 Register and $SM_L$ to the T2 Register. If the mantissa is unequal to 0, the signs are different, and it is not a fault condition, and neither D5 nor C2 is negative or the C Adder is positive, the negative value of the T1 Register is gated to the H1 Register and the negative value of the T2 Register is gated to the H2 Register. Otherwise, the positive value of the T1 Register is transferred to the H1 Register and the positive value of the T2 Register is transferred to the H2 Register. If the Block Final Clear Flip-Flop is not set, the Busy II flip-flop is cleared. For 33,15 instructions, the output Available Flip-Flop and the write enables are set. If the Block Final Clear Flip-Flop is not set, a final clear is executed. Normally at the conclusion of Branch 14 there will be entrance to Branch 15 from control of the branch selection logic.

BRANCH 15 (33,14 and 33,15)

The primary function of Branch 15 is to compress the double-precision floating-point results to a single-precision floating-point result, and the result will reside in the H1 and H2 Registers. As a set up step, U is transferred to the U Buffer and the contents of U + 1 are transferred to the U + 1 Buffer. The S0, V0, S1, V1 and Q1 Registers are cleared. The U Buffer is transferred to the U Register. The negative value of the U + 1 Buffer is transferred to the U + 1 Register. The U Selector Designators are set for U Register to U Selector Bits 0 through 23 transfer, sign to U Selector bits 24 through 26 transfer, the sign to U Selector Bits 27 through 35 transfer and the others are cleared. The U + 1 Selector Designators are set for a U + 1 Register to U + 1 Selector transfer with the others being cleared. The A Selector Designators are set for a T3 Register to A Selector transfer with the others cleared. The A + 1 Selector Designators are set for a T4 Register to A + 1 Selector transfer with the others being cleared. The T3 Selector Designators are set for a U Selector to T3 Selector transfer and the others are cleared. The C3 Selector Designators are set for the constant $-1600_8$ to the C3 Selector transfer with the other cleared. If the U Buffer is positive, the C4 Selector Designators are set for a positive U Register to C4 Selector Bits 27 through 35 transfer and a positive U Register to C4 Selector Bits 24 through 26 transfer, but if the U Buffer is negative, the C4 Selector Designators are set for a negative U Register to C4 Selector Bits 27 through 35 transfer, and a negative U Register to C4 Selector Bits 24 through 26 transfer, and in both cases the others are cleared. The N Selector Designator is set for a constant to the N Selector transfer. The shift matrix designator is set for double right circular shift for enabling the SM upper Bits 27 through 35 and the others are cleared. The contents of Q1 Register are left shifted one place and gated to the Q0 Register. The C4 Selector is transferred to the C1 Register. The C3 Selector transfers $-1600_8$ to the C2 Register. The Block Final Clear Flip-Flop is cleared. The U + 1 Selector is transferred to the T4 Register. The test of T3 and T4 Registers will determine whether the Mantissa = 0 Flip-Flop is to be set. The T3 Selector is transferred to the T3 Register. The C3 Selector Designators are set to clear the constant to the C3 Selector Designator, and set the C0 Register to the C3 Selector Designator. The C4 Selector Designators are cleared. The C Adder is gated to the C0 Register and left shifted three places in the process. If the C Adder Bits 8 and 9 and 10 are set and if the C Adder is positive and if the mantissa is not 0, the Character Overflow Flip-Flop is set. If the C Adder is negative, the Character Underflow Flip-Flop is set. The H1 and H2 Wrap Around Flip-Flops are cleared. The Clear Busy I Flip-Flop is set. The constant zeroes are gated to the C1 Register. The C3 Selector is transferred to the C2 Register. If T3 Bit 35 is not set, the H Selector Designators are set for the +C Adder to the H Selector transfer. If the T3 bit 35 is set, the H Selector Designators are set for a −C Adder to the H Selector transfer. The N Selector bit 69 is left shifted three places and entered into the C0 Register. The constant 2R Designator is cleared. If the mantissa is unequal to 0 and it is not a fault condition, $SM_U$ is gated to the T1 Register. If the mantissa = 0 or a fault condition exists, the contents of $Q0_U$ Register are gated to the T1 Register. The T1 Register is gated to the H1 Register to store the equivalent of 420. The output available flip-flop is set. The write enables are set. The Busy II flip-flop is cleared. A final clear is executed, a clear faults is generated and Branch 15 will then terminate.

CONCLUSION

In conclusion, then, it can be seen from the foregoing detailed description of the preferred embodiment that the various stated objectives of this invention have been achieved. An improved data format conversion system for use in an electronic arithmetic system for converting data formats between coded byte string formats representative of floating-point numbers and floating-point data formats has been described. As described, the data format conversion system includes circuitry that is arranged in the arithmetic section of an electronic data processor, and operates to perform the conversions under electronic sequence timing control without software intervention during the conversion process. As shown, the data format conversion can be either to convert from floating-point to coded byte format, or to convert from coded byte format to floating-point. The conversion circuitry includes receiving circuitry for receiving signals indicative of a numerical value expressed as a floating-point number in a first data format having a predetermined numerical capacity, and to be converted to manifestations indicative of the equivalent of said numerical value expressed as a second data format having a predetermined numerical capacity. These receiving circuits include storage circuits for at least temporarily receiving and storing first manifestations indicating the characteristic of the number and representing the power of the number base of said number in the first format, together with second manifestations indicative of the mantissa for representing the numerical value of the number expressed in the first format, together with manifestations indicative of the arithmetic sign in the first format. The data format conversion circuitry includes an arithmetic system having input circuits coupled to the receiving circuits. The arithmetic system is capable of performing a plurality of data manipulation and data transfer operations, each controlled by a separate branch control logic circuit. The arithmetic system also includes branch control circuits for causing the arithmetic system to perform selected ones of the available data manipulation or transfer operations, as required in the conversion process, the sequence of branch execution being dependent on whether the conversion is from coded decimal byte string format to binary floating-point format, or from binary floating-point format to coded decimal byte string format, as well as upon the actual data words being converted. The branch control and designation circuitry is operative to complete the selected conversion, once initiated, without further instruction or program intervention. The data format conversion circuit is programmable, and the instruction control circuitry is arranged for selecting and activating conversion from one format to another in response to the appropriate initiating programmed instruction. Once the type of conversion is programmably selected, the branch control circuitry selects the predetermined ones of the available branches or data manipulation and transfer sequences in the arithmetic system for converting the first input data format to the second converted data format. The data format conversion system includes circuitry for converting the sign as expressed in the input format to the sign requirements for the output format.

It being recognized that there is modifications of signal arrangements, circuitry selection, circuit arrangement, timing conditions, data word size and format arrangements, and control conditions, will become apparent to those skilled in the art, without departing from the spirit and scope of this invention, what is intended to be protected by Letters Patent is set forth in the appended claims.

We claim:

1. Data format conversion apparatus for use in an electronic digital computer for converting coded byte string data word formats and floating-point data formats, said computer being of the type including receiving means having storage means for receiving and at least temporarily storing a digital data word representing a numerical quantity expressed as a floating-point number in a first data format of a first numerical capacity during its conversion to an equivalent numerical value expressed as a floating-point number in a second data format, said first data format including a first manifestation indicative of the characteristic representing the power of the number base of said data word in said first format, second manifestations indicative of the mantissa for representing the numerical value of the data word expressed in said first data format, and third manifestations indicative of the arithmetic sign in said first data format; arithmetic means having input means coupled to said storage means; output means; and instruction control means responsive to one of a set of conversion instruction words for developing control signals for said arithmetic means during the entire conversion period, the improvement comprising:

branch control means in said arithmetic means including means for effecting AND and OR logic functions connected to receive as inputs thereto said control signals and selected signals from said receiving means;

branch designator flip-flop means coupled to said branch control means adapted to be set and cleared in a predetermined sequence governed by said branch control means for converting said first manifestation to a fourth manifestation indicative of the characteristic representing the power of the number base of said data word in said second format, for converting said second manifestations indicative of the mantissa for representing the numerical value of said data word expressed in said first data format to fifth manifestations indicative of the mantissa for representing the numerical value of said data word expressed in said second data format, and for converting said third manifestation indicative of the arithmetic sign in said first data format to sixth manifestations indicative of the arithmetic sign in said second data format; and means for providing said fourth, fifth and sixth manifestations to said output means.

2. A data format conversion system as in claim 1 wherein said first, second, and third manifestations in said first data format comprise signals indicative of a signed binary floating-point number, and said fourth, fifth, and sixth manifestations in said second data format comprise a signed coded byte string number, each numerical byte of said string being expressed in a binary coded decimal format.

3. A data format conversion system as in claim 1 wherein said first, second, and third manifestations in said first data format comprise a signed coded byte string number, each numerical byte of said string being expressed in a binary coded decimal format, and said fourth, fifth, and sixth manifestations in said second data format comprise a signed binary floating-point number.

4. A data format conversion system as in claim 1 wherein said branch designator flip-flop means includes a first plurality of bistable circuit means, each of said bistable circuit means for uniquely identifying as associated one of said branch control means; a second plurality of bistable circuit means coupled to said first plurality of bistable circuit means for uniquely identifying and activating an associated one of said branch control means; conversion instruction decoding means for identifying the format conversion selected; timing means for controlling the time of activation of each of said branch control means; and control logic means for controlling the operation of said first and second plurality of bistable circuit means for controlling the order of selection for activation of said associated ones of said branch control means.

5. A data format conversion system as in claim 4 wherein said branch control means further includes transfer means for causing an associated one of said bistable circuits in said second plurality of bistable circuit means to be set and all others to be cleared, thereby causing activation of an associated one of said branch control means.

6. A data format conversion system as in claim 1 wherein said arithmetic means includes constant generator means for generating predetermined required constants for use in data format conversion without requiring memory access.

7. In a digital computer of the type including data input means, arithmetic means coupled to said input means and instruction control means, apparatus for converting data words expressed in binary floating-point formats applied to said data input means to data words expressed in coded byte string formats in response to the presence of one of a set of conversion instructions in said instruction control means during the entire conversion operation, the improvement comprising:

branch control means in said arithmetic means including means for effecting AND and OR logic functions connected to receive control signals from said instruction control means;

branch designator flip-flop means connected to receive output signals from said branch control means to be thereby set and cleared in a prescribed sequence for causing said arithmetic means to perform selected ones of a plurality of data manipulation and transfer operations;

characteristic conversion means in said arithmetic means coupled to said data input means and to predetermined ones of said branch designator flip-flop means for generating exponent representing signals indicative of the decimal equivalent of a binary floating-point characteristic;

mantissa conversion means in said arithmetic means coupled to said data input means and to other of said branch designator flip-flop means for providing converted mantissa representing signals indicative of the decimal equivalent of said binary floating-point mantissa;

exponent correction means in said arithmetic means for selecting the corrected magnitude to be represented by said exponent representing signals; and output means coupled to said mantissa conversion means and said exponent correction means for providing said converted mantissa signals and said corrected exponent signals in coded byte string format.

8. A data format conversion system as in claim 7 wherein said characteristic conversion means includes characteristic control means for selecting ones of said branch control means for performing evaluation of the sign of the floating-point data word and binary to decimal conversion of said characteristic.

9. A data format conversion system as in claim 8 wherein said characteristic conversion means further includes bias control means for converting a biased characteristic to an unbiased binary value to be converted to an equivalent decimal value.

10. A data format conversion system as in claim 9 wherein said characteristic conversion means further includes data word characteristic range selection means for alternatively recognizing and coverting single-precision floating-point characteristics and double-precision floating-point characteristics to coded byte string formats.

11. A data format conversion system as in claim 7 wherein said mantissa conversion means includes mantissa control means for selecting ones of said branch control means for performing binary to decimal conversion of said mantissa to be provided as coded byte strings.

12. A data format conversion system as in claim 11 wherein said mantissa control means includes data word mantissa range selection means for alternatively recognizing and converting single-precision floating-point mantissas and double-precision floating-point mantissas to corresponding ranged coded byte string formats.

13. A data format conversion system as in claim 8 wherein said mantissa control means further includes sign byte control means for generating sign bytes for said coded byte string formats.

14. Data format conversion apparatus for a digital computer for converting data words expressed in coded byte string format to corresponding data words expressed in binary floating-point formats wherein said computer is of the type including input means for receiving coded byte string data words to be converted, arithmetic means coupled to said input means for performing selected data manipulation and transfer operations, instruction control means for developing control signals indicative of an operation to be performed and output means connected to receive the results of said operations, the improvement comprising:

branch control means in said arithmetic means including means for performing AND and OR logic functions responsive to control signals occasioned by the presence of a single conversion instruction in said instruction control means;

a plurality of branch designator flip-flops connected to receive output signals from said branch control means to be thereby set and cleared in a prescribed sequence for causing said arithmetic means to perform selected ones of a plurality of data manipulations and transfer operations in a predetermined order;

mantissa conversion means coupled to said data input means and to predetermined ones of said branch designator flip-flops for generating converted mantissa signals indicative of the binary equivalent of the mantissa portion of said coded byte strings;

exponent conversion means coupled to said data input means and to other of said branch designator flip-flops for generating characteristic representing signals indicative of the binary equivalent of the exponent portion of said coded byte strings;

characteristic correction means in said arithmetic means for generating a corrected value of characteristic representing signals; and means for delivering said converted mantissa representing signals, and said corrected characteristic representing signals to said output means.

15. A data format conversion system as in claim 14 wherein said mantissa conversion means includes mantissa control means for selecting ones of said branch control means for detecting and identifying mantissa characters for converting coded byte signals to binary format signals, and packing said binary format signals in a floating-point mantissa format.

16. A data format conversion system as in claim 15 wherein said exponent conversion means includes characteristic control means for selecting ones of said branch control means for detecting and identifying exponent characters for converting said coded byte signals to binary format signals and packing said binary format signals in a floating-point characteristic format.

17. A data format conversion system as in claim 16 wherein said exponent conversion means includes bias control means for converting said binary format signals to biased binary floating-point signals indicative of a biased binary floating-point characteristic.

18. A data format conversion system as in claim 17 wherein said mantissa conversion means and said exponent conversion means each include format error detecting means for providing error signals indicative of format errors detected in said coded byte string data words.

19. A data format conversion system as in claim 18 and further including sign control means for reading said sign bytes and generating sign signals for said floating-point data words.

20. A data format conversion system as in claim 19 and including floating-point data word capacity control means for converting double-precision floating-point data words to single-precision floating-point data words after conversion from said coded byte string formats and prior to output when programmably selected as the format of conversion.

* * * * *